US012632713B2

(12) United States Patent
Lau et al.

(10) Patent No.: US 12,632,713 B2
(45) Date of Patent: May 19, 2026

(54) METHODS AND APPARATUS TO PERFORM TENSOR OPERATIONS

(71) Applicant: Intel Corporation, Santa Clara, CA (US)

(72) Inventors: Horace H. Lau, Mountain View, CA (US); Prashant Arora, Fremont, CA (US); Olivia K. Wu, Los Altos, CA (US); Tony L. Werner, Los Altos, CA (US); Carey K. Kloss, Los Altos, CA (US); Amir Khosrowshahi, San Diego, CA (US); Andrew Yang, Cupertino, CA (US); Aravind Kalaiah, San Jose, CA (US); Vijay Anand R. Korthikanti, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 16/474,029

(22) PCT Filed: Dec. 28, 2017

(86) PCT No.: PCT/US2017/068826
§ 371 (c)(1),
(2) Date: Jun. 26, 2019

(87) PCT Pub. No.: WO2018/126073
PCT Pub. Date: Jul. 5, 2018

(65) Prior Publication Data
US 2019/0392297 A1 Dec. 26, 2019

Related U.S. Application Data

(60) Provisional application No. 62/440,980, filed on Dec. 30, 2016.

(51) Int. Cl.
*G06N 3/063* (2023.01)
*G06F 17/16* (2006.01)
(Continued)

(52) U.S. Cl.
CPC ............. *G06N 3/063* (2013.01); *G06F 17/16* (2013.01); *G06N 3/04* (2013.01); *G06N 3/08* (2013.01)

(58) Field of Classification Search
CPC . G06N 3/08; G06N 3/063; G06N 3/04; G06F 17/16
See application file for complete search history.

(56) References Cited

U.S. PATENT DOCUMENTS 8,924,455 B1    12/2014  Barman et al.
9,779,786 B1 *  10/2017  Wu ...................... G11C 7/1006
(Continued)

FOREIGN PATENT DOCUMENTS

EP         3343356 A1     7/2018
WO    2016/186810 A1    11/2016
(Continued)

OTHER PUBLICATIONS

'Fast Image Scanning With Deep Max-Pooling Convolutional Neural Networks': Giusti, 2013, Image processing.*
(Continued)

*Primary Examiner* — Adam C Standke
(74) *Attorney, Agent, or Firm* — NICHOLSON DE VOS WEBSTER & ELLIOTT LLP

(57) ABSTRACT

A network of matrix processing units (MPUs) is provided on a device, where each MPU is connected to at least one other MPU in the network, and each MPU is to perform matrix multiplication operations. Computer memory stores tensor data and a master control central processing unit (MCC) is provided on the device to receive an instruction from a host
(Continued)

device, where the instruction includes one or more tensor operands based on the tensor data. The MCC invokes a set of operations on one or more of the MPUs based on the instruction, where the set of operations includes operations on the tensor operands. A result is generated from the set of operations, the result embodied as a tensor value.

25 Claims, 47 Drawing Sheets

(51) Int. Cl.
G06N 3/04          (2023.01)
G06N 3/08          (2023.01)

(56)                References Cited

U.S. PATENT DOCUMENTS

| 11,055,063 | B2 * | 7/2021 | Goyal | G06F 7/48 |
|---|---|---|---|---|
| 2003/0022164 | A1 * | 1/2003 | Mills, Jr. | B82Y 10/00 |
| | | | | 435/6.13 |
| 2011/0107060 | A1 | 5/2011 | McAllister et al. | |
| 2011/0307685 | A1 | 12/2011 | Song | |
| 2014/0067735 | A1 | 3/2014 | Yu et al. | |
| 2015/0238148 | A1 | 8/2015 | Georgescu et al. | |
| 2015/0339571 | A1 | 11/2015 | Krizhevsky et al. | |
| 2016/0013773 | A1 | 1/2016 | Dourbal | |
| 2016/0026912 | A1 * | 1/2016 | Falcon | G06N 3/06 |
| | | | | 706/25 |
| 2016/0098633 | A1 | 4/2016 | Min | |
| 2016/0162402 | A1 | 6/2016 | Woolley, Jr. et al. | |
| 2016/0179434 | A1 * | 6/2016 | Herrero Abellanas | |
| | | | | G06F 3/0604 |
| | | | | 711/155 |
| 2016/0342892 | A1 | 11/2016 | Ross | |
| 2016/0342893 | A1 * | 11/2016 | Ross | G06N 3/063 |
| 2017/0060811 | A1 * | 3/2017 | Yang | G06F 17/16 |
| 2017/0097884 | A1 * | 4/2017 | Werner | G06F 15/76 |
| 2017/0132496 | A1 * | 5/2017 | Shoaib | G06N 3/063 |
| 2018/0041434 | A1 * | 2/2018 | Florea | H04L 49/901 |
| 2018/0074787 | A1 * | 3/2018 | Aydonat | G06F 30/34 |
| 2018/0121786 | A1 * | 5/2018 | Narayanaswami | G06N 3/04 |
| 2019/0392297 | A1 | 12/2019 | Lau et al. | |
| 2021/0182077 | A1 * | 6/2021 | Chen | G06F 9/445 |
| 2022/0245438 | A1 | 8/2022 | Lau et al. | |
| 2023/0222331 | A1 | 7/2023 | Lau et al. | |

FOREIGN PATENT DOCUMENTS

| WO | WO-2018107383 | A1 * | 6/2018 | G06F 15/16 |
|---|---|---|---|---|
| WO | 2018/126073 | A1 | 7/2018 | |

OTHER PUBLICATIONS

Austin W, Ballard G, Kolda TG. Parallel tensor compression for large-scale scientific data. In 2016 IEEE international parallel and distributed processing symposium (IPDPS) May 23, 2016.*

Akin, Berkin et al., "Data reorganization in memory using 3D-stacked DRAM." ACM SIGARCH Computer Architecture News 43.3S (Year: 2015).*

Austin W, Ballard G, Kolda TG. Parallel tensor compression for large-scale scientific data. In 2016 IEEE international parallel and distributed processing symposium (IPDPS) May 23 (Year: 2016).*

'Fast Image Scanning With Deep Max-Pooling Convolutional Neural Networks': Giusti, 2013 (Year: 2013).*

EPO; Extended European Search Report issued in EP Patent Application No. 17888101.7, dated Jul. 27, 2020; 7 pages.

International Search Report and Written Opinion for Application No. PCT/US2017/068826, mailed on May 2, 2018, 13 pages.

European Patent Office, "Communication under Rule 71(3) EPC, Intention to grant," issued in connection with European Patent Application No. 17888101.7-1203 on Oct. 12, 2021, 5 pages.

European Patent Office, "European Search Report," issued in connection with European Patent Application No. 21216800.9-1203 on Apr. 21, 2022, 4 pages.

European Patent Office, "Communication pursuant to Article 94(3) EPC," issued in connection with European Patent Application No. 21216800.9-1203 on May 3, 2022, 4 pages.

European Patent Office, "Communication pursuant to Article 94(3) EPC," issued in connection with European Patent Application No. 21216800.9, on Nov. 21, 22, 5 pages.

European Patent Office, "European Search Report," issued in connection with European Application No. 22202120.6, dated Mar. 2, 2023, 8 pages.

Nurvitadhi et al., "Hardware Accelerator for Analytics of Sparse Data," 2016 Design, Automation & Test in Europe Conference & Exhibition, Mar. 14, 2016, pp. 1616-1621, 6 pages.

International Searching Authority, "International Preliminary Report on Patentability," issued in connection with PCT No. PCT/US2017/068826, Jul. 2, 2019, 11 pages.

European Patent Office, "Communication Pursuant to Article 94(3) EPC," issued in connection with European Application No. 21216800.9, dated May 23, 2023, 6 pages.

European Patent Office, "Communication under Rule 71(3) EPC," issued in connection with European Application No. 21216800.9, dated Oct. 24, 2024, 9 pages.

European Patent Office, "Communication pursuant to Article 94(3) EPC," issued in connection with European Patent Application No. 22 202 120.6-1203, dated May 27, 2024, 4 pages.

European Patent Office, "Communication pursuant to Article 94(3) EPC," issued in connection with European Patent Application No. 21 216 800.9-1203, dated May 10, 2024, 4 pages.

European Patent Office, "Communication Pursuant to Article 94(3) EPC," issued in connection with European Patent Application No. 21216800.9, dated Nov. 10, 2023, 5 pages.

European Patent Office, "Communication Pursuant to Article 94(3) EPC," issued in connection with European Patent Application No. 22202120.6-1203, dated Jan. 18, 2024, 4 pages.

United States Patent and Trademark Office, "Non-Final Office Action," issued in connection with U.S. Appl. No. 17/728,175, dated Oct. 4, 2023, 36 pages.

Chen et al., "Eyeriss: An Energy-Efficient Reconfigurable Accelerator for Deep Convolutional Neural Networks", IEEE Journal of Solid-State Circuits, vol. 52, No. 1, Nov. 8, 2016, 12 pages.

Jiang et al., "Matrix Multiplication based on Scalable Macro-Pipelined FPGA Accelerator Architecture", 2009 IEEE International Conference on Reconfigurable Computing and FPGAs, 2009, pp. 48-53.

Non-Final Office Action, U.S. Appl. No. 17/728,175, Apr. 10, 2025, 24 pages.

Non-Final Office Action, U.S. Appl. No. 18/184,651, Apr. 23, 2025, 20 pages.

Final Office Action, U.S. Appl. No. 17/728,175, Sep. 9, 2025, 26 pages.

Final Office Action, U.S. Appl. No. 18/184,651, Oct. 22, 2025, 22 pages.

\* cited by examiner

400

500

700

900

1200

1600

MATRIX PROCESSING RESOURCES 1610

MATRIX PROCESSING CHIP 1620a

1615

1615

MATRIX PROCESSING CHIP 1620d

MATRIX PROCESSING CHIP 1620b

1615

1615

MATRIX PROCESSING CHIP 1620c

INTERCONNECT BUS 1680

HOST PROCESSOR 1660

HOST MEMORY 1670

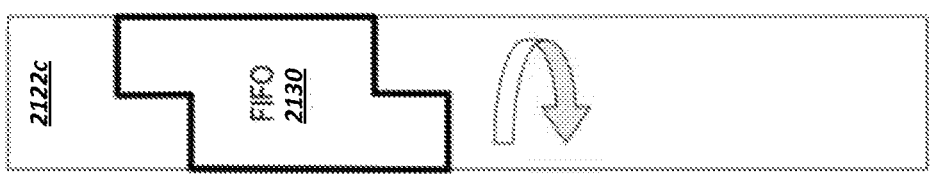
FIG. 21D
FIG. 21C

_2300A_

$$\boxed{\phantom{xx}}_{2310a} = \left(\begin{bmatrix} 1 & 0 & -1 & 0 \\ 0 & 1 & 1 & 0 \\ 0 & -1 & 1 & 0 \\ 0 & 1 & 0 & -1 \end{bmatrix}_{2330a} * \begin{bmatrix} \phantom{xx} \end{bmatrix}_{2320a}\right) * \begin{bmatrix} 1 & 0 & -1 & 0 \\ 0 & 1 & 1 & 0 \\ 0 & -1 & 1 & 0 \\ 0 & 1 & 0 & -1 \end{bmatrix}^{T}_{2340a}$$

_2300B_

$$\boxed{\phantom{x}}_{2310b} = \left(\begin{bmatrix} 1 & 1 & 1 & 0 \\ 0 & 1 & -1 & -1 \end{bmatrix}_{2330b} * \begin{bmatrix} \phantom{xx} \end{bmatrix}_{2320b}\right) * \begin{bmatrix} 1 & 1 & 1 & 0 \\ 0 & 1 & -1 & -1 \end{bmatrix}^{T}_{2340b}$$

MATRIX PARTITIONING

P PARTITIONS

WEIGHT MATRIX (W)    ACTIVATION MATRIX (A)

MULTI-CHIP WEIGHT UPDATE

A    B    C

MULTI-CHIP WEIGHT UPDATE:  STAGE 1

MULTI-CHIP WEIGHT UPDATE:  STAGE 2

MULTI-CHIP FORWARD PROPAGATION

| $a_{11}$ | $a_{12}$ | $a_{13}$ | $a_{14}$ | $a_{15}$ | $a_{16}$ | ... | $a_{1p}$ |
|---|---|---|---|---|---|---|---|
| $a_{21}$ | $a_{22}$ | $a_{23}$ | $a_{24}$ | $a_{25}$ | $a_{26}$ | ... | $a_{2p}$ |
| $a_{31}$ | $a_{32}$ | $a_{33}$ | $a_{34}$ | $a_{35}$ | $a_{36}$ | ... | $a_{3p}$ |
| $a_{41}$ | $a_{42}$ | $a_{43}$ | $a_{44}$ | $a_{45}$ | $a_{46}$ | ... | $a_{4p}$ |
| $a_{51}$ | $a_{52}$ | $a_{53}$ | $a_{54}$ | $a_{55}$ | $a_{56}$ | ... | $a_{5p}$ |
| $a_{61}$ | $a_{62}$ | $a_{63}$ | $a_{64}$ | $a_{65}$ | $a_{66}$ | ... | $a_{6p}$ |
| ... | ... | ... | ... | ... | ... | ... | ... |
| $a_{p1}$ | $a_{p2}$ | $a_{p3}$ | $a_{p4}$ | $a_{p5}$ | $a_{p6}$ | ... | $a_{pp}$ |

A          X          B          =          C $$c_i = \sum a_i {}^* b_i$$

MULTI-CHIP FORWARD PROPAGATION: STAGE 1

$$c_i = a_i {}^* b_i$$

MULTI-CHIP FORWARD PROPAGATION: STAGE 2

MULTI-CHIP BACKWARD PROPAGATION (A$^T$ * B)

MULTI-CHIP BACKWARD PROPAGATION ($A^T * B$): STAGE 1

MULTI-CHIP BACKWARD PROPAGATION ($A^T * B$): STAGE 2

FORWARD PROPAGATION: STAGE 1

FORWARD PROPAGATION: STAGE 2

FORWARD PROPAGATION: STAGE 3

FORWARD PROPAGATION: STAGE 4

FORWARD PROPAGATION RESULT

WEIGHT UPDATE: PARTITIONING

WEIGHT UPDATE: PARTIAL OPERATION 1 OF 4

WEIGHT UPDATE: STAGE 1

WEIGHT UPDATE: STAGE 2

WEIGHT UPDATE: STAGE 3

WEIGHT UPDATE: STAGE 4

IFM1 3201 ⊗ IFM2 3202 = OFM 3203

FIG. 32F

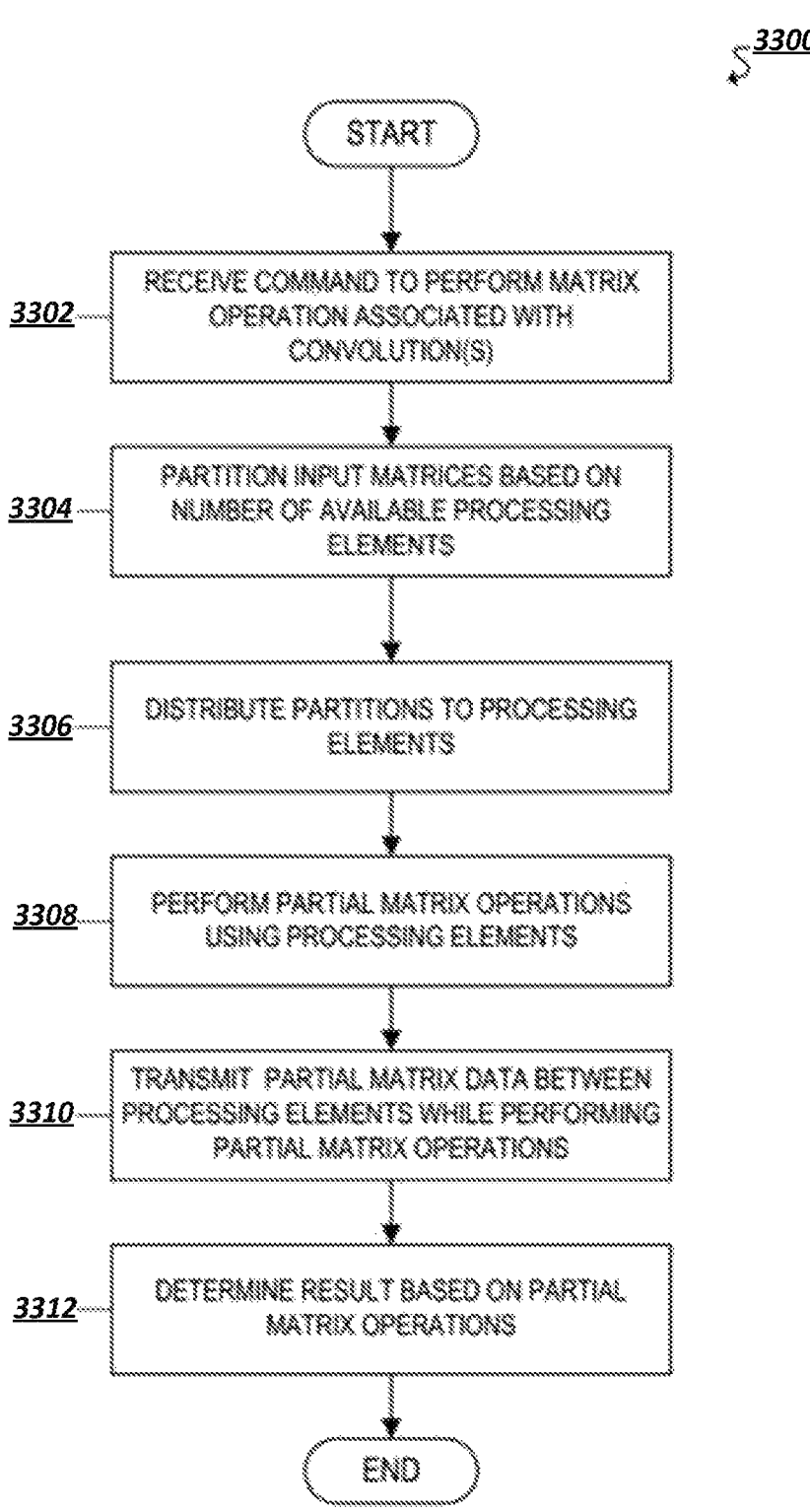

_3300_

START

3302 — RECEIVE COMMAND TO PERFORM MATRIX OPERATION ASSOCIATED WITH CONVOLUTION(S)

3304 — PARTITION INPUT MATRICES BASED ON NUMBER OF AVAILABLE PROCESSING ELEMENTS

3306 — DISTRIBUTE PARTITIONS TO PROCESSING ELEMENTS

3308 — PERFORM PARTIAL MATRIX OPERATIONS USING PROCESSING ELEMENTS

3310 — TRANSMIT PARTIAL MATRIX DATA BETWEEN PROCESSING ELEMENTS WHILE PERFORMING PARTIAL MATRIX OPERATIONS

3312 — DETERMINE RESULT BASED ON PARTIAL MATRIX OPERATIONS

END

FIG. 33

DIMENSIONS: A x B x C

3400A

DIMENSIONS: AB x C

3400B

METHODS AND APPARATUS TO PERFORM TENSOR OPERATIONS

CROSS-REFERENCE TO RELATED APPLICATIONS

This application is a national stage application under 35 U.S.C. § 371 of PCT International Application Serial No. PCT/US2017/068826, filed on Dec. 28, 2017, and entitled DEEP LEARNING HARDWARE, which claims the benefit of U.S. Provisional Patent Application No. 62/440,980, filed on Dec. 30, 2016, and entitled DEEP LEARNING HARD-WARE. The disclosures of the prior applications are considered part of and are hereby incorporated by reference in their entirety in the disclosure of this application.

TECHNICAL FIELD

This disclosure relates in general to the field of computer systems and, more particularly, to machine learning hardware.

BACKGROUND

Artificial neural networks (or ANNs) are generally presented as systems of interconnected "neurons" which can compute values from inputs. ANNs represent one of the most relevant and widespread techniques used to learn and recognize patterns. Consequently, ANNs have emerged as an effective solution for intuitive human/device interactions that improve user experience, a new computation paradigm known as "cognitive computing." Among other usages, ANNs can be used for imaging processing, voice and object recognition or natural language processing. Convolution Neural Networks (CNNs) and Deep Belief Networks (DBNs) are just a few examples of computation paradigms that employ ANN algorithms.

BRIEF DESCRIPTION OF THE DRAWINGS

FIGS. 21A, 21B, 21C and 21D illustrate examples of max pooling using a matrix processing engine.

FIGS. 31A, 31B, 31C, 31D, 31E, 31F and 31G and 32A, 32B, 32C, 32D, 32E and 32F illustrate representations of example neural network operations associated with convolutions.

FIG. 33 illustrates a flowchart for an example embodiment of distributed matrix operations associated with convolutions.

DETAILED DESCRIPTION OF EXAMPLE EMBODIMENTS

Figure 1:
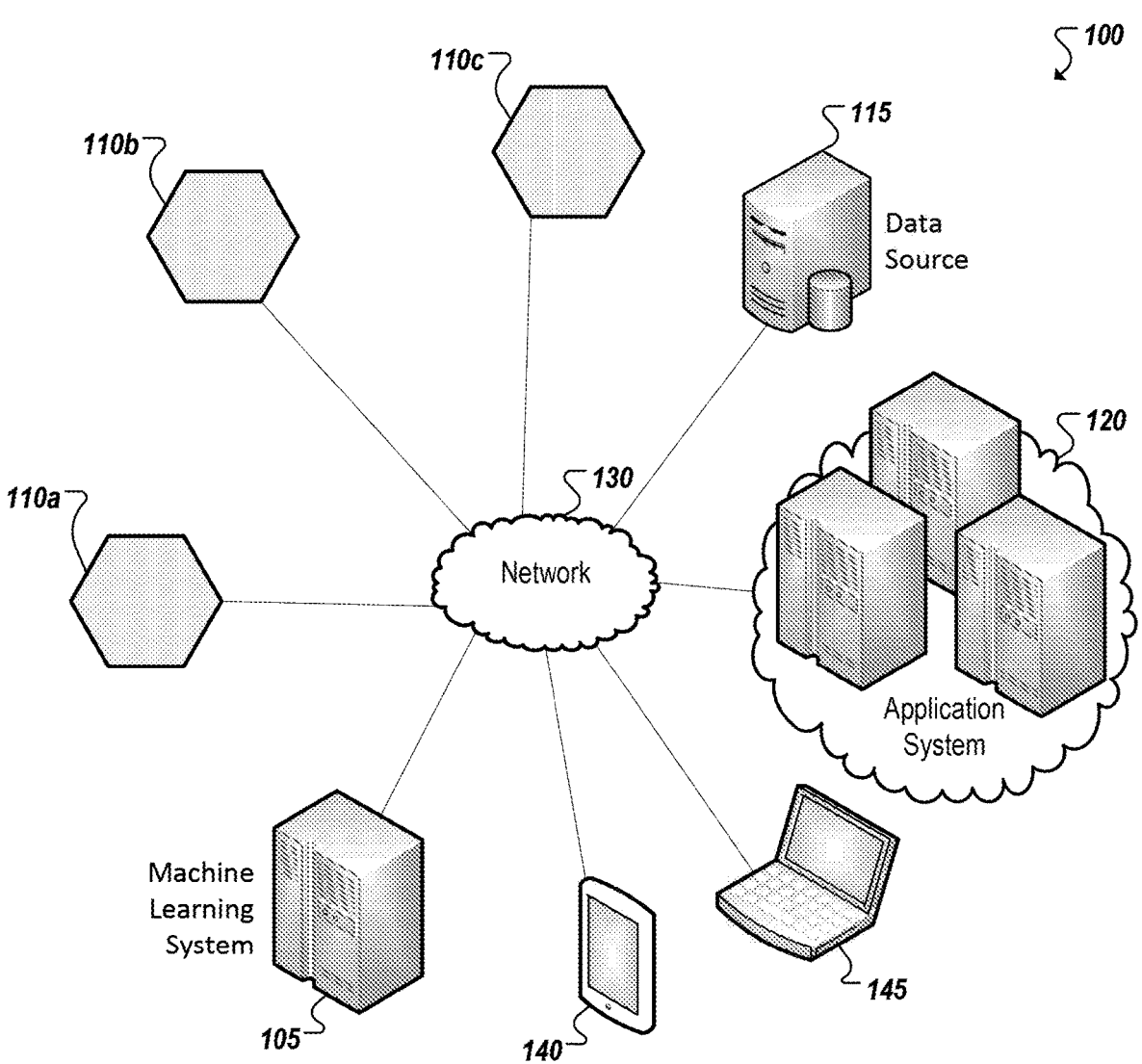
FIG. 1 illustrates an embodiment of a system including a machine learning system.

FIG. 1 illustrates an example computing system including a machine learning computing system 105, which may accept as inputs, data from one or a variety of sources. For instance, sources may include sensor devices (e.g., 110a-c). Such devices 110a-c may detect and/or measure attributes of an environment and generate sensor data describing or capturing characteristics of the environment. For instance, a given sensor may be configured to detect such characteristics as movement, weight, physical contact, temperature, wind, noise, light, computer communications, wireless signals, humidity, the presence of radiation or specific chemical compounds, among several other examples. Sensors may generate numerical data describing these attributes, audio data, photographic images, video, among other sensor data. Sources may additionally include data stores, such as databases of one or more computing systems (e.g., 115), which may aggregate data and/or generate additional data (e.g., from post processing of the aggregated data), such as in connection with a governmental, enterprise, scientific, or other entity or project. Data from the one or more sources (e.g., 110*a-c*, 115, etc.) may be provided to the machine learning computing system 105 to perform machine and deep learning on the information encapsulated in the data. Results produced by the machine learning computing system 105 may be additionally consumed, for instance, by an application system 120 hosting one or more other processes, programs, or applications. User endpoint devices (e.g., 140, 145), such as personal computers and mobile devices, may additionally make use of the results generated from or in connection with a machine learning computing system 105, such as through the consumption of the results by one or more applications hosted by the user devices (e.g., 140, 145), presenting the results on a graphical user interface of the user device, among other examples.

In some instances, as implied by the example illustrated in FIG. 1, a machine learning computing system 105 may be provided as a service (e.g., over a network 130) to one or more other systems (e.g., 120, 140, 145). A machine learning computing system 105 may additionally utilize inputs generated by remote systems (e.g., an Internet of Things (IoT) network composed of multiple sensor devices (e.g., 110*a-c*). In other instances, the functionality of a machine learning computing system 105 may be integrated with any one of the other example systems (e.g., 110*a-c*, 115, 120, 130, 140, 145, etc.). For instance, a wearable device or IoT device (e.g., 110*a-c*) may be provided with machine learning computing resources to operate directly on inputs generated by a sensor of the device. As another example, an application or service may be provided (e.g., by application server system 120), which includes and makes use of machine learning computing resources, among a variety of other examples and use cases. Further, machine learning computing systems may utilized to support or implement products or services based on or utilizing artificial intelligence, including digital personal assistants, chat bots, video games, self-driving cars, robots, and other examples.

In general, "servers," "clients," "computing devices," "network elements," "hosts," "system-type system entities," "user devices," "sensor devices," and "systems" (e.g., 105, 110*a-c*, 115, 120, 130, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

In one implementation, a machine learning computing system may be provided that includes an application-specific integrated circuit (ASIC)-based deep learning hardware (DLH) device provided that is designed to accelerate computations for deep learning applications. The example DLH device may have the flexibility to support both batch-based and on-line training of networks. The DLH device may include a network of interconnected matrix processing units equipped with processing circuitry to perform arithmetic and convolutional operations on tensor operands (e.g., multidimensional matrix operands). Instructions of the MPUs may take tensors as inputs or operands. These instructions may be sent from a general purpose host processor to the DLH device. The instructions, as sent down from the host processor, may also operate on tensors. These instructions may be processed by the control logic of the DLH to feed the other units (MPU, memory, etc.). These instructions may include data movement (e.g. from off-chip memory into on-chip memory, operands in on-chip memory, and the arithmetic operations). This data may be stored and transferred as tensors in on-chip and off-chip memory, and between the host and the chip. For instance, data to be fetched or written to using the MPUs may be stored in tensor form, among other example features. Further, workloads involving a convolution or matrix multiplication operation may be performed by orchestrating portions of the work to be performed substantially in parallel by multiple MPUs. Data transferred between MPUs or even between multiple DLHs (e.g., as in the example of FIG. 2) may be transferred as tensors. Additionally, specialized memory blocks may be provided, with access to the memory shared by the multiple MPUs to limit data exchanges and simplify and expedite workloads involving multiple cooperating MPUs, among other example functions and advantages.

In one example, an example DLH device includes support for high-bandwidth and high-capacity off-chip memory so that large data sets can be loaded from the CPU into the PCIe adapter card, and re-used many times. A flexible architecture enables support for different machine learning network topologies and computational models. Network models such as multilayer perceptrons (MLPs), restricted Boltzmann machines (RBMs), deep belief networks (DBNs), auto-encoders, and convoluted neural networks (CNNs) can all be supported and implementing using such DLH devices. Alternate topologies and algorithms are also possible, with support corresponding to the data and computational requirements of a particular network.

An example processor device may be targeted for use in a PCIe host bus adapter (HBA), although dedicated appliance configurations may also be possible. Specifically, the DLH device may be designed as the main chip(s) on a PCIe host bus adapter card to offload a host CPU of the training and inference operations utilized in deep neural networks.

Figure 2:
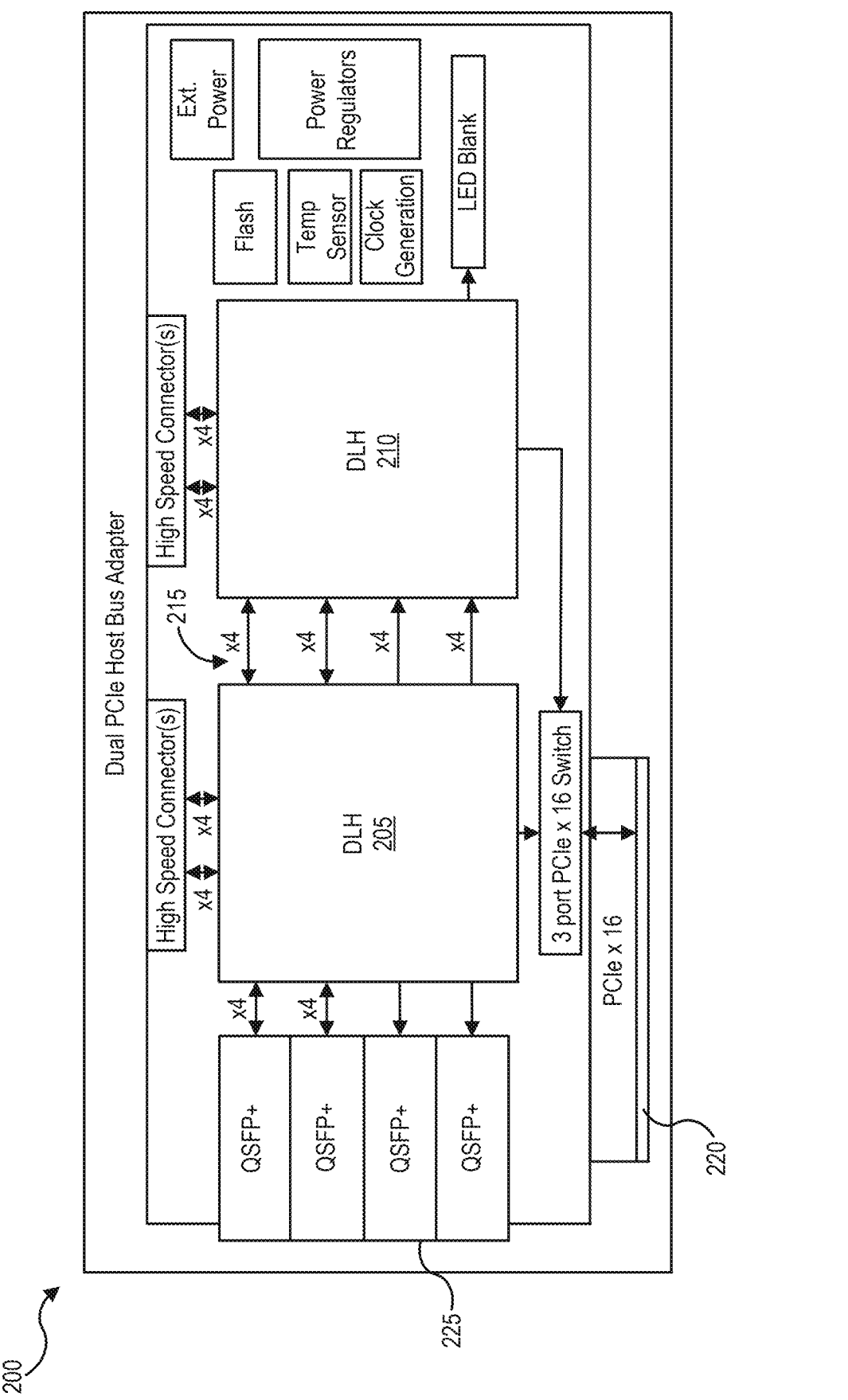
FIG. 2 illustrates an embodiment of a system including deep learning hardware devices connected on a host bus adapter. an example hat map generation system and one or more sensor devices.

As an example, the block diagram 200 of FIG. 2 shows an example system level block diagram of a HBA with two DLH devices 205, 210 coupled to provide doubled compute capability. In this example, the two DLH chips may communicate locally with four or more high-speed Serializer/Deserializer (SerDes) channels (e.g., 215) bonded together for high a high bandwidth connection between the chips, enabling them to act as a single compute node. The architecture of the DLH and the inclusion of high speed links may support scaling of a system to many chip instances to accelerate large networks with many layers. Indeed, other implementations may interconnect more than two DLH devices (e.g., 205, 210) with similar high-speed interconnections, among other examples. To facilitate the development of systems such as that shown in the example of FIG. 2, an example DLH device (e.g., 205, 210) may possess external interfaces such as a Gen3 or Gen4 PCIe interface (e.g., 220), inter-chip communication transceivers (e.g., Quad Small Form-factor Pluggable (QSFP) transceivers) (e.g., 225), multiple SerDes interfaces (one example including up to 48 lanes running at 25 Gbps or higher each, for a total aggregate bi-directional bandwidth of 1.2 Tbps or higher, SPI Flash interface(s) (e.g., for CPU firmware and register initialization), I2C interface(s) (e.g., for general configuration house-keeping functions at the board level), GPIO interface(s) (e.g., to drive LEDs, interrupts, etc.), among other example features.

As noted above, an example DLH device may have an architecture well adapted to support deep learning network topologies such as MLPs, RBM/DBNs, RNNs, Auto-encoders, and CNNs. A tensor-centric process flow may further enhance the DLH device's ability to implement such deep learning solutions. Further, the flexibility built-in to the DLH device may enable such devices to additionally support other topologies and mathematical operations. The DLH device may support both inference and both online and minibatch training.

In order to seamlessly support various deep learning programming paradigms, an example DLH device, such as introduced herein, may be optimized to support matrix operations. For instance, data within the DLH device may be generally handled natively as tensor data to allow operations to be performed on a matrix or vector basis, rather than at a single operand at a time, which may allow for a single high-level instruction to kick-off a long sequence of internal processing operations to implement complex matrix arithmetic and convolutional operations. For instance, one or more Basic Linear Algebra Subprograms (BLAS) levels may be natively supported, including BLAS level 1—vector-vector operations, BLAS level 2—matrix-vector operations, and BLAS level 3—matrix-matrix operations, among other example operations and functionality.

Libraries of subroutines may be provided in an example DLH device to enable instructions to make use of various combinations of the subroutines to implement advance matrix arithmetic and convolution operations. Examples of the specific subroutines supported by the DLH device are described in later sections. In addition to the BLAS routines, the DLH may further support element-wise operations on matrices. These operations can include any mathematical operations, examples being: multiplication and division, addition and subtraction, bit-wise logical operators (|, &, ^, ~), arithmetic and logical shift, comparison operators (>, <, ==, !=), random number generation, and other programmable functions to implement potentially any other required function. Statistical operations across the elements of a matrix may also be natively supported, such as the following: max value and index in rows/columns/matrix, min value and index in rows/columns/matrix, summation across rows/columns/matrix, max absolute value across matrix, among other examples.

In some implementations, the mathematical operations performed by an example DLH device may generally use 16-bit primary operands from memory/registers. It might also use larger (32 b or more) or smaller (8 b or less) operands. In one example, the operations are neither fixed-point integer, nor floating point in nature, but may be implemented as a hybrid or in-between operation. For instance, tensor operands may be utilized, with a tensor having a single exponent value for all the values within the tensor (e.g., a scalar, vector, or matrix). Hardware of the DLH device may be designed according to a block-based floating point-like implementation.

In some implementations, an DLH device may support parallelization and scalability by instantiating multiple processing clusters on a single DLH, as well as providing high-speed communication between chips. The processing clusters on a single chip may be interconnected in a ring or 2-D mesh to provide communication between any clusters on the chip. Both bulk data and control data may be transferred between clusters via the on-chip mesh fabric. In one example, multiple DLH devices can be linked together via high-speed serial links in order to distribute a neural network across multiple chips in order to speed up processing. For instance, an inter-chip network may be implemented according to a Ring, 1/2/3-D mesh, or 1/2/3-D toroidal network topology, among other examples. The hardware of the device may ensure reliable data transport across the links with a hardware ACK/NAK and retry mechanism similar to PCIe so that a deep software stack is not required to handle inter-chip communication. A level of multi-cast support may also be provided in both the on-chip and inter-chip networks.

In one example, an DLH device may implement arithmetic processing to support two major operational modes—one for matrix operations, and one convolutions. Matrix operation mode may be optimized for high arithmetic utilization for matrix operations (specifically matrix multiplication). Matrix inputs and outputs may be kept in on-chip memory as much as possible, and matrix data may be passed from one processing cluster to another. Convolution mode may be a superset of matrix operation mode. On-chip convolution data formatters allow the convolution operations to be efficiently cast as matrix multiplications while greatly reducing the off-chip memory bandwidth requirements. Convolutional operations can be thought of as a hardware accelerated front-end to the matrix operations. These modes may be used to implement a variety of deep learning solutions.

Figure 3:
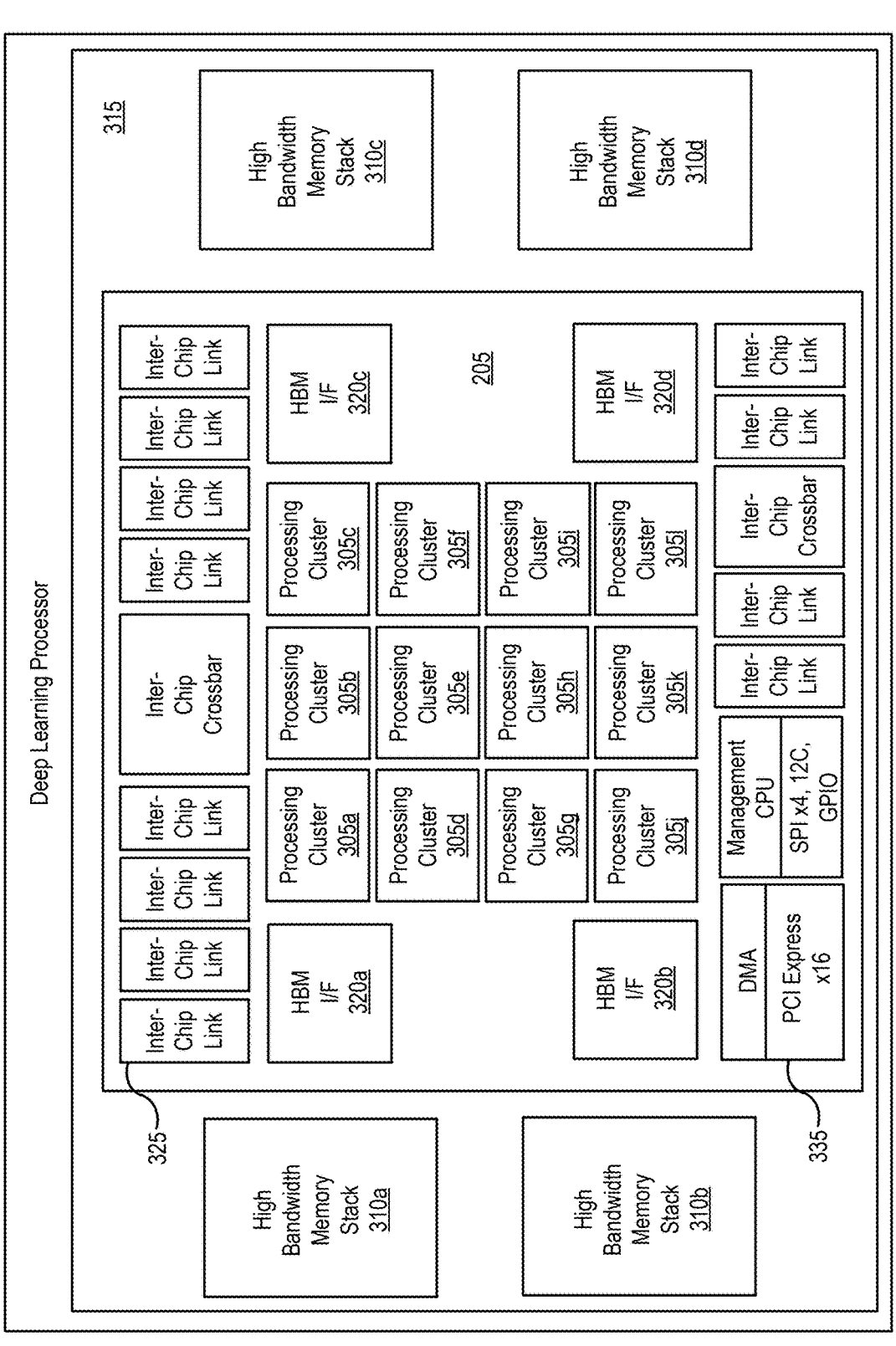
FIG. 3 is a simplified block diagram illustrating an example deep learning processor device.

Turning to the simplified block diagram of FIG. 3, a top level block diagram of an example DLH-based deep learning processor device is shown. A DLH device (e.g., 205) may include a network of processing clusters (e.g., 305a-l) to interface with high bandwidth memory (HBM) (e.g., 310a-d). In this example, four high bandwidth memory (HBM) stacked dies 310a-d are provided, but not on the same silicon die as the DLH device 205. In this example, however, HBMs may be contained within the same 2.5D package 315 as the DLH device, such as shown in the diagram of FIG. 3. In one example, the peripheral interfaces (HBM interfaces (e.g., 320a-d), inter-chip links (ICL) (e.g., 325), PCIe interface, etc.) may run asynchronously to the core so that their clock requirements can be handled independently. In one example, a host interface (HIF) block (e.g., 335) may be provided in an example DLH device, the host interface block composed of a PCIe x16 endpoint controller and a direct memory access (DMA) engine to interact with the rest of the system. The Direct Memory Access (DMA) block of the HIF 335 supports read and write DMA to offload data transfers between the DLH device 205 and a host CPU (not shown). In one example, scatter/gather DMA is supported in hardware, and the DMA descriptors are generalized to support multiple configurations (e.g. ring buffers, linear buffer, etc.), allowing for different types of host driver optimization. Multiple DMA channels are supported to allow multiplexing of various data and instruction streams simultaneously. The DLH device 205 may support host-controlled peer-to-peer DMA, among other example features.

Figure 4:
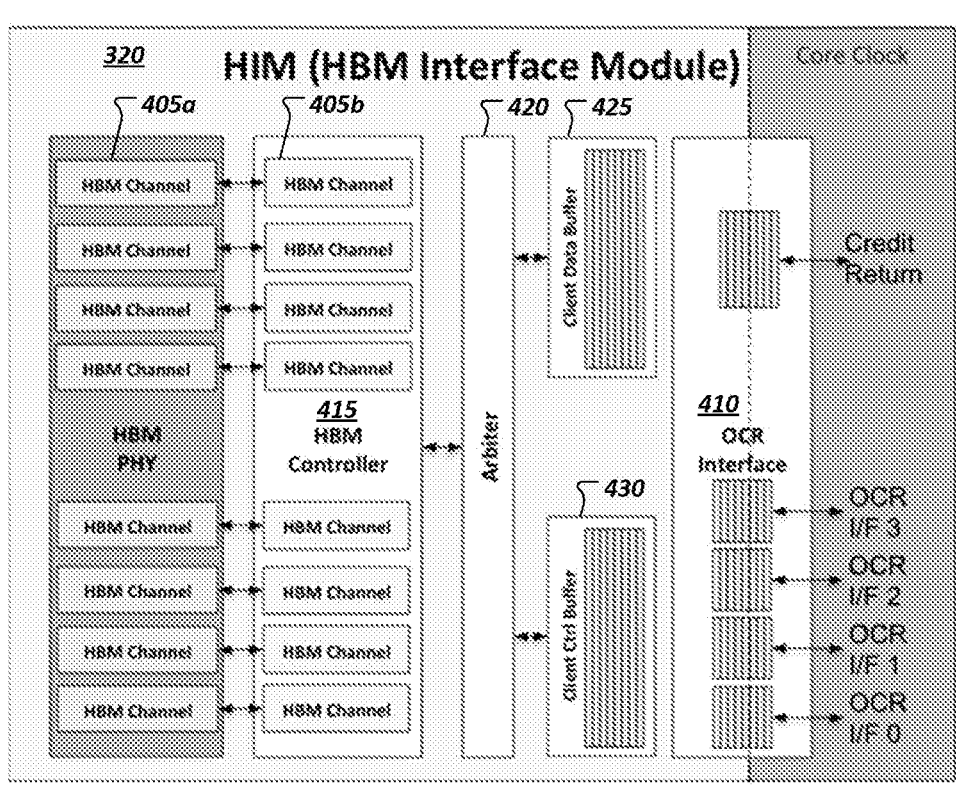
FIG. 4 is a simplified block diagram illustrating an example memory interface block.

In one example, a DLH device 205 may support multiple HBM memory interfaces (e.g., 320*a-d*). The diagram 400 of FIG. 4 illustrates an example implementation of an HBM interface of DLH device. Each HBM interface 320 of FIG. 4 may be logically split into multiple individual memory channels operating simultaneously. Each channel (e.g., 405*a*, 405*b*, etc.) may operate independently of the other channels with its own command channel and address space. Each HBM interface (e.g., 320 of FIG. 4) may support a single HBM die stack (e.g., 310*a-d* of FIG. 3) up to the currently supported maximum HBM capacity (in one example it could be 8 GB per stack). Each HIM block 320 may be independent of the other HIM blocks on the chip. Data between the multiple interfaces is to be managed carefully by software to ensure that the storage capacity as well as the bandwidth is utilized effectively by the processing clusters of the DLH device. For instance, a HBM controller 415, arbiter circuitry 420 (connected to various client data buffers (e.g., 425, 430)), and other logic may be provided to manage data across the HIM block 320. A HIM block 320 may further expose interfaces at the core frequency of the processing clusters of the DLH device. For instance, an interface (e.g., 410) to an on-chip router (OCR) of a processing cluster or the DLH device may be provided. The HIM may queue up data and requests from each client separately for flow control purposes in order to prevent congestion in the on-chip network.

An example DLH device may be designed to have the ability to scale-out processing across multiple chips/boards/systems so that larger computational models can be transparently deployed by the end user. In artificial neural networks, inter-chip communication may be utilized for instance to scale up the capacity of a network (i.e. more layers, nodes, more parameters, etc.), speed up the training of a network by splitting the computation of the network across multiple nodes, among other example functions.

Figure 5:
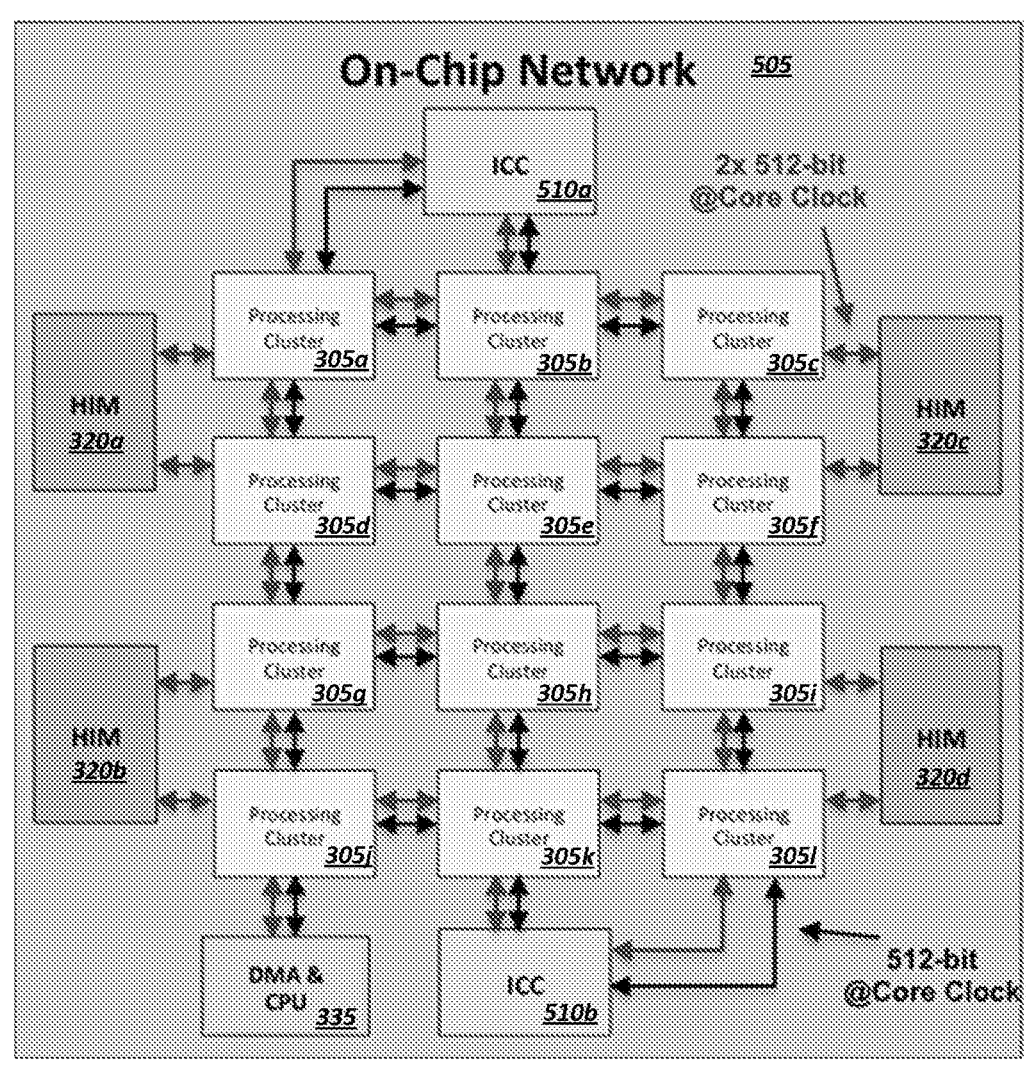
FIG. 5 is a simplified block diagram illustrating an example on-chip network.
Figure 6:
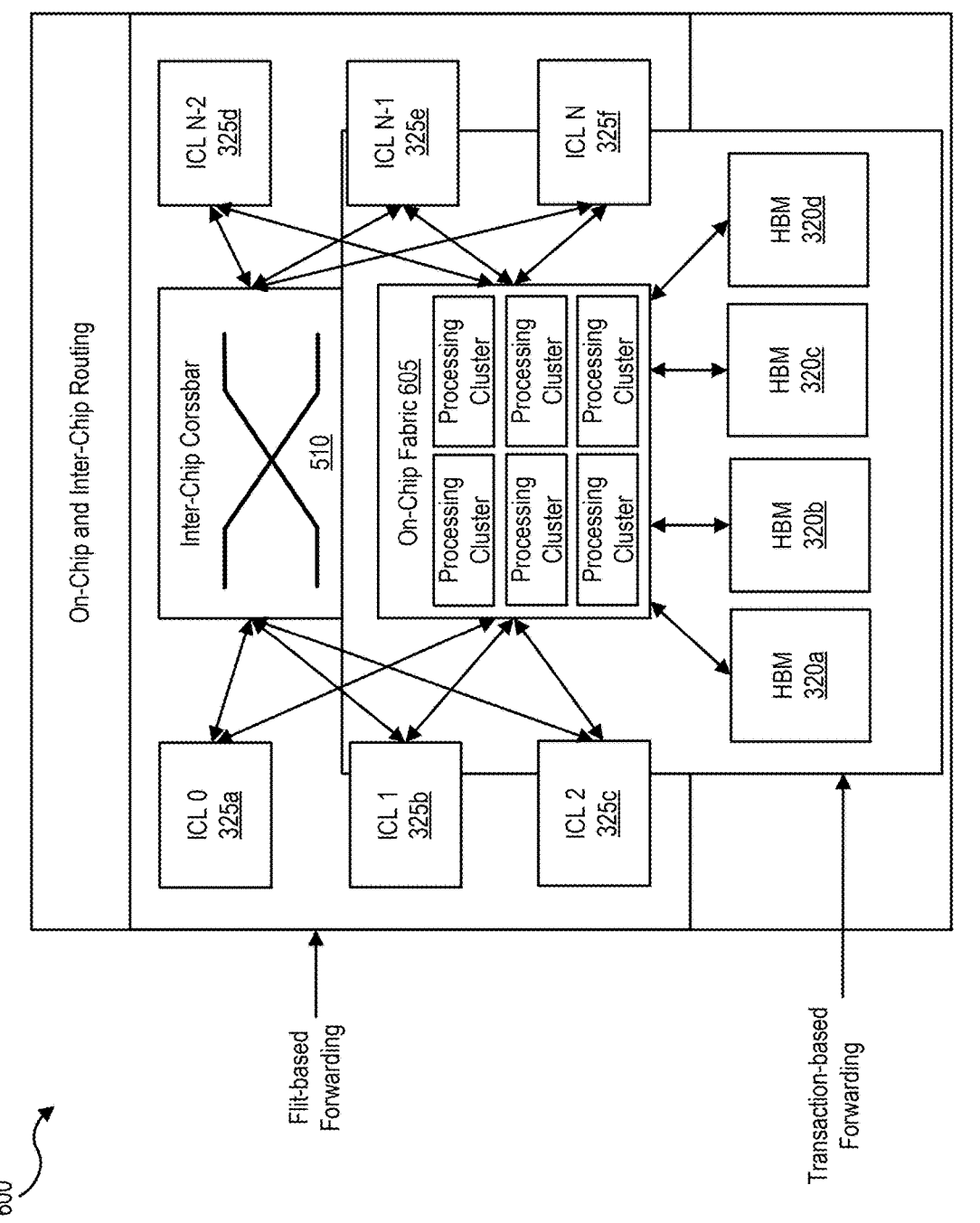
FIG. 6 is a representation of routing in a deep learning processor device.

As shown in the example shown in the diagram 500 of FIG. 5, an on-chip network 505 of an example DLH device and the corresponding inter-chip network may work together to deliver data between chips and processing clusters (e.g., 305*a-l*). In order to reduce latency and reduce buffering requirements for reliable data transport, the inter-chip network (facilitated through inter-chip interfaces (e.g., 510*a-b*) may be a flit-based architecture with cut-through forwarding support. In some cases, the on-chip network may be transaction based because data transport is assumed to be reliable. The diagram 600 of FIG. 6 shows how flit segmentation and re-assembly may be performed at the interface between the on-chip and inter-chip networks. The primary components of the Inter-chip network, in one example, may be an inter-chip link (ICL) blocks (e.g., 325*a-f*) and an inter-chip crossbar (ICC) hardware (e.g., 510). An on-chip fabric 605 may be used to interconnect the DHL processing clusters (which, in turn, may connect to HBMs (e.g., 320*a-d*)). In some implementations multiple (e.g., 12) ICLs (e.g., 325*a-f*) may be provided to support multiple interconnect topologies, among other example implementations.

Figure 7:
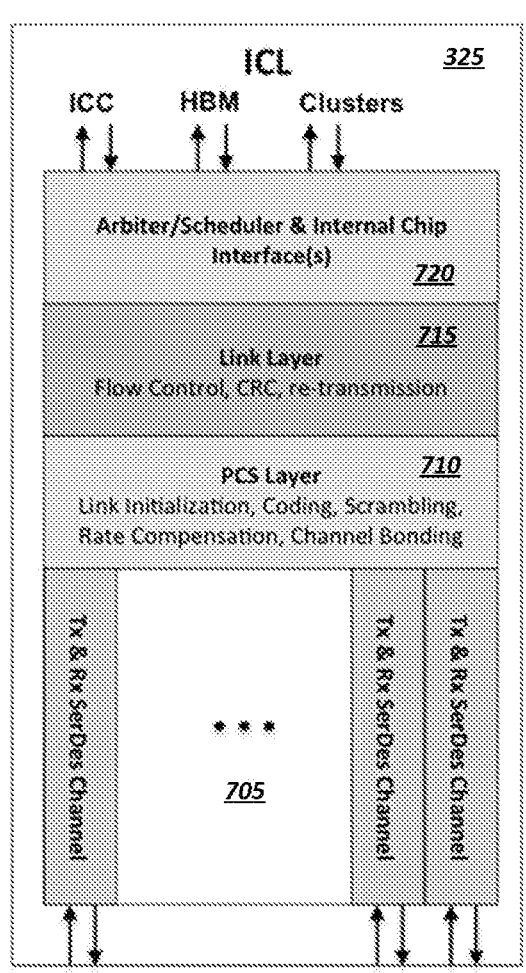
FIG. 7 a simplified block diagram illustrating an example inter-chip link module.

FIG. 7 is block diagram 700 illustrating an example ICL 325. An ICL 325 may be provided with primary functions such as SerDes physical layer (PHY) instantiation 705, a physical coding sublayer (PCS) layer 710, a link layer 715 (to provide reliable data transmission and error checking, time synchronization, network discovery, etc.), and a transaction layer 720 (e.g., to interface to ICC, on-chip network, and HBM, perform flit segmentation and re-assembly, flow control credit handling, virtual channel (VC) and priority arbiter, etc.), among other examples.

Returning the examples of FIGS. 6 and 7, some implementations of a DLH device may include one or more instances of an ICC (e.g., 510). An example ICC may provide the following primary functions: switch data from input port to output port, route data to the proper port to reach the final intended destination, congestion management, multi-cast support (e.g., as a packet can be both consumed by chip as well as forwarded to another port), among other example features. An ICC may be provided with functionality to support sophisticated routing algorithms with a fully programmable route look-up table. The ICC may support four or more VCs, two or more priorities, and cut-through forwarding.

In some implementations, on-chip blocks may be connected via one or more full bandwidth busses. In the case where there is more than one bus connecting two blocks, different classes of data might be sent on the busses in order to maintain ordering or meet bandwidth requirements of different network types. As an example, a multilayer perceptron (MLP) might require more cluster-to-cluster bandwidth, and a convolutional network (CNN) might require more cluster-to-memory bandwidth, among other examples.

An example DLH device may include multiple processing clusters. For instance, as shown in the diagram 800 of FIG. 8, in one example, each processing cluster 305 of FIG. 3 may store local tensor information, processes instruction streams from the host, and perform the computations required by the artificial neural networks. Each processing cluster may also include an on-chip routing block to send/receive data from other blocks on the chip, including other clusters and peripheral devices. For instance, an example processing cluster may include a master control central processing unit (MCC) (e.g., 805), one or more matrix processing units (MPU) (e.g., 810*a*), a matrix element storage and slicing (MES) block (e.g., 815) (which may include a convolutional slicing engine (CSE) 820 and super memory resource block (SMB) (which includes multiple shared memory resource blocks (MRBs) (e.g., 830*a-j*) configured for storing tensor data for access by MPUs (e.g., 810*a*)), and an on-chip router (OCR) 825, among other example components.

An MCC (Master Control CPU) may take in a stream of instructions from a host CPU connected to a DLH device. These instructions can be thought of as macro-commands from the host CPU. These instructions may pass or include tensor data for operation using processing clusters of the DLH. With each instruction, the MCC may invoke a series of operations on the MPUs of one or more processing clusters. The MCC may coordinate the data flow and arithmetic operations that are sequenced to the MPUs.

A sample of macro instruction to the MCC may be of the form C=A*B. The instruction contains the handles to each of the matrices, and hints to indicate how to store the matrices in the MRBs. In this example, performing the entire operation may entail sub-operations such as: performing blocking on matrix A and B to break down into 32×32 matrix multiplications, performing matrix multiplication by sending blocked sections of matrix A and matrix B into the MPU(s) so that the final matrix product is formed, storing the matrix C partial products and the final product into the MRB(s), and repeating until all (e.g., 32×32) output blocks of matrix C have been computed, among other examples.

Figure 9:
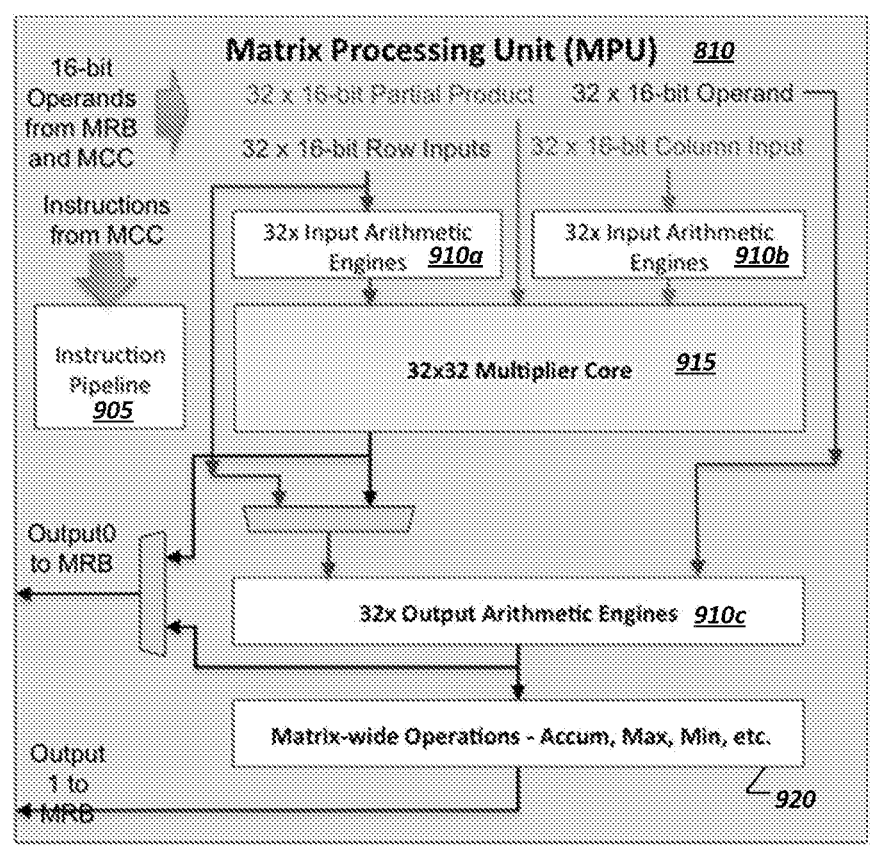
FIG. 9 is a simplified block diagram illustrating an example matrix processing unit.

Turning to FIG. 9, a representation 900 of an example MPU 810 is provided. Matrix Processing Units (MPU) 810 may represent the primary data computation engine of an example DLH device and its processing cluster(s). Each cluster may contain two or more instances of the MPU, which may be independently controlled. In some implementations, a MPU may be optimized for matrix-matrix multiplication operations. The MPU may receive instructions from the MCC (e.g., through instruction pipeline 905) and operands from the SMB. The MCC and MRB inputs may be synchronized by the MCC externally so that the MPU makes use of all data as it comes in. The MPU may be implemented as a flow-through architecture that never stalls.

Commands from an MCC may instruct the MPU to perform a series of arithmetic operations, which may or may not include matrix multiplication. The arithmetic engines (e.g., 910$a$-$c$) in the MPU may be arranged to provide binary operations on input data prior to matrix multiplication (e.g., using matrix multiplier core 915), as well as binary and unary operations on output data post-matrix multiplication. These pre- and post-operations increase the number of arithmetic operations that can be performed on each set of data fetched from internal memory, as the architecture is bound by memory bandwidth. A set of matrix-wide operations (e.g., provided by circuitry 920) may also be provided to process data among the elements of a single matrix (e.g. max value in matrix plus indices), among other examples.

In some examples, a MPU 810 can perform the following arithmetic operations matrix multiplication, unary matrix operations (including but not limited to square, bitwise inversion, absolute value, software programmed look-up table based function, random number generation (RNG), etc.), binary matrix operations (including but not limited to addition (+), subtraction (−), multiplication (*), division (/), bitwise XOR, AND, OR, logical and arithmetic left and right shift, comparison (>, <, >=, <=, ==, !=)). MPU operations may further include column-wise, row-wise, and matrix-wide operations such as sum, max value (and indices), min value (and indices), max absolute value, among other examples.

An example MCC may sequence data from an MES into the MPU as blocks of matrix data. For instance, for a 32×32 matrix block, each operand may be a 16-bit, signed, fixed point number. The location of the decimal point may be managed by the host, and come to the MPU as part of the instruction. Design of an example DLH device may be fully pipelined and can take in up to four sets of 32 operands (e.g., tensor operands) per cycle to perform matrix multiplication, as well as partial product addition and pre- and post-multiplication operations.

Figure 10:
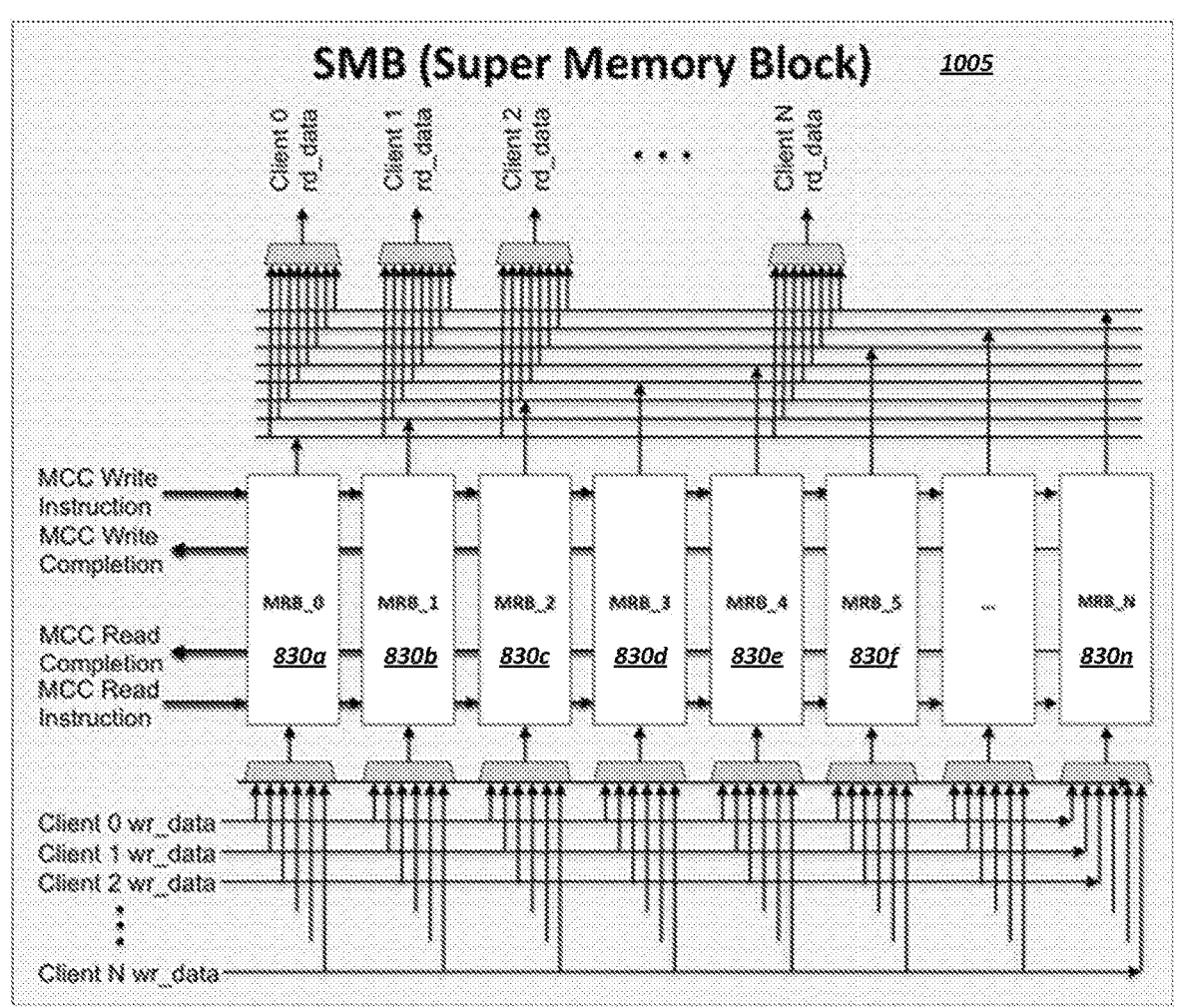
FIG. 10 is a simplified block diagram illustrating an example super memory block.

An example DLH device may include a Super Memory Block (SMB) that groups together all the memory resource blocks (MRBs) in that corresponding processing cluster. Multiple on-chip clients have both read and write access to the MRBs within the SMB. For instance, FIG. 10 shows a representative diagram 1000 of inputs and outputs of an example SMB 1005, and the routing between the composite MRBs (e.g., 830$a$-$n$) and the ports of the SMB 1005. Note that the inputs and outputs shown in the example of FIG. 10 are not necessarily complete, but show a representative set. In one example, the MRBs (e.g., 830$a$-$n$) in the SMB are shared between the two MPUs within a cluster. Because the memory is shared between the two processing nodes, there is no need to move data inside the chip to perform distributed matrix multiplication over the two MPUs. None of the following common data movements required in distributed matrix multiplication are required between the two MPU processing nodes, in such implementations, such as row/column broadcast, block shifting up/down, right/left, matrix copy, data gather, matrix transpose, matrix expansion/duplication, among other examples. Instead, such operations may be handled by simply pointing each MPU to the right block of data in the appropriate MRB(s). An MRB (e.g., 830$a$-$n$) may be implemented to store and retrieve matrix data (and other tensor data) efficiently. For instance, each MRB may be configured to read and write 32 matrix values either row-wise or column-wise every cycle. As an example, a MRB (e.g., 830$a$-$n$) may be composed of 16 logical memories with individual addressing and input and output data rotation to support both the row and column access, among other example implementations.

Figure 11:
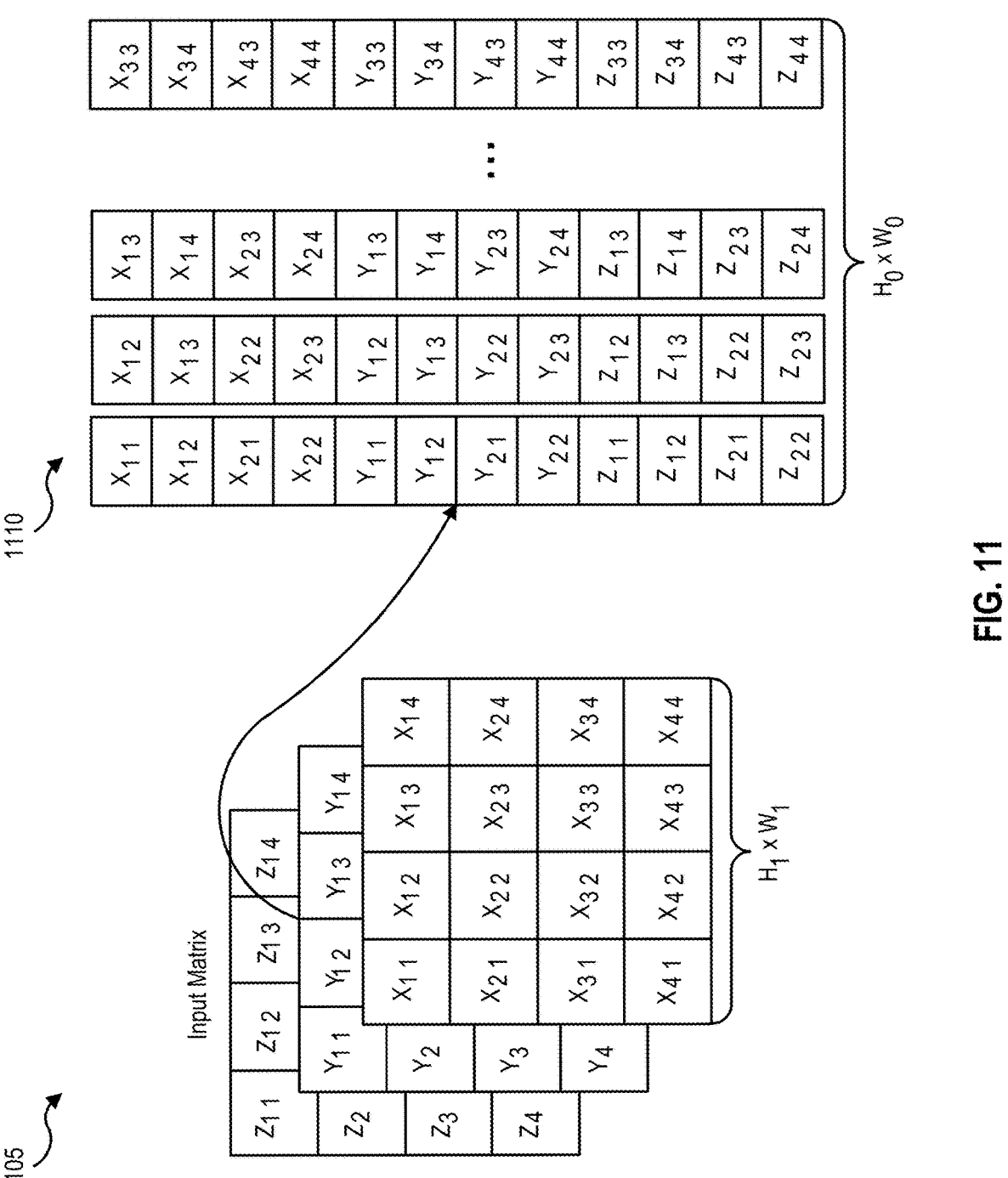
FIG. 11 is a simplified block diagram representing the flattening of matrix data using an example convolution slicing engine.

As noted above, an SMB (e.g., 1005) may additionally include convolution slicing engine (CSE) circuity to read data in from main memory and formats the data in such a way that 2D convolutions can be cast as matrix multiplications. For instance, the CSE allows the reuse of the main DLH device matrix multiplication datapath for efficient convolutions rather than implementing an entirely separate convolution engine and datapath, which takes up valuable die area. Locally storing and re-using the data in the CSE preserves off-chip memory bandwidth and reduces power consumption. The CSE may take in multiple rows of data, and re-use the data many times to flatten out 2D regions (e.g., 1105) into rows or columns (e.g., 1110) of a matrix (e.g., as illustrated in the example of FIG. 11). Once the data is flattened into a row or column, it can be fed into the MPUs to be convolved with multiple filter weights, which may also be formed into a matrix. In addition to input data (or feature maps), the CSE can be efficiently used for any operation that takes multiple overlapping two-dimensional blocks of data and flattens them into rows or columns for processing. In addition to convolutions, the CSE supports data flattening for the other operations in commonly used in convolutional network such as local response normalization (LRN), local contrast normalization (LCN), max pooling, strides, filter sizing, padding, among other examples.

Figure 8:
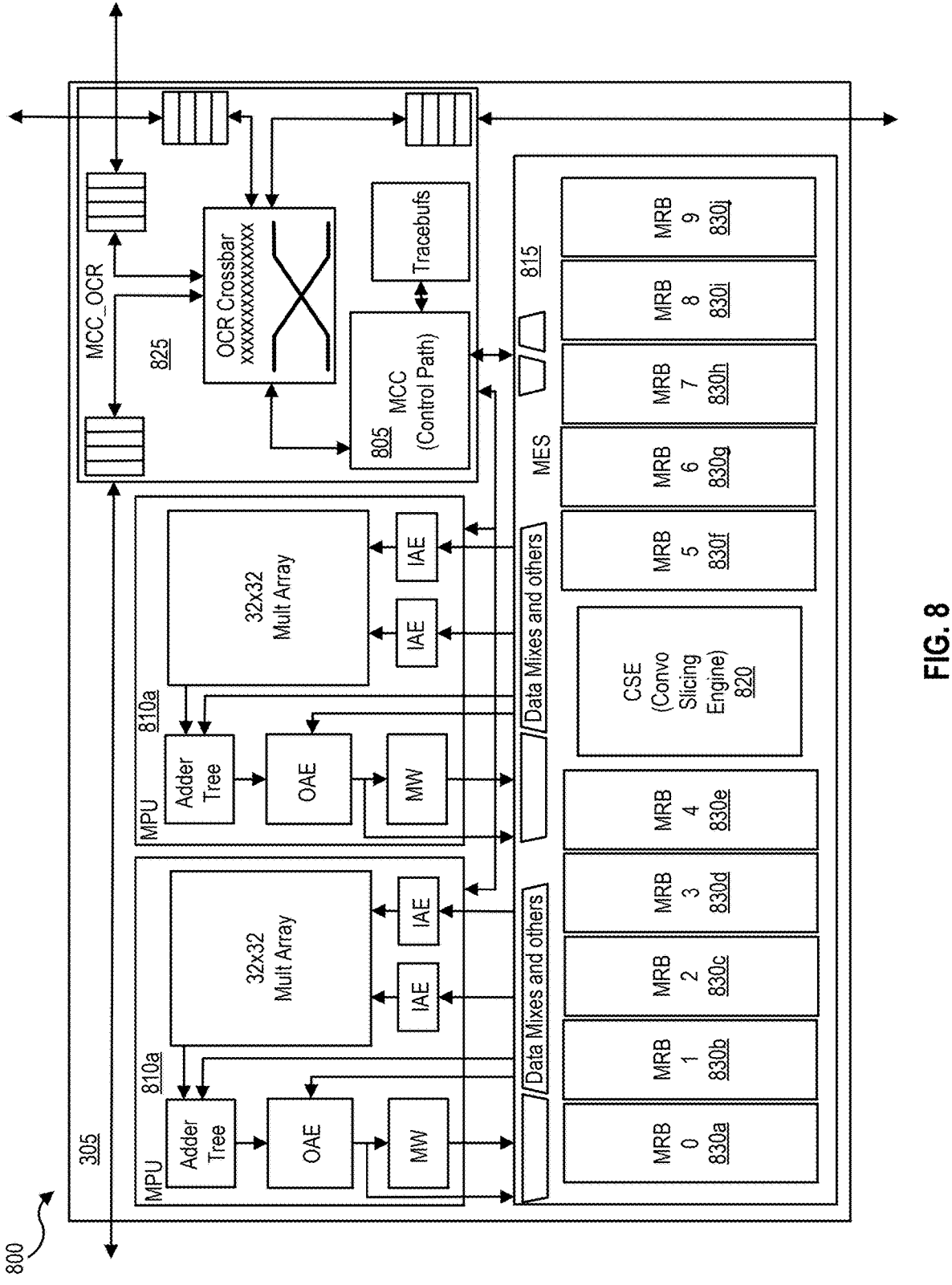
FIG. 8 is a simplified block diagram illustrating an example matrix processing cluster.

An example processing cluster may additionally include an on-chip router (OCR) 825 (as shown in FIG. 8) that is responsible for routing data between its various ports. A single port is provided to the cluster blocks to the networks. The other 4 ports send and receive data from neighboring processing clusters. Separate routers may be provided for each of the separate 2D mesh networks on the chip to keep different types of data independent. In some implementations, an OCR may be implemented as a full duplex router, with equal ingress and egress bandwidth. The OCR may route traffic in multiple directions (e.g., North, South, East, West, and into the cluster).

In some implementations, additional components may be included in an example processing cluster or DLH device. For instance, in some implementations, an example DLH device may be provided with a small management CPU for general housekeeping duties. The management processor may include various management interfaces and entities including flash memory interfaces, I2C management interfaces, temperature monitoring, management CPU, etc. The processing clusters in an example DLH device may share the I/O devices on the chip. For instance, HBM, PCIe, and SerDes interface resources are not dedicated to a particular cluster. Access to these devices may involve arbitration by the I/O device for scheduling and fairness. In addition, requests to these I/O devices must not saturate the on-chip network in a way that causes congestion to stay within the network rather than the I/O devices should the I/O device create back-pressure.

Figure 12:
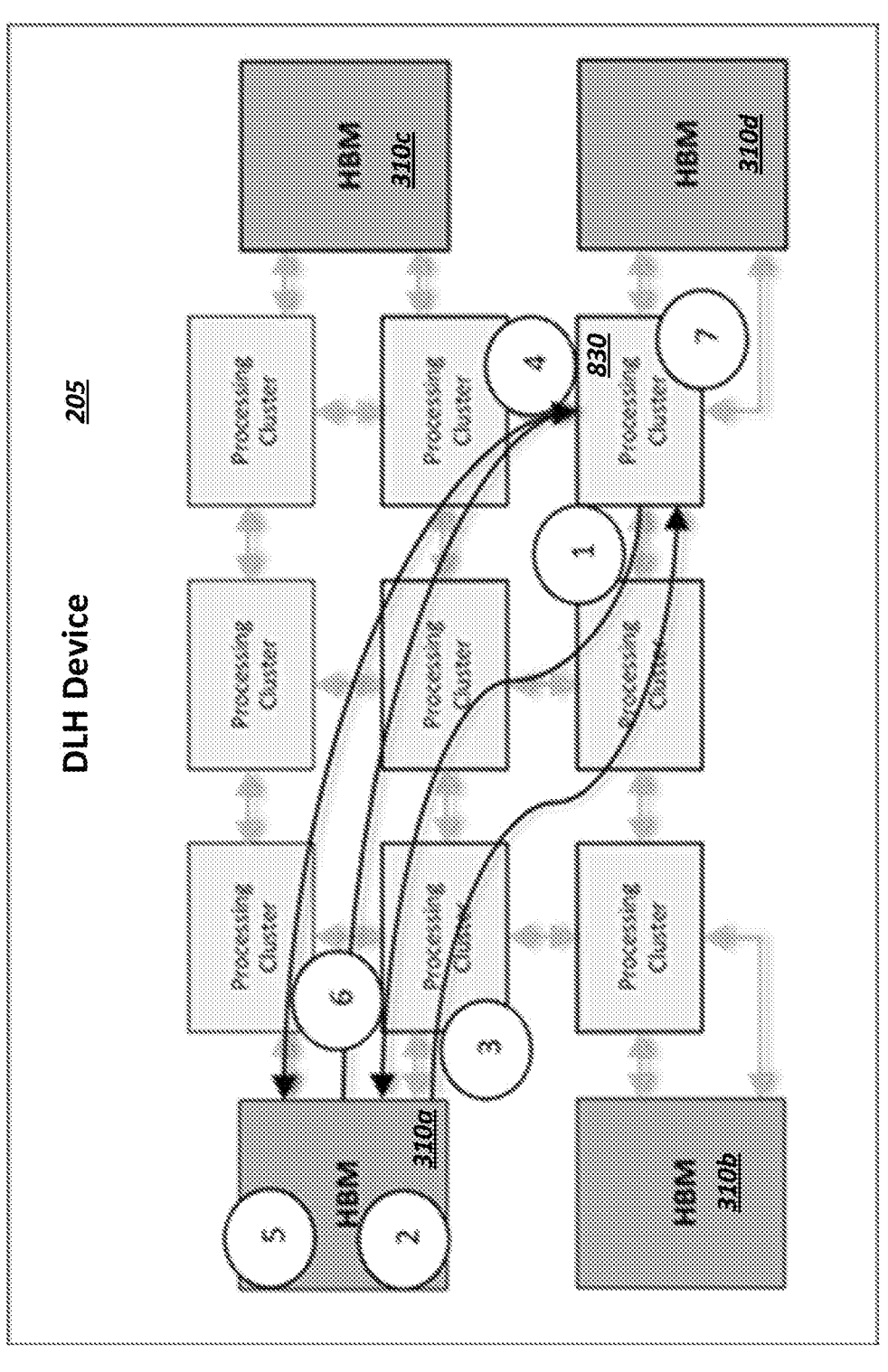
FIG. 12 is a simplified block diagram illustrating example operation of a deep learning processor device.

An example DLH device may support communication between clusters to allow mapping of distributed algorithms across many processing clusters. These clusters can be on the same chip, or different chips, or both. The control flow needs to support both on-chip and inter-chip cluster communication. Turning to FIG. 12, a diagram 1200 is shown illustrating the example operation of a DLH device.

For instance, a particular processing cluster (or client) 305 may send a request to an IO device (e.g., an HBM (e.g.,)). The request (at 1) may be routed to a particular processing cluster (e.g., 305) through the on-chip control network. The I/O device (e.g., 310*a*) may buffer (at 2) the various requests it receives and perform arbitration and scheduling of responses to the requests. When buffer space is available in the I/O device, the next client selected (at 3) by the I/O device is sent a Clear To Send (CTS) through the on-chip control network. The client receives the CTS and issues the write request (at 4) and data to the I/O device. The write request is forwarded by the on-chip network to the I/O device. The I/O device may handle the write (at 5) and issue (at 6) a write response back to the client through the on-chip network. The client may receive (at 7) the write response and retires the request.

A system utilizing an example DLH device, such as discussed herein, may be further provided with management software that relies on interrupts of the device to communicate status and error information, among other examples. For instance, each cluster or register group may have three interrupts that are routed and coalesced into chip top-level interrupts, such as High priority interrupts, Low priority interrupts, and Non-Maskable Interrupts (NMI), among other examples.

Various algorithms and strategies may be used to scale networks across multiple chips. When scaling a network across multiple nodes, both data parallelism and model parallelism may be employed. For instance, with data parallelism, the network model is such that independent pieces of data can be processed separately by individual processing nodes, without the need for constant synchronization and communication between the nodes. A typical example is the convolutional layers of a convolutional neural network. In such cases, data is simply sent to the nodes, and after some amount of time, the nodes return their individual results. In other cases, distributed matrix multiplication may utilize techniques such as SUMMA and Cannon's algorithm, among other examples, such as those described in the appendices.

Figure 13:
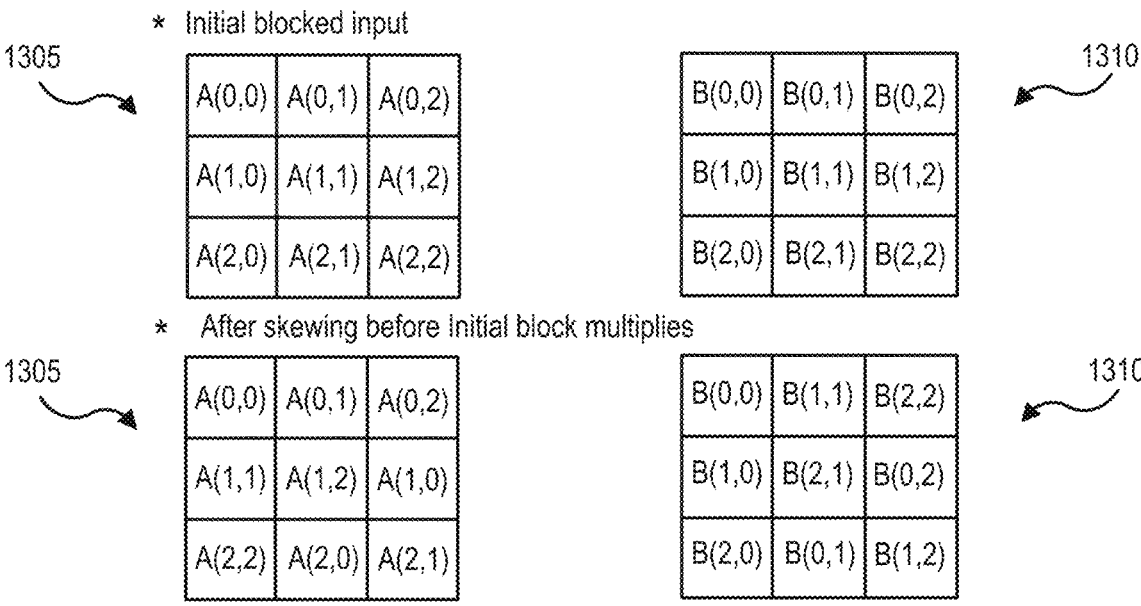
FIG. 13 is a simplified block diagram illustrating an example multiplication of skewed matrices.

An example DLH device may be well adapted to accelerating distributed matrix multiplication. Various algorithms may be used to distribute matrix multiplication across multiple nodes. Each algorithm has a different cost, and implied interconnect architecture. Algorithms may employ 2D grid interconnects, and 3D grid interconnects, among other examples. For instance, Cannon's Algorithm and Scalable Universal Matrix Multiplication Algorithm (SUMMA) may use a two-dimensional grid on interconnected nodes to distribute matrix multiplication. Data rotates or is broadcast east to west and north to south. In the case of Cannon's algorithm, the input and output matrices are blocked across a 2D grid of nodes and computes matrix products using an inner product. The algorithm may be performed on square matrices, as non-square matrices require duplication of data and careful handling of data rotations. Prior to computing the inner products, the data in both the left and right side matrices (e.g., 1305, 1310) may be skewed horizontally and vertically respectively as shown in FIG. 13. The initial skewing aligns the data within each processing node so that the proper data for the inner product is provided to each node simultaneously.

Figure 14:
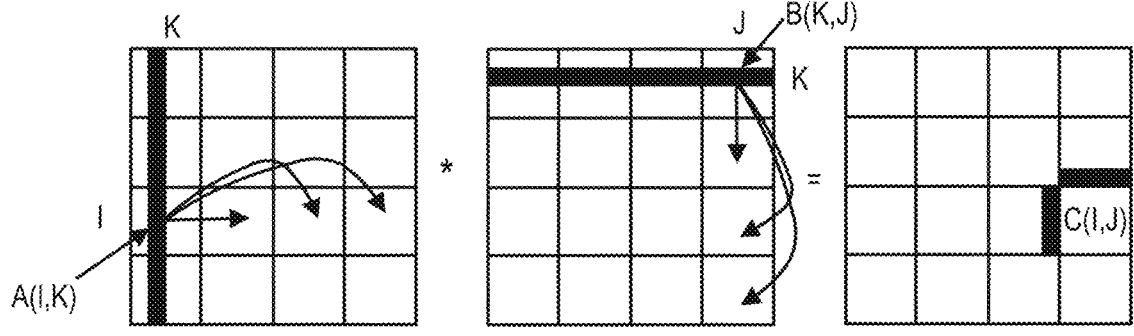
FIG. 14 is a simplified block diagram illustrating an example Scalable Universal Matrix Multiplication Algorithm (SUM MA) operation.

In the case of SUMMA, the input and output matrices may be blocked across a 2D grid of nodes and computes matrix products using an outer product. SUMMA may also be generalized to non-square matrices without data duplication or complicated blocking, as it relies on nodes broadcasting row and column data for the outer products as shown in the example of FIG. 14.

Figure 15:
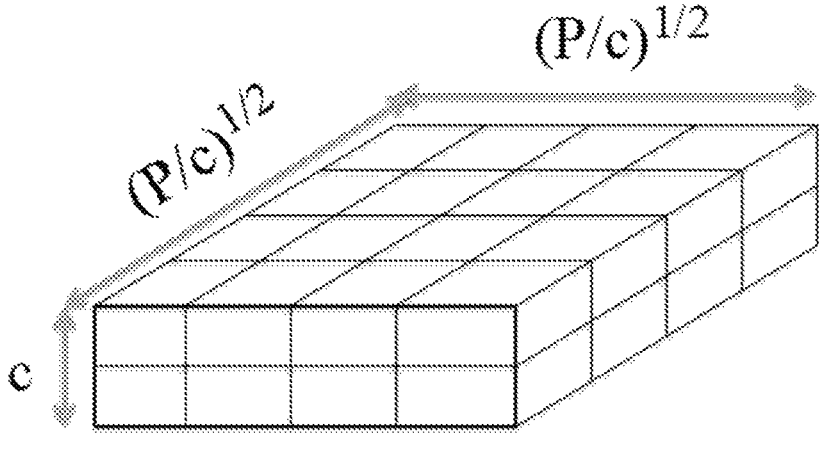
FIG. 15 is a simplified block diagram illustrating an example two-plane matrix multiplication.

Both 2.5D and 3D matrix multiplication may use 3D interconnects. 2.5D matrix multiplication is a generalized version of 3D matrix multiplication. The primary goal of 2.5D matrix multiplication is to reduce internode communication, at the expense of using more aggregate memory across all nodes, as the matrix data is duplicated in each plane. A simple two-plane 2.5D matrix multiplication is shown in FIG. 15. Given the same amount of compute nodes, arranging them in a 2.5D instead of 2D may reduce the aggregate communication required in the system, among other example benefits.

In some implementations of the DLH device or deep learning applications, the DLH device may utilize both large memory capacity to store training data, weights, and intermediate data, as well as high memory bandwidth to feed the thousands of multipliers on the chip. External memory technologies such as DDR4, Hybrid Memory Cube (HMC), and HBM memory may be utilized by the DLH device.

Figure 16A:
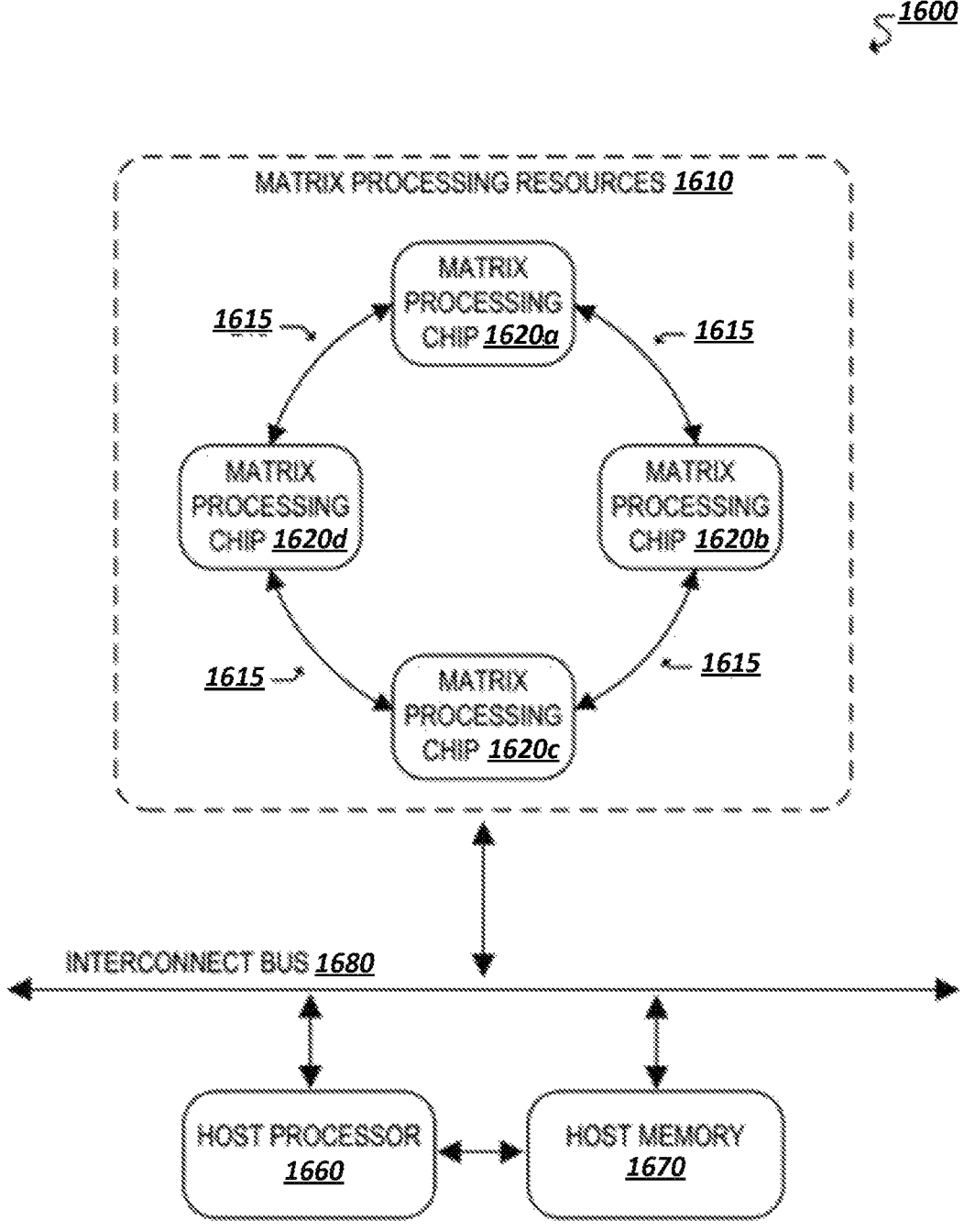
FIGS. 16A, 16B and 16C are block diagrams for an example embodiment of a matrix processing architecture.
Figures 16B, 16C:
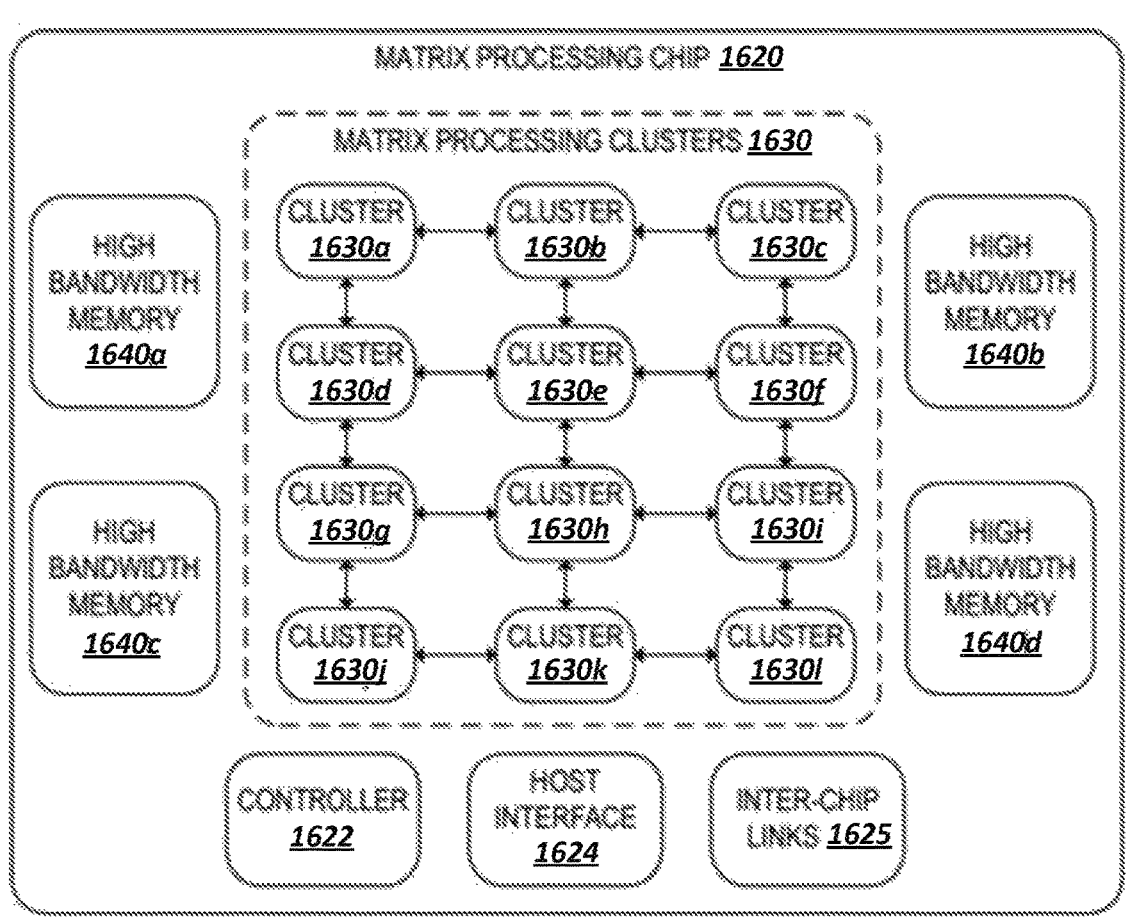

FIGS. 16A-16C illustrate simplified block diagrams showing example embodiments tensor processing architecture. The matrix processing architecture shown in this example may represent a more generalized implementation of the DLH device discussed above and may include many of the same or similar components as introduced above.

In some embodiments, the matrix processing functionality described throughout this disclosure may be implemented using a matrix processing architecture, such as the matrix processing architecture of FIGS. 16A-16C. Matrix processing architectures, such as the matrix processing architecture of FIGS. 16A-16C, may be implemented or used in a variety of systems, devices, and/or components, such as those described throughout this disclosure, including system 100 of FIG. 1 and/or any of its associated components (e.g., cloud services 120/datacenter servers, sensor devices 110, machine learning system 105). In some embodiments, the matrix processing architecture of FIGS. 16A-16C may be used to implement artificial intelligence and machine learning in neural networks. The matrix processing architecture illustrated in FIGS. 16A-16C is merely one example embodiment for performing the matrix processing functionality described throughout this disclosure. Other embodiments may use different types, arrangements, and/or numbers of components. For example, other embodiments may include any number of matrix processing chips 1620, matrix processing clusters 1630, matrix processing units (MPUs) 1634, high bandwidth memory (HBM) modules 1640, and/ or memory resource blocks (MRBs) 1638. Moreover, all or part of any component of the matrix processing architecture of FIGS. 16A-16C (e.g., any component of matrix processing system 1600, matrix processing chips 1620, and/or matrix processing clusters 1630) may be implemented as a separate or stand-alone component or chip, or may be integrated with other components or chips, such as a system-on-a-chip (SoC) that integrates various computer components into a single chip.

FIG. 16A illustrates a block diagram for an example embodiment of a matrix processing system 1600. In the illustrated embodiment, matrix processing system 1600 includes host processor 1660, host memory 1670, matrix processing resources 1610, and interconnect bus 1680.

Host processor 1660 may be configured to control and/or manage matrix processing system 1600. For example, in some embodiments, host processor 1660 may use matrix processing resources 1610 to perform complex matrix operations. Host processor 1660 may be any processing resource capable of controlling and/or managing matrix processing functionality of matrix processing system 1600. In some embodiments, host processor 1660 may be a separate or stand-alone component that is communicatively coupled to matrix processing resources 1610. Alternatively, in other embodiments, host processor 1660 and matrix processing resources 1610 may be integrated into the same component or chip. For example, in some embodiments, the components of matrix processing system 1600, including host processor 1660 and matrix processing resources 1610, may be implemented as a system-on-a-chip (SoC).

Host memory 1670 may include any type or combination of volatile and/or non-volatile memory. Examples of volatile memory include various types of random access memory (RAM), such as dynamic random access memory (DRAM), synchronous dynamic random access memory (SDRAM), and static random access memory (SRAM), among other examples. Examples of non-volatile memory include disk-based storage mediums (e.g., magnetic and/or optical storage mediums), solid-state storage (e.g., any form of persistent flash memory, including planar or three dimensional (3D) NAND flash memory or NOR flash memory), 3D crosspoint memory, electrically erasable programmable read-only memory (EEPROM), and/or other types of non-volatile random access memories (RAM), among other examples. Host memory 1670 may be used, for example, to store information for host processor 1660 during execution, such as code and/or data.

Interconnect bus 1680 may be used, in some embodiments, to communicatively couple host processor 1660 and host memory 1670 to matrix processing resources 1610. Interconnect bus 1680 may use any interconnection protocol, such as Peripheral Component Interconnect express (PCIe), Universal Serial Bus (USB), or Small Computer Systems Interface (SCSI), among other examples.

Matrix processing resources 1610 may include any processing resources configured to perform matrix operations. For example, matrix processing resources 1610 may be configured to perform matrix multiplication operations, convolution operations, element-wise matrix operations (e.g., +, *, /<, >, ==), dimension shuffle operations, and/or any combination thereof. In some embodiments, matrix processing resources 1610 may include processing resources that are designed and optimized for performing matrix operations. In some embodiments, matrix processing resources 1610 may also be arranged hierarchically with multiple levels of processing resources. For example, in the illustrated embodiment, matrix processing resources 1610 include a plurality of matrix processing chips 1620, and may also include any processing resources within each matrix processing chip 1620. For example, as discussed below in connection with FIGS. 16B and 16C, each matrix processing chip 1620 may include a plurality of high bandwidth memory (HBM) modules 1640 and a plurality of matrix processing clusters 1630, and each matrix processing cluster 1630 may include multiple matrix processing units 1634. Thus, in some embodiments, matrix processing resources 1610 may include multiple matrix processing chips 1620, multiple high bandwidth memory (HBM) modules 1640 and multiple matrix processing clusters 1630 on each matrix processing chip 1620, and/or multiple matrix processing units 1634 on each matrix processing cluster 1630.

Matrix processing chips 1620 may be, for example, any chips or other components configured to perform matrix operations. For example, in some embodiments, a matrix processing chip 1620 may be a peripheral card or chip connected to host processor 1660 using any type of interconnect interface, such as a PCIe interface. In some embodiments, a matrix processing chip 1620 may be implemented using an integrated circuit, such as an application specific integrated circuit (ASIC), a field programmable gate array (FPGA), and/or any other type of circuitry. In the illustrated embodiment, matrix processing chips 1620 are configured in a cyclical arrangement, with communication channels 1615 between neighboring matrix processing chips 1620. In some embodiments, communication channels 1615 may provide one-way communication between neighboring matrix processing chips 1620. In other embodiments, however, communication channels 1615 may provide bi-directional communication between neighboring matrix processing chips 1620. A cyclical arrangement with one-way communication between neighboring processing resources may be referred to as a "single-cyclical" configuration, while a cyclical arrangement with bi-directional communication between neighboring processing resources may be referred to as a "dual-cyclical" configuration.

Moreover, although not illustrated, in some embodiments matrix processing system 1600 may include a communication interface to communicate over a communication network. For example, in some embodiments, matrix processing system 1600 may communicate over a network with one or more remote matrix processing chips to perform distributed matrix operations.

FIG. 16B illustrates a block diagram for an example embodiment of a matrix processing chip 1620. In the illustrated embodiment, matrix processing chip 1620 includes controller 1622, host interface 1624, inter-chip links 1625, high bandwidth memory (HBM) modules 1640, and matrix processing clusters 1630.

Controller 1622 may be configured to control and/or manage matrix operations performed by matrix processing chip 1620. In some embodiments, controller 1622 may control and/or manage matrix operations in conjunction with host processor 1660 of FIG. 16A and/or master control CPUs (MCCs) 1632 of matrix processing clusters 1630 of FIG. 16C. For example, in some embodiments, host processor 1660, controller 1622, and/or master control CPUs (MCCs) 1632 may be configured to receive a matrix operation or command, and distribute the matrix operation and matrix operands across matrix processing clusters 1630 and high bandwidth memory (HBM) modules 1640. In some embodiments, controller 1622 may be a microprocessor, an integrated circuit, and/or any other type of circuitry and/or processing logic.

Host interface 1624 may be a communication interface that enables a matrix processing chip 1620 to communicate with host processor 1660 of FIG. 16A. In some embodiments, for example, controller 1622 may use host interface

1624 to communicate with host processor 1660 of FIG. 16A. Host interface 1624 may use any type of interconnect protocol or interface, including Peripheral Component Interconnect express (PCIe), Universal Serial Bus (USB), or Small Computer Systems Interface (SCSI), among other examples.

Inter-chip links (ICLs) 1625 may enable a matrix processing chip 1620 to communicate with other matrix processing chips. For example, inter-chip links 1625 may be used to implement the communication channels 1615 between matrix processing chips 1620 in FIG. 16A. An inter-chip link 1625 may be, for example, any communication interface that enables a matrix processing chip 1620 to communicate with another matrix processing chip. In some embodiments, a matrix processing chip 1620 may include multiple inter-chip links 1625 (e.g., twelve inter-chip links). In some embodiments, an inter-chip link 1625 may be implemented using one or more serializer/de-serializer (SerDes) interfaces. A SerDes interface may be a communication interface that converts data from serial to parallel, and vice-versa. For example, the transmitter of a SerDes interface may include a serial-to-parallel converter, and the receiver of a SerDes interface may include a parallel-to-serial converter. In some embodiments, a matrix processing chip 1620 may use multiple SerDes interfaces for each connection to another matrix processing chip (e.g., four SerDes interfaces between each pair of connected matrix processing chips).

High bandwidth memory (HBM) modules 1640 may be memory components associated with matrix processing chip 1620 that are used to store matrix operands and other matrix data. In some embodiments, high bandwidth memory (HBM) modules 1640 may be designed to efficiently store and retrieve matrix data. In some embodiments, high bandwidth memory (HBM) modules 1640 may be multi-dimensional memory components configured to store and retrieve data in multiple dimensions. For example, in some embodiments, high bandwidth memory (HBM) modules 1640 may be memory components configured to store and retrieve data in two dimensions, such as rows and columns. Other embodiments, however, may use memory components configured to store and retrieve data using any other number of dimensions (e.g., one dimension, three dimensions, four dimensions, and so forth). In the illustrated embodiment, matrix processing chip 1620 includes four high bandwidth memory (HBM) modules 1640a-d. In some embodiments, high bandwidth memory (HBM) modules 1640 may be shared by the matrix processing clusters 1630 of a matrix processing chip 1620.

Matrix processing clusters 1630 may include processing resources configured to perform matrix operations, such as matrix multiplication, convolutions, and/or dimension shuffling, among other examples. In some embodiments, matrix processing clusters 1630 may be collectively used to execute a particular matrix operation by performing matrix processing in parallel. In the illustrated embodiment, matrix processing chip 1620 includes twelve matrix processing clusters 1630a-l. Moreover, in the illustrated embodiment, matrix processing clusters 1630 are configured or arranged using a two-dimensional mesh interconnection topology. The interconnection topology of matrix processing clusters 1630 may facilitate cyclical communication among the matrix processing clusters 1630. Moreover, other embodiments may include any number and/or arrangement of matrix processing clusters 1630.

FIG. 16C illustrates a block diagram for an example embodiment of a matrix processing cluster 1630. In the illustrated embodiment, matrix processing cluster 1630 includes master control CPU (MCC) 1632, matrix processing units (MPUs) 1634, slicing engine 1636, and memory resource blocks (MRBs) 1638.

Master control CPU (MCC) 1632 may be configured to control and/or manage matrix operations performed by a matrix processing cluster 1630. In some embodiments, master control CPU 1632 may be a microprocessor, an integrated circuit, and/or any other type of circuitry and/or processing logic. In some embodiments, master control CPU 1632 may receive instructions from another component, such as host processor 1660 of FIG. 16A and/or controller 1622 of FIG. 16B. Based on the instructions, master control CPU 1632 may then use matrix processing units 1634 to perform matrix operations, such as matrix multiplication, convolutions, and/or dimension shuffling, among other examples. For example, master control CPU 1632 may receive an instruction to perform a matrix multiplication operation, such as C=A*B. The instruction may include the handles or identifiers for each matrix, and may also indicate how the matrices should be stored in memory resource blocks (MRBs) 1638. Matrices A and B may then be broken down into a series of smaller matrices (e.g., 32×32 matrices). Matrix operations may then be performed on the smaller matrices, and the partial results may be stored in memory resource blocks (MRBs) 1638, until the output matrix C has been fully computed.

Matrix processing units (MPUs) 1634 may be configured to perform matrix operations, such as matrix multiplication, convolutions, and/or dimension shuffling. In some embodiments, matrix processing units (MPUs) 1634 perform matrix operations based on commands received from master control CPU (MCC) 1632. Moreover, in some embodiments, each matrix processing cluster 1630 may include multiple matrix processing units (MPUs) 1634. For example, in the illustrated embodiment, matrix processing cluster 1630 includes two matrix processing units (MPUs) 1634. A matrix processing unit (MPU) 1634 may be capable of performing matrix operations, such as matrix multiplication, on small matrices (e.g., 32×32 matrices). In some cases, a matrix processing unit (MPU) 1634 may be designed and/or optimized to perform matrix multiplication operations. A matrix processing unit (MPU) 1634 may load matrix operands from memory resource blocks (MRBs) 1638. In some embodiments, a matrix processing unit (MPU) 1634 may support the following arithmetic operations: matrix multiplication; unary matrix operations; binary matrix operations, such as addition (+), subtraction (−), multiplication (*), division (/), bitwise XOR, AND, OR, logical and arithmetic left and right shift, comparison (>, <, >=, <=, ==, !=); and column-wise, row-wise, and matrix-wide operations, such as sum, max value, and min value.

Slicing engine 1636 may be configured to slice the matrix operands of a particular matrix operation into smaller partial matrices. For example, in some embodiments, master control CPU (MCC) 1632 may use slicing engine 1636 to break up matrix operands into smaller partial matrices for matrix processing units (MPUs) 1634. In some embodiments, slicing engine 1636 may include a convolution slicing engine (CSE) to perform matrix slicing for convolution operations. For example, in some embodiments, a convolution slicing engine (CSE) may slice matrix operands in a manner that enables a convolution operation to be cast as a matrix multiplication operation, thus enabling the same processing logic to perform both matrix multiplication and convolution operations. Moreover, in some embodiments, slicing engine 1636 and/or the associated convolution slicing engine (CSE)

may be used to perform the dimension shuffle operations to reorder the dimensions of a matrix.

Memory resource blocks (MRBs) 1638 may be memory components on matrix processing cluster 1630 used to store matrix operands and other matrix data. In some embodiments, memory resource blocks (MRBs) 1638 may be designed to store and retrieve matrix data efficiently. In some embodiments, memory resource blocks (MRBs) 1638 may be multi-dimensional memory components configured to store and retrieve data in multiple dimensions. For example, in some embodiments, memory resource blocks (MRBs) 1638 may be memory components configured to store and retrieve data in two dimensions, such as rows and columns. In the illustrated embodiment, matrix processing cluster 1630 includes ten memory resource blocks (MRBs) 1638. Other embodiments, however, may include a different number of memory resource blocks (MRBs) 1638 on a matrix processing cluster 1630. In some embodiments, each memory resource block (MRB) 1638 may be capable of storing a matrix of a certain size (e.g., a 256×512 matrix). In some embodiments, memory resource blocks (MRBs) 1638 may be shared by the matrix processing units (MPUs) 1634 of a particular matrix processing cluster 1630.

In some embodiments, the matrix processing architecture of FIGS. 16A-16C may be used to implement the matrix processing functionality described throughout this disclosure. For example, matrix processing system 1600 may be used to perform matrix operations using a distributed approach that achieves 100% processing efficiency using the available processing resources. For example, in some embodiments, a matrix operation may be distributed across multiple processing resources 1610 that are optimized for matrix processing, thus enabling full utilization of the processing resources 1610 throughout the duration of the matrix operation. For example, matrix processing system 1600 may include multiple processing resources 1610 that are designed and optimized for performing matrix operations. In some embodiments, these processing resources 1610 may be configured in a single-cyclical or dual-cyclical arrangement. In addition, the processing resources 1610 may be arranged hierarchically with multiple levels of processing resources. For example, in some embodiments, the processing resources 1610 may include multiple matrix processing chips 1620, multiple high bandwidth memory (HBM) modules 1640 and multiple matrix processing clusters 1630 on each matrix processing chip 1620, and/or multiple matrix processing units (MPUs) 1634 on each matrix processing cluster 1630. This processing architecture enables matrix operations to be distributed across multiple processing resources 1610 and/or processing hierarchies with 100% processing efficiency. In addition, this processing architecture enables matrix operations to be efficiently scaled across a variable number of processing resources 1610 operating in parallel, while still achieving 100% processing efficiency. For example, scaling may be achieved by adjusting the number of processing resources 1610 used to perform a particular matrix operation, such as the number of matrix processing systems 1600 or servers, the number of matrix processing chips 1620 in each matrix processing system 1600 or server, and so forth.

As an example, the matrix processing architecture of FIGS. 16A-16C may be used to implement matrix multiplication and/or convolution operations. For example, in some embodiments, a matrix multiplication operation may be distributed across multiple processing resources 1610 in a manner that results in the latency for communicating matrix operands being less than the matrix processing time, which allows the communication of matrix operands to be completed while the matrix processing is being performed. For example, for certain matrix operations involving matrix operands with certain dimensions (e.g., matrix multiplication with a "thin" matrix operand), the time required to access and communicate matrix operands may exceed the time required to perform the actual matrix computations, resulting in idle processing time while the matrix operands are being obtained from memory and/or communicated to processing resources 1610. For example, a single-cyclical configuration (e.g., where each processing resource 1610 only obtains matrix operands and data from one neighboring processing resource 1610 at any given time) may be unable to achieve 100% processing efficiency for these particular types of matrix operations and matrix operands. However, a dual-cyclical configuration of processing resources 1610 enables each processing resource to perform matrix computations while simultaneously obtaining matrix operands and data from both of its neighboring processing resources 1610, which significantly reduces the latency for communicating matrix operands, and thus avoids any idle processing time. For example, the communication latency for certain operations may be reduced by half when using a dual-cyclical approach as opposed to a single-cyclical approach. In this manner, the latency for communicating matrix operands and matrix data can be fully masked by the matrix processing time, thus avoiding any wasted or idle processing time and achieving 100% processing efficiency. Accordingly, matrix operations (e.g., matrix multiplication or GEMM) can be performed efficiently even for large matrix operands and/or matrix operands with certain dimensions, such as a large matrix operand that is neither square nor a single vector (e.g., a "thin" matrix with a much larger height than width). For example, matrix multiplication can be performed efficiently even when multiplying two thin matrices, a thin matrix and a square matrix, and so forth. Similarly, convolution operations may be distributed across multiple processing resources 1610 in a manner that results in 100% processing efficiency using the available processing resources.

As an example, when a matrix operation or command is received, the matrix operation may be distributed across the processing resources 1610 of matrix processing system 1600. For example, the matrix operands (or input matrices) may be partitioned based on the number of available processing resources 1610. Moreover, in some embodiments, the partitions may be across the rows of the matrix operands, and/or across any other dimension of the matrix operands. Each partition may then be distributed to a particular processing resource 1610. Each processing resource 1610 may then perform a plurality of partial matrix operations. In some embodiments, the plurality of partial matrix operations is performed in a plurality of stages. For example, each processing resource 1610 may perform a particular stage of partial matrix operations while simultaneously sending and receiving partial matrix data to and from its neighboring processing resources 1610. For example, in a single-cyclical configuration of processing resources 1610, each processing resource 1610 either sends or receives partial matrix data to or from each neighbor processing resource. Similarly, in a dual-cyclical configuration of processing resources 1610, each processing resource 1610 may send and receive partial matrix data to and from each neighboring processing resource 1610.

Each processing resource 1610 may then use the partial matrix data for subsequent partial matrix operations. The result of the matrix operation may then be determined based on the partial matrix operations collectively performed by the processing resources 1610.

Moreover, if the processing resources 1610 are arranged hierarchically, the matrix operation may be distributed in a hierarchical manner. For example, the matrix operands (or input matrices) may initially be partitioned based on the number of available matrix processing chips 1620. Each partition, and the associated partial matrix operations, may then be distributed to a particular matrix processing chip 1620. The partition and partial matrix operations distributed to a particular matrix processing chip 1620 may then be similarly partitioned and distributed across the matrix processing clusters 1630 and/or high bandwidth memory (HBM) modules 1640 of the particular matrix processing chip 1620. For example, for certain matrix operations, partial matrix operations may be distributed to each matrix processing cluster 1630. Alternatively, for certain matrix operations, partial matrix operations may be distributed across various "logical processing nodes" (e.g., groups of matrix processing clusters 1630 associated with a high-bandwidth memory (HBM) module 1640), and may then be distributed to each matrix processing cluster 1630 of a particular logical processing node. In some embodiments, the matrix processing clusters 1630 (and/or the logical processing nodes) may be cyclically configured similar to the matrix processing chips 1620. The partition and partial matrix operations distributed to a particular matrix processing cluster 1630 may then be similarly partitioned and distributed across the matrix processing units (MPUs) 1634 of the particular matrix processing cluster 1630.

Figure 17:
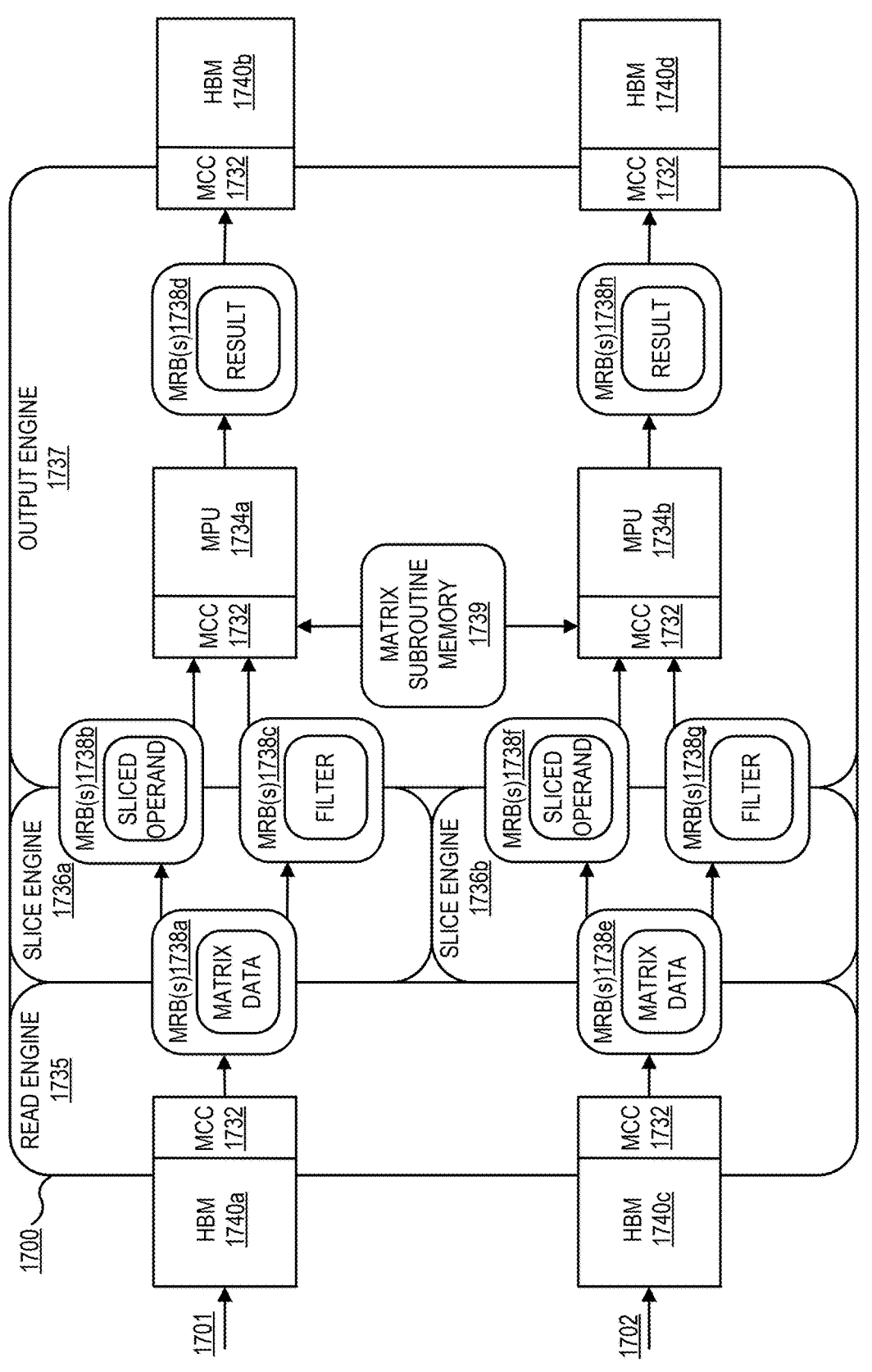
FIG. 17 illustrates an example embodiment of a matrix processing engine.

FIG. 17 illustrates an example embodiment of a matrix processing engine 1700. In some embodiments, matrix processing engine 1700 may be implemented by a matrix processing architecture, such as the matrix processing architectures discussed in the examples above. For example, in some embodiments, matrix processing engine 1700 may be implemented by a matrix processing cluster on a matrix processing chip. In those embodiments, a particular matrix processing cluster may use its associated matrix processing engine 1700 to perform matrix-based processing and operations, such as partial matrix operations associated with a particular matrix operation distributed across multiple matrix processing resources (e.g., as described throughout this disclosure).

In some embodiments, matrix processing engine 1700 may be used to perform operations for an artificial neural network, such as forward propagation, backward propagation, and/or weight update operations. In some cases, for example, matrix processing engine 1700 may be used to perform a variety of operations, such as discussed in the examples below.

In the illustrated embodiment, matrix processing engine 1700 includes read engine 1735, slice engines 1736, and output engine 1737, which are discussed further below. The illustrated embodiment also depicts various components of the underlying matrix processing architecture that may be involved when performing matrix operations using matrix processing engine 1700. For example, the illustrated embodiment depicts high bandwidth memory (HBM) modules 1740, master control CPU (MCC) 1732, matrix processing units (MPUs) 1734, and memory resource blocks (MRBs) 1738. In the illustrated embodiment, for example, these various components are superimposed on matrix processing engine 1700 to illustrate how and when they would be used by matrix processing engine 1700, as described further below.

HBM modules 1740 may be high bandwidth memory (HBM) modules designed to efficiently store and retrieve large volumes of matrix data. In some embodiments, for example, HBM modules 1740 may be high bandwidth memory (HBM) modules on a matrix processing chip.

MCC 1732 may be a master control CPU (MCC) used to control and/or manage matrix operations. In some embodiments, for example, MCC 1732 may be the master control CPU on a particular matrix processing cluster. In those embodiments, for example, MCC 1732 may be used to control and/or manage matrix operations performed on its particular cluster.

MPUs 1734 may be matrix processing units (MPUs) used to perform matrix operations. In some embodiments, for example, MPUs 1734 may be matrix processing units on a particular matrix processing cluster. For example, in some embodiments, a matrix processing cluster may include multiple matrix processing units (MPUs) for performing matrix operations. The illustrated embodiment, for example, depicts two matrix processing units (MPUs) 1734a and 1734b. In some embodiments, MPUs 1734 may perform matrix operations based on commands or instructions from master control CPU (MCC) 1732.

Memory resource blocks (MRBs) 1738 may be memory components designed to efficiently store and retrieve matrix data. In some embodiments, for example, MRBs 1738 may be memory resource blocks on a particular matrix processing cluster. In those embodiments, for example, MRBs 1738 may be used to store and retrieve matrix data associated with matrix operations performed on the particular cluster.

Matrix processing engine 1700 performs matrix operations using read engine 1735, slice engines 1736, and output engine 1737, as described further below. In the illustrated example, matrix processing engine 1700 is performing multiple matrix operations 1701 and 1702 in parallel. For example, as noted above, in some embodiments matrix processing engine 1700 may be implemented on a particular matrix processing cluster, and the particular matrix processing cluster may include multiple MPUs 1734. In the illustrated example, matrix processing engine 1700 is implemented on a cluster with two MPUs 1734a-b. Accordingly, matrix processing engine 1700 can perform two matrix operations 1701 and 1702 in parallel using the respective MPUs 1734.

The illustrated example shows the control flow of matrix processing engine 1700 for matrix operation 1701 and matrix operation 1702. The control flow for a matrix operation begins with the read engine 1735 of matrix processing engine 1700. For example, for matrix operation 1701, read engine 1735 may first retrieve matrix data associated with the particular matrix operation from an HBM module 1740a. In the illustrated example, matrix processing engine 1700 is being used to perform convolution related operations, and thus the matrix data is associated with the image(s) and filters involved in those operations. In some embodiments, for example, the convolution related operations may be associated with artificial intelligence functionality implemented using operations in an artificial neural network, such as forward propagation, backward propagation, and/or weight update operations.

Read engine 1735 may then store the matrix data retrieved from HBM 1740a in certain MRBs 1738a of its associated cluster. In some embodiments, for example, read engine 1735 may use two MRBs 1738a to store the associated matrix data. For example, read engine 1735 may use one MRB to store matrix data associated with an image, and may use another MRB to store matrix data associated with a filter used for convolution related operations on that image. In some embodiments, read engine 1735 may use the master control CPU (MCC) 1732 on its respective cluster for storing and retrieving data on HBMs 1740 and MRBs 1738.

Slice engine 1736a may then "slice" the matrix data stored in MRBs 1738a to extract the particular matrix operands associated with matrix operation 1701. For example, in some cases, the associated matrix operands may only include a subset of the matrix data stored in MRBs 1738a, and/or the matrix operands may not be arranged contiguously in the matrix data stored in MRBs 1738a. Accordingly, slice engine 1736a may extract particular "slices" or pieces of the matrix data stored in MRBs 1738a, and may then arrange the slices in a particular manner to form the respective matrix operands.

In the illustrated example, slice engine 1736a extracts a sliced matrix operand and a filter from MRBs 1738a. For example, as noted above, MRBs 1738a may include two MRBs that are respectively used to store image data and filter data. The image data stored in one of the MRBs 1738a may be used by slice engine 1736a to extract a sliced matrix operand. The sliced matrix operand, for example, may be a particular portion of the image data involved in the convolution related operations. The filter data stored in the other MRB 1738a may include a filter involved in the convolution related operations. The sliced operand and the filter, for example, may be the operands for a matrix multiplication operation that is used to multiply the sliced operand with the filter. Slice engine 1736a then stores the sliced operand and the filter in respective MRBs. In the illustrated example, the sliced operand is stored in MRB 1738b, and the filter is stored in MRB 1738c.

Output engine 1737 may then be used to compute a result for the particular matrix operation 1701. For example, output engine 1737 may perform the appropriate matrix operation 1701 using the matrix operands generated by slice engine 1736a (e.g., the matrix operands stored in MRBs 1738b and 1738c).

In some embodiments, for example, output engine 1737 may first identify an associated matrix subroutine corresponding to the particular matrix operation, and output engine 1737 may then obtain that matrix subroutine from matrix subroutine memory 1739. Matrix subroutine memory 1739, for example, may be a memory component used to store matrix subroutines that are used by output engine 1737. A matrix subroutine, for example, may be a programmable subroutine for a matrix processor that is designed to perform a particular matrix operation when executed by the matrix processor. For example, a matrix subroutine may include a series of instructions and/or commands, supported by a particular matrix processor, and designed to perform a desired matrix operation when executed by the matrix processor. In some embodiments, for example, a matrix processor may be designed to support a set of instructions and/or commands for performing various fundamental operations. For example, in some embodiments, a matrix processor may support instructions for processing data, performing various arithmetic operations, and/or identifying matrix operands and outputs for the various instructions and operations. In this manner, the fundamental instructions and/or commands supported by the matrix processor can be used to program matrix subroutines for more complex matrix operations, such as distributed matrix multiplication and/or convolution operations, dimension shuffle operations, reshape operations, and so forth.

After retrieving the appropriate matrix subroutine, output engine 1737 may then specify or supply certain information or fields used by the matrix subroutine, if appropriate. For example, in some embodiments, certain information and/or fields of a matrix subroutine may be incomplete or unspecified, such as the size and/or location of the particular operands for the matrix subroutine. In some embodiments, output engine 1737 may use the master control CPU (MCC) 1732 on its respective cluster to retrieve matrix subroutines from matrix subroutine memory 1739, and to specify or supply any remaining information and/or fields for the particular matrix subroutine (e.g., the size and/or location of matrix operands).

Output engine 1737 may then execute the particular matrix subroutine. For example, output engine 1737 may use MCC 1732 and/or MPU 1734a to execute the programmed instructions associated with the particular matrix subroutine. MCC 1732, for example, may be used to perform certain tasks specified by the instructions, such as reading and writing data, communicating with other resources, and so forth. MPU 1734a, for example, may be used to perform particular arithmetic operations specified by the instructions. Moreover, in some cases, a particular matrix subroutine may be repeatedly executed or looped until the particular operation has been performed or completed for all requisite data (e.g., all data of a particular matrix operand).

Output engine 1737 may store the output or result of the matrix subroutine in certain MRB(s) 1738d of the cluster used to execute the matrix subroutine. Output engine 1737 may then perform any remaining processing and/or transmitting of the result 1738d. For example, in some cases, output engine 1737 may provide the result 1738d to other components of the matrix processing architecture. For example, in some cases, matrix operation 1701 may be a partial matrix operation associated with a larger matrix operation distributed across multiple processing resources, and thus the result of matrix operation 1701 may be a partial result associated with the larger distributed operation. Moreover, the partial result 1738d may be needed by other processing resource(s) involved in the distributed matrix operation. Accordingly, output engine 1737 may provide the partial result 1738d to the appropriate resource, for example, for further processing and/or storage. In some embodiments, output engine 1737 may use the master control CPU (MCC) 1732 on its respective cluster in order to provide the result of a particular operation to the appropriate destination. In some cases, the appropriate destination resource may vary based on the circumstances, including the type of matrix operation being performed, the implementation of the associated matrix subroutine(s), the number and availability of processing resources, and so forth. For example, in some cases, the particular processing and/or destination of the output of a matrix operation may be programmed or defined by the associated matrix subroutine.

In some cases, for example, output engine 1737 may provide the result 1738d to an HBM 1740 for storage, to another processing resource for further processing (e.g., another adjacent cluster or another matrix processing chip), and/or may feed the result 1738d back to MPU 1734a for further processing and operations. In the illustrated example, the result 1738d of matrix operation 1701 is transmitted to and stored on HBM 1740b.

In the illustrated example, the 2nd matrix operation 1702 may be executed in parallel with the 1st matrix operation 1701. Moreover, the control flow for the 2nd matrix operation 1702 may be similar to the control flow described above for the 1st matrix operation 1701. The 2nd matrix operation 1702, however, may be a different matrix operation (e.g., performed using a different matrix subroutine), with different matrix operands and results, using different memory locations of HBMs 1740 and/or MRBs 1738, and executed using a different MPU 1734*b* and associated slice engine 1736*b*.

Figure 18:
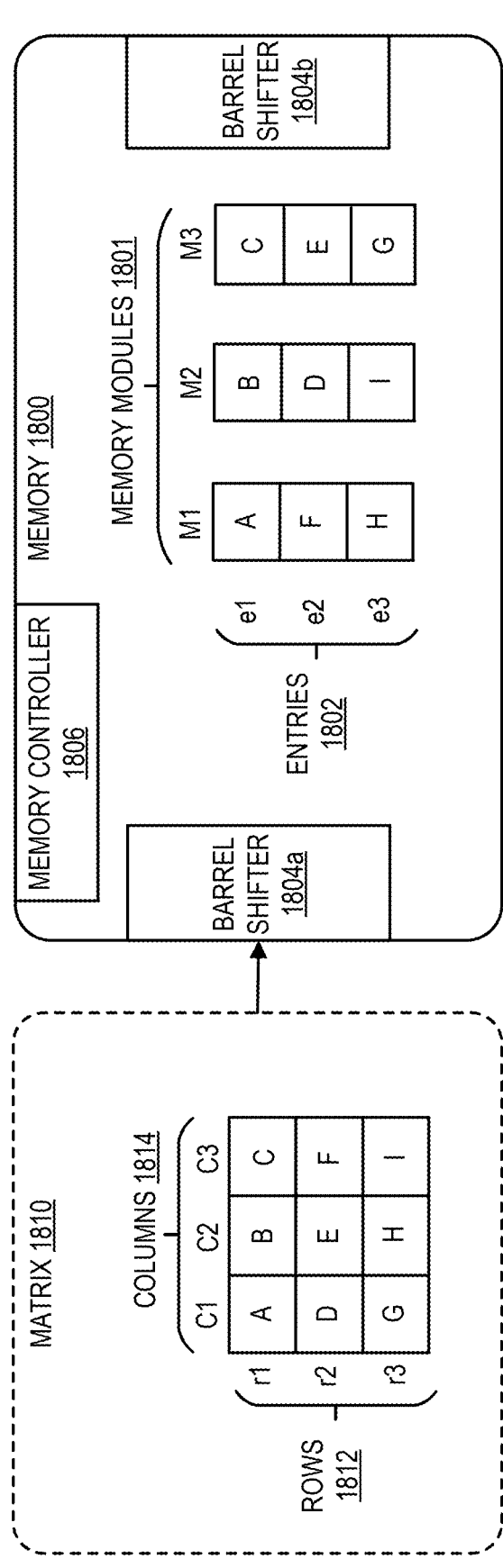
FIG. 18 illustrates an example embodiment of memory for storing matrices using data shifting.

A matrix processing system such as in the examples introduced above (e.g., DLH devices), may be utilized to implement the following example features and functionality: Matrix Storage Using Data Shifting Memory FIG. 18 illustrates an example embodiment of memory 1800 for storing matrices using data shifting. In some embodiments, for example, memory 1800 may be used to provide efficient storage of matrices in a matrix processing system. For example, memory 1800 could be used to implement the memory resource blocks (MRBs) of an example processing cluster.

Matrices can be stored in memory using a variety of approaches. Some approaches for storing matrices are inefficient, however, as they are unable to efficiently access both rows and columns of a matrix. For example, some approaches are unable to access particular rows and columns of a matrix in their entirety, instead requiring each element of a particular row or column to be accessed individually (e.g., by accessing each element in separate clock cycles). Moreover, some approaches are only able to access either the rows of a matrix or the columns of a matrix in their entirety, but not both. For example, some approaches can access particular rows of a matrix in their entirety, while particular columns can only be accessed by separately accessing each element. Similarly, some approaches can access particular columns of a matrix in their entirety, while particular rows can only be accessed by separately accessing each element. Accordingly, these matrix storage approaches are inefficient for matrix operations that involve access to entire rows and columns of a matrix. For example, a transpose operation is a common operation used in many complex matrix algorithms. A transpose operation, for example, is used to "transpose" the rows and columns of a matrix, by rearranging the rows as columns and the columns as rows. A transpose operation can be performed on a matrix processor, for example, by retrieving each row of a matrix from memory, and then storing each row back in memory as a column. Accordingly, a transpose operation may be very inefficient if the underlying memory is unable to store and retrieve rows and columns of a matrix in their entirety, as it may involve a significant number of memory accesses.

The matrix memory and storage embodiments described throughout this disclosure, however, provide an efficient approach for accessing both rows and columns of a matrix stored in memory. For example, in the illustrated embodiment, memory 1800 may be used to store or retrieve an entire row or column of a matrix in a single clock cycle. For example, memory 1800 can be implemented using M separate memory modules 1801 that are each N entries 1802 deep, thus providing storage capacity for matrix data of size N×M. Moreover, each memory module 1801 may have read and write ports for reading or writing a particular entry 1802 every clock cycle. In some embodiments, memory 1800 may store a particular matrix by spreading or shifting the elements of each particular row and column across the M separate memory modules 1801, as described further below. In this manner, each element of a particular row or column of a matrix is stored in a different memory module 1801 of memory 1800. Accordingly, memory 1800 can access a particular row or column of the matrix in its entirety by accessing the appropriate entry 1802 of each of the M separate memory modules 1801. In this manner, an entire row or column of a matrix stored in memory 1800 can be accessed in a single clock cycle.

In the illustrated embodiment, for example, memory 1800 includes a plurality of memory modules 1801, and each memory module 1801 includes a plurality of entries 1802. For example, memory 1800 includes three memory modules 1801 (M1, M2, and M3), and each memory module 1801 includes three entries 1802 (e1, e2, and e3). Each entry 1802 may be used to store a single matrix element using a particular number of bits (e.g., 8 bits or 16 bits). Accordingly, in the illustrated embodiment, memory 1800 can be used to store a 3×3 matrix, such as matrix 1810. The illustrated embodiment, however, is merely used for illustrative purposes. In actual implementations and embodiments, memory 1800 may include any number of memory modules 1801, and each memory module 1801 may include any number of entries 1802. Moreover, each entry 1802 may be any size or number of bits, and/or may be used to store multiple matrix elements rather than a single element (e.g., as described in connection with memory 1900 of FIG. 19).

Memory 1800 also includes a memory controller 1806. Memory controller 1806 may be used for efficiently storing and retrieving rows and columns of a matrix from memory modules 1801, as described further below. Moreover, in the illustrated embodiment, memory 1800 includes barrel shifters 1804*a* and 1804*b*. Barrel shifters 1804 may be used for shifting matrix data in order to provide efficient access to rows and columns of a matrix, as described further below.

In the illustrated example of FIG. 18, memory 1800 is used to store matrix 1810. Matrix 1810 includes a plurality of matrix elements A-I arranged into rows 1812 and columns 1814. For example, matrix 1810 includes three rows 1812 (r1, r2, and r3) and three columns 1814 (c1, c2, and c3) for storing matrix elements A-I. Matrix 1810 may be stored in memory 1800 using memory modules 1801. For example, each element A-I of matrix 1810 may be stored in a particular entry 1802 of memory modules 1801.

In some embodiments, memory controller 1806 may be used to efficiently store and retrieve the elements of matrix 1810 in memory 1800. For example, memory controller 1806 may store matrix 1810 by spreading or shifting the elements of each row 1812 and column 1814 across the memory modules 1801, such that each element of a particular row 1812 or column 1814 is stored in a different memory module 1801. Moreover, memory controller 1806 is able to read and/or write a particular entry 1802 in each memory module 1801 every clock cycle. Accordingly, memory controller 1806 can access a particular row 1812 or column 1814 of matrix 1810 in its entirety, by accessing the appropriate entry 1802 of each memory module 1801 during a given clock cycle. In this manner, entire rows 1812 and columns 1814 can be accessed in a single clock cycle.

A row 1812 of matrix 1810, for example, may be written to memory 1800 by storing each element of the row in a different memory module 1801 of memory 1800, but at the same entry 1802 or offset within the memory modules 1801. For example, elements A, B, C in row r1 of matrix 1810 may each be stored in entry e1 of a particular memory module 1801. Similarly, elements D, E, F in row r2 of matrix 1810 may each be stored in entry e2 of a particular memory module 1801. Finally, elements G, H, I in row r3 of matrix 1810 may each be stored in entry e3 of a particular memory module 1801. In this manner, the elements of any given row 1812 of matrix 1810 are stored on different memory modules 1801 of memory 1800.

A column 1814 of matrix 1810 is written to memory 1800 using a similar approach as described above for rows, with the exception that each element of a column is stored at a different entry 1802 or offset within the memory modules 1801. For example, elements A, D, G in column c1 of matrix 1810 are respectively stored at entries e1, e2, and e3 of particular memory modules 1801. Similarly, elements B, E, H in column c2 are respectively stored at entries e1, e2, and e3 of particular memory modules 1801. Finally, elements C, F, I in column c3 are respectively stored at entries e1, e2 and e3 of particular memory modules 1801.

Moreover, the elements of a particular row 1812 or column 1814 may be shifted before they are written on the respective memory modules 1801 of memory 1800. In some embodiments, for example, a barrel shifter 1804*a* may be used to shift the row or column elements before they are written to the respective memory modules 1801 of memory 1800. The shifting may be performed so that, when matrix 1810 has been written to memory 1800, the elements of any given column 1814 of matrix 1810 ultimately reside on different memory modules 1801 of memory 1800. The number of shifts performed when writing a particular row 1812 or column 1814 to memory 1800 varies based on the corresponding row or column number. For example, the number of shifts performed for a particular row or column may be one less than its corresponding row or column number (e.g., # of shifts=row number–1, or # of shifts=column number–1).

Accordingly, when writing the rows 1812 of matrix 1810 to memory 1800, the first row is shifted by 0 elements (e.g., no shifting is performed), the second row is shifted by +1 element, the third row is shifted by +2 elements, and so forth. For example, in the illustrated example, the elements of row r1 are in the order A, B, C in matrix 1810, and since 0 shifts are performed on row r1, its elements are written to the respective memory modules M1, M2, and M3 in their original order A, B, C. The elements of row r2 are in the order D, E, F in matrix 1810, and since +1 shift is performed on row r2, its elements are written to the respective memory modules M1, M2 and M3 in the order F, D, E. The elements of row r3 are in the order G, H, I in matrix 1810, and since +2 shifts are performed on row r3, its elements are written to the respective memory modules M1, M2 and M3 in the order H, I, G.

Similarly, when writing the columns 1814 of matrix 1810 to memory 1800, the first column is shifted by 0 elements (e.g., no shifting is performed), the second column is shifted by +1 element, the third column is shifted by +2 elements, and so forth. For example, in the illustrated example, the elements of column c1 are in the order A, D, G in matrix 1810, and since 0 shifts are performed on column c1, its elements are written to the respective memory modules M1, M2 and M3 in their original order A, D, G. The elements of column c2 are in the order B, E, H in matrix 1810, and since +1 shift is performed on column c2, its elements are written to the respective memory modules M1, M2 and M3 in the order H, B, E. The elements of column c3 are in the order C, F, I in matrix 1810, and since +2 shifts are performed on column c3, its elements are written to the respective memory modules M1, M2 and M3 in the order F, I, C.

In order to read a row 1812 or column 1814 of matrix 1810 from memory 1800, a particular entry 1802 or offset is read from each memory module M1, M2 and M3. For example, in order to read a particular row 1812 of matrix 1810 from memory 1800, the same entry 1802 or offset is read from each memory module M1, M2 and M3. For example, row r1 can be retrieved by reading entry e1 from each memory module 1801, row r2 can be retrieved by reading entry e2 from each memory module 1801, and row r3 can be retrieved by reading entry e3 from each memory module 1801. In order to read a particular column 1814 of matrix 1810 from memory 1800, a different entry 1802 or offset is read from each memory module M1, M2, and M3. For example, column c1 can be retrieved by reading each memory module M1, M2, M3 at entries e1, e2 and e3, respectively. Similarly, column c2 can be retrieved by reading each memory module M1, M2 M3 at entries e3, e1, and e2, respectively. Similarly, column c3 can be retrieved by reading each memory module M1, M2 M3 at entries e2, e3, and e1, respectively.

After a particular row 1812 or column 1814 of matrix 1810 is read from memory modules M1, M2 and M3, the elements are out-of-order and thus must be shifted back to their original order, which is performed by barrel shifter 1804*b*. The shifting required when reading a particular row 1812 or column 1814 is simply the opposite of the shifting performed when the row 1812 or column 1814 was originally written. Accordingly, when reading out the rows 1812 of matrix 1810 from memory 1800, the first row is shifted by 0 elements (e.g., no shifting is performed), the second row is shifted by –1 element, the third row is shifted by –2 elements, and so forth. Similarly, when reading out the columns 1814 of matrix 1810 from memory 1800, the first column is shifted by 0 elements (e.g., no shifting is performed), the second column is shifted by –1 element, the third column is shifted by –2 elements, and so forth.

In this manner, when memory 1800 is used to store matrix 1810, the elements of any given row 1812 or column 1814 of matrix 1810 will each reside on a different memory module 1801 of memory 1800. Given that memory controller 1806 can access one entry 1802 from each memory module 1801 during a given clock cycle, storing the elements of matrix 1810 in this manner allows an entire row 1812 or entire column 1814 of matrix 1810 to be read or written during a given clock cycle. Accordingly, memory 1800 can significantly improve the performance of matrix processing systems, particularly for operations that involve access to entire rows and columns of a matrix, such as transpose operations.

Figure 19:
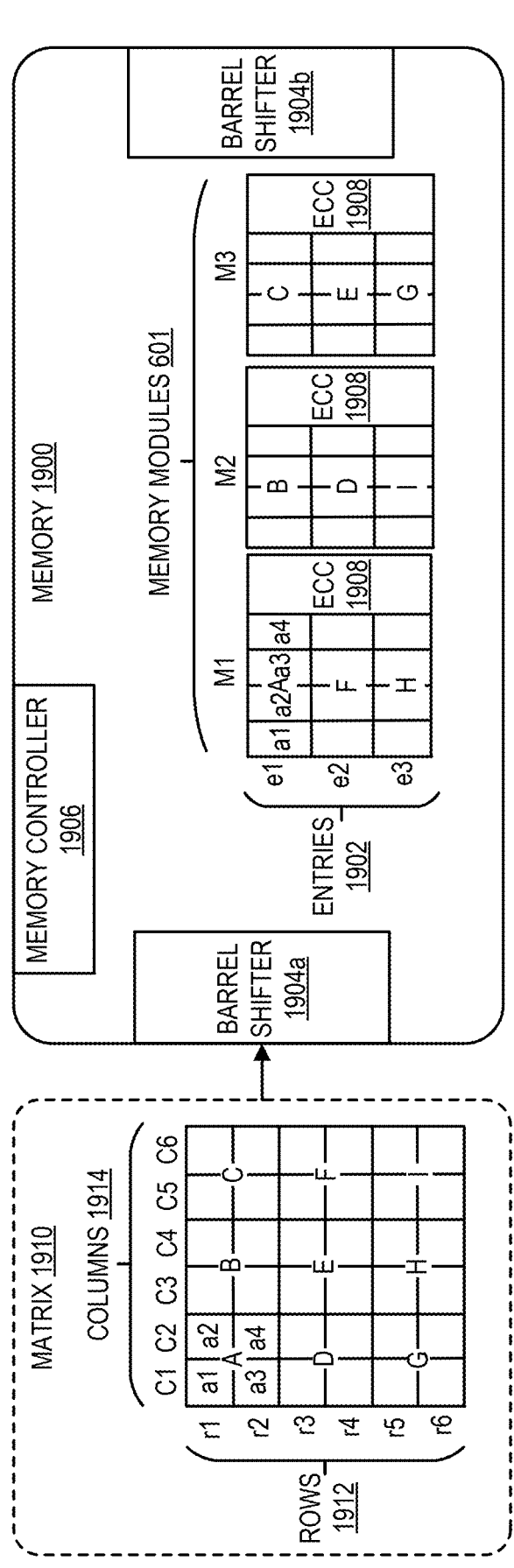
FIG. 19 illustrates another example embodiment of memory for storing matrices using data shifting.

FIG. 19 illustrates another example embodiment of memory 1900 for storing matrices using data shifting. In some embodiments, for example, memory 1900 may be used to provide efficient storage of matrices in a matrix processing system, such as in deep learning and matrix processing systems discussed in the example above. For example, memory 1900 could be used to implement the memory resource blocks (MRBs) an example processing cluster, among other examples.

In the illustrated embodiment, memory 1900 may be similar to memory 1800 of FIG. 18. For example, memory 1900 similarly includes a plurality of memory modules 601, and each memory module 601 includes a plurality of entries 1902. For example, memory 1900 includes three memory modules 601 (M1, M2, and M3), and each memory module 601 includes three entries 1902 (e1, e2, and e3). Memory 1900 also includes a memory controller 1906 for efficiently storing and retrieving rows and columns of a matrix from memory modules 601. Moreover, memory 1900 includes barrel shifters 1904*a* and 1904*b* for shifting matrix data stored in memory 1900.

However, in the illustrated embodiment of memory 1900, each entry 1902 of memory modules 601 can store up to four matrix elements using a particular number of bits, such as 64 bits. Moreover, each entry 1902 also includes a particular number of bits for storing error correction codes (ECC) 1908, such as 8 bits. Error correction codes, for example, can be used to correct errors in the data stored and retrieved using entries 1902 of memory modules 601. For example, in some cases, an error correction code for a particular entry 1902 may be able to correct single bit errors and may be able to detect double bit errors. Accordingly, each entry 1902 includes 64 bits for storing up to four matrix elements, plus an additional 8 bits for storing an error correction code 1908, totaling 72 bits per entry 1902. Thus, in the illustrated example, the error correction codes 1908 consume approximately 10% of the storage capacity of each entry 1902.

If entries are implemented using a smaller number of bits to store matrix elements (e.g., 8 bits or 16 bits to store a single matrix element), fewer bits may similarly be required for the corresponding error correction codes, but the error correction codes would consume a much larger overall percentage of each entry. For example, if each entry is implemented with 16 bits for storing a single matrix element, an additional 5 bits may be required for a corresponding error correction code, resulting in 21 bits per entry. In that example, the error correction code consumes approximately 25% of the storage capacity of a given entry. Thus, as the total storage capacity of an entry decreases, the percentage of the storage capacity consumed by an associated error correction code increases. Accordingly, entries with smaller storage capacities may be much less efficient for storing data with error correction codes than entries with larger storage capacities.

Memory 1900 may be used for storing matrices in a similar manner as memory 1800 of FIG. 18. However, because the entries 1902 of memory modules 601 can each store up to four matrix elements, the storage capacity of example memory 1900 is four times larger than the storage capacity of memory 1800. For example, in the illustrated embodiment, memory 1900 can be used to store a 6×6 matrix, such as matrix 1910. Memory 1900, however, can store and retrieve the elements of matrix 1910 in a similar manner as memory 1800. For example, memory 1900 may store matrix 1910 by spreading or shifting the elements of each row 1912 and column 1914 across the memory modules 601. For example, barrel shifters 1904a and 1904b may be used to shift the elements of rows 1912 and columns 1914 when they are stored and retrieved on memory 1900, similar to barrel shifters 1804a and 1804b of memory 1800 from FIG. 18. In this manner, when memory 1900 is used to store matrix 1910, the elements of any given row 1912 or column 1914 of matrix 1910 will reside on different memory modules 601 of memory 1900. Given that memory 1900 can access one entry 1902 from each memory module 601 during a given clock cycle, storing the elements of matrix 1910 in this manner allows an entire row 1912 or entire column 1914 of matrix 1910 to be read or written during a given clock cycle. Accordingly, memory 1900 can significantly improve the performance of matrix processing systems, particularly for operations that involve access to entire rows and columns of a matrix, such as transpose operations.

Memory 1900, however, arranges the elements of matrix 1910 using a variation of the approach used by memory 1800 for the elements of matrix 1810 in FIG. 18. For example, given that the entries 1902 of memory modules 601 can each store four matrix elements, accessing a particular entry 1902 of memory modules 601 involves access to four matrix elements rather than one matrix element. Accordingly, memory 1900 stores and retrieves matrix elements in blocks of four. FIG. 19 illustrates the manner in which memory 1900 stores or arranges the elements of matrix 1910 in memory modules 601. For example, matrix 1910 is logically partitioned into 2×2 blocks of matrix elements, and each 2×2 block is stored in a single entry 1902 of memory modules 601. For example, matrix 1910 is logically partitioned into blocks A-I, which are 2×2 blocks of matrix elements in matrix 1910, and each block A-I is stored in a single entry 1902 of memory modules 601. For example, memory 1900 stores and retrieves these respective blocks A-I of matrix 1910 using the same approach as used by memory 1800 for the respective elements A-I of matrix 1810 from FIG. 18. Thus, memory 1900 uses the same storage approach as memory 1800, but memory 1900 operates on blocks of four matrix elements while memory 1800 operates on single matrix elements.

The illustrated embodiment of memory 1900 is merely used for illustrative purposes. In actual implementations and embodiments, memory 1900 may include any number of memory modules 601, and each memory module 601 may include any number of entries 1902. Moreover, each entry 1902 may be any size or number of bits for storing any number of matrix elements.

Figure 20:
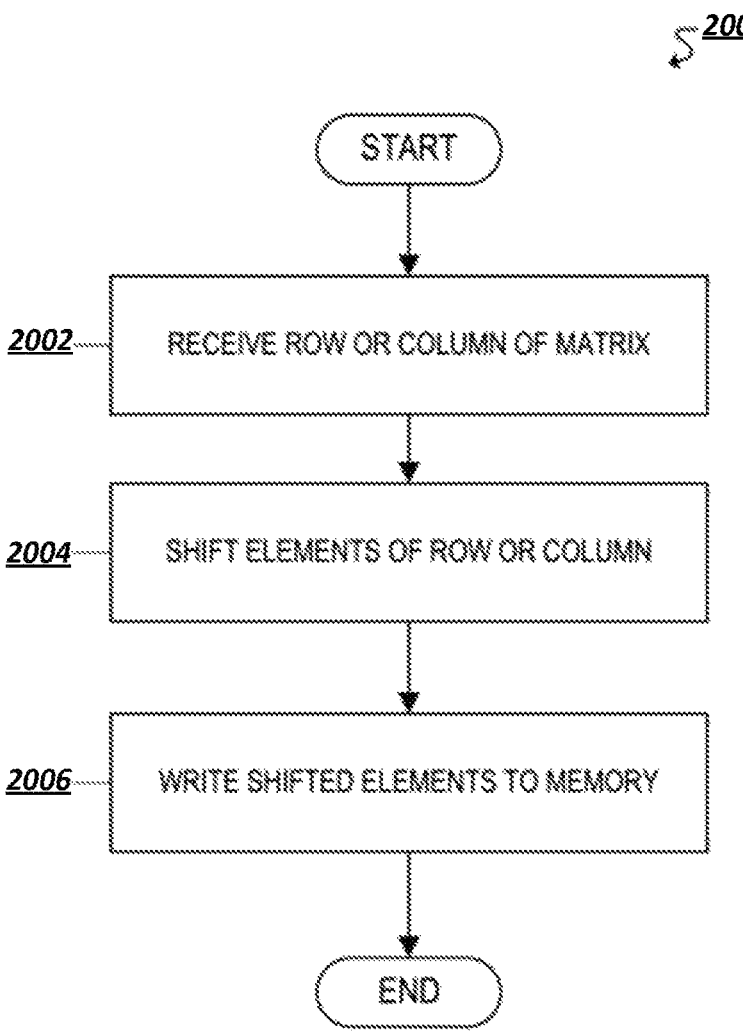
FIG. 20 illustrates a flowchart for an example embodiment of matrix storage using data shifting memory.

FIG. 20 illustrates a flowchart 2000 for an example embodiment of matrix storage using data shifting memory. Flowchart 2000 may be implemented, in some embodiments, by components described throughout this disclosure (e.g., memory 1800 of FIG. 18, memory 1900 of FIG. 19).

The flowchart may begin at block 2002 by receiving a row or column of a matrix to write to memory. In some embodiments, for example, the memory (or an associated memory controller) may receive a command to store a particular row or column of a matrix, and thus the corresponding elements of the particular row or column may be provided or otherwise identified to the memory.

In some embodiments, the memory may be implemented using M separate memory modules that are each N entries deep. Moreover, each entry may be able to store a single matrix element using a particular number of bits, such as 8 or 16 bits. Accordingly, the memory may provide storage capacity for matrix data of size N*M (e.g., N rows of matrix elements and M columns of matrix elements). Moreover, each memory module may include read and write ports for reading or writing a particular entry of the memory module every clock cycle.

Alternatively, in some embodiments, each entry N of the M memory modules may be able to store four matrix elements using a particular number of bits, such as 64 bits. Accordingly, the memory may provide storage capacity for matrix data of size 4N*M. Moreover, each entry may also include a particular number of bits for storing error correction codes (ECC), such as 8 bits. Error correction codes, for example, can be used to correct errors in the data stored and retrieved using the entries of memory modules. For example, in some cases, an error correction code for a particular entry may be able to correct single bit errors and may be able to detect double bit errors. Accordingly, in these embodiments, each entry may include 64 bits for storing up to four matrix elements, plus an additional 8 bits for storing an error correction code, totaling 72 bits per entry. Thus, the error correction codes consume approximately 10% of the storage capacity of each entry.

The flowchart may then proceed to block 2004 to shift the elements of the particular row or column that is being written to memory. In some embodiments, for example, the memory may be used to store a particular matrix by spreading or shifting the elements of each particular row and column across the M separate memory modules. The elements of a particular row or column may be shifted before they are written on the respective memory modules of the memory, for example, using a barrel shifter. The shifting may be performed so that, when the matrix has been written to the memory, the elements of any given row or column of the matrix ultimately reside on different memory modules of the memory. The number of shifts performed when writing a particular row or column to the memory varies based on the corresponding row or column number. For example, the number of shifts performed for a particular row or column may be one less than its corresponding row or column number (e.g., # of shifts=row number−1, or # of shifts=column number−1). Accordingly, when writing a row of a matrix to memory, the first row is shifted by 0 elements (e.g., no shifting is performed), the second row is shifted by +1 element, the third row is shifted by +2 elements, and so forth. Similarly, when writing a column of a matrix to memory, the first column is shifted by 0 elements (e.g., no shifting is performed), the second column is shifted by +1 element, the third column is shifted by +2 elements, and so forth.

The flowchart may then proceed to block 2006 to write the shifted elements to memory. The shifted elements of the particular row or column may be written to the respective memory modules of the memory in their respective order after the shifting is performed. Moreover, when writing a row of a matrix to memory, each element of the row is written at the same entry or offset within the memory modules. However, when writing a column of a matrix to memory, each element of the column is written at a different entry or offset within the memory modules.

In order to read a row or column of the matrix from memory, a particular entry or offset is read from each memory module. For example, in order to read a particular row of the matrix from memory, the same entry or offset is read from each memory module. In order to read a particular column of a matrix from memory, a different entry or offset is read from each memory module. After a particular row or column of the matrix is read from the memory modules, however, the elements are out-of-order and thus must be shifted back to their original order, which can be performed by a barrel shifter. The shifting required when reading a particular row or column is simply the opposite of the shifting performed when the row or column was originally written. Accordingly, when reading out the rows of a matrix from memory, the first row is shifted by 0 elements (e.g., no shifting is performed), the second row is shifted by −1 element, the third row is shifted by −2 elements, and so forth. Similarly, when reading out the columns of a matrix from memory, the first column is shifted by 0 elements (e.g., no shifting is performed), the second column is shifted by −1 element, the third column is shifted by −2 elements, and so forth.

In this manner, when the memory is used to store a matrix, the elements of any given row or column of the matrix will reside on different memory modules of the memory. Given that the memory can access one entry from each memory module during a given clock cycle, storing the elements of the matrix in this manner allows an entire row or entire column of the matrix to be read or written during a given clock cycle. Accordingly, the memory can be used to significantly improve the performance of matrix processing systems, particularly for operations that involve access to entire rows and columns of a matrix, such as transpose operations. At this point, the flowchart may be considered complete. In some embodiments, however, the flowchart may restart and/or certain blocks may be repeated. For example, in some embodiments, the flowchart may restart at block 2002 to continue writing rows and columns of a matrix to memory.

Max Pooling in a Matrix Processing Architecture

FIGS. 21A-21D illustrate examples of max pooling using a matrix processing engine. An artificial neural network, such as a convolutional neural network, includes a series of connected layers. In some cases, the neural network may include one or more max pooling layers. Max pooling is a down-sampling operation that reduces the spatial size of an input feature map, for example, to reduce the amount of parameters and computation in the neural network. A max pooling layer, for example, is often inserted between successive convolutional layers in a convolutional neural network. Max pooling is performed by sliding a "max filter" throughout the input feature map, identifying the maximum value within each filter position on the input feature map, and storing the respective maximum values in an output feature matrix.

As noted above, max pooling can be implemented as a layer in a neural network. Forward propagation through the max pooling layer of a neural network may be referred to as forward pooling, while backward propagation through the max pooling layer of a neural network may be referred to as backward pooling.

Figure 21A:
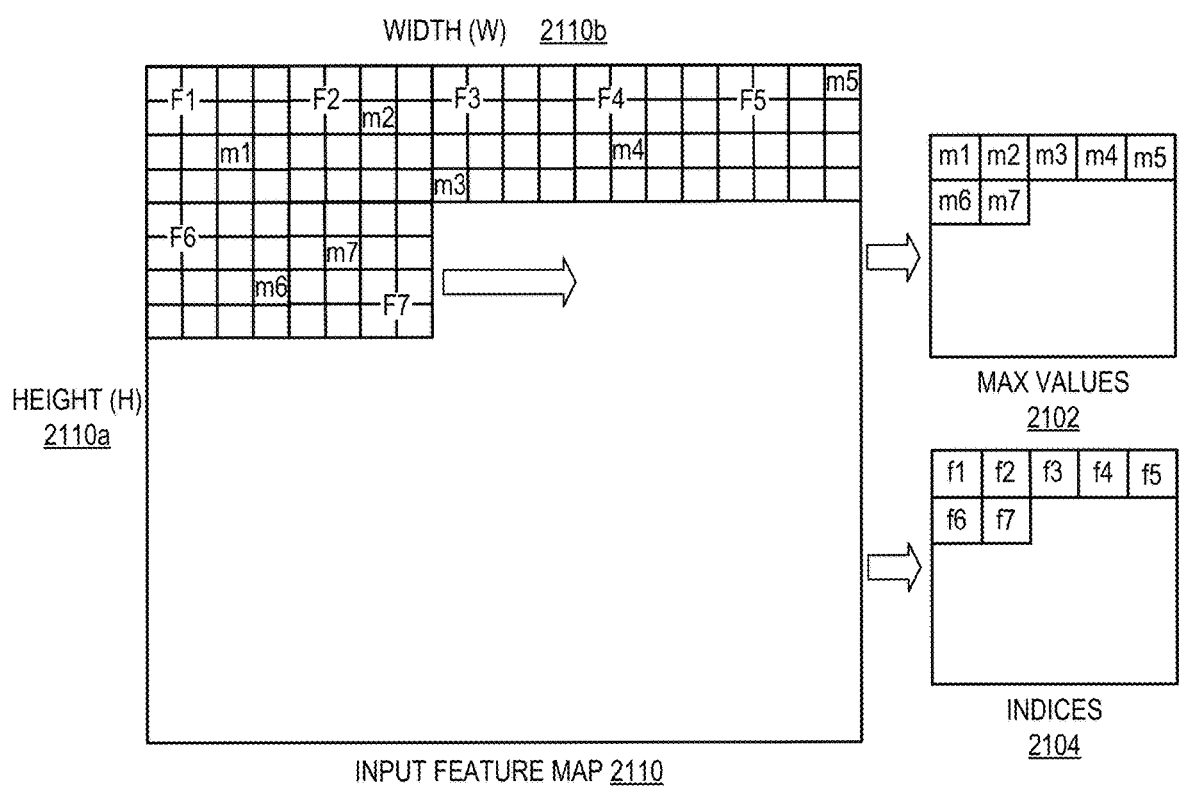

FIG. 21A illustrates a simplified example of forward pooling (e.g., performed by a matrix processing engine). The illustrated example performs forward pooling on an input feature map 2110 with dimensions H×W (e.g., height H and width W). Moreover, the illustrated example uses a 4×4 filter size with a stride of 4 in both the horizontal and vertical directions. In the illustrated example, the stride and filter size are equal for ease of illustration. In some use cases, however, the stride may not necessarily equal the filter size, which will result in overlapping filter positions during forward pooling.

In the illustrated example, for each filter position (e.g., F1-F7) on the input feature map 2110, the maximum value is identified for the elements within the filter, along with its relative position within the bounds of the filter (e.g., the index within the filter that corresponds to the max value). The collective maximum values 2102 from each filter position are stored together in memory as an output feature map (OFM), and the collective indices 2104 are similarly stored together in memory as an OFM. The max values 2102 and indices 2104 can also be viewed or treated as a single OFM with two respective channels for the max values and indices.

The illustrated example of FIG. 21A shows forward pooling for the first seven filter positions F1-F7 on the input feature map 2110. For example, at filter position F1, the max value m1 is stored in the max values OFM 2102, and its corresponding index within the filter i1 is stored in indices OFM 2104. Each filter position is processed in a similar manner until all filter positions on the input feature map 2110 have been processed, and thus the corresponding max values 2102 and indices 2104 have been stored in their respective OFMs.

Figure 21B:
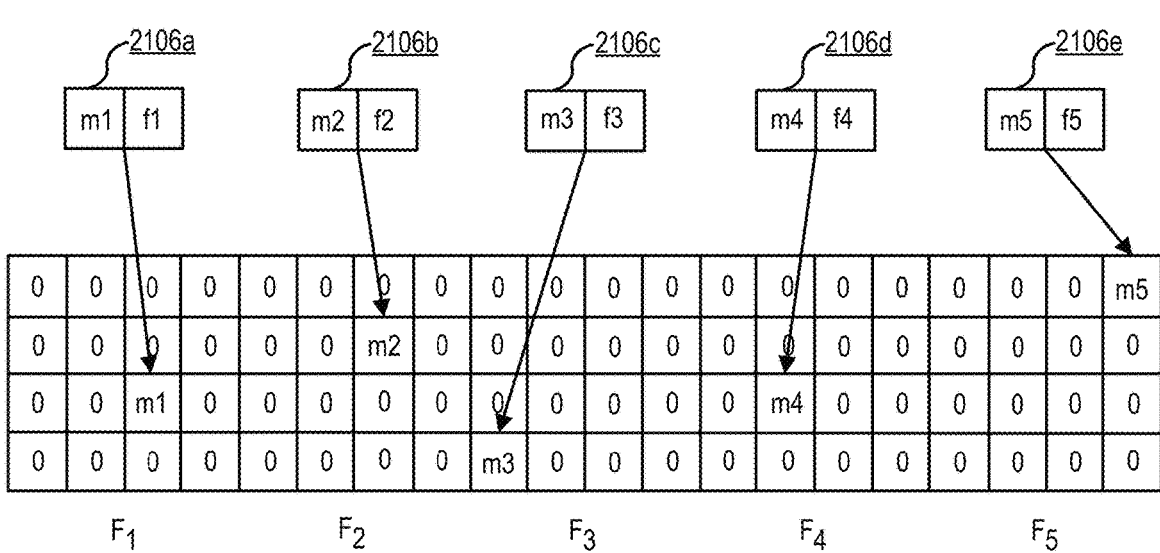

FIG. 21B illustrates a simplified example of backward pooling (e.g., performed by matrix processing engine). Backward pooling is used to partially reconstruct the original input feature map 2110, for example, using the max values 2102 and indices 2104 from the forward pooling operation. Each max value-index pair (e.g., pairs 2106a-e) is processed sequentially to reconstruct a partial facsimile of the original H×W input feature map 2110. The reconstructed feature map, of course, will only retain the respective maximum values from the various filter positions, while all other elements will be filled with zeroes.

FIG. 21B illustrates how the original feature map is reconstructed using the max value-index pairs 2106. For example, for filter position F1, max value m1 and index i1 are used to write max value m1 to the appropriate location within F1, while all other elements within F1 are filled with zeroes. Each filter position is processed in a similar manner until all max values have been written to their respective locations and the remaining elements of the reconstructed feature map have been filled with zeroes.

As noted above, while the example forward pooling operation from FIG. 21A uses a stride that is equal to the filter size, that may not always be the case. For example, in some use cases, the stride may be different than the filter size, which results in overlapping filter positions during forward pooling. A use case with a stride of 1 is of particular interest, as that is the most restrictive use case. For example, if a stride of 1 was used in the examples of FIGS. 21A and 21B instead of a stride of 4, that would place each successive filter position only 1 element to the right instead of 4 elements to the right. Similarly, after reaching the right edge of the H×W input feature map 2110, the next row of filter positions would only be 1 element down instead of 4 elements down.

Accordingly, in the scenario where stride equals 1, there can be a significant overlap of the elements within the various filter positions. Moreover, a particular element of the input feature map 2110 could be the maximum value in multiple different filter positions, and thus that element would be identified multiple times by the max value-index pairs generated during forward pooling.

During backward pooling, if each max value-index pair is fully processed and written to memory in isolation, that would require multiple duplicative read and write operations when reconstructing the original feature map, due to the overlapping elements in the respective filter positions. Accordingly, in order to efficiently reconstruct the original feature map, it is critical to determine when you have processed all value-index pairs that can impact a particular element of the reconstructed feature map, so that the particular element can be written to memory at an appropriate time to minimize the number of total memory accesses. For example, given that the filter movement is to the right and then down, the element in the top-left corner of the filter is always the latest element that will have no further updates. Accordingly, that element can be safely written to memory.

FIGS. 21C-D illustrate a simplified example of an implementation of backward pooling. The illustrated implementation of backward pooling, for example, can be implemented by matrix processing engine.

As an initial matter, a "macro-column" is a basic construct that can be used by matrix processing engine, regardless of the particular type of convolutional operation that is being performed. Macro-columns serve to limit the width of the active feature map to ensure that the memory resource blocks (MRBs) have space to hold enough rows of the feature map to execute the particular operation. For backward pooling, the macro-column width may be fixed at a particular size, such as 32 elements. Moreover, there may also be a maximum supported filter size, such as 16×16 elements. Accordingly, in some embodiments, the size of the active feature map may be 16 row elements by 32 column elements, or 512 elements.

FIGS. 21C-D illustrate an implementation of backward pooling that uses a first in first out (FIFO) memory 2130, which has the same size as the active feature map (e.g., a 512-entry FIFO). FIFO 2130 also maintains a status bit for each entry (e.g., using a flip flop) to track whether each entry has been updated or modified during the backward pooling operation.

During backward pooling, FIFO 2130 can effectively be viewed as a sliding window that slides down each macro-column 2122 of the output feature map 2120. FIG. 21C illustrates a simplified example of FIFO 2130 sliding down a particular macro-column 2122c of output feature map 2120, while FIG. 21D illustrates a more detailed depiction of how FIFO 2130 slides down the particular macro-column 2122c.

For example, for a stride of 1, FIFO 2130 moves a single column element after a particular max value-index pair is processed. The column element that is uncovered by moving FIFO 2130 can then be written to memory, as that column element will not be modified by any subsequently processed max value-index pairs. For a stride greater than 1, multiple column elements will be uncovered when moving FIFO 2130. In general, after processing a particular max value-index pair, the number of column elements written to memory is equal to the column stride, as the column stride dictates how many column elements are uncovered each time FIFO 2130 is moved.

When reaching the boundary of a macro-column 2122c, FIFO 2130 is then moved down a number of rows equal to the row stride. If the row stride is greater than 1, then entire rows are uncovered by the movement of FIFO 2130, all of which are immediately written to memory. The particular number of rows written to memory is the row stride minus one (e.g., row stride −1).

Moreover, when writing a particular element to memory, the corresponding status bit of FIFO 2130 can be used to determine whether the element has been modified. For example, if the element has not been modified, then a 0 may simply be written to memory. If the status bit indicates that the element has been modified, however, then a read-modify-write operation may be performed to read the existing value, modify the existing value (e.g., by summing the existing value with the new value), and then writing the modified value back to memory.

Each macro-column can be processed in this manner until the backward pooling operation is complete. Moreover, in some embodiments, the result of the backward pooling operation may be written to one or more memory resource blocks (MRBs).

Figure 22:
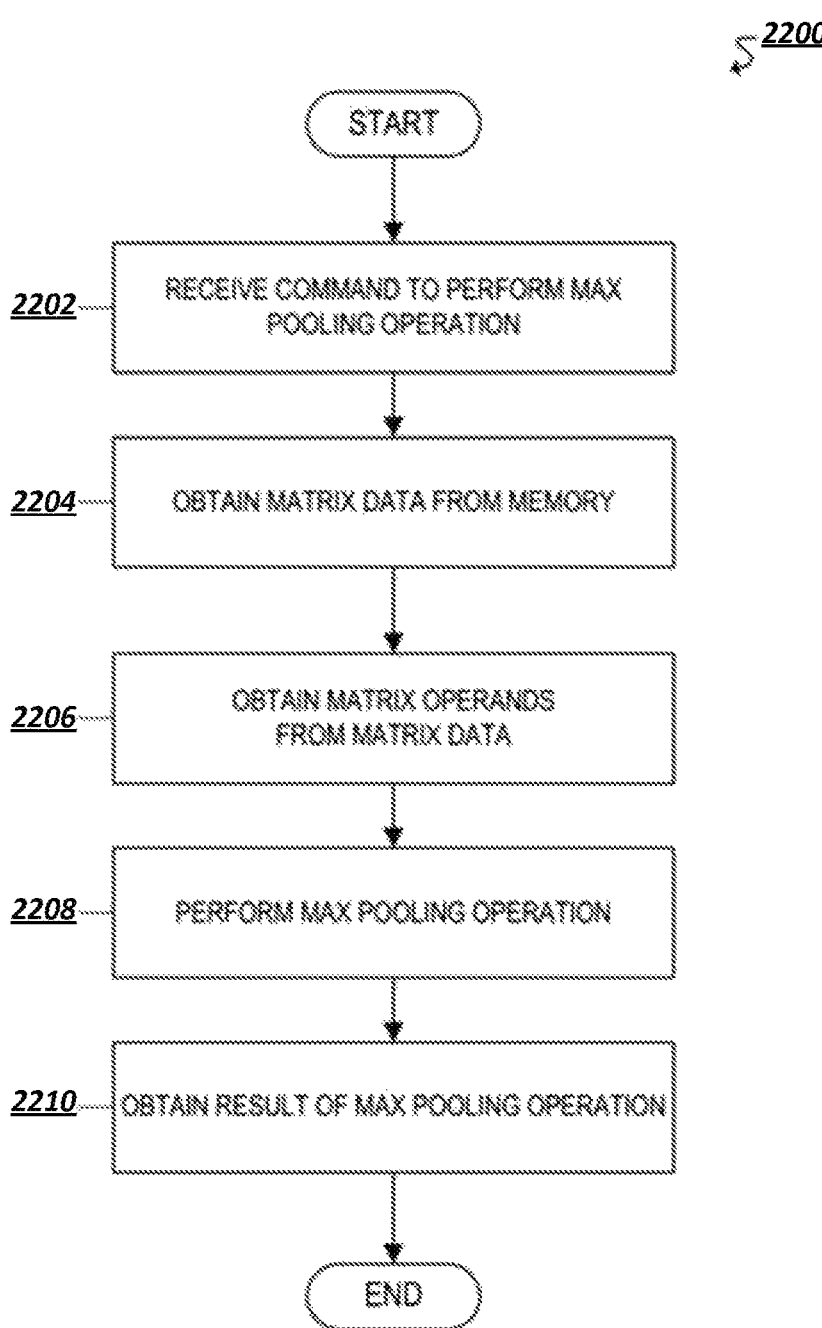
FIG. 22 illustrates a flowchart for an example embodiment of max pooling using a matrix processing engine

FIG. 22 illustrates a flowchart 2200 for an example embodiment of max pooling using a matrix processing engine. Flowchart 2200 may be implemented, in some embodiments, by components described throughout this disclosure (e.g., the deep learning and matrix processing architectures discussed above).

The flowchart may begin at block 2202 by receiving a command to perform a max pooling operation. The max pooling operation, for example, may be associated with forward or backward propagation in a neural network. For example, during forward propagation in a neural network, the max pooling operation may be a forward pooling operation used to reduce the size of a matrix operand. During backward propagation in a neural network, the max pooling operation may be a backward pooling operation used to reconstruct the original matrix operand from the forward pooling operation.

The flowchart may then proceed to block 2204 to obtain matrix data from memory. In some embodiments, for example, matrix data associated with the one or more operands of the max pooling operation may be retrieved from memory. Moreover, in some embodiments, the memory may be a multi-dimensional memory.

The flowchart may then proceed to block 2206 to obtain the matrix operands from the matrix data. For example, in some embodiments, the matrix data may be sliced to extract the matrix operands.

The flowchart may then proceed to block 2208 to perform the max pooling operation using the matrix operands obtained from the matrix data. For example, for a backward pooling operation, the original matrix operand from a forward pooling operation is partially reconstructed using a max value matrix. The max value matrix, for example, may be the output from the forward pooling operation. In order to reconstruct the original matrix operand, each max value entry in the max value matrix may be processed. Each max value entry, for example, may include a maximum value and an index. A portion of the original matrix is reconstructed using each max value entry. After using a particular max value entry to reconstruct a portion of the original matrix, it is then determined that certain element(s) of the partially reconstructed matrix will not be modified further during the remainder of the reconstruction process. Accordingly, those elements are written to memory. In some embodiments, the elements of the reconstructed matrix may be stored using a FIFO memory. Moreover, the FIFO memory may include status bits (e.g., implemented using flip flops) to track whether the respective entries in the FIFO memory have been modified.

After each max value entry has been processed, the flowchart may then proceed to block 2210 to obtain a result of the max pooling operation. For example, for a backward pooling operation, the result may be a matrix that is reconstructed from the respective max value entries, as described above.

At this point, the flowchart may be complete. In some embodiments, however, the flowchart may restart and/or certain blocks may be repeated. For example, in some embodiments, the flowchart may restart at block 2202 to continue performing max pooling operations.

Winograd Algorithm on a Matrix Processing Architecture

In some embodiments, a matrix processing engine may perform matrix multiplication operations using an implementation of the Winograd matrix multiplication algorithm. Winograd is an algorithm that accelerates matrix multiplication by transforming the operands of the matrix multiplication operation into new "Winograd" operands that, when multiplied, require fewer overall multiplications by replacing some of the multiplications with addition and subtraction. The result of the multiplication on the Winograd operands, however, must then be transformed to obtain the final result of the original matrix multiplication operation.

Winograd may be particularly beneficial for small filter sizes and is superior to other transform techniques like Fast Fourier Transform for those small filter sizes. Matrix processing engine, for example, may apply the Winograd algorithm to a 3×3 filter size, which is a common filter size in deep learning neural networks.

The performance improvement provided by the Winograd algorithm depends on the size of the output tile. For example, a Winograd algorithm can be implemented to output either a 2×2 output tile, or a 4×4 output tile. A Winograd algorithm that outputs a 2×2 output tile can be referred to as Winograd 2, while a Winograd algorithm that outputs a 4×4 output tile can be referred to as Winograd 4. For Winograd 2 (e.g., using a 2×2 output tile), the Winograd transform converts the 3×3 filter into a 4×4 filter with a stride of 2. The performance improvement provided by Winograd 2 using the 2×2 output tile is 2.25. For Winograd 4 (e.g., using a 4×4 output tile), the Winograd transform converts the 3×3 filter into a 6×6 filter with a stride of 4. The performance improvement provided by Winograd 4 using the 4×4 output tile is 4. Accordingly, assuming the Winograd transforms are implemented efficiently, using the Winograd algorithm for a convolution operation can reduce the processing time of a normal convolution by approximately one-half to one-fourth (depending on whether Winograd 2 or Winograd 4 is used). The illustrated architecture can be used to efficiently implement the Winograd algorithm to achieve the maximum performance improvement that is possible using the Winograd algorithm, which cannot be done using CPUs or GPUs.

In some implementations, a slice engine may "slice" the matrix data stored in MRBs to extract the particular matrix operands associated with the convolution operations. For example, in some cases, the associated matrix operands may only be a subset of the matrix data stored in MRBs, and/or the matrix operands may not be arranged contiguously in the matrix data stored in MRBs. Accordingly, slice engine may extract particular "slices" or pieces of the matrix data stored in MRBs, and may then arrange the slices in a particular manner to form the respective matrix operands. For instance, the slice engine may extract a sliced matrix operand and two filters from MRBs. For example, as noted above, MRBs may include two MRBs that are respectively used to store image data and filter data. The image data stored in one of the MRBs may be used by slice engine to extract a sliced matrix operand. The sliced matrix operand, for example, may be a particular portion of the image data involved in the convolution operations. The filter data stored in the other MRB can include two filters that are interleaved. Interleaving filters in this manner allows two filters to be stored in a single MRB, while also allowing those filters to be extracted simultaneously by slicing engine. Storing the filters in a single MRB rather than two separate MRBs allows an MRB that would otherwise be needed to store one of the filters to be used for other purposes, resulting in more efficient use of valuable MRB memory. Moreover, interleaving the filters allows them to be simultaneously extracted by slice engine, thus avoiding any performance hit that would result from retrieving the filters separately.

The sliced operand and the two filters, for example, may be the operands for two separate matrix multiplication operations that are used to multiply the sliced operand with each filter. However, because matrix processing engine uses the Winograd algorithm for matrix multiplication, slice engine performs a Winograd transform on the sliced matrix operand in order to generate a transformed matrix operand for the Winograd algorithm. An example of the Winograd transform performed by slice engine is described below in connection with FIG. 23A. Slice engine then stores the transformed Winograd operand and each filter in respective MRBs. In the illustrated example, the Winograd operand is stored in MRB, and the filters are respectively stored in MRB and MRB.

An output engine may then perform matrix multiplication using a transformed Winograd operand created by slice engine. For example, output engine may perform separate matrix multiplication operations to multiply the Winograd operand with each filter. Moreover, output engine can use different MPUs to multiply the respective filters in parallel. Thus, the Winograd operand stored in MRB is used in both matrix multiplication operations, and thus that operand may be broadcasted to both of the MPUs.

Output engine may then execute the particular matrix subroutine. In this example, the matrix subroutine would be used to perform matrix multiplication on the Winograd operand and each filter. For example, in the illustrated embodiment, output engine uses MPU to multiply the Winograd operand with the first filter, and output engine uses MPU to multiply the Winograd operand with the second filter. The result of each matrix multiplication using the Winograd operand is an output that is in "pre-transform" Winograd form and thus needs to be transformed into the final result of the matrix multiplication operation. For example, multiplying the Winograd operand with the first filter (e.g., using MPU) results in an output in Winograd form that is stored in MRB. Similarly, multiplying the Winograd operand with the second filter (e.g., using MPU) results in a different Winograd output that is stored in MRB. Accordingly, each Winograd output in MRB and MRB, respectively, must be transformed into the final result of their respective matrix multiplication operations.

Transform engine is used to transform each Winograd output into the final result for their respective matrix multiplication operations. An example of the Winograd transform performed by transform engine is described below in connection with FIG. 23B. In some embodiments, transform engine includes a transform subroutine memory. Transform subroutine memory may be similar to a matrix subroutine memory of the output engine, except the transform subroutines are implemented primarily using read and write instructions to manipulate data stored in the MRBs. In some embodiments, transform engine may be programmed to perform any type of transform using the transform subroutine memory. After performing the Winograd output transform on each Winograd output, transform engine may then store the final result for each matrix multiplication operation in corresponding MRBs, respectively. In this manner, a matrix processing engine may be used to perform matrix multiplication algorithms using the described implementation of the Winograd algorithm.

Figures 23A, 23B:
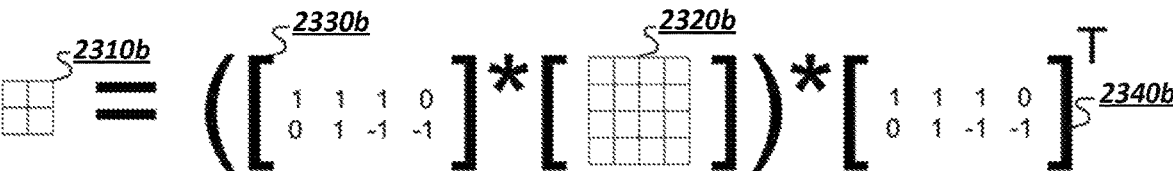
FIGS. 23A-23B illustrate example Winograd transforms performed by a matrix processing engine.

FIGS. 23A and 23B illustrate example Winograd transforms performed by a matrix processing engine. For example, in some embodiments, the illustrated transforms may be used in the Winograd algorithm implemented by an example matrix processing engine.

FIG. 23A illustrates an example Winograd input transform 2300a. The input transform 2300a is an operation used to convert an original matrix multiplication operand 2320a into a transformed Winograd matrix operand 2310a used by the Winograd algorithm. The original matrix operand 2320a, for example, may be an operand of the original matrix multiplication operation that is being performed using the Winograd algorithm. In some embodiments, the original matrix operand 2320a may be a matrix operand containing matrix data associated with an image. The transformed Winograd matrix operand 2310a is created from the original matrix operand 2320a, and can then be used in the Winograd algorithm (e.g., as described above). In the illustrated transform 2300A, the original matrix operand 2320a is converted into the Winograd matrix operand 2310a using matrix multiplication. For example, matrix multiplication is performed on the original matrix operand 2320a using two transform matrices 2330a and 2340a, where the second transform matrix 2340a is the transpose of the first transform matrix 2330a. The particular coefficients used in the transform matrices 2330a and 2340a are illustrated in FIG. 23A. The original matrix operand 2320a is first multiplied by the first transform matrix 2330a, and the result from that operation is then multiplied by the second transform matrix 2340a. The result from the second operation is the transformed Winograd matrix operand 2310a used by the Winograd algorithm.

FIG. 23B illustrates an example Winograd output transform 2300B. The output transform 2300B is an operation used to transform the intermediate Winograd output 2320b of the Winograd algorithm into the final result 2310b of the original matrix multiplication operation that is being performed using the Winograd algorithm (e.g., as described above). In the illustrated transform 2300B, the Winograd output 2320b is transformed into the final result 2310b using matrix multiplication. For example, matrix multiplication is performed on the Winograd output 2320b using two transform matrices 2330b and 2340b, where the second transform matrix 2340b is the transpose of the first transform matrix 2330b. The particular coefficients used in the transform matrices 2330b and 2340b are illustrated in FIG. 23B. The Winograd output 2320b is first multiplied by the first transform matrix 2330b, and the result from that operation is then multiplied by the second transform matrix 2340b. The result from the second operation is the final result 2310b of the original matrix multiplication operation that is performed using the Winograd algorithm.

Figure 24:
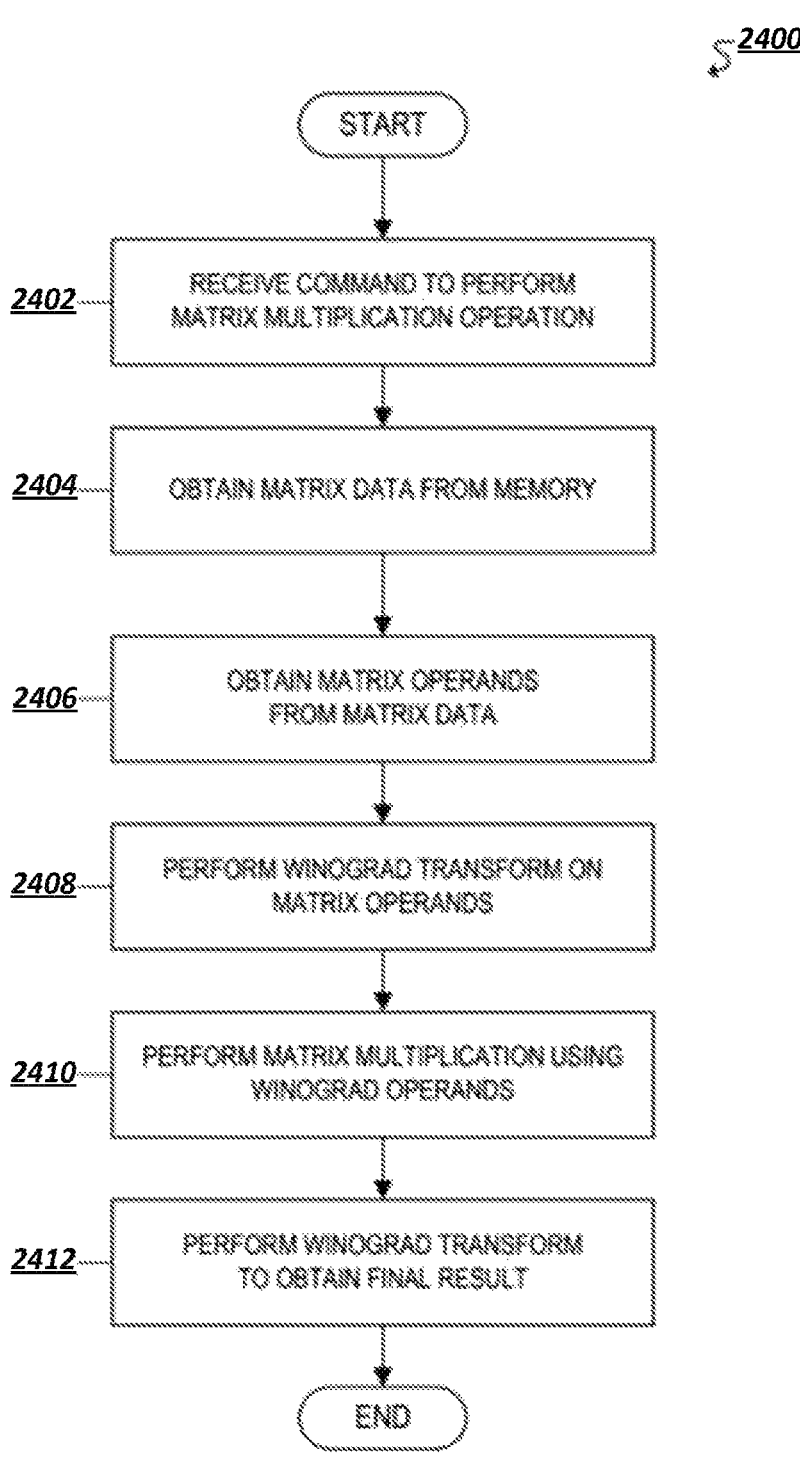
FIG. 24 illustrates a flowchart for an example embodiment of matrix multiplication using the Winograd algorithm.

FIG. 24 illustrates a flowchart 2400 for an example embodiment of matrix multiplication using the Winograd algorithm. Flowchart 2400 may be implemented, in some embodiments, by components described throughout this disclosure.

The flowchart may begin at block 2402 by receiving a command to perform a matrix multiplication operation. The matrix multiplication operation, for example, may be associated with a convolution operation. In some embodiments, matrix operations, such as matrix multiplication and convolution, may be used to implement computer vision artificial intelligence and machine learning capabilities in an artificial neural network. For example, in some embodiments, the matrix operation of block 2402 may be associated with operations in an artificial neural network, such as forward propagation, backward propagation, and/or weight update operations.

The flowchart may then proceed to block 2404 to obtain matrix data from memory. The matrix data, for example, may be associated with one or more matrix operands of the matrix operation. In some embodiments, the matrix data may be obtained from multi-dimensional memory. Multi-dimensional memory, for example, may be a memory component designed to efficiently store and retrieve matrix data in multiple dimensions (e.g., two-dimensions).

The flowchart may then proceed to block 2406 to obtain matrix operands from the matrix data. In some embodiments, for example, the matrix operands may be obtained by slicing the matrix data to extract the matrix operands from the matrix data. For example, for a convolution operation, a sliced matrix operand and a filter may be extracted from the matrix data. Moreover, in some embodiments, multiple filters may be extracted from the matrix data for performing two parallel matrix multiplication operations on the sliced matrix operand and each filter. In some embodiments, the multiple filters may be interleaved in a single memory resource block to preserve memory resource blocks, while still allowing the filters to be retrieved simultaneously.

The flowchart may then proceed to block 2408 to perform a Winograd transform on the sliced matrix operand (e.g., using the Winograd transform described above in connection with FIG. 23A). The Winograd transform, for example, may be used to transform the sliced matrix operand into a Winograd operand used in the Winograd matrix multiplication algorithm.

The flowchart may then proceed to block 2410 to perform matrix multiplication using the transformed Winograd operand. In some embodiments, two matrix multiplications may be performed in parallel by respective MPUs. For example, the transformed Winograd operand may be separately multiplied by two filters using two separate matrix multiplication operations.

The flowchart may then proceed to block 2412 to perform another Winograd transform on the output or partial result from the matrix multiplication operation from block 2410. For example, the result of a matrix multiplication operation on the transformed Winograd operand is an output or partial result that is in "pre-transform" Winograd form, and thus needs to be transformed into the final result of the matrix multiplication operation. Accordingly, a Winograd transform may be used to transform the Winograd partial result to the final result of the matrix multiplication operation (e.g., using the Winograd transform described above in connection with FIG. 23B). At this point, the flowchart may be complete. In some embodiments, however, the flowchart may restart and/or certain blocks may be repeated. For example, in some embodiments, the flowchart may restart at block 2402 to continue receiving and processing commands to perform matrix operations.

Distributed Matrix Operations

Figure 25:
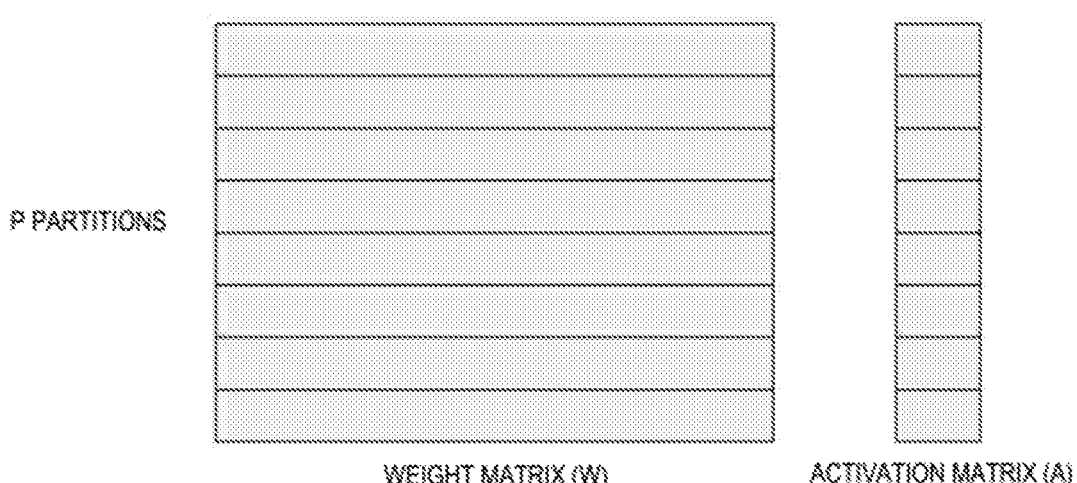
FIG. 25 illustrates an example of partitioning matrix operands.

FIGS. 25, 26A-26C, 27A-27C, and 28A-28C illustrate example operations in a neural network. In some embodiments, these example operations may be performed using a matrix processing architecture, such as the matrix processing architectures discussed in the examples above. The fundamental operations of a neural network may include forward propagation, backward propagation, and weight updates. These operations may be used, in some embodiments, to train a neural network in order to provide machine learning functionality. For example, a forward propagation operation may include propagating a particular input through a neural network in order to generate a corresponding output. The input to the forward propagation operation may be a training pattern with a known or expected output. A backward propagation operation may then be used to determine the error associated with the forward propagation operation based on the difference or delta between the calculated output and the expected output of the forward propagation operation. A weight update operation may then be used to determine updated weight values in order to minimize the associated error. In some embodiments, these neural network operations may be performed using matrix operations. For example, the input values, weights, and output values may be represented using matrices. In some embodiments, these neural network operations may be implemented using the following formulas:

forward propagation: $A_2=w^*A_1$ backward propagation: $A_1=w^T{}^*A_2$ weight update: $\Delta w=A_1{}^T{}^*A_2$ FIG. 25 illustrates an example of partitioning matrix operands. Matrix operands may be partitioned, for example, to perform matrix operations using the distributed matrix processing functionality described throughout this disclosure. In particular, matrix partitioning may be performed for neural network operations, such as those illustrated in FIGS. 26, 27, and 28.

The illustrated embodiment demonstrates matrix partitioning for a weight matrix (W) and an activation matrix (A). In the illustrated embodiment, weight matrix (W) and activation matrix (A) are partitioned into P partitions. In some embodiments, matrix operands may be partitioned into a number of partitions corresponding to the number of available processing resources. For example, weight matrix (W) and activation matrix (A) may be partitioned into P partitions corresponding to P processing resources. Moreover, in some embodiments, the matrix operands may be partitioned across their rows. Each partition may then be distributed to a particular processing resource, as described throughout this disclosure.

In some embodiments, matrix operands may be partitioned hierarchically based on the hierarchical arrangement of processing resources. For example, the matrix operands may initially be partitioned based on the number of available matrix processing chips. Each partition, and the associated partial matrix operations, may then be distributed to a particular matrix processing chip. The partition and partial matrix operations distributed to a particular matrix processing chip may then be similarly partitioned and distributed across the matrix processing clusters of that matrix processing chip (e.g., matrix processing clusters). The partition and partial matrix operations distributed to a particular matrix processing cluster may then be similarly partitioned and distributed across the matrix processing units (MPUs) of that matrix processing cluster (e.g., matrix processing units (MPUs)).

Figure 26A:
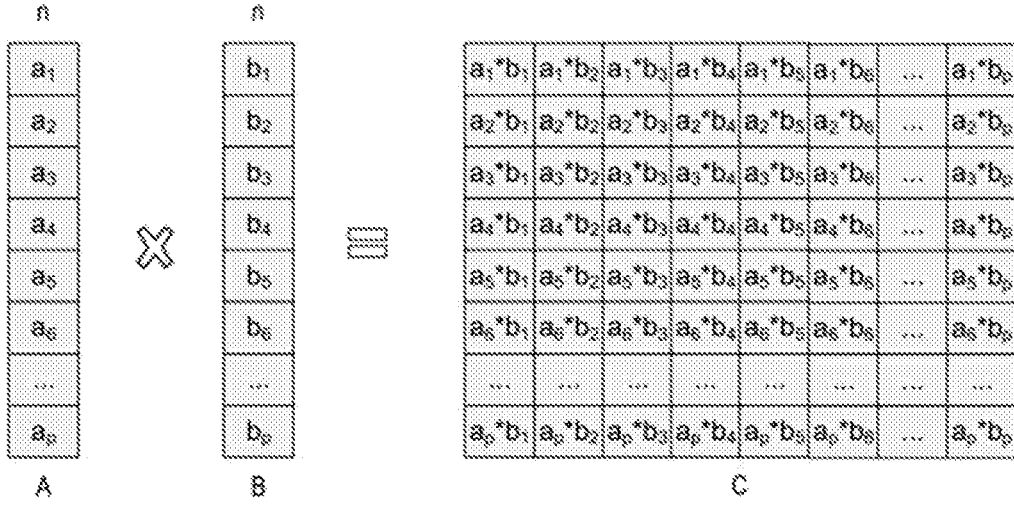
FIGS. 26A, 26B and 26C illustrate an example weight update operation in a neural network.
Figure 26B:
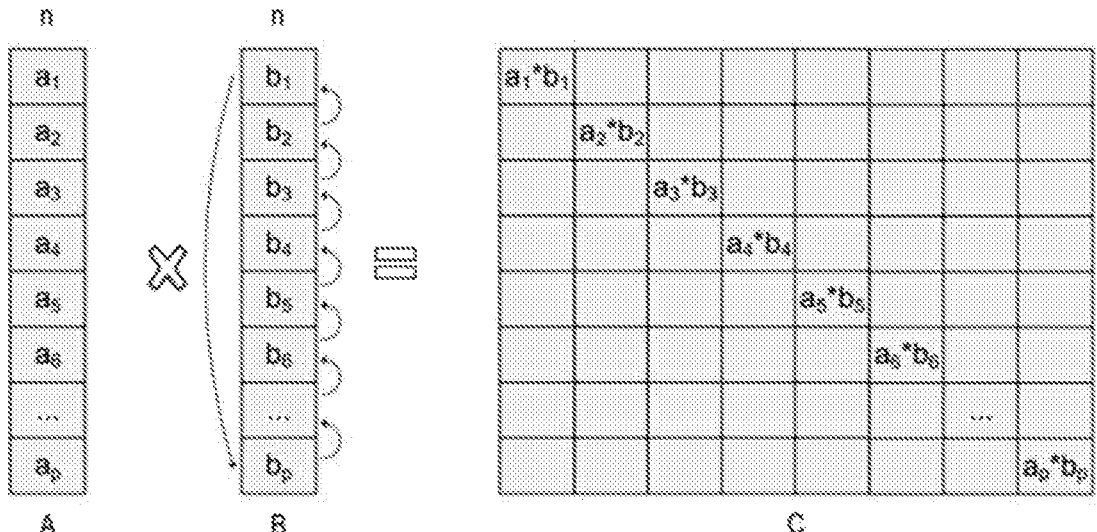
Figure 26C:
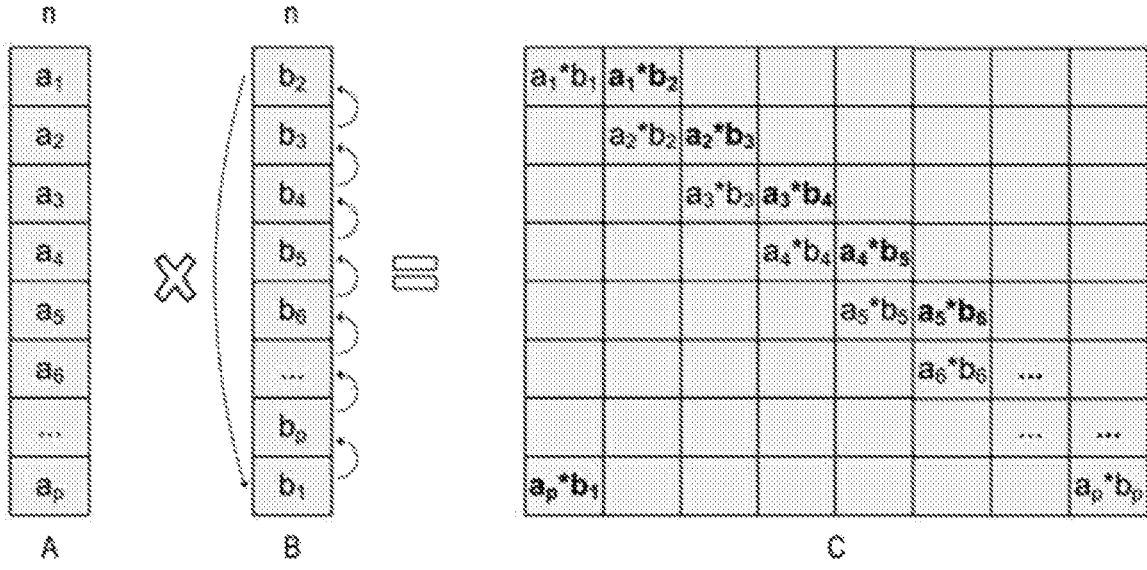

FIGS. 26A-26C illustrate an example weight update operation in a neural network. FIG. 26A illustrates the weight update operation that is to be performed, and FIGS. 26B and 26C illustrate how the weight update operation is performed.

FIG. 26A illustrates the following operation: A*B=C. A weight update operation may be implemented using the formula $\Delta w=A_1{}^T{}^*A_2$, which may translate as follows in FIG. 26A: matrix A corresponds to $A_1{}^T$ (e.g., the transpose of the first activation matrix); matrix B corresponds to $A_2$ (e.g., the second activation matrix); and matrix C corresponds to $\Delta w$ (e.g., the updated weight matrix).

Matrices A and B may first be partitioned based on the number of available processing resources, as described in connection with FIG. 25. For example, in some embodiments, matrices A and B may be partitioned into P partitions corresponding to the number of available matrix processing chips. For example, if there are P matrix processing chips, the rows of matrix A may be partitioned into partitions $a_1$-$a_p$, and the rows of matrix B may be partitioned into partitions $b_1$-$b_p$. Each partition may then be distributed to a particular matrix processing chip. For example, partitions $a_1$ and $b_1$ may be distributed to a first matrix processing chip, partitions $a_2$ and $b_2$ may be distributed to a second matrix processing chip, and so forth.

Moreover, in some embodiments the matrix operands may be further partitioned based on the hierarchical arrangement of processing resources, as described in connection with FIG. 25. For example, the partition distributed to a particular matrix processing chip may then be similarly partitioned and distributed across the matrix processing clusters of that matrix processing chip. The partition distributed to a particular matrix processing cluster may then be similarly partitioned and distributed across the matrix processing units (MPUs) of that matrix processing cluster (e.g., matrix processing units (MPUs)).

The weight update operation may then be performed as described in connection with FIGS. 26B and 26C. FIG. 26B illustrates the first stage of the weight update operation. In the first stage, each matrix processing chip may perform a partial matrix multiplication operation using its respective partitions of matrices A and B. For example, the first chip may perform a partial matrix multiplication operation using partitions $a_1$ and $b_1$, the second chip may perform a partial matrix multiplication operation using partitions $a_2$ and $b_2$, and so forth. The partial result calculated by each matrix processing chip may then be stored in the corresponding location in result matrix C.

Moreover, in some embodiments, the partial matrix operations may be further distributed based on the hierarchical arrangement of processing resources. For example, the partial matrix operations distributed to a particular matrix processing chip may then be similarly distributed across the matrix processing clusters of that matrix processing chip (e.g., matrix processing clusters). The partial matrix operations distributed to a particular matrix processing cluster may then be similarly distributed across the matrix processing units (MPUs) of that matrix processing cluster (e.g., matrix processing units (MPUs)).

While the partial operations are being performed by the matrix processing chips, each chip may simultaneously send and receive partial matrix operands to and from its neighboring matrix processing chips. For example, in some embodiments, the matrix processing chips may be configured in a single-cyclical arrangement (e.g., with one-way communication between neighboring chips) or a dual-cyclical arrangement (e.g., with two-way communication between neighboring chips). In a single-cyclical configuration, each matrix processing chip may send or receive partial matrix operands to or from each neighboring chip. However, a single-cyclical configuration may be unable to achieve 100% processing efficiency for certain matrix operations and matrix operands (e.g., a large matrix operand which is neither square nor a single vector, such as a "thin" matrix with a much larger height than width). In a dual-cyclical configuration, each matrix processing chip may send and receive matrix operands to and from both neighboring chips. Accordingly, a dual-cyclical configuration may significantly reduce the latency for communicating matrix operands, thus avoiding any idle processing time.

Using either approach, the partitions of matrix B (e.g., partitions $b_1$-$b_p$) are shifted across matrix processing chips during each stage of partial matrix operations. For example, the illustrated embodiment uses a single-cyclical approach, such that each partition of matrix B (e.g., partitions $b_1$-$b_p$) is transmitted from its current chip to a single neighboring chip. Other embodiments may use a dual-cyclical approach, such that each partition of matrix B (e.g., partitions $b_1$-$b_p$) is transmitted from its current chip to both neighboring chips, thus reducing the latency for communicating partial matrix operands by half.

In this manner, during each stage of partial matrix operations, partial matrix operands (e.g., partitions $b_1$-$b_p$) are shifted to neighboring chip(s), and each matrix processing chip may then use the partial matrix operands received from neighboring chips for subsequent partial matrix operations, as described in connection with FIG. 26C.

FIG. 26C illustrates the second stage of the weight update operation. In the second stage, each matrix processing chip may perform a partial matrix multiplication operation using its respective partitions of matrices A and B. For example, while the partitions of matrix A remain the same across the chips, the partitions of matrix B have been shifted across the chips, as described in connection with FIG. 26B. Thus, the first chip may perform a partial matrix multiplication operation using partitions $a_1$ and $b_2$, the second chip may perform a partial matrix multiplication operation using partitions $a_2$ and $b_3$, and so forth. Moreover, in some embodiments the partial matrix operations may be further distributed based on the hierarchical arrangement of processing resources, as described in connection with FIG. 26B. The partial result calculated by each matrix processing chip may then be stored in the corresponding location in result matrix C.

Moreover, while the partial operations are being performed by the matrix processing chips, each chip may simultaneously send and receive partial matrix operands to and from its neighboring matrix processing chips, as described in connection with FIG. 26B. For example, each matrix processing chip may send its current partition of matrix B (e.g., partitions $b_1$-$b_p$) to one or more neighboring chips.

Thus, during each stage of partial matrix operations, partial matrix operands (e.g., partitions $b_1$-$b_p$) are shifted to neighboring chip(s), and each matrix processing chip may then use the partial matrix operands received from neighboring chips for subsequent partial matrix operations. These stages of the matrix operation may continue in this manner until all partial results for result matrix C have been computed. The result of the matrix operation may then be determined using the partial results collectively computed by the matrix processing chips.

Figures 27A, 27B:
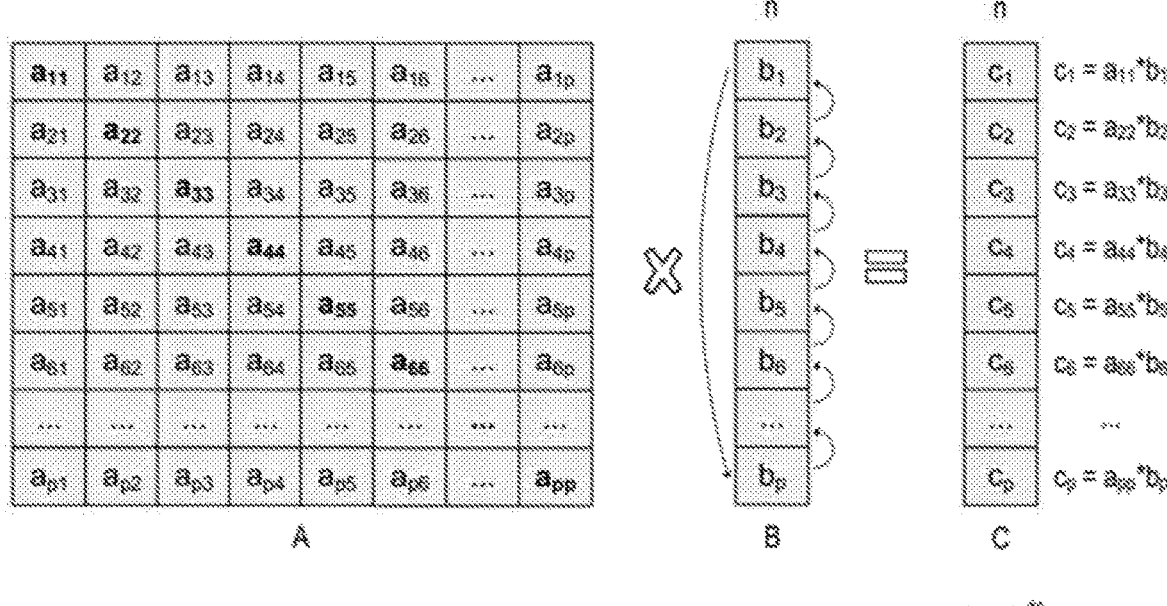
FIGS. 27A, 27B and 27C illustrate an example forward propagation operation in a neural network.
Figure 27C:
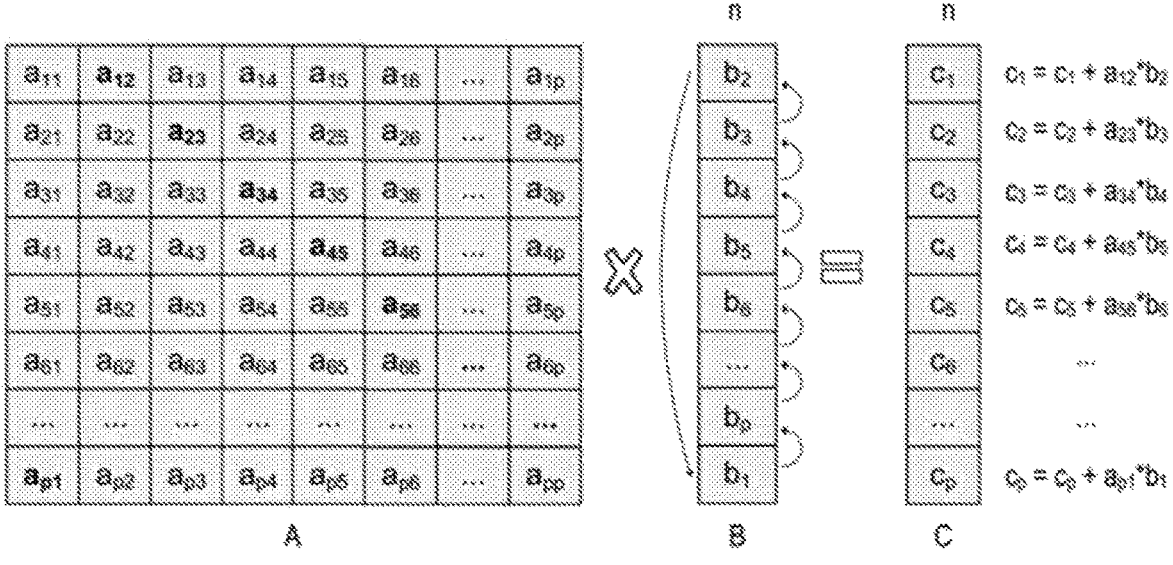

FIGS. 27A-27C illustrate an example forward propagation operation in a neural network. FIG. 27A illustrates the forward propagation operation that is to be performed, and FIGS. 27B and 27C illustrate how the forward propagation operation is performed.

FIG. 27A illustrates the following operation: $A*B=C$. A forward propagation operation may be implemented using the formula $A_2w*A_1$, which may translate as follows in FIG. 27A: matrix A corresponds to w (e.g., the weight matrix); matrix B corresponds to $A_1$ (e.g., the first activation matrix); and matrix C corresponds to $A_2$ (e.g., the second activation matrix).

Matrices A and B may first be partitioned based on the number of available processing resources, as described in connection with FIG. 25. For example, in some embodiments, matrices A and B may be partitioned into P partitions corresponding to the number of available matrix processing chips (e.g., matrix processing chips). For example, if there are P matrix processing chips, the rows of matrix A may be partitioned into partitions $a_{1x}$-$a_{px}$, and the rows of matrix B may be partitioned into partitions $b_1$-$b_p$. Each partition may then be distributed to a particular matrix processing chip. For example, partitions $a_{1x}$ and $b_1$ may be distributed to a first matrix processing chip, partitions $a_{2x}$ and $b_2$ may be distributed to a second matrix processing chip, and so forth.

Moreover, in some embodiments the matrix operands may be further partitioned based on the hierarchical arrangement of processing resources, as described in connection with FIG. 25. For example, the partition distributed to a particular matrix processing chip may then be similarly partitioned and distributed across the matrix processing clusters of that matrix processing chip (e.g., matrix processing clusters). The partition distributed to a particular matrix processing cluster may then be similarly partitioned and distributed across the matrix processing units (MPUs) of that matrix processing cluster (e.g., matrix processing units (MPUs)).

The forward propagation operation may then be performed as described in connection with FIGS. 27B and 27C. For example, the corresponding partitions of result matrix C (e.g., $c_1$-$c_p$) may be calculated and stored by each matrix processing chip, such that $c_i=\Sigma a_{ij}*b_j$.

FIG. 27B illustrates the first stage of the forward propagation operation. In the first stage, each matrix processing chip may perform a partial matrix multiplication operation using its respective partitions of matrices A and B. For example, the first chip may perform a partial matrix multiplication operation using partitions $a_{11}$ and $b_1$, the second chip may perform a partial matrix multiplication operation using partitions $a_{22}$ and $b_2$, and so forth. The partial result calculated by each matrix processing chip may then be stored in the corresponding partition $c_1$-$c_p$ of result matrix C, such that $c_i = a_{ii} * b_i$.

Moreover, in some embodiments, the partial matrix operations may be further distributed based on the hierarchical arrangement of processing resources. For example, the partial matrix operations distributed to a particular matrix processing chip may then be similarly distributed across the matrix processing clusters of that matrix processing chip (e.g., matrix processing clusters). The partial matrix operations distributed to a particular matrix processing cluster may then be similarly distributed across the matrix processing units (MPUs) of that matrix processing cluster (e.g., matrix processing units (MPUs)).

While the partial operations are being performed by the matrix processing chips, each chip may simultaneously send and receive partial matrix operands to and from its neighboring matrix processing chips, using a single-cyclical or dual-cyclical configuration, as described in connection with FIG. 26B. Thus, the partitions of matrix B (e.g., partitions $b_1$-$b_p$) may be shifted across matrix processing chips during each stage of partial matrix operations. For example, the illustrated embodiment uses a single-cyclical approach, such that each partition of matrix B (e.g., partitions $b_1$-$b_p$) is transmitted from its current chip to a single neighboring chip. Other embodiments may use a dual-cyclical approach, such that each partition of matrix B (e.g., partitions $b_1$-$b_p$) is transmitted from its current chip to both neighboring chips, thus reducing the latency for communicating partial matrix operands by half.

In this manner, during each stage of partial matrix operations, partial matrix operands (e.g., partitions $b_1$-$b_p$) are shifted to neighboring chip(s), and each matrix processing chip may then use the partial matrix operands received from neighboring chips for subsequent partial matrix operations, as described in connection with FIG. 27C.

FIG. 27C illustrates the second stage of the forward propagation operation. In the second stage, each matrix processing chip may perform a partial matrix multiplication operation using its respective partitions of matrices A and B. For example, while the partitions of matrix A remain the same across the chips, the partitions of matrix B have been shifted across the chips, as described in connection with FIG. 27B. Thus, the first chip may perform a partial matrix multiplication operation using partitions $a_{12}$ and $b_2$, the second chip may perform a partial matrix multiplication operation using partitions $a_{23}$ and $b_3$, and so forth. Moreover, in some embodiments the partial matrix operations may be further distributed based on the hierarchical arrangement of processing resources, as described in connection with FIG. 27B. The partial result calculated by each matrix processing chip may then be added to the current value stored in the corresponding partition $c_1$-$c_p$ of result matrix C, such that $c_i = c_i + a_{i(i+1)} * b_{i+1}$. In this manner, when all partial operations are complete, each partition $c_1$-$c_p$ of result matrix C contains the sum of the partial results calculated by the corresponding matrix processing chip, such that $c_i = \Sigma\ a_{ij} * b_j$.

Moreover, while the partial operations are being performed by the matrix processing chips, each chip may simultaneously send and receive partial matrix operands to and from its neighboring matrix processing chips, as described in connection with FIG. 27B. For example, each matrix processing chip may send its current partition of matrix B (e.g., partitions $b_1$-$b_p$) to one or more neighboring chips.

Thus, during each stage of partial matrix operations, partial matrix operands (e.g., partitions $b_1$-$b_p$) are shifted to neighboring chip(s), and each matrix processing chip may then use the partial matrix operands received from neighboring chips for subsequent partial matrix operations. These stages of the matrix operation may continue in this manner until all partial results for result matrix C have been computed. The result of the matrix operation may then be determined using the partial results collectively computed by the matrix processing chips.

Figure 28A:
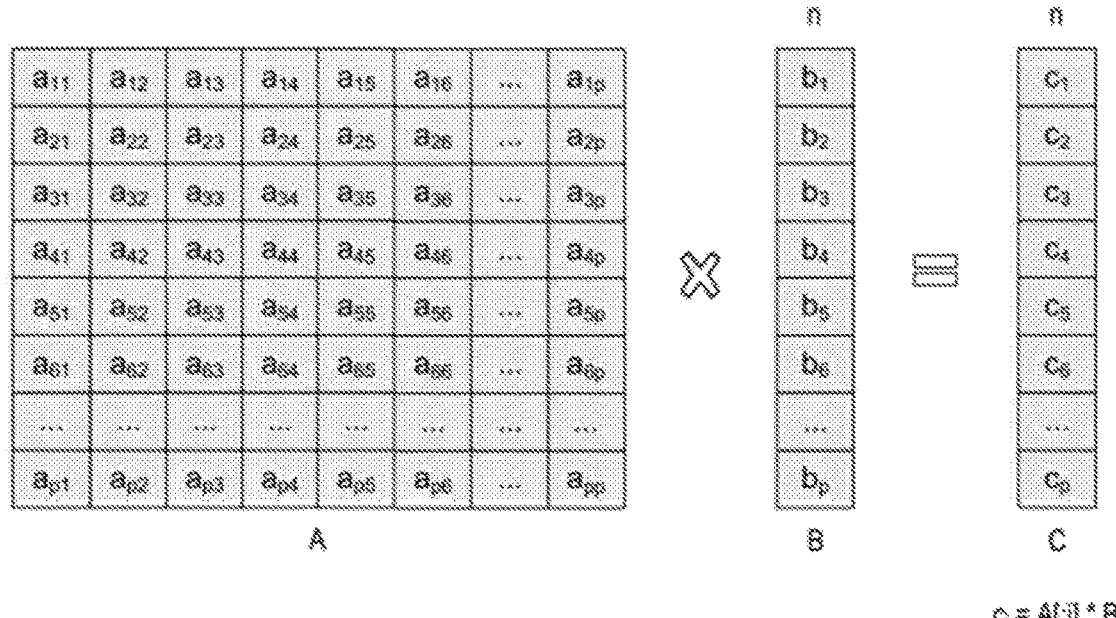
FIGS. 28A, 28B and 28C illustrate an example backward propagation operation in a neural network.
Figure 28B:
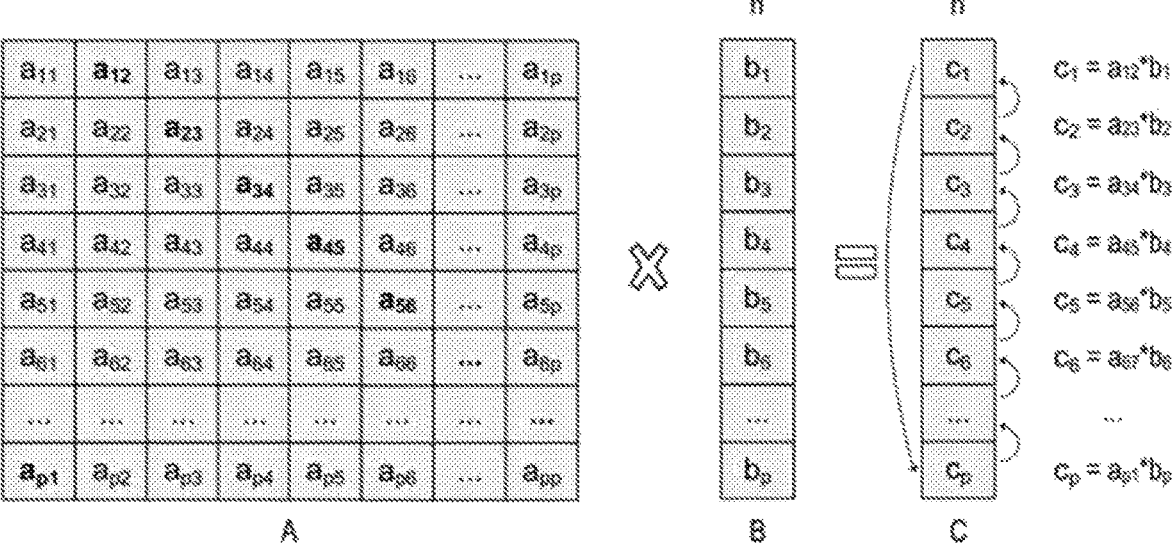
Figure 28C:
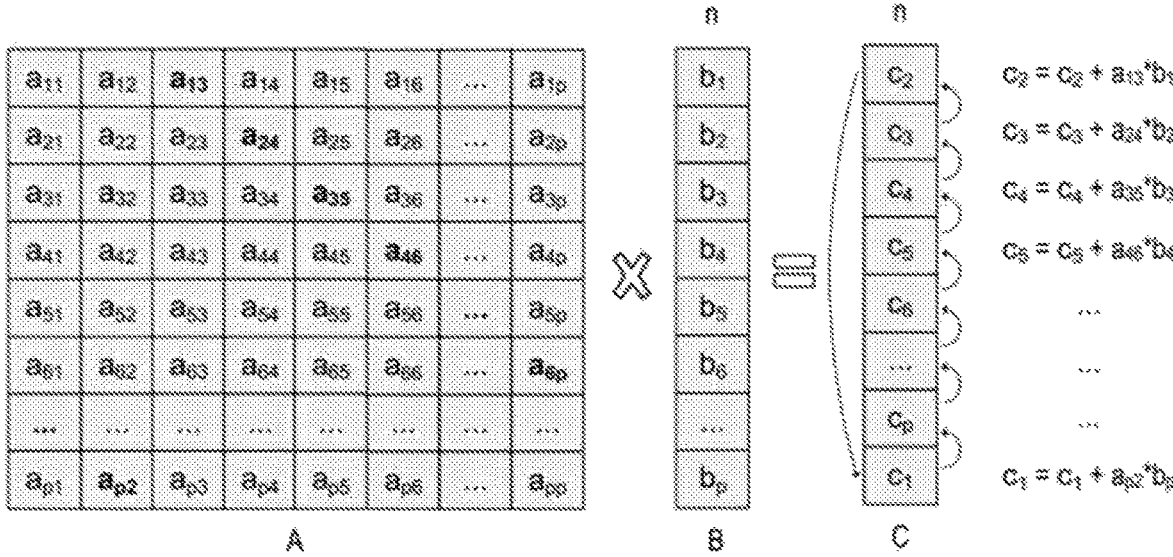

FIGS. 28A-28C illustrate an example backward propagation operation in a neural network. FIG. 28A illustrates the backward propagation operation that is to be performed, and FIGS. 28B and 28C illustrate how the backward propagation operation is performed.

FIG. 28A illustrates the following operation: $A^T * B = C$. A backward propagation operation may be implemented using the formula $A_1 = w^T * A_2$, which may translate as follows in FIG. 28A: matrix A corresponds to w (e.g., the weight matrix); matrix B corresponds to $A_2$ (e.g., the second activation matrix); and matrix C corresponds to $A_1$ (e.g., the first activation matrix). In this example, the matrix operation $A^T * B = C$ may be performed without having to perform a transpose on the elements of matrix A in memory.

Matrices A and B may first be partitioned based on the number of available processing resources, as described in connection with FIG. 25. For example, in some embodiments, matrices A and B may be partitioned into P partitions corresponding to the number of available matrix processing chips (e.g., matrix processing chips). For example, if there are P matrix processing chips, the rows of matrix A may be partitioned into partitions $a_{1x}$-$a_{px}$, and the rows of matrix B may be partitioned into partitions $b_1$-$b_p$. Each partition may then be distributed to a particular matrix processing chip. For example, partitions $a_{1x}$ and $b_1$ may be distributed to a first matrix processing chip, partitions $a_{2x}$ and $b_2$ may be distributed to a second matrix processing chip, and so forth.

Moreover, in some embodiments the matrix operands may be further partitioned based on the hierarchical arrangement of processing resources, as described in connection with FIG. 25. For example, the partition distributed to a particular matrix processing chip may then be similarly partitioned and distributed across the matrix processing clusters of that matrix processing chip (e.g., matrix processing clusters). The partition distributed to a particular matrix processing cluster may then be similarly partitioned and distributed across the matrix processing units (MPUs) of that matrix processing cluster (e.g., matrix processing units (MPUs)).

The backward propagation operation may then be performed as described in connection with FIGS. 28B and 28C. For example, the corresponding partitions of result matrix C (e.g., $c_1$-$c_p$) may be calculated and stored by each matrix processing chip, such that $c_i = A[:i] * B$. FIG. 28B illustrates the first stage of the backward propagation operation. In the first stage, each matrix processing chip may perform a partial matrix multiplication operation using its respective partitions of matrices A and B. For example, the first chip may perform a partial matrix multiplication operation using partitions $a_{12}$ and $b_1$, the second chip may perform a partial matrix multiplication operation using partitions $a_{23}$ and $b_2$, and so forth. The partial result calculated by each matrix processing chip may then be stored in the corresponding partition $c_1$-$c_p$ of result matrix C.

Moreover, in some embodiments, the partial matrix operations may be further distributed based on the hierarchical arrangement of processing resources. For example, the partial matrix operations distributed to a particular matrix processing chip may then be similarly distributed across the matrix processing clusters of that matrix processing chip (e.g., matrix processing clusters). The partial matrix operations distributed to a particular matrix processing cluster may then be similarly distributed across the matrix processing units (MPUs) of that matrix processing cluster (e.g., matrix processing units (MPUs)).

While the partial operations are being performed by the matrix processing chips, each chip may simultaneously send and receive partial matrix data to and from its neighboring matrix processing chips, as described in connection with FIG. 26B. However, for a backward propagation operation, the partitions of result matrix C (e.g., partitions $c_1$-$c_p$) may be shifted across matrix processing chips during each stage of partial matrix operations. For example, in the illustrated embodiment, each partition $c_1$-$c_p$ of result matrix C is transmitted from its current chip to a neighboring chip.

In this manner, during the first stage of partial matrix operations, partial results are calculated and stored in the corresponding partition $c_1$-$c_p$ of result matrix C. Each partial result on partitions $c_1$-$c_p$ is then shifted to a neighboring chip, and each matrix processing chip may then use the partial result received from a neighboring chip for subsequent partial matrix operations, as described in connection with FIG. 28C.

FIG. 28C illustrates the second stage of the backward propagation operation. In the second stage, each matrix processing chip may perform a partial matrix multiplication operation using its respective partitions of matrices A and B. In some embodiments, the partial matrix operations may be further distributed based on the hierarchical arrangement of processing resources, as described in connection with FIG. 28B.

As an example, the first chip may perform a partial matrix multiplication operation using partitions $a_{13}$ and $b_1$, the second chip may perform a partial matrix multiplication operation using partitions $a_{24}$ and $b_2$, and so forth. The partial result calculated by each matrix processing chip may then be added to the current value of the result partition $c_1$-$c_p$, which was previously received from a neighboring chip (as discussed in connection with FIG. 28B). For example, partition $c_2$ may have previously been shifted from the second chip to the first chip, and thus the first chip may now add that value of $c_2$ to the partial result computed in the current stage (e.g., $c_2$=$c_2$+$a_{13}$*$b_1$).

While the partial operations are being performed by the matrix processing chips, each chip may simultaneously send and receive partial matrix data to and from its neighboring matrix processing chips, as described in connection with FIG. 28B. For example, each matrix processing chip may send its current partition of result matrix C (e.g., partitions $c_1$-$c_p$) to a neighboring chip. Thus, during each stage of partial matrix operations, partial matrix results (e.g., partitions $c_1$-$c_p$) are shifted to a neighboring chip, and each matrix processing chip may then use the partial matrix result received from a neighboring chip for subsequent partial matrix operations. These stages of the matrix operation may continue in this manner until all partial results for result matrix C have been computed. In this manner, when all partial operations are complete, the partitions $c_1$-$c_p$ of result matrix C contain the result of the matrix operation $A^T$*B=C, allowing the matrix operation to be performed without having to transpose the elements of matrix A in memory.

44

Figure 29:
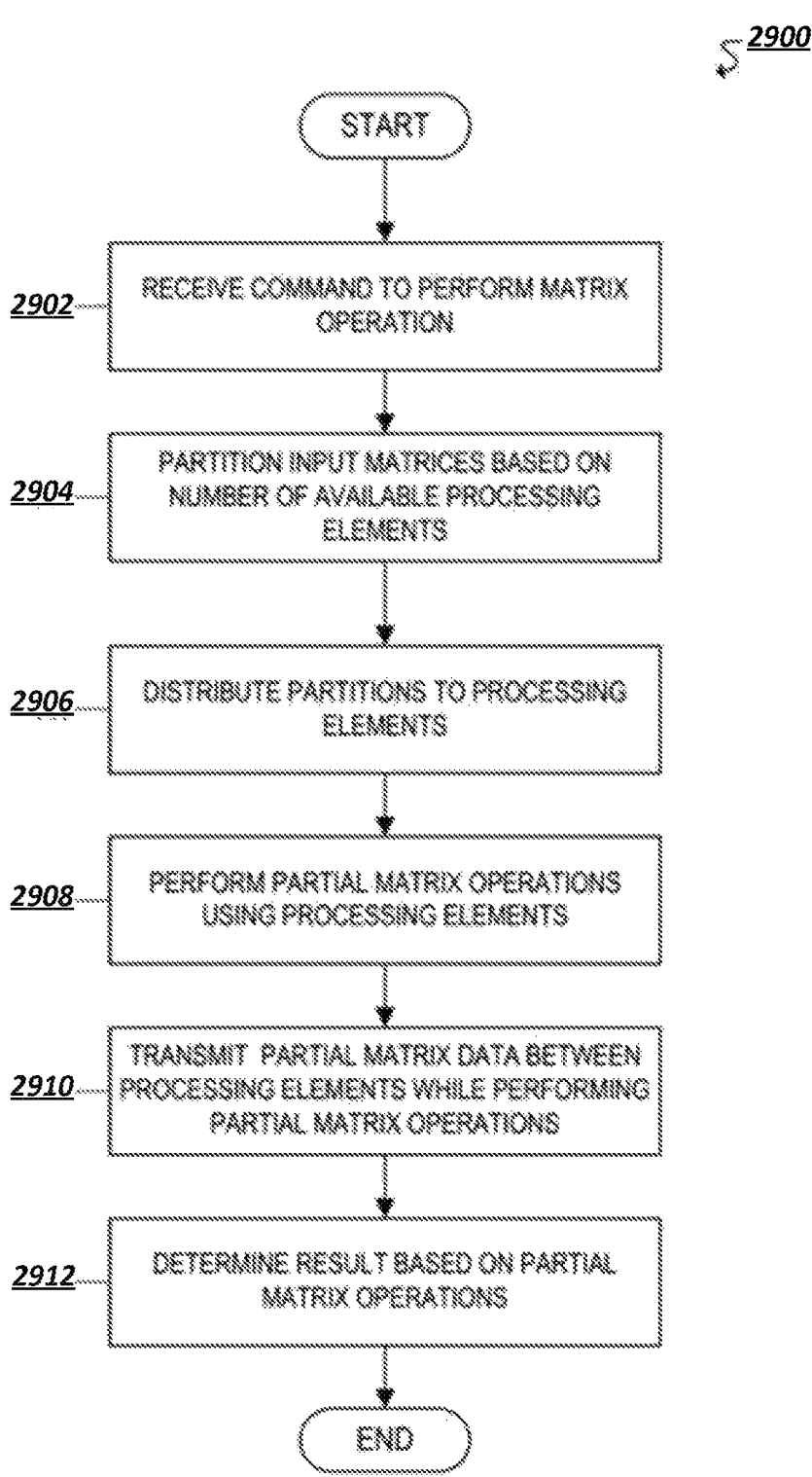
FIG. 29 illustrates a flowchart for an example embodiment of distributed matrix operations.

FIG. 29 illustrates a flowchart 2900 for an example embodiment of distributed matrix operations. Flowchart 2900 may be implemented, in some embodiments, by components described throughout this disclosure.

The flowchart may begin at block 2902 by receiving a command to perform a matrix operation. The matrix operation may comprise an operation associated with a plurality of input matrices (e.g., matrix operands), such as one or more matrix multiplication operations. In some embodiments, the matrix operation may be associated with an operation in a neural network, such as a forward propagation operation, backward propagation operation, and/or weight update operation.

The flowchart may then proceed to block 2904 to partition the input matrices into a plurality of partitions based on the number of available processing elements. In some embodiments, the input matrices may be partitioned based on the hierarchical arrangement of processing resources, as described further in connection with block 2906. Moreover, in some embodiments, the input matrices may be partitioned across their rows.

The flowchart may then proceed to block 2906 to distribute the partitions to the available processing elements. For example, in some embodiments, each partition may be distributed to a particular processing element. Moreover, in some embodiments, the processing elements may be configured in a hierarchical arrangement with a plurality of processing levels, and the matrix operation may be distributed across the hierarchy of processing levels. For example, the processing elements may include multiple matrix processing chips (e.g., matrix processing chips), multiple matrix processing clusters on each matrix processing chip (e.g., matrix processing clusters), and/or multiple matrix processing units (MPUs) on each matrix processing cluster (e.g., matrix processing units (MPUs)). In those embodiments, the matrix operation may first be partitioned and distributed across the matrix processing chips. The partial matrix operation distributed to a particular matrix processing chip may then be similarly partitioned and distributed across the matrix processing clusters of that matrix processing chip. The partial matrix operation distributed to a particular matrix processing cluster may then be similarly partitioned and distributed across the matrix processing units (MPUs) of that matrix processing cluster. The flowchart may then proceed to block 2908 to perform partial matrix operations using the processing elements. For example, each processing element may perform a partial matrix operation based on the matrix data distributed to that processing element.

The flowchart may then proceed to block 2910 to transmit partial matrix data between processing elements while performing the partial matrix operations. For example, in some embodiments, the processing elements may be configured in a cyclical arrangement such that each processing element is communicatively coupled to multiple neighbor processing elements. Moreover, the partial matrix operations may be performed in a plurality of stages, and each processing element may transmit partial matrix data to its neighbor processing elements while performing a particular stage of the partial matrix operations. For example, in some embodiments, each processing element may transmit partial matrix data to one of its neighbor processing elements (e.g., using a single-cyclical approach) or to both of its neighbor processing elements (e.g., using a dual-cyclical approach) during each stage of partial matrix operations. For example, a first processing element may use or calculate partial matrix data in a particular stage of the partial matrix operations, the first processing element may transmit the partial matrix data to a second processing element, and the second processing element may then use the partial matrix data in a subsequent stage of the partial matrix operations. In some matrix operations, the partial matrix data may include a partial input matrix, while in other matrix operations the partial matrix data may include a partial result matrix.

The flowchart may then proceed to block 2912 to determine a result of the matrix operation. For example, the result of the matrix operation may be determined based on the partial results collectively computed by the processing elements. At this point, the flowchart may be complete. In some embodiments, however, the flowchart may restart and/or certain blocks may be repeated. For example, in some embodiments, the flowchart may restart at block 2902 to continue receiving and processing commands to perform matrix operations.

Distributed Convolution Operations

Figure 30:
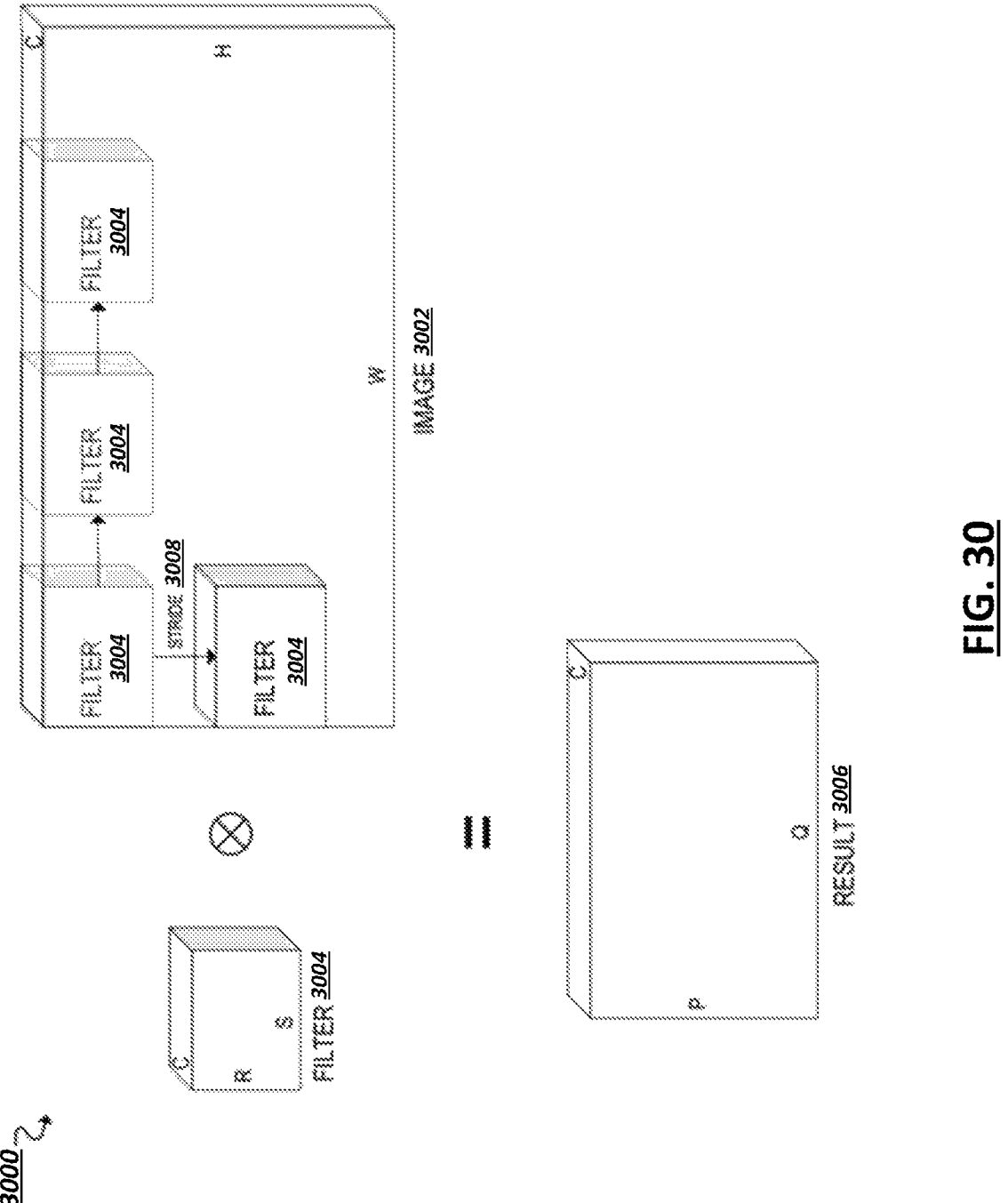
FIG. 30 illustrates an example convolution operation.

FIG. 30 illustrates an example convolution operation 3000. A convolution operation may be used, for example, for image processing, such as image processing used by an artificial neural network to provide computer vision artificial intelligence and machine learning capabilities. For example, in some embodiments, convolution operations may be used to implement the fundamental operations of an artificial neural network, including forward propagation, backward propagation, and weight updates. A convolution operation used for image processing may involve applying a filter to an image. The filter (which may also be referred to as a "kernel") may be used to modify the image (e.g., applying visual effects), detect certain features in the image (e.g., facial recognition or identification of other objects), and so forth. In some embodiments, the filter may be smaller than the image, and the convolution operation may be performed by moving the filter throughout the image and applying the filter at each location.

In the illustrated embodiment, for example, a convolution operation 3000 is performed on an image 3002 using a filter 3004, resulting in a convolution result 3006. In some embodiments, the image 3002, filter 3004, and result 3006 of a convolution operation 3000 may be represented as matrices. For example, an image may be represented by a matrix whose elements correspond to each pixel of the image. For example, in some embodiments, a black and white image may be represented by a two-dimensional (2D) matrix with dimensions corresponding to the height (H) and width (W) of the image. As another example, a color image (e.g., image 3002) may be represented by a three-dimensional (3D) matrix with dimensions corresponding to the number of channels (C), height (H), and width (W) of the image. The channels of the image, for example, may be used to define the color of each pixel in the image. For example, in some embodiments, a color image may include three RGB channels to define the color of each pixel (e.g., a red channel, a green channel, and a blue channel). Similarly, a filter (e.g., filter 3004) for a color image may be represented by a 3D matrix with dimensions corresponding to the number of channels (C), filter height (R), and filter width (S). In these embodiments, a convolution operation 3000 may be performed by moving the filter 3004 throughout the image 3002 and computing the dot product between the filter 3004 and the various portions of the image 3002. For example, in some embodiments, the filter 3004 may be moved along the height and width of the image 3002 using a certain stride or interval, the dot product may be computed at each location, and the result may be stored in the corresponding location of a result matrix 3006. The result matrix 3006, for example, may be represented by a 3D matrix with dimensions corresponding to the number of channels (C), output height (P), and output width (Q).

Moreover, in some embodiments, when convolution operations need to be performed on multiple images and using multiple filters, the images may be processed together to increase processing efficiency. Thus, in some embodiments, a collection of images may be represented using a four-dimensional (4D) matrix, with dimensions corresponding to the number of channels (C), image height (H), image width (W), and number of images (N). Similarly, a collection of filters may be represented using a 4D matrix, with dimensions corresponding to the number of filters (K), number of channels (C), filter height (R), and filter width (S). Accordingly, multiple convolution operations may then be performed using the 4D matrices that are used to represent the images and filters. The collective results of the convolution operations may be represented using a 4D matrix, with dimensions corresponding to number of filters (K), output height (P), output width (Q), and number of images (N).

FIGS. 31 and 32 illustrate example neural network operations associated with convolutions. As described above in connection with FIG. 30, a convolution operation can be used for image processing, for example, by applying a filter to an image in order to modify the image (e.g., applying visual effects), detect certain features in the image (e.g., facial recognition or identification of other objects), and so forth. Moreover, in some embodiments, convolution operations can be used for image processing in an artificial neural network, for example, to provide computer vision artificial intelligence and machine learning capabilities. For example, in some embodiments, the fundamental operations of an artificial neural network (e.g., forward propagation, backward propagation, and weight updates) can be implemented for convolution operations. These fundamental neural network operations may be used, in some embodiments, to train a neural network in order to provide machine learning functionality. For example, a forward propagation operation may include propagating a particular input through a neural network in order to generate a corresponding output. The input to the forward propagation operation may be a training pattern with a known or expected output. A backward propagation operation may then be used to determine the error associated with the forward propagation operation based on the difference or delta between the calculated output and the expected output of the forward propagation operation. A weight update operation may then be used to determine updated weight values in order to minimize the associated error. In some embodiments, these neural network operations may be implemented for convolution operations. For example, in some embodiments, these neural network operations may be implemented using the following formulas (where the asterisk (*) represents each respective operation):

$$\text{forward propagation: IFM}[CHW{\times}N]{*}\text{FILTER}[CRS{\times}K]{=}\text{OFM}[KPQ{\times}N]$$

$$\text{backward propagation: IFM}[KPQ{\times}N]{*}\text{FILTER}[KRS{\times}C]{=}\text{OFM}[CHW{\times}N]$$

$$\text{weight update: IFM1}[CHW{\times}N]{*}\text{IFM2}[KPQ{\times}N]{=}\text{OFM}[CRS{\times}K]$$

In some embodiments, the example operations illustrated by FIGS. 31 and 32 may be performed using a matrix processing architecture, such as the matrix processing architecture discussed in the examples above.

FIGS. 31A-31G illustrate an example forward propagation operation in a neural network. The illustrated forward propagation operation is implemented using the following formula (where the asterisk (*) represents forward propagation): $IFM[CHW \times N]*FILTER[CRS \times K]=OFM[KPQ \times N]$. Moreover, although not illustrated, a backward propagation operation may be implemented in a manner similar to the forward propagation operation discussed throughout FIGS. 31A-31G, by replacing the forward propagation formula with a formula for backward propagation, such as the following formula (where the asterisk (*) represents backward propagation): $IFM[KPQ \times N]*FILTER[KRS \times C]=OFM[CHW \times N]$.

In some embodiments, forward propagation can be implemented for convolution operations. For example, the illustrated forward propagation operation is implemented by performing convolutions using an input feature matrix (IFM) 3102 and a filter 3104 to generate an output feature matrix (OFM) 3106. In some embodiments, IFM 3102 may correspond to a collection of images represented using a four-dimensional (4D) matrix, with dimensions corresponding to the number of channels (C), image height (H), image width (W), and number of images (N). In some embodiments, however, IFM 3102 may need to be stored in 2D memory (e.g., when using matrix processing architectures that store matrix operands using 2D memory components). Accordingly, because IFM 3102 is a 4D matrix, its dimensions may need to be rearranged in order to store it in 2D memory. For example, in some embodiments, IFM 3102 could be stored in 2D memory by treating the channels (C), height (H), and width (W) as one dimension, and treating the number of images (N) as another dimension (e.g., arranging the dimensions of IFM 3102 as CHW×N).

Similarly, filter 3104 may correspond to a collection of filters represented using a four-dimensional (4D) matrix, with dimensions corresponding to the number of filters (K), number of channels (C), filter height (R), and filter width (S). Moreover, because filter 3104 is a 4D matrix, its dimensions may need to be rearranged in order to store it in 2D memory. For example, in some embodiments, filter 3104 could be stored in 2D memory by treating the channels (C), filter height (R), and filter width (S) as one dimension, and treating the number of filters (K) as another dimension (e.g., arranging the dimensions of filter 3104 as CRS×K).

OFM 3106 may correspond to the result of the convolution operation, and may be represented using a four-dimensional (4D) matrix with dimensions corresponding to the number of filters (K), output height (P), output width (Q), and number of images (N). Moreover, because OFM 3106 is a 4D matrix, its dimensions may need to be rearranged in order to store it in 2D memory. For example, in some embodiments, OFM 3106 could be stored in 2D memory by treating the number of filters (K), output height (P), and output width (Q) as one dimension, and treating the number of images (N) as another dimension (e.g., arranging the dimensions of OFM 3106 as KPQ'N).

Figure 31A:
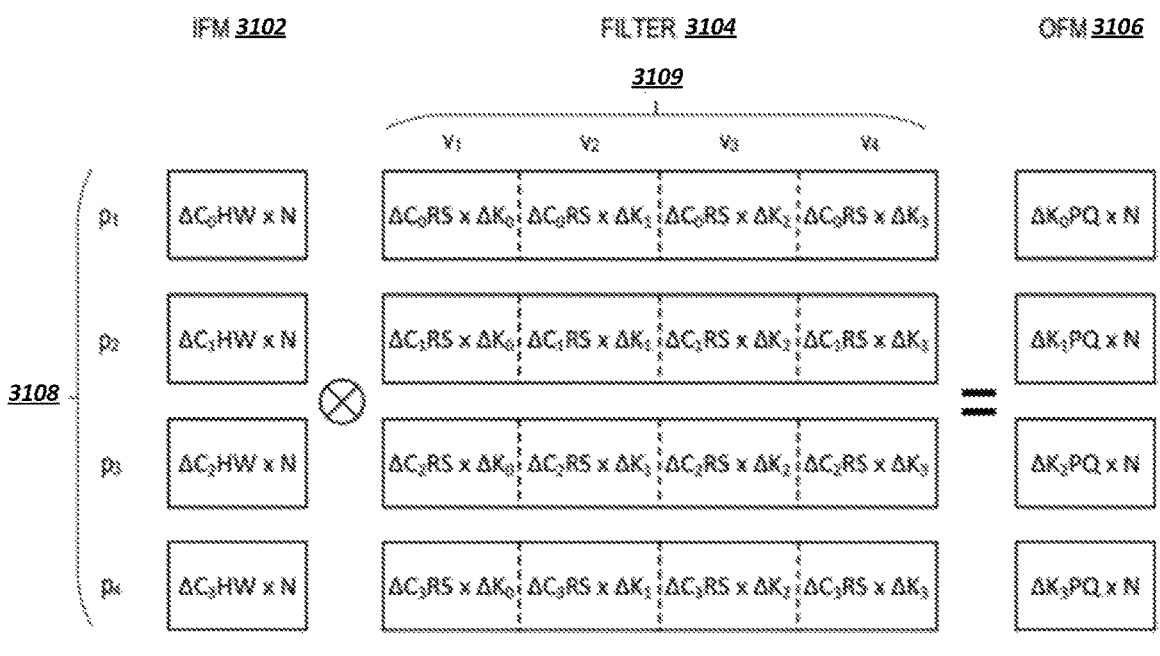

FIG. 31A illustrates the process of partitioning the forward propagation operation among the available processing resources. For example, in some embodiments, the matrix operands of a forward propagation operation may be partitioned in order to distribute the forward propagation operation across a variable number of processing resources, as described throughout this disclosure.

In some embodiments, the operands of a forward propagation operation may be partitioned into a number of partitions corresponding to the number of available processing resources. For example, if there are P processing resources available to perform the operation, the input feature matrix (IFM) 3102 and filter 3104 may be partitioned into P partitions. Moreover, in some embodiments, the P partitions may be across any of the various dimensions of the matrix operands, such as the channels (C), images (N), and/or filters (K). Each partition may then be distributed to a particular processing resource, as described throughout this disclosure.

In the illustrated example, the matrix operands are partitioned for distribution across four processing resources. Accordingly, IFM 3102 and filter 3104 are partitioned into four partitions $p_1$-$p_4$ (designated by label 3108) corresponding to the four processing resources. Moreover, in some embodiments, partitions $p_1$-$p_4$ of filter 3104 may be further partitioned into virtual partitions $v_1$-$v_4$ (designated by label 3109). Virtual partitions $v_1$-$v_4$, for example, may simply be further sub-partitions of partitions $p_1$-$p_4$, which are respectively used in different stages of a forward propagation operation. Moreover, the partitions of IFM 3102 and filter 3104 are across the channels (C) and filters (K) dimensions. Each partition $p_1$-$p_4$ may then be distributed to a particular matrix processing resource. For example, partition $p_1$ of IFM 3102 and filter 3104 may be distributed to a first matrix processing resource, partition $p_2$ of IFM 3102 and filter 3104 may be distributed to a second matrix processing resource, and so forth.

Moreover, in some embodiments, matrix operands may be partitioned hierarchically based on the hierarchical arrangement of processing resources. For example, a matrix processing system may include a hierarchy of processing resources, including multiple matrix processing chips, multiple high bandwidth memory (HBM) modules on each matrix processing chip, multiple matrix processing clusters on each matrix processing chip, and/or multiple matrix processing units (MPUs) on each matrix processing cluster. Accordingly, in some embodiments, matrix operands may be partitioned at the multi-chip level, the multi-HBM level, and/or the multi-cluster level.

At the multi-chip level, the matrix operands may initially be partitioned based on the number of available matrix processing chips (e.g., matrix processing chips). The partitions at the multi-chip level may be across any of the various dimensions of the matrix operands, such as the channels (C), images (N), and/or filters (K) dimensions. Each partition, and the associated partial matrix operations, may then be distributed to a particular matrix processing chip.

At the multi-HBM level, the partition and partial matrix operations distributed to a particular matrix processing chip may then be similarly partitioned and distributed across various "logical processing nodes" of that matrix processing chip. A "logical processing node" of a matrix processing chip may include, for example, a group of matrix processing clusters and an associated high-bandwidth memory (HBM) module. For example, matrix processing chip includes twelve matrix processing clusters and four high bandwidth memory (HBM) modules. Thus, matrix processing chip may be treated as having four logical processing nodes, where each logical processing node includes three matrix processing clusters and an associated high bandwidth memory (HBM) module. Accordingly, at the multi-HBM level for a chip such as matrix processing chip, the partition and partial matrix operations distributed to that chip may then be similarly partitioned and distributed across the four logical processing nodes of that matrix processing chip. The partitions at the multi-HBM level may be across any of the various dimensions of the matrix operands, such as the channels (C), images (N), and/or filters (K) dimensions.

At the multi-cluster level, the partition and partial matrix operations distributed to a particular logical processing node may then be similarly partitioned and distributed across the matrix processing clusters of that logical processing node (e.g., a group of three matrix processing clusters), and across the matrix processing units (MPUs) of each matrix processing cluster (e.g., matrix processing units (MPUs)). The partitions at the multi-cluster level may be across any of the various dimensions of the matrix operands, such as the channels (C), and/or filters (K). Moreover, at the multi-cluster level, the partial matrix operations may be distributed across the height (P) and width (Q) of the output feature matrix (OFM) 3106. For example, in some embodiments, a logical processing node may include three matrix processing clusters, and each matrix processing cluster may include two matrix processing units (MPUs). Accordingly, a partial matrix operation distributed to the logical processing node may be distributed to the three matrix processing clusters across the height (P) of OFM 3106, and the partial matrix operation distributed to each matrix processing cluster may then be distributed to the two matrix processing units (MPUs) across the width (Q) of OFM 3106.

The forward propagation operation may then be performed as described in connection with FIGS. 31B-31G.

Figure 31B:
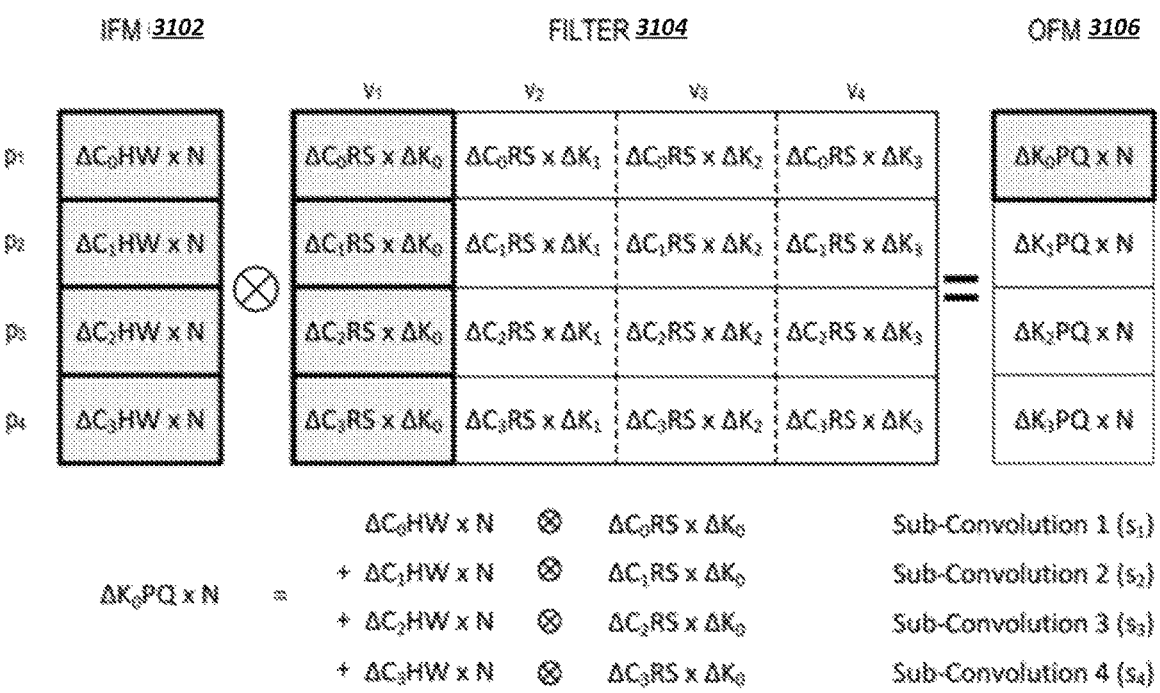

FIG. 31B illustrates one of four partial calculations that are performed in parallel to determine the result of the forward propagation operation. For example, the result of the forward propagation operation is determined by performing various partial calculations that are each used to calculate a partial result of the forward propagation operation. For example, when the forward propagation operation is complete, each partial result of the forward propagation operation will be stored in partitions $p_1$-$p_4$ of output feature matrix (OFM) 3106, as illustrated in FIG. 31B. For example, as illustrated in FIG. 31B, partition $p_1$ of OFM 3106 corresponds to partial result $\Delta K_0 PQ \times N$; partition $p_2$ of OFM 3106 corresponds to partial result $\Delta K_1 PQ \times N$; partition $p_3$ of OFM 3106 corresponds to partial result $\Delta K_2 PQ \times N$; and partition $p_4$ of OFM 3106 corresponds to partial result $\Delta K_3 PQ \times N$.

The partial results of OFM 3106 are determined using the following partial calculations:

$1^{st}$ partial calculation: partial result $\Delta K_0 PQ \times N$ (partition $p_1$ of OFM 3106)=convolution of IFM 3102 and virtual partition $v_1$ of filter 3104;

$2^{nd}$ partial calculation: partial result $\Delta K_1 PQ \times N$ (partition $p_2$ of OFM 3106)=convolution of IFM 3102 and virtual partition $v_2$ of filter 3104;

$3^{rd}$ partial calculation: partial result $\Delta K_2 PQ \times N$ (partition $p_3$ of OFM 3106)=convolution of IFM 3102 and virtual partition $v_3$ of filter 3104; and $4^{th}$ partial calculation: partial result $\Delta K_3 PQ \times N$ (partition $p_4$ of OFM 3106)=convolution of IFM 3102 and virtual partition $v_4$ of filter 3104.

FIG. 31B illustrates the $1^{st}$ partial calculation above, which is used to determine the partial result corresponding to partition $p_1$ of OFM 3106 (e.g., partial result $\Delta K_0 PQ \times N$). For example, as illustrated in FIG. 31B, the $1^{st}$ partial calculation is a convolution of input feature matrix (IFM) 3102 and the first virtual partition $v_1$ of filter 3104, and the result of the calculation is the partial result corresponding to partition $p_1$ of OFM 3106 (e.g., partial result $\Delta K_0 PQ \times N$).

In the illustrated example, the $1^{st}$ partial calculation (e.g., for the partial result corresponding to partition $p_1$ of OFM

3106) is broken down as the sum of four sub-convolutions $s_1$-$s_4$ (where the asterisks (*) represent a convolution operation):

$s_1$: $\Delta C_0 HW \times N * \Delta C_0 RS \times \Delta K_0$
$s_2$: $\Delta C_1 HW \times N * \Delta C_1 RS \times \Delta K_0$
$s_3$: $\Delta C_2 HW \times N * \Delta C_2 RS \times \Delta K_0$
$s_4$: $\Delta C_3 HW \times N * \Delta C_3 RS \times \Delta K_0$ These four sub-convolutions $s_1$-$s_4$ are then performed in four stages, as described further in connection with FIGS. 31C-31F. Moreover, although not illustrated throughout FIGS. 31B-31F, the remaining partial calculations identified above (e.g., the $2^{nd}$-$4^{th}$ partial calculations for the partial results corresponding to partitions $p_2$-$p_4$ of OFM 3106) may be executed in parallel and in a similar manner as the $1^{st}$ partial calculation.

For example, in the first stage, sub-convolution $s_4$ of the $1^{st}$ partial calculation is performed by a first processing resource. Moreover, during this stage, the other processing resources may be performing sub-convolutions associated with the other partial calculations identified above. In the second stage, sub-convolution $s_3$ of the $1^{st}$ partial calculation is performed by a second processing resource, and while that sub-convolution is being performed, the result of sub-convolution $s_4$ is transmitted from the first processing resource to the second processing resource. When the second processing resource completes sub-convolution $s_3$, it calculates the sum of $s_4$ and $s_3$. Moreover, during this stage, the other processing resources may be performing similar operations associated with the other partial calculations identified above. In the third stage, sub-convolution $s_2$ of the $1^{st}$ partial calculation is performed by a third processing resource, and while that sub-convolution is being performed, the sum of $s_4$ and $s_3$ is transmitted from the second processing resource to the third processing resource. When the third processing resource completes sub-convolution $s_2$, it calculates the sum of $s_4$, $s_3$, and $s_2$. Moreover, during this stage, the other processing resources may be performing similar operations associated with the other partial calculations identified above. In the fourth stage, sub-convolution $s_1$ of the $1^{st}$ partial calculation is performed by a fourth processing resource, and while that sub-convolution is being performed, the sum of $s_4$, $s_3$, and $s_2$ is transmitted from the third processing resource to the fourth processing resource. When the fourth processing resource completes sub-convolution $s_1$, it calculates the sum of $s_4$, $s_3$, $s_2$, and $s_1$, which is the final result of the $1^{st}$ partial calculation (e.g., the partial result corresponding to partition $p_1$ of OFM 3106). Similarly, during this stage, the other processing resources may be performing similar operations associated with the other partial calculations identified above, and thus may obtain the partial results corresponding to partitions $p_2$-$p_4$ of OFM 3106.

Figure 31C:
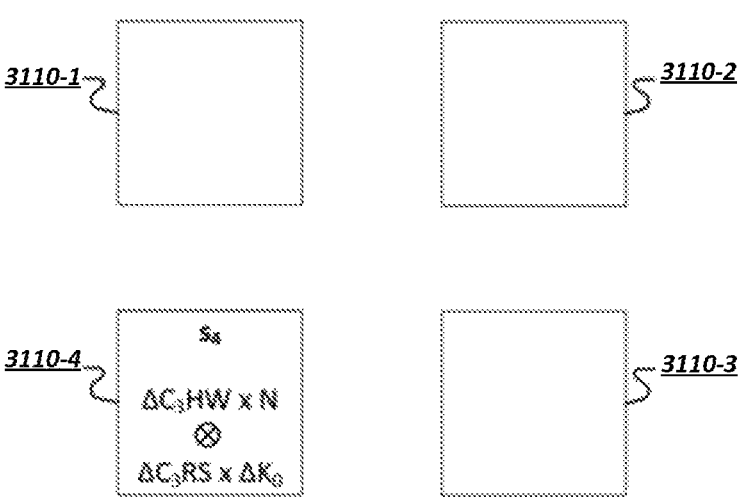

FIG. 31C illustrates stage 1 of the $1^{st}$ partial calculation from FIG. 31B. As discussed above in connection with FIG. 31A, the matrix operands have been partitioned into four partitions corresponding to the four available processing resources. In the illustrated example of FIG. 31C, the four available processing resources are processing resources 3110-1 to 3110-4. Processing resources 3110, for example, could be any of the processing resources of an example matrix processing system, such as matrix processing chips, logical processing nodes, and/or matrix processing clusters, among other examples. For example, at the multi-chip level, processing resources 3110 could be matrix processing chips; at the multi-HBM level, processing resources 3110 could be logical processing nodes (e.g., groups of matrix processing clusters and an associated HBM module); and at the multi-cluster level, processing resources 3110 could be matrix processing clusters.

Although not illustrated, partitions $p_1$-$p_4$ of the matrix operands have been distributed across processing resources 3110-1 to 3110-4 (e.g., $p_1$ to processing resource 3110-1, $p_2$ to processing resource 3110-2, and so forth), as described above in connection with FIG. 31A. Accordingly, partition $p_4$ of the matrix operands has been distributed to processing resource 3110-4.

In the illustrated example of stage 1, processing resource 3110-4 performs sub-convolution $s_4$ (e.g., $\Delta C_3 HW \times N * \Delta C_3 RS \times \Delta K_0$) of the $1^{st}$ partial calculation. Moreover, although not illustrated, the processing resources may be performing similar stage 1 operations associated with the other partial calculations identified above in connection with FIG. 31B (e.g., the $2^{nd}$-$4^{th}$ partial calculations).

Figure 31D:
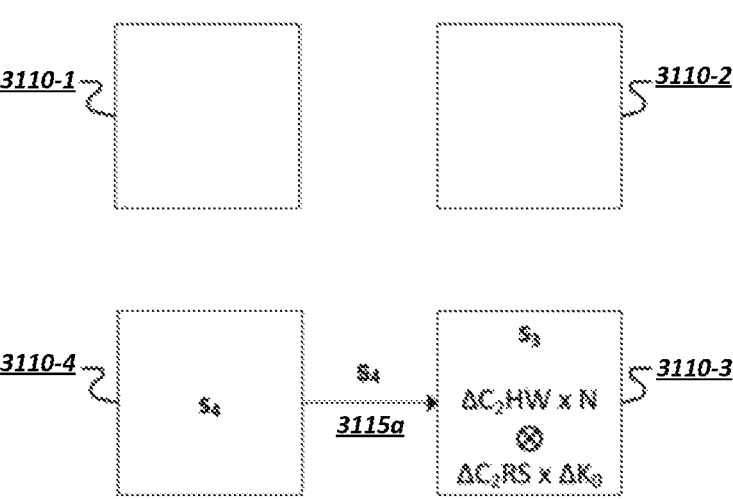

FIG. 31D illustrates stage 2 of the $1^{st}$ partial calculation from FIG. 31B. As discussed above, the matrix operands have been partitioned into four partitions $p_1$-$p_4$, which have been distributed to the four available processing resources 3110. Accordingly, although not illustrated, partition $p_3$ of the matrix operands has been distributed to processing resource 3110-3.

In the illustrated example of stage 2, processing resource 3110-3 performs sub-convolution $s_3$ (e.g., $\Delta C_2 HW \times N * \Delta C_2 RS \times \Delta K_0$) of the $1^{st}$ partial calculation. Moreover, while processing resource 3110-3 is performing sub-convolution $s_3$, processing resource 3110-4 transmits the result of sub-convolution $s_4$ (which was computed during the previous stage) to processing resource 3110-3 (denoted by label 3115a). Moreover, although not illustrated, the processing resources may be performing similar stage 2 operations associated with the other partial calculations identified above in connection with FIG. 31B (e.g., the $2^{nd}$-$4^{th}$ partial calculations).

Figure 31E:
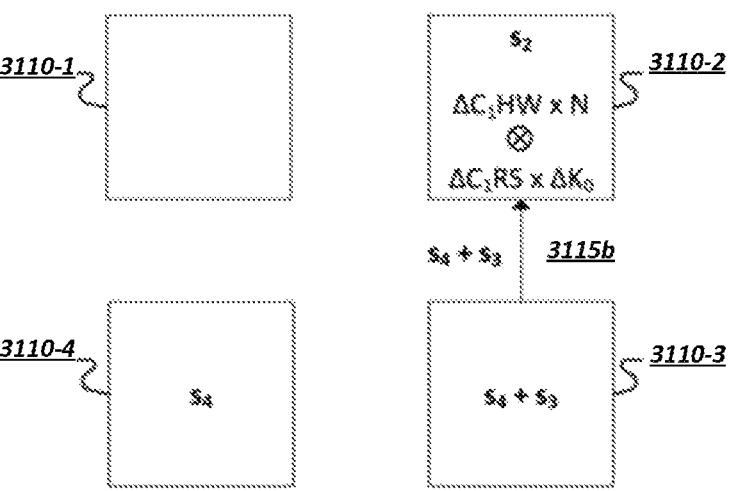

FIG. 31E illustrates stage 3 of the $1^{st}$ partial calculation from FIG. 31B. As discussed above, the matrix operands have been partitioned into four partitions $p_1$-$p_4$, which have been distributed to the four available processing resources 3110. Accordingly, although not illustrated, partition $p_2$ of the matrix operands has been distributed to processing resource 3110-2.

In the illustrated example of stage 3, processing resource 3110-2 performs sub-convolution $s_2$ (e.g., $\Delta C_1 HW \times N * \Delta C_1 RS \times \Delta K_0$) of the $1^{st}$ partial calculation. Moreover, while processing resource 3110-2 is performing sub-convolution $s_2$, processing resource 3110-3 transmits the sum of sub-convolutions $s_4$ and $s_3$ (or $s_4 + s_3$) to processing resource 3110-2 (denoted by label 3115b). Moreover, although not illustrated, the processing resources may be performing similar stage 3 operations associated with the other partial calculations identified above in connection with FIG. 31B (e.g., the $2^{nd}$-$4^{th}$ partial calculations).

Figure 31F:
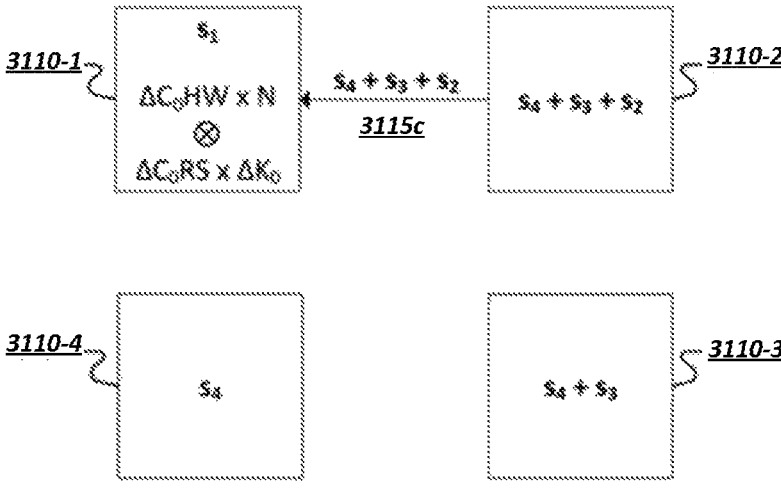

FIG. 31F illustrates stage 4 of the $1^{st}$ partial calculation from FIG. 31B. As discussed above, the matrix operands have been partitioned into four partitions $p_1$-$p_4$, which have been distributed to the four available processing resources 3110. Accordingly, although not illustrated, partition $p_1$ of the matrix operands has been distributed to processing resource 3110-1.

In the illustrated example of stage 4, processing resource 3110-1 performs sub-convolution $s_1$ (e.g., $\Delta C_0 HW \times N * \Delta C_0 RS \times \Delta K_0$) of the $1^{st}$ partial calculation. Moreover, while processing resource 3110-1 is performing sub-convolution $s_1$, processing resource 3110-2 transmits the sum of sub-convolutions $s_4$, $s_3$, and $s_2$ (or $s_4 + s_3 + s_2$) to processing resource 3110-1 (denoted by label 3115c). Moreover, although not illustrated, the processing resources may be performing similar stage 4 operations associated with the other partial calculations identified above in connection with FIG. 31B (e.g., the $2^{nd}$-$4^{th}$ partial calculations).

Figure 31G:
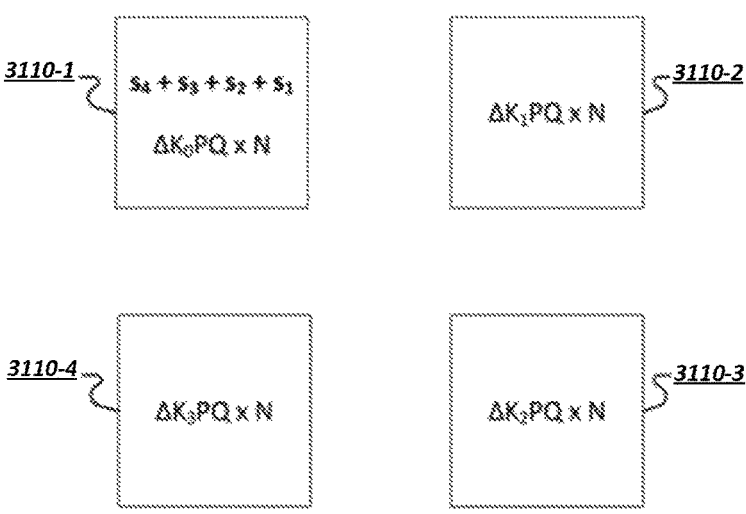

FIG. 31G illustrates the result of the forward propagation operation after all stages have been completed.

After all stages are complete, processing resource 3110-1 contains the partial result of the $1^{st}$ partial calculation from FIG. 31B. For example, processing resource 3110-1 contains the sum of sub-convolutions $s_4$, $s_3$, $s_2$, and $s_1$ (or $s_4 + s_3 + s_2 + s_1$) of the $1^{st}$ partial calculation, which is the partial result corresponding to the first partition $p_1$ of OFM 3106 in FIG. 31A (e.g., $\Delta K_0 PQ \times N$). Moreover, although not illustrated, during stages 1-4 of FIGS. 31C-31F, processing resources 3110 performed similar operations in parallel for the other partial calculations identified above in connection with FIG. 31B (e.g., the $2^{nd}$-$4^{th}$ partial calculations).

Accordingly, when all stages have been completed, each processing resource 3110 contains one of the partial results of OFM 3106 from FIG. 31A. For example, as shown in the illustrated example of FIG. 31G, processing resource 3110-1 has the partial result ($\Delta K_0 PQ \times N$) corresponding to the first partition $p_1$ of OFM 3106 in FIG. 31A; processing resource 3110-2 has the partial result ($\Delta K_1 PQ \times N$) corresponding to the second partition $p_2$ of OFM 3106 in FIG. 31A; processing resource 3110-3 has the partial result ($\Delta K_2 PQ \times N$) corresponding to the third partition $p_3$ of OFM 3106 in FIG. 31A; and processing resource 3110-4 has the partial result ($\Delta K_3 PQ \times N$) corresponding to the fourth partition $p_4$ of OFM 3106 in FIG. 31A. Accordingly, the result of the forward propagation operation (e.g., OFM 3106) now includes all four partial results, and thus the forward propagation operation is complete.

FIGS. 32A-32F illustrate an example weight update operation in a neural network. The illustrated weight update operation is implemented using the following formula (where the asterisk (*) represents a weight update operation): $IFM1[CHW \times N] * IFM2[KPQ \times N] = OFM[CRS \times K]$. Thus, in the illustrated weight update operation, a weight update is performed using a first input feature matrix 3201 (IFM1) and a second input feature matrix 3202 (IFM2) to generate an output feature matrix 3203. In some embodiments, for example, IFM1 3201 may correspond to the output of a backward propagation operation, IFM2 3202 may correspond to the output of a forward propagation operation, and OFM 3203 may correspond to an updated weight matrix with adjusted weight values to minimize the error associated with forward propagation operations. For example, in some embodiments, the illustrated weight update operation may be used to generate an updated filter for convolutions associated with forward propagation operations in a neural network.

Figure 32A:
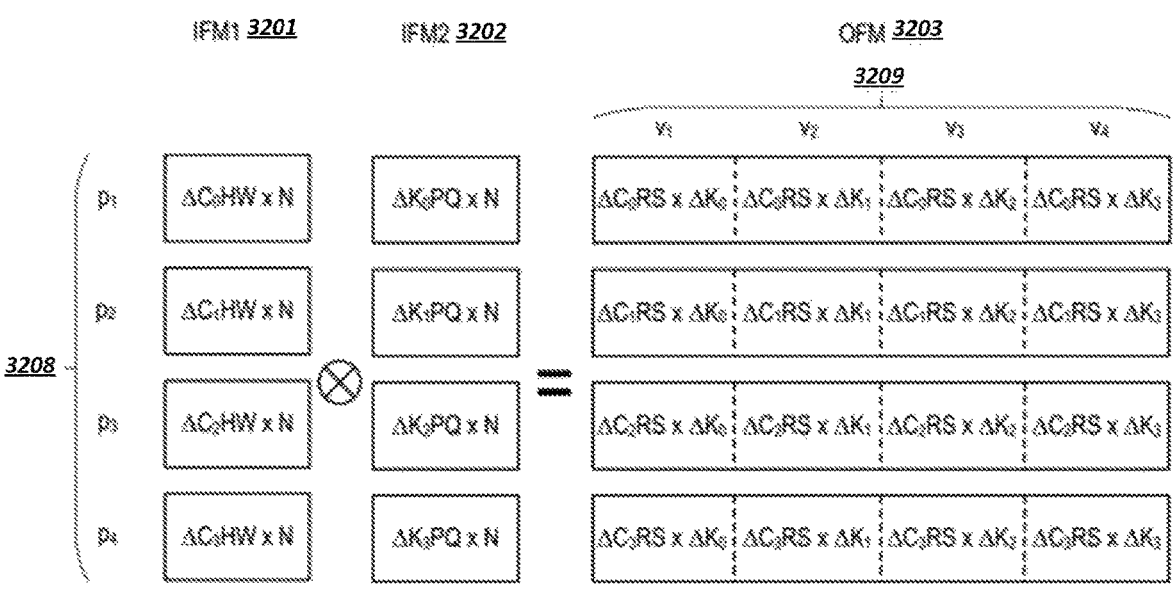

FIG. 32A illustrates the process of partitioning the weight update operation among the available processing resources. For example, in some embodiments, the matrix operands of a weight update operation may be partitioned in order to distribute the weight update operation across a variable number of processing resources, as described throughout this disclosure.

In some embodiments, the operands of a weight update operation may be partitioned into a number of partitions corresponding to the number of available processing resources. For example, if there are P processing resources available to perform the weight update operation, IFM1 3201 and IFM2 3202 may be partitioned into P partitions. Moreover, in some embodiments, the P partitions may be across any of the various dimensions of the matrix operands, such as the channels (C), images (N), and/or filters (K) dimensions. Each partition may then be distributed to a particular processing resource, as described throughout this disclosure.

In the illustrated example, the matrix operands are partitioned for distribution across four processing resources. Accordingly, IFM1 3201 and IFM2 3202 are partitioned into four partitions $p_1$-$p_4$ (designated by label 3208) corresponding to the four processing resources. Moreover, the partitions of IFM1 3201 and IFM2 3202 are across the channels (C) and filters (K) dimensions. Each partition $p_1$-$p_4$ may then be distributed to a particular matrix processing resource. For example, partition $p_1$ of IFM1 3201 and IFM2 3202 may be distributed to a first matrix processing resource, partition $p_2$ of IFM1 3201 and IFM2 3202 may be distributed to a second matrix processing resource, and so forth.

Moreover, each processing resource then performs various stages of partial matrix operations to compute various partial results of the output feature matrix (OFM) 3203. The partial results from these partial matrix operations are stored in partitions $p_1$-$p_4$ (and virtual partitions $v_1$-$v_4$) of OFM 3203, as illustrated in FIG. 32A. For example, in the illustrated example, OFM 3203 is partitioned into partitions $p_1$-$p_4$ and virtual partitions $v_1$-$v_4$ (as designated by labels 3208 and 3209). Partitions $p_1$-$p_4$ of OFM 3203 are each stored by a different processing resource, while virtual partitions $v_1$-$v_4$ are simply further sub-partitions of a partition $p_1$-$p_4$ stored by a particular processing resource.

Moreover, in some embodiments, matrix operands may be partitioned and distributed hierarchically based on the hierarchical arrangement of processing resources, as described above in connection with FIG. 31A. For example, at the multi-chip level, the matrix operation and operands may be partitioned and distributed across the available matrix processing chips. At the multi-HBM level, partial matrix operations and operands distributed to a particular matrix processing chip may be partitioned and distributed across the "logical processing nodes" of that matrix processing chip. Finally, at the multi-cluster level, partial matrix operations and operands distributed to a particular logical processing node may be partitioned and distributed across the matrix processing clusters of the logical processing node, and/or across the matrix processing units (MPUs) of each matrix processing cluster. Moreover, the partitions of the matrix operands may be across any of the various dimensions of the matrix operands, such as the channels (C), images (N), and/or filters (K) dimensions. In addition, the partial matrix operations may be distributed across the height (P) and width (Q) of output feature matrix (OFM) 3203.

The weight update operation may then be performed as described in connection with FIGS. 32B-32F.

Figure 32B:
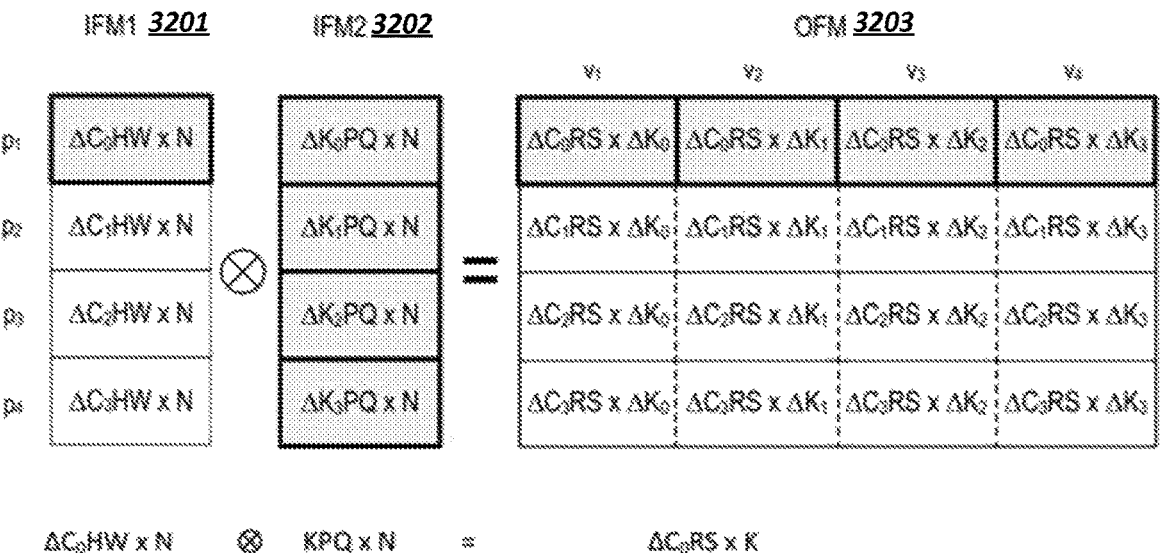

FIG. 32B illustrates one of four partial weight update operations that are performed in parallel to determine the result of the weight update operation. For example, the result of the weight update operation is determined by performing various partial weight update operations that are each used to calculate a partial result of the weight update operation. The partial results from these partial weight update operations are stored in partitions $p_1$-$p_4$ (and partitions $v_1$-$v_4$) of output feature matrix (OFM) 3203, as illustrated in FIG. 32B. For example, each partial weight update operation is further broken down into four partial matrix calculations, and the result of each partial matrix calculation is stored in virtual partitions $v_1$-$v_4$ of a particular partition $p_1$-$p_4$ of OFM 3203. In the illustrated example, partitions $p_1$-$p_4$ of OFM 3203 are each stored by a different processing resource, while virtual partitions $v_1$-$v_4$ are simply further sub-partitions of a partition $p_1$-$p_4$ stored by a particular processing resource. When the partial weight update operations are complete, the result of the weight update operation will be stored in OFM 3203, as illustrated in FIG. 32B.

The result of the weight update operation is determined using the following partial weight update operations (where an asterisk (*) represents a partial weight update operation):

$1^{st}$ partial weight update operation: $\Delta C_0 HW \times N(p_1$ of IFM1 3201)*KPQ$\times N$(IFM2 3202)=$\Delta C_0 RS \times K(p_i$ of OFM 3203);

$2^{nd}$ partial weight update operation: $\Delta C_1 HW \times N(p_2$ of IFM1 3201)*KPQ$\times N$(IFM2 3202)=$\Delta C_1 RS \times K(p_2$ of OFM 3203);

$3^{rd}$ partial weight update operation: $\Delta C_2 HW \times N(p_3$ of IFM1 3201)*KPQ$\times N$(IFM2 3202)=$\Delta C_2 RS \times K(p_3$ of OFM 3203); and $4^{th}$ partial weight update operation: $\Delta C_3 HW \times N(p_4$ of IFM1 3201)*KPQ$\times N$(IFM2 3202)=$\Delta C_3 RS \times K(p_4$ of OFM 3203).

FIG. 32B illustrates the $1^{st}$ partial weight update operation above. For example, as illustrated in FIG. 32B, the $1^{st}$ partial weight update operation is implemented using partial input matrix $\Delta C_0 HW \times N$ (e.g., partition $p_1$ of IFM1 3201) and input matrix KPQ$\times N$ (e.g., IFM2 3202) to generate partial result matrix $\Delta C_0 RS \times K$ (e.g., the partial result corresponding to partition $p_1$ of OFM 3203). Moreover, the $1^{st}$ partial weight update operation is further broken down into four partial matrix calculations, and the result of each partial matrix calculation is stored in virtual partitions $v_1$-$v_4$ of partition $p_1$ of OFM 3203. Although not illustrated, the remaining partial weight update operations (identified above as the $2^{nd}$-$4^{th}$ partial weight update operations) are each similarly broken down into four partial matrix calculations.

The entire weight update operation (including all associated partial weight update operations and partial matrix calculations) is then performed in four stages, as described further in connection with FIGS. 32C-32F.

Figure 32C:
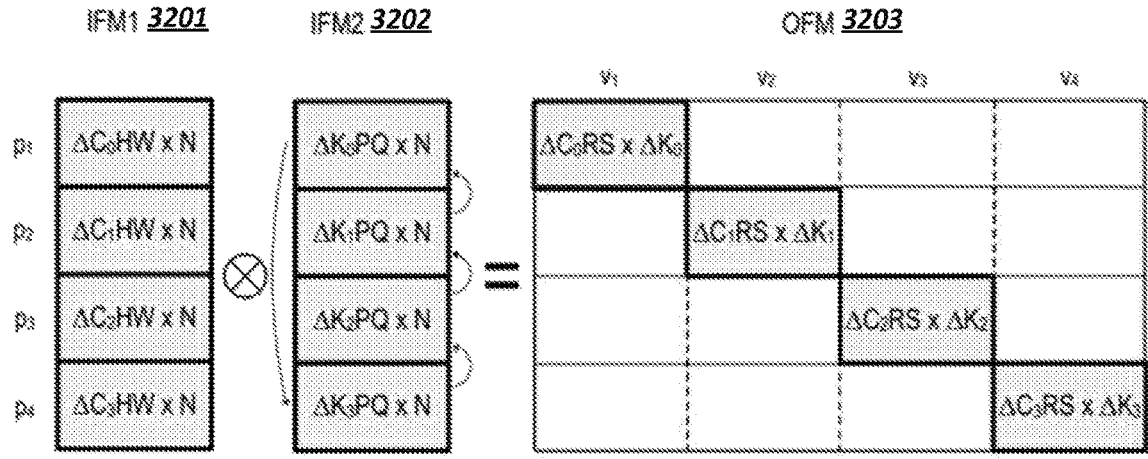

FIG. 32C illustrates stage 1 of the weight update operation. As discussed above in connection with FIG. 32A, the matrix operands have been partitioned into four partitions $p_1$-$p_4$ corresponding to the four available processing resources. Thus, each partition $p_1$-$p_4$ of IFM1 3201 and IFM2 3202 has been distributed to a particular processing resource. For example, a first processing resource has partition $p_1$ of IFM1 3201 and IFM2 3202, a second processing resource has partition $p_2$ of IFM1 3201 and IFM2 3202, a third processing resource has partition $p_3$ of IFM1 3201 and IFM2 3202, and a fourth processing resource has partition $p_4$ of IFM1 3201 and IFM2 3202.

Accordingly, in stage 1 of the weight update operation, each processing resource performs a partial matrix calculation using its respective partitions of IFM1 3201 and IFM2 3202, as illustrated in FIG. 32C and described further below. In some embodiments, for example, the partial matrix calculation performed by each processing resource (represented by asterisks (*) in the discussion below) may be a matrix multiplication operation.

The first processing resource performs the following partial matrix calculation using the matrix operands on partition $p_1$ of IFM1 3201 and IFM2 3202: $\Delta C_0 HW \times N*\Delta K_0 PQ \times N=\Delta C_0 RS \times K_0$. The result is stored in the corresponding location of OFM 3203 (e.g., on partition $p_1, v_1$ of OFM 3203).

The second processing resource performs the following partial matrix calculation using the matrix operands on partition $p_2$ of IFM1 3201 and IFM2 3202: $\Delta C_1 HW \times N * \Delta K_1 PQ \times N = \Delta C_1 RS \times \Delta K_1$. The result is stored in the corresponding location of OFM 3203 (e.g., on partition $p_2, v_2$ of OFM 3203).

The third processing resource performs the following partial matrix calculation using the matrix operands on partition $p_3$ of IFM1 3201 and IFM2 3202: $\Delta C_2 HW \times N * \Delta K_2 PQ \times N = \Delta C_2 RS \times \Delta K_2$. The result is stored in the corresponding location of OFM 3203 (e.g., on partition $p_3, v_3$ of OFM 3203).

Finally, the fourth processing resource performs the following partial matrix calculation using the matrix operands on partition $p_4$ of IFM1 3201 and IFM2 3202: $\Delta C_3 HW \times N * \Delta K_3 PQ \times N = \Delta C_3 RS \times \Delta K_3$. The result is stored in the corresponding location of OFM 3203 (e.g., on partition $p_4, v_4$ of OFM 3203).

Moreover, while the partial matrix calculations are being performed by the processing resources in stage 1, each processing resource simultaneously sends and receives partial matrix operands to and from its neighbor processing resources. For example, in some embodiments, the processing resources may be configured in a single-cyclical arrangement (e.g., with unidirectional communication between neighboring processing resources) or a dual-cyclical arrangement (e.g., with bi-directional communication between neighboring processing resources). In a single-cyclical configuration, each processing resource either sends to, or receives from, each neighbor processing resource. In a dual-cyclical configuration, each processing resource may send and receive to and from each neighbor processing resource. Accordingly, for some operations, a dual-cyclical configuration may reduce the latency for communicating matrix operands, thus avoiding any idle processing time.

Accordingly, using a cyclical configuration (e.g., single-cyclical, dual-cyclical, or any other cyclical-based configuration), the partitions $p_1$-$p_4$ of IFM2 3202 are shifted across the processing resources during each stage of the weight update operation. In the illustrated examples of FIGS. 32C-32F, a single-cyclical configuration is used. Accordingly, each processing resource sends its partition $p_x$ of IFM2 3202 to a neighbor processing resource, and receives a partition $p_x$ of IFM2 3202 from another neighbor processing resource. In other embodiments, a dual-cyclical configuration may be used, which may reduce the latency in half for communicating partial matrix operands for certain matrix operations. For example, using a dual-cyclical approach, each processing resource sends its partition $p_x$ of IFM2 3202 to both of its neighbor processing resources, and receives a partition $p_x$ of IFM2 3202 from both of its neighbor processing resources.

In this manner, during each stage of the weight update operation, partial matrix operands (e.g., partitions $p_1$-$p_4$ of IFM2 3202) are shifted across the processing resources to and from their respective neighboring processing resource (s). For example, in FIG. 32C, the partial matrix operands of IFM2 3202 are shifted as follows:

The $4^{th}$ processing resource sends its partition of IFM2 3202 (e.g., $\Delta K_3 PQ \times N$) to the $3^{rd}$ processing resource (e.g., the matrix operand in partition $p_4$ of IFM2 3202 is shifted up to partition $p_3$ of IFM2 3202).

The $3^{rd}$ processing resource sends its partition of IFM2 3202 (e.g., $\Delta K_2 PQ \times N$) to the $2^{nd}$ processing resource (e.g., the matrix operand in partition $p_3$ of IFM2 3202 is shifted up to partition $p_2$ of IFM2 3202).

The $2^{nd}$ processing resource sends its partition of IFM2 3202 (e.g., $\Delta K_1 PQ \times N$) to the $1^{st}$ processing resource (e.g., the matrix operand in partition $p_2$ of IFM2 3202 is shifted up to partition $p_2$ of IFM2 3202).

The $1^{st}$ processing resource sends its partition of IFM2 3202 (e.g., $\Delta K_0 PQ \times N$) to the $4^{th}$ processing resource (e.g., the matrix operand in partition $p_1$ of IFM2 3202 is shifted down to partition $p_4$ of IFM2 3202).

Each processing resource may then use the partial matrix operands received from neighboring processing resource(s) in subsequent stages, as described below in connection with FIGS. 32D-32F.

Figure 32D:
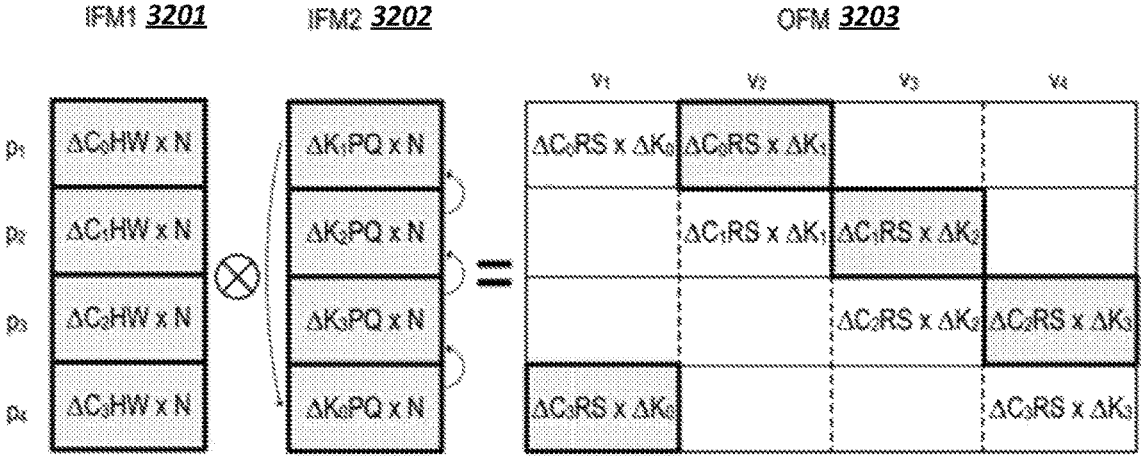

FIG. 32D illustrates stage 2 of the weight update operation. As described above in connection with stage 1 of FIG. 32C, the partitions of IFM2 3202 were shifted across the processing resources during stage 1 of the weight update operation. Accordingly, in stage 2 of the weight update operation, each processing resource performs a partial matrix calculation using its respective partitions of IFM1 3201 and IFM2 3202, as illustrated in FIG. 32D and described further below. In some embodiments, for example, the partial matrix calculation performed by each processing resource (represented by asterisks (*) in the discussion below) may be a matrix multiplication operation.

The first processing resource performs the following partial matrix calculation using the matrix operands on partition $p_1$ of IFM1 3201 and IFM2 3202: $\Delta C_0 HW \times N * \Delta K_1 PQ \times N = \Delta C_0 RS \times \Delta K_1$. The result is stored in the corresponding location of OFM 3203 (e.g., on partition $p_1, v_2$ of OFM 3203).

The second processing resource performs the following partial matrix calculation using the matrix operands on partition $p_2$ of IFM1 3201 and IFM2 3202: $\Delta C_1 HW \times N * \Delta K_2 PQ \times N = \Delta C_1 RS \times \Delta K_2$. The result is stored in the corresponding location of OFM 3203 (e.g., on partition $p_2, v_3$ of OFM 3203).

The third processing resource performs the following partial matrix calculation using the matrix operands on partition $p_3$ of IFM1 3201 and IFM2 3202: $\Delta C_2 HW \times N * \Delta K_3 PQ \times N = \Delta C_2 RS \times \Delta K_3$. The result is stored in the corresponding location of OFM 3203 (e.g., on partition $p_3, v_4$ of OFM 3203).

Finally, the fourth processing resource performs the following partial matrix calculation using the matrix operands on partition $p_4$ of IFM1 3201 and IFM2 3202: $\Delta C_3 HW \times N * \Delta K_0 PQ \times N = \Delta C_3 RS \times \Delta K_0$. The result is stored in the corresponding location of OFM 3203 (e.g., on partition $p_4, v_1$ of OFM 3203).

Moreover, while the processing resources are performing the partial matrix calculations in stage 2, each processing resource simultaneously sends and receives partitions of IFM2 3202 to and from its neighbor processing resources. Accordingly, during stage 2 of the weight update operation, the partitions of IFM2 3202 are shifted across the processing resources, in a similar manner as described for stage 1 of FIG. 32C (e.g., using single-cyclical, dual-cyclical, or other cyclical-based configurations). For example, in FIG. 32D, the partial matrix operands of IFM2 3202 are shifted as follows:

The $4^{th}$ processing resource sends its partition of IFM2 3202 (e.g., $\Delta K_0 PQ \times N$) to the $3^{rd}$ processing resource (e.g., the matrix operand in partition $p_4$ of IFM2 3202 is shifted up to partition $p_3$ of IFM2 3202).

The $3^{rd}$ processing resource sends its partition of IFM2 3202 (e.g., $\Delta K_3 PQ \times N$) to the $2^{nd}$ processing resource (e.g., the matrix operand in parti-
tion $p_3$ of IFM2 3202 is shifted up to partition
$p_2$ of IFM2 3202).

The $2^{nd}$ processing resource sends its partition of
IFM2 3202 (e.g., $\Delta K_2 PQ \times N$) to the $1^{st}$ process-
ing resource (e.g., the matrix operand in parti-
tion $p_2$ of IFM2 3202 is shifted up to partition
$p_1$ of IFM2 3202).

The $1^{st}$ processing resource sends its partition of
IFM2 3202 (e.g., $\Delta K_1 PQ \times N$) to the $4^{th}$ process-
ing resource (e.g., the matrix operand in parti-
tion $p_1$ of IFM2 3202 is shifted down to parti-
tion $p_4$ of IFM2 3202).

Each processing resource may then use the partial matrix operands received from neighboring processing resource(s) in subsequent stages, as described below in connection with FIGS. 32E-32F.

Figure 32E:
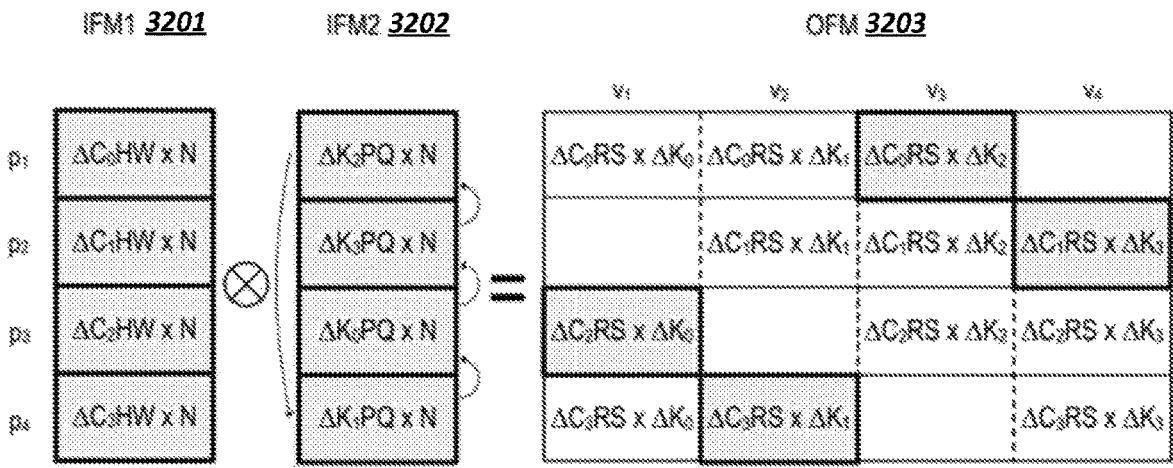

FIG. 32E illustrates stage 3 of the weight update operation. As described above in connection with stage 2 of FIG. 32D, the partitions of IFM2 3202 were shifted across the processing resources during stage 2 of the weight update operation. Accordingly, in stage 3 of the weight update operation, each processing resource performs a partial matrix calculation using its respective partitions of IFM1 3201 and IFM2 3202, as illustrated in FIG. 32E and described further below. In some embodiments, for example, the partial matrix calculation performed by each processing resource (represented by asterisks (*) in the discussion below) may be a matrix multiplication operation.

The first processing resource performs the following partial matrix calculation using the matrix operands on partition $p_1$ of IFM1 3201 and IFM2 3202: $\Delta C_0 HW \times N * \Delta K_2 PQ \times N = \Delta C_0 RS \times \Delta K_2$. The result is stored in the corresponding location of OFM 3203 (e.g., on partition $p_1, v_3$ of OFM 3203).

The second processing resource performs the following partial matrix calculation using the matrix operands on partition $p_2$ of IFM1 3201 and IFM2 3202: $\Delta C_1 HW \times N * \Delta K_3 PQ \times N = \Delta C_1 RS \times \Delta K_3$. The result is stored in the corresponding location of OFM 3203 (e.g., on partition $p_2, v_4$ of OFM 3203).

The third processing resource performs the following partial matrix calculation using the matrix operands on partition $p_3$ of IFM1 3201 and IFM2 3202: $\Delta C_2 HW \times N * \Delta K_0 PQ \times N = \Delta C_2 RS \times \Delta K_0$. The result is stored in the corresponding location of OFM 3203 (e.g., on partition $p_3, v_1$ of OFM 3203).

Finally, the fourth processing resource performs the following partial matrix calculation using the matrix operands on partition $p_4$ of IFM1 3201 and IFM2 3202: $\Delta C_3 HW \times N * \Delta K_1 PQ \times N = \Delta C_3 RS \times \Delta K_1$. The result is stored in the corresponding location of OFM 3203 (e.g., on partition $p_4, v_2$ of OFM 3203).

Moreover, while the processing resources are performing the partial matrix calculations in stage 3, each processing resource simultaneously sends and receives partitions of IFM2 3202 to and from its neighbor processing resources. Accordingly, during stage 3 of the weight update operation, the partitions of IFM2 3202 are shifted across the processing resources, in a similar manner as described for stages 1 and 2 of FIGS. 32C-D (e.g., using single-cyclical, dual-cyclical, or other cyclical-based configurations). For example, in FIG. 32E, the partial matrix operands of IFM2 3202 are shifted as follows:

The $4^{th}$ processing resource sends its partition of IFM2 3202 (e.g., $\Delta K_1 PQ \times N$) to the $3^{rd}$ processing resource (e.g., the matrix operand in partition $p_4$ of IFM2 3202 is shifted up to partition $p_3$ of IFM2 3202).

The $3^{rd}$ processing resource sends its partition of IFM2 3202 (e.g., $\Delta K_0 PQ \times N$) to the $2^{nd}$ processing resource (e.g., the matrix operand in partition $p_3$ of IFM2 3202 is shifted up to partition $p_2$ of IFM2 3202).

The $2^{nd}$ processing resource sends its partition of IFM2 3202 (e.g., $\Delta K_3 PQ \times N$) to the $1^{st}$ processing resource (e.g., the matrix operand in partition $p_2$ of IFM2 3202 is shifted up to partition $p_1$ of IFM2 3202).

The $1^{st}$ processing resource sends its partition of IFM2 3202 (e.g., $\Delta K_2 PQ \times N$) to the $4^{th}$ processing resource (e.g., the matrix operand in partition $p_1$ of IFM2 3202 is shifted down to partition $p_4$ of IFM2 3202).

Each processing resource may then use the partial matrix operands received from neighboring processing resource(s) in subsequent stages, as described below in connection with FIG. 32F.

Figure 32F:
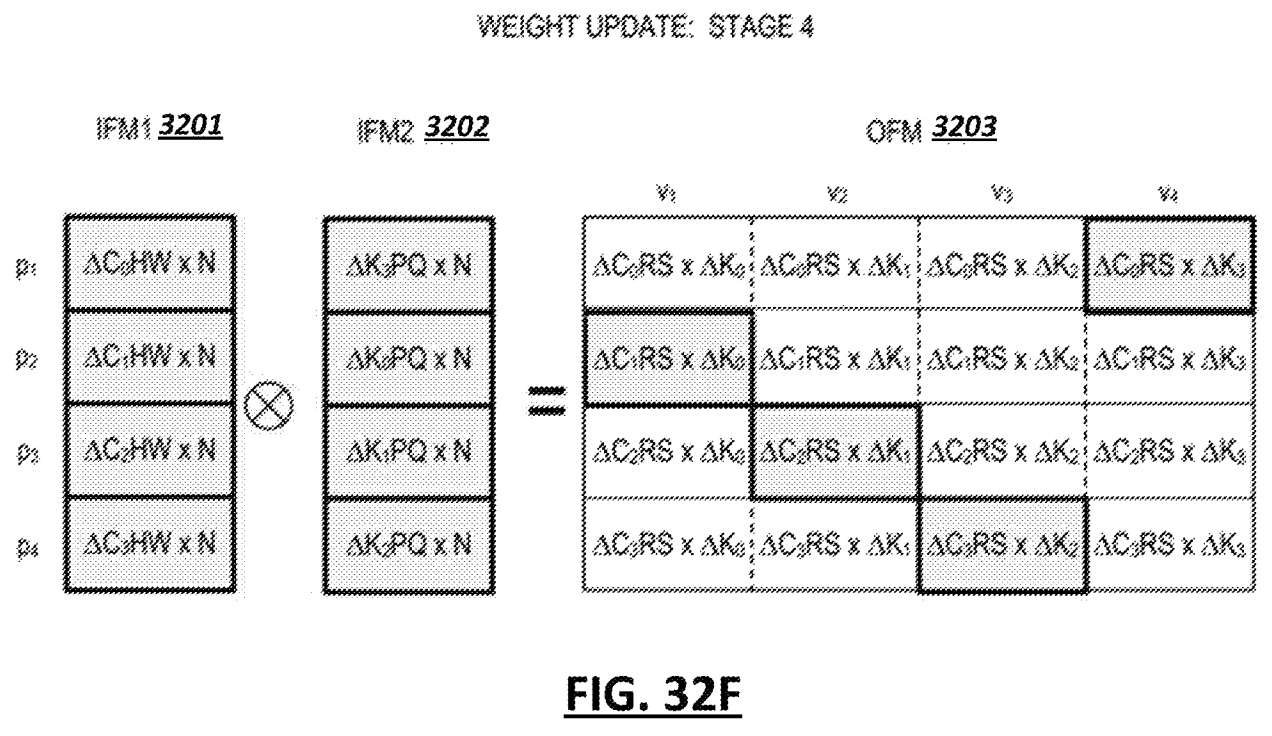

FIG. 32F illustrates stage 4 of the weight update operation. As described above in connection with stage 3 of FIG. 32E, the partitions of IFM2 3202 were shifted across the processing resources during stage 3 of the weight update operation. Accordingly, in stage 4 of the weight update operation, each processing resource performs a partial matrix calculation using its respective partitions of IFM1 3201 and IFM2 3202, as illustrated in FIG. 32F and described further below. In some embodiments, for example, the partial matrix calculation performed by each processing resource (represented by asterisks (*) in the discussion below) may be a matrix multiplication operation.

The first processing resource performs the following partial matrix calculation using the matrix operands on partition p1 of IFM1 3201 and IFM2 3202: $\Delta C0HW \times N * \Delta K3PQ \times N = \Delta C0RS \times \Delta K3$. The result is stored in the corresponding location of OFM 3203 (e.g., on partition p1,v4 of OFM 3203).

The second processing resource performs the following partial matrix calculation using the matrix operands on partition p2 of IFM1 3201 and IFM2 3202: $\Delta C1HW \times N * \Delta K0PQ \times N = \Delta C1RS \times \Delta K0$. The result is stored in the corresponding location of OFM 3203 (e.g., on partition p2,v1 of OFM 3203).

The third processing resource performs the following partial matrix calculation using the matrix operands on partition p3 of IFM1 3201 and IFM2 3202: $\Delta C2HW \times N * \Delta K1PQ \times N = \Delta C2RS \times \Delta K1$. The result is stored in the corresponding location of OFM 3203 (e.g., on partition p3,v2 of OFM 3203).

Finally, the fourth processing resource performs the following partial matrix calculation using the matrix operands on partition p4 of IFM1 3201 and IFM2 3202: $\Delta C3HW \times N * \Delta K2PQ \times N = \Delta C3RS \times \Delta K2$. The result is stored in the corresponding location of OFM 3203 (e.g., on partition p4,v3 of OFM 3203).

After the partial matrix calculations of stage 4 are complete, all partial results of the weight update operation have been calculated and are stored in OFM 3203. Accordingly, the weight update operation is complete.

FIG. 33 illustrates a flowchart 3300 for an example embodiment of distributed matrix operations associated with convolutions. Flowchart 3300 may be implemented, in some embodiments, by components described throughout this disclosure.

The flowchart may begin at block 3302 by receiving a command to perform a matrix operation. The matrix operation, for example, may comprise an operation on a plurality of input matrices (e.g., matrix operands). Moreover, the matrix operation may be associated with one or more convolution operations.

Convolution operations, for example, may be used for image processing. For example, a convolution operation may involve applying a filter to an image. The filter may be used to modify the image (e.g., applying visual effects), detect certain features in the image (e.g., facial recognition or identification of other objects), and so forth. Moreover, in some embodiments, the image and filter of a convolution operation may be represented using matrices. For example, a color image may be represented by a three-dimensional (3D) matrix with dimensions corresponding to the number of channels (C), height (H), and width (W) of the image. Similarly, a filter may be represented by a 3D matrix with dimensions corresponding to the number of channels (C), height (R), and width (S) of the filter. In these embodiments, a convolution operation may be performed by moving the filter throughout the image and computing the dot product between the filter and the various portions of the image. Moreover, in some embodiments, when convolution operations need to be performed on multiple images and using multiple filters, the images may be processed together to increase processing efficiency. Thus, in some embodiments, a collection of images may be represented using a four-dimensional (4D) matrix, with dimensions corresponding to the number of channels (C), image height (H), image width (W), and number of images (N). Similarly, a collection of filters may be represented using a 4D matrix, with dimensions corresponding to the number of filters (K), number of channels (C), filter height (R), and filter width (S). Accordingly, a convolution operation may then be performed using the 4D matrices that are used to represent the images and filters.

In some embodiments, convolution operations may be used to implement computer vision artificial intelligence and machine learning capabilities in an artificial neural network. For example, in some embodiments, the matrix operation of block 3302 may be associated with operations in an artificial neural network, such as forward propagation, backward propagation, and/or weight update operations.

The flowchart may then proceed to block 3304 to partition the input matrices into a plurality of partitions based on the number of available processing elements. In some embodiments, the input matrices may be partitioned based on the hierarchical arrangement of processing resources, as described further in connection with block 3306. In some embodiments, the partitions may be across any of the various dimensions of the input matrices, such as the channels (C), images (N), and/or filters (K) dimensions.

The flowchart may then proceed to block 3306 to distribute the partitions to the available processing elements. For example, in some embodiments, each partition may be distributed to a particular processing element. Moreover, in some embodiments, the processing elements may be configured in a hierarchical arrangement with a plurality of processing levels, and the matrix operation may be distributed across the hierarchy of processing levels. For example, in some embodiments, the processing elements may include multiple matrix processing chips (e.g., matrix processing chips), multiple high bandwidth memory (HBM) modules on each matrix processing chip (e.g., HBM modules), multiple matrix processing clusters on each matrix processing chip (e.g., matrix processing clusters), and/or multiple matrix processing units (MPUs) on each matrix processing cluster (e.g., MPUs). In those embodiments, the matrix operation may first be partitioned and distributed across the matrix processing chips. The partial matrix operation distributed to a particular matrix processing chip may then be similarly partitioned and distributed across the matrix processing clusters and/or high bandwidth memory (HBM) modules of the particular matrix processing chip. For example, in some cases, the partial matrix operation may be distributed across the matrix processing clusters of the matrix processing chip. Alternatively, the partial matrix operation may first be distributed across various "logical processing nodes" of the matrix processing chip (e.g., groups of matrix processing clusters associated with an HBM module), and may then be distributed across the matrix processing clusters of a particular logical processing node. The partition and partial matrix operation distributed to a particular matrix processing cluster may then be similarly partitioned and distributed across the matrix processing units (MPUs) of the particular matrix processing cluster.

Moreover, in some cases, a partial matrix operation distributed to a particular processing element may be distributed across the height (P) and width (Q) of the corresponding output of the partial matrix operation. For example, a partial matrix operation distributed to a logical processing node may be distributed to the associated matrix processing clusters across the height (P) of the output matrix, and the partial matrix operation distributed to each matrix processing cluster may then be distributed to the matrix processing units (MPUs) across the width (Q) of the output matrix.

The flowchart may then proceed to block 3308 to perform partial matrix operations using the processing elements. For example, each processing element may perform a partial matrix operation based on the matrix data distributed to that processing element.

The flowchart may then proceed to block 3310 to transmit partial matrix data between processing elements while performing the partial matrix operations. For example, in some embodiments, the processing elements may be configured in a cyclical arrangement such that each processing element is communicatively coupled to multiple neighbor processing elements. Moreover, the partial matrix operations may be performed in a plurality of stages, and each processing element may transmit partial matrix data to its neighbor processing elements while performing a particular stage of the partial matrix operations. For example, in some embodiments, each processing element may transmit partial matrix data to one of its neighbor processing elements (e.g., using a single-cyclical approach) or to both of its neighbor processing elements (e.g., using a dual-cyclical approach) during each stage of partial matrix operations. For example, a first processing element may use or calculate partial matrix data in a particular stage of the partial matrix operations, the first processing element may transmit the partial matrix data to a second processing element, and the second processing element may then use the partial matrix data in a subsequent stage of the partial matrix operations. For some matrix operations, the partial matrix data may include a partial input matrix, while for other matrix operations, the partial matrix data may include a partial result matrix.

The flowchart may then proceed to block 3312 to determine a result of the matrix operation. For example, the result of the matrix operation may be determined based on the partial results collectively computed by the processing elements.

At this point, the flowchart may be complete. In some embodiments, however, the flowchart may restart and/or certain blocks may be repeated. For example, in some embodiments, the flowchart may restart at block 3302 to continue receiving and processing commands to perform matrix operations.

Matrix Dimension Shuffling

FIGS. 34A-34D illustrate examples of matrix dimension shuffling. In some embodiments, these example operations may be performed using a matrix processing architecture, such as the matrix processing architectures discussed in the examples above.

In the illustrated examples, dimension shuffling is performed for a three-dimensional (3D) matrix stored in two-dimensional (2D) memory. The example 3D matrix includes dimensions A, B, and C (or A×B×C). In the illustrated examples, the 3D matrix is stored in 2D memory with its dimensions arranged as AB×C, and dimension shuffling is used to reorder the dimensions into other 2D permutations, such as from AB×C to BA×C, and from AB×C to BC×A.

In some embodiments, the 3D matrix could be used to represent an image, and thus dimensions A, B, and C of the matrix may correspond to the channels (C), height (H), and width (W) of the image (or C×H×W). The 3D matrix could also be used to represent a filter (e.g., for a convolution operation), and thus dimensions A, B, and C of the matrix may correspond to the channels (C), filter height (R), and filter width (S) of the filter (or C×R×S). Moreover, while the examples illustrated by FIGS. 34A-34D use a 3D matrix, a matrix with any number of dimensions may be used. For example, in some embodiments, a four-dimensional (4D) matrix could be used to represent a collection of images, with dimensions arranged into channels (C), height (H), width (W), and number of images (N) (or C×H×W×N). Alternatively, a four-dimensional (4D) matrix could be used to represent a collection of filters used to perform convolution operations, with dimensions arranged into channels (C), filter height (R), filter width (S), and number of filters (K) (or C×R×S×K). Accordingly, dimension shuffling could be used to reorder the dimensions of a matrix used to represent an image, a filter, or a collection of images or filters. For example, a matrix used to represent a collection of filters could be stored in 2D memory with its dimensions arranged as CRS×K, and dimension shuffling could be used to reorder the dimensions to any other 2D permutation, such as from CRS×K to KRS×C.

Figure 34A:
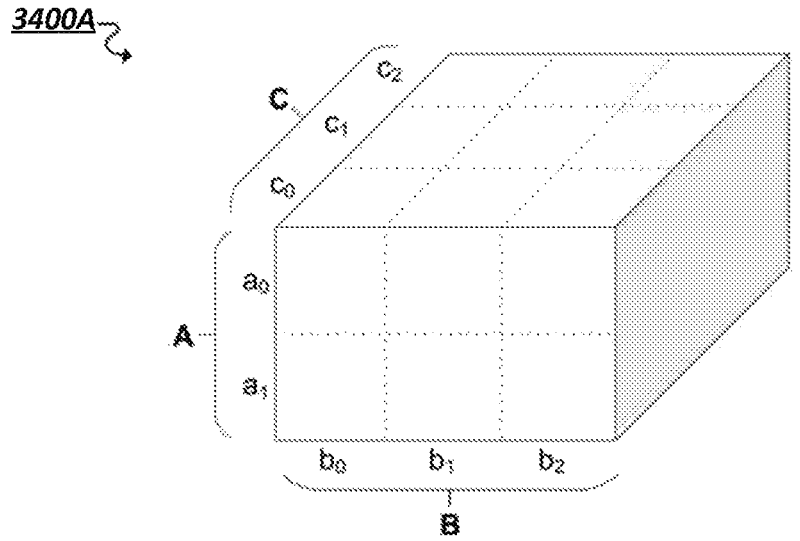
FIGS. 34A, 34B, 34C and 34D illustrate examples of matrix dimension shuffling.

FIG. 34A illustrates an example of a three-dimensional (3D) matrix 3400A. In the illustrated embodiment, matrix 3400A includes dimensions A, B, and C, or A×B×C. Dimension A includes elements $a_0$ and $a_1$; dimension B includes elements $b_0$, $b_1$, and $b_2$; and dimension C includes elements $c_0$, $c_1$, and $c_2$.

Figure 34B:
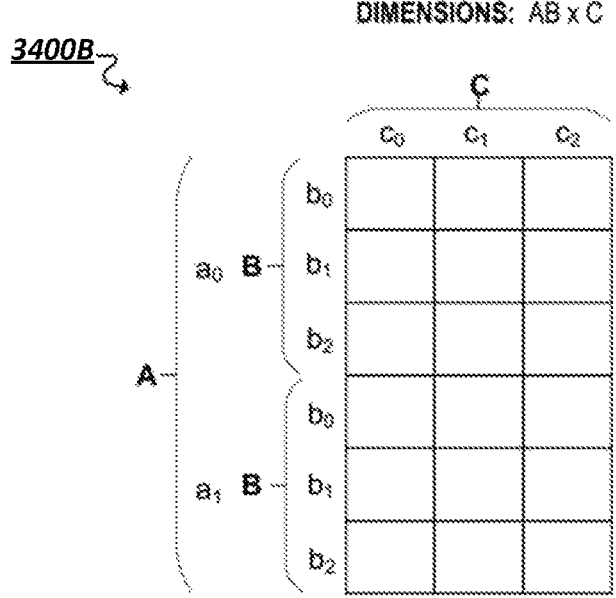

FIG. 34B illustrates an example of how 3D matrix 3400A of FIG. 34A may be stored in two-dimensional (2D) memory as 2D matrix 3400B. For example, in some embodiments, matrix operands may be stored using two-dimensional (2D) memory components (e.g., memory configured to store and retrieve data in two dimensions, such as using rows and columns). Accordingly, a matrix with three or more dimensions (e.g., matrix 3400A of FIG. 34A) may need its dimensions rearranged in order for the matrix to be stored in 2D memory. For example, 3D matrix 3400A (which includes dimensions A, B, and C, or A×B×C) may be stored in 2D memory as 2D matrix 3400B by treating two of its dimensions as a single dimension. For example, 3D matrix 3400A may be stored in 2D memory as 2D matrix 3400B by arranging its dimensions as AB×C, AC×B, BA×C, BC×A, or A×BC, and so forth. In the illustrated embodiment, for example, 3D matrix 3400A is stored as 2D matrix 3400B by treating dimensions A and B as one dimension in 2D memory, and treating dimension C as another dimension in 2D memory, or AB×C.

In some cases, however, a particular matrix operation (e.g., a convolution operation) may need the dimensions of matrix 3400A converted from one arrangement in memory to another arrangement in memory (e.g., converting a matrix from AB×C to BA×C). As an example, a convolution operation may need the dimensions of its filter to be arranged differently for forward propagation operations versus backward propagation operations in an artificial neural network. Accordingly, a dimension shuffle operation may be used to reorder the dimensions of a matrix in memory.

Figure 34C:
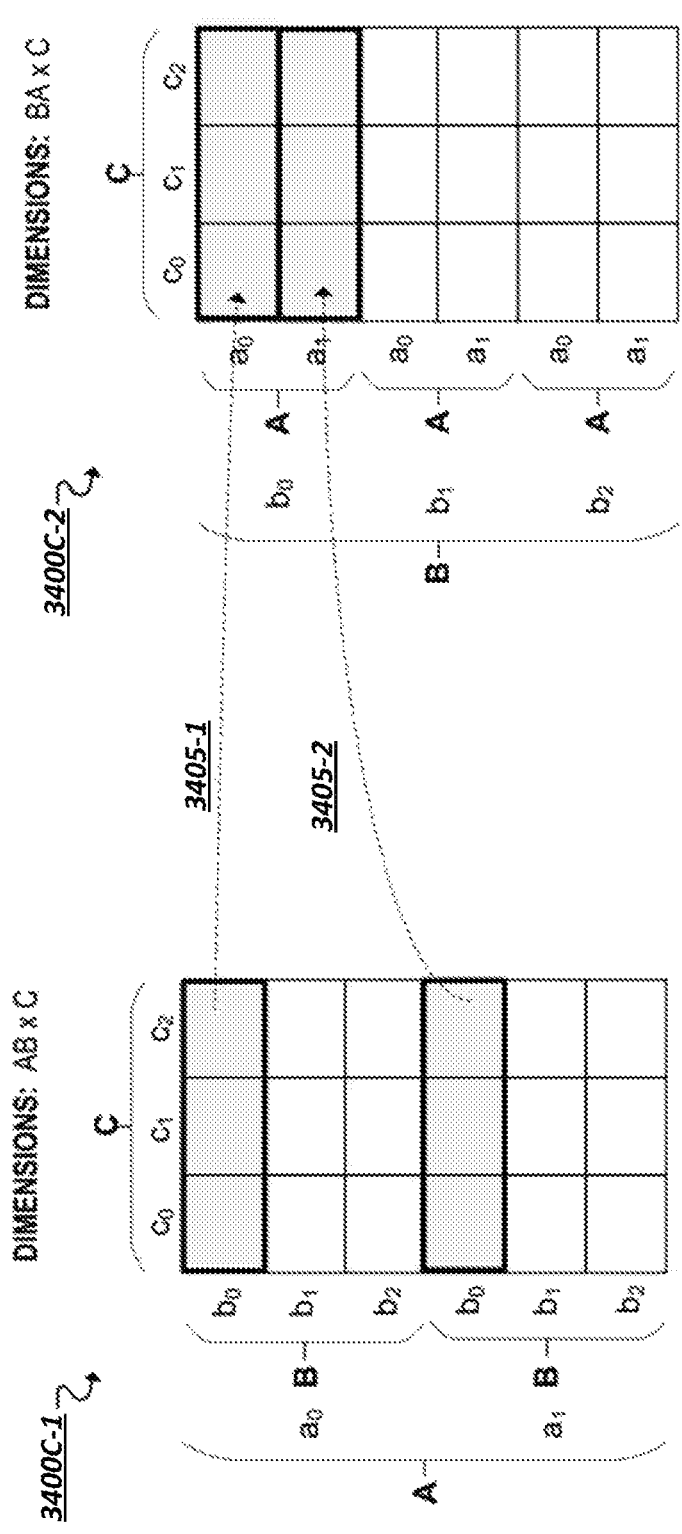
Figure 34D:
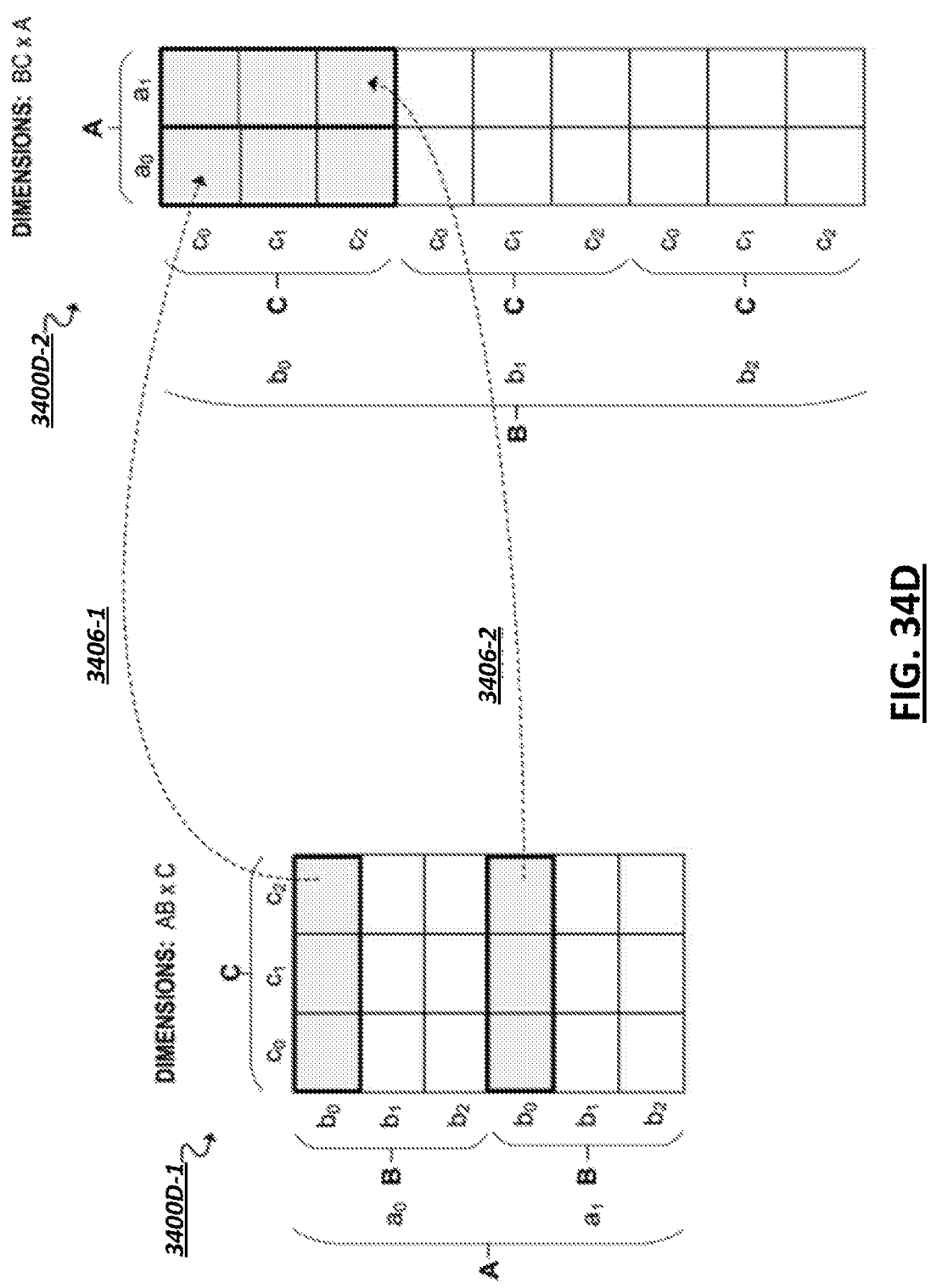

In some embodiments, a dimension shuffle operation may be implemented using convolutional read operations and/or strided memory access. For example, in some embodiments, a matrix processing system (e.g., matrix processing system) may implement a convolutional read operation, which may use strided memory access to access data at locations in 2D memory that are separated by a particular interval or stride. A convolutional read operation may also begin the strided memory access at a particular offset within memory. Moreover, some embodiments may include multiple variations of a convolutional read operation, including non-transpose and transpose convolutional reads. A non-transpose convolutional read, for example, may store data obtained using strided memory access in non-transpose form (e.g., as illustrated in FIG. 34C). A transpose convolutional read, for example, may store data obtained using strided memory access in transpose form (e.g., as illustrated in FIG. 34D).

A particular dimension shuffle operation may involve one or more non-transpose and/or transpose convolutional reads, and the result of each convolutional read may be stored in a result matrix based on the order in which the data is accessed using strided memory access. Moreover, in some cases, a particular dimension shuffle operation may involve multiple dimension shuffle operations to reorder the dimensions into one or more intermediate formats. For example, a dimension shuffle operation from AB×C to AC×B may involve a dimension shuffle from AB×C to BA×C, and another dimension shuffle from BA×C to AC×B. In this manner, any dimension shuffle operation may be performed using a combination of non-transpose and/or transpose convolutional reads to reorder the dimensions of a matrix from one format to another.

FIG. 34C illustrates an example of matrix dimension shuffling using non-transpose convolutional read operations. In the illustrated example, matrix 3400C-1 corresponds to a 3D matrix (e.g., 3D matrix 3400A of FIG. 34A) that is stored in 2D memory with its dimensions arranged as AB×C. Similarly, matrix 3400C-2 corresponds to the same matrix but with its dimensions arranged as BA×C. In some embodiments, matrix 3400C-1 may be converted into matrix 3400C-2, or from AB×C to BA×C, using non-transpose convolutional read operations.

In the illustrated example, a non-transpose convolutional read operation is used to access certain data of matrix 3400C-1 and store the data in matrix 3400C-2. In the illustrated example, the non-transpose convolution read operation uses strided memory access with an offset of zero and a stride of three rows. Accordingly, because the offset is zero, the convolutional read begins by accessing the first row of matrix 3400C-1 and storing it in non-transpose form as the first row of matrix 3400C-2 (as depicted by operation 3405-1). Next, because the stride is three rows, the convolutional read then accesses the fourth row of matrix 3400C-1 and stores it in non-transpose form as the second row of matrix 3400C-2 (as depicted by operation 3405-2). The next strided memory access of the convolutional read would occur at the seventh row, but because matrix 3400C-1 only contains six rows, the convolutional read is complete.

Although not illustrated, the dimension shuffle operation can be completed using two additional non-transpose convolutional read operations, using the same stride (e.g., three) but with offsets of one and two for the respective convolutional read operations. For example, a non-transpose convolutional read operation with an offset of one and a stride of three would access the second and fifth rows of matrix 3400C-1, and store them in non-transpose form as the third and fourth rows of matrix 3400C-2, respectively. Similarly, a non-transpose convolutional read operation with an offset of two and a stride of three would access the third and sixth rows of matrix 3400C-1, and store them in non-transpose form as the fifth and sixth rows of matrix 3400C-2, respectively. At this point, the dimension shuffle operation would be complete.

FIG. 34D illustrates an example of matrix dimension shuffling using transpose convolutional read operations. In the illustrated example, matrix 3400D-1 corresponds to a 3D matrix (e.g., 3D matrix 3400A of FIG. 34A) that is stored in 2D memory with its dimensions arranged as AB×C. Similarly, matrix 3400D-2 corresponds to the same matrix but with its dimensions arranged as BC×A. In some embodiments, matrix 3400D-1 may be converted into matrix 3400D-2, or from AB×C to BC×A, using convolutional read operations.

In the illustrated example, a transpose convolutional read operation is used to access certain data of matrix 3400D-1 and store the data in matrix 3400D-2. In the illustrated example, the transpose convolution read operation uses strided memory access with an offset of zero and a stride of three rows. Accordingly, because the offset is zero, the convolutional read begins by accessing the first row of matrix 3400D-1 and storing it in transpose form at the beginning of the first column of matrix 3400D-2 (as depicted by operation 3406-1). For example, the first row of matrix 3400D-1 contains three elements, and thus the transposed form is a column with three elements, which is then stored as the first three elements of the first column of matrix 3400D-2. Next, because the stride is three rows, the convolutional read then accesses the fourth row of matrix 3400D-1 and stores it in transpose form at the beginning of the second column of matrix 3400D-2 (as depicted by operation 3406-2). For example, the fourth row of matrix 3400D-1 contains three elements, and thus the transposed form is a column with three elements, which is then stored as the first three elements of the second column of matrix 3400D-2. The next strided memory access of the convolutional read would occur at the seventh row, but because matrix 3400D-1 only contains six rows, the convolutional read is complete.

Although not illustrated, the dimension shuffle operation can be completed using two additional transpose convolutional read operations, using the same stride (e.g., three) but with offsets of one and two for the respective convolutional read operations. For example, a transpose convolutional read operation with an offset of one and a stride of three would access the second and fifth rows of matrix 3400D-1, and store them in transpose form in the next available elements (e.g., elements four through six) of the first and second columns of matrix 3400D-2, respectively. Similarly, a transpose convolutional read operation with an offset of two and a stride of three would access the third and sixth rows of matrix 3400D-1, and store them in transpose form in the next available elements (e.g., elements seven through nine)

of the first and second columns of matrix 3400D-2, respectively. At this point, the dimension shuffle operation would be complete.

Figure 35:
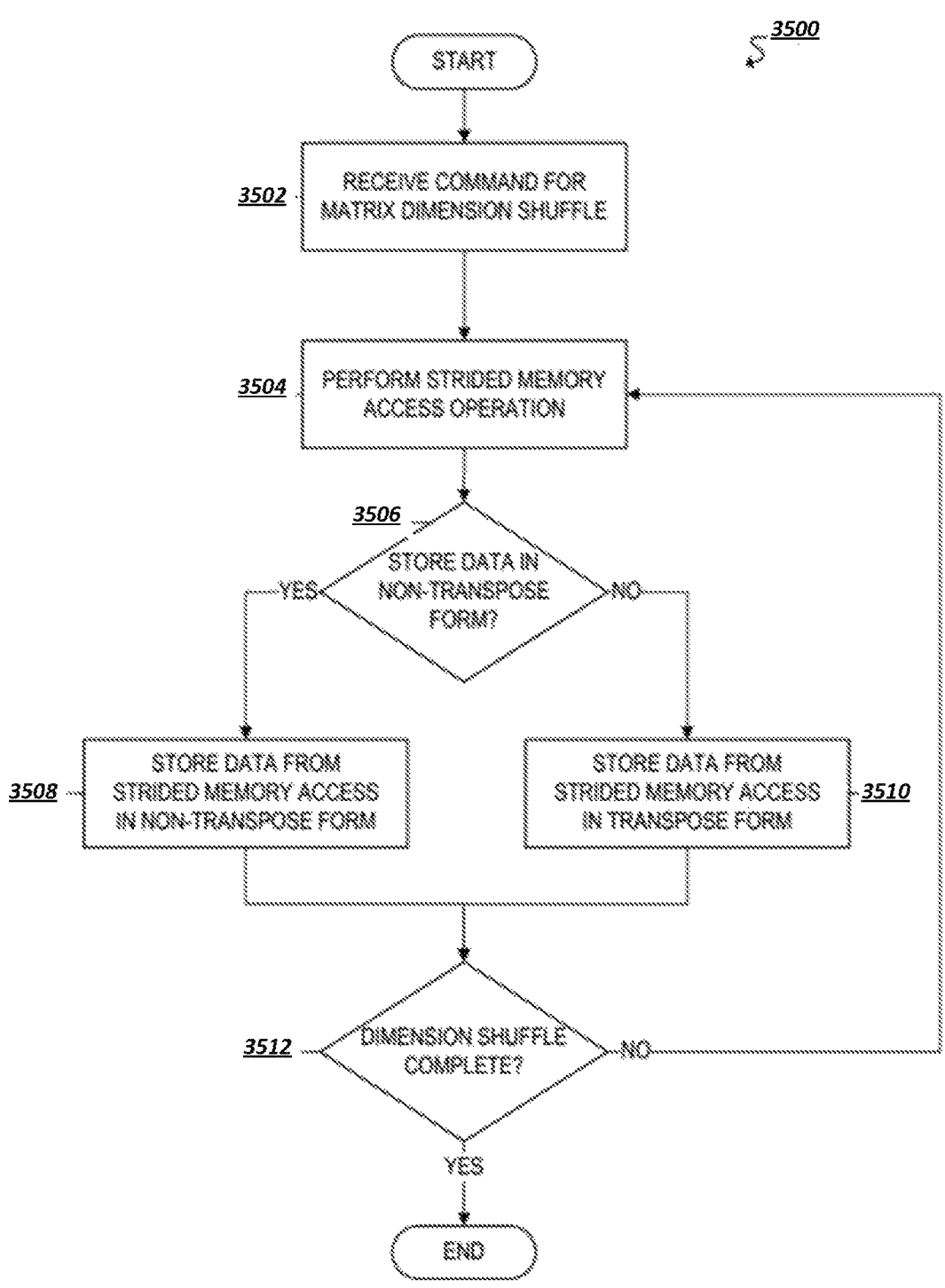
FIG. 35 illustrates a flowchart for an example embodiment of matrix dimension shuffling.

FIG. 35 illustrates a flowchart 3500 for an example embodiment of matrix dimension shuffling. Flowchart 3500 may be implemented, in some embodiments, by components described throughout this disclosure (e.g., the matrix processing architecture).

The flowchart may begin at block 3502 by receiving a command to perform a matrix dimension shuffle operation. The matrix dimension shuffle operation, for example, may be an operation to reorder a plurality of dimensions of an input matrix. In some embodiments, for example, the input matrix may be stored in two-dimensional (2D) memory. Moreover, in some cases, the input matrix may include two-dimensions. In other cases, however, the input matrix may contain a number of dimensions other than two dimensions, such as three dimensions, four dimensions, or any other number of dimensions. Moreover, in some embodiments, the matrix dimension shuffle operation may be associated with another complex matrix operation, such as a convolution operation associated with backward propagation in an artificial neural network.

The flowchart may then proceed to block 3504 to perform a strided memory access operation. For example, in some embodiments, the strided memory access operation may be a convolutional read operation. The convolutional read operation, for example, may use strided memory access to access data at locations in memory that are separated by a particular interval or stride. For example, in some embodiments, the convolutional read operation may use strided memory access to access rows of memory that are separated by a particular interval or stride, such as a particular number of rows. Similarly, in some embodiments, the convolutional read operation could use strided memory access to access columns of memory that are separated by a particular interval or stride, such as a particular number of columns. The convolutional read operation may also begin the strided memory access at a particular offset within memory (e.g., a particular number of rows or columns from the beginning of memory).

The flowchart may then proceed to block 3506 to determine whether the data accessed using the strided memory access operation should be stored in non-transpose form or transpose form. For example, some embodiments may include multiple variations of a convolutional read operation, including non-transpose and transpose convolutional reads. A non-transpose convolutional read, for example, may store data obtained using strided memory access in non-transpose form. A transpose convolutional read, for example, may store data obtained using strided memory access in transpose form.

If it is determined at block 3506 that the data should be stored in non-transpose form, the flowchart may then proceed to block 3508 to store the data in a result matrix in non-transpose form. If it is determined at block 3506 that the data should be stored in transpose form, the flowchart may then proceed to block 3510 to store the data in a result matrix in transpose form. The flowchart may then proceed to block 3512 to determine whether the dimension shuffle operation has been completed. If it is determined at block 3512 that the dimension shuffle operation is incomplete, the flowchart may then proceed to block 3504 to continue performing strided memory access operations. For example, a particular dimension shuffle operation may involve one or more non-transpose and/or transpose convolutional reads, and the result of each convolutional read may be stored in a result matrix based on the order in which the data is accessed using strided memory access. Moreover, in some cases, a particular dimension shuffle operation may involve multiple dimension shuffle operations to reorder the dimensions into one or more intermediate formats. In this manner, any dimension shuffle operation may be performed using a combination of non-transpose and/or transpose convolutional reads to reorder the dimensions of a matrix from one format to another. If it is determined at block 3512 that the dimension shuffle operation has been completed, the result matrix may be returned in response to the command to perform the dimension shuffle operation. At this point, the flowchart may be complete. In some embodiments, however, the flowchart may restart and/or certain blocks may be repeated. For example, in some embodiments, the flowchart may restart at block 3502 to continue receiving and processing commands to perform matrix dimension shuffle operations.

Programmable Matrix Processing Engine

Matric processing architectures, such the example devices and architectures above, may provide a flexible or "programmable" approach for defining or implementing particular matrix operations. For example, certain embodiments may include a matrix processor that can execute programmable matrix subroutines. A matrix subroutine, for example, may be a programmable subroutine that is designed to perform a particular matrix operation when executed by a matrix processor. For example, a matrix subroutine may include a series of instructions and/or commands, supported by a particular matrix processor, and designed to perform a desired matrix operation when executed by the matrix processor. In some embodiments, for example, a matrix processor may be designed to support a set of instructions and/or commands for performing various fundamental operations. In this manner, matrix subroutines for more complex matrix operations can be programmed using the fundamental instructions and/or commands supported by the matrix processor. In some embodiments, these matrix subroutines can be stored on a matrix subroutine memory associated with a matrix processor. Then, when a particular matrix operation needs to be performed, the matrix processor can retrieve the corresponding matrix subroutine from the matrix subroutine memory, and then execute the instructions and/or commands of the subroutine to perform the desired matrix operation.

The programmable matrix processing functionality described throughout this disclosure provides numerous technical advantages, including alleviating the inefficiencies of existing approaches, and enabling flexible matrix operations to be efficiently defined and implemented using programmable matrix subroutines. These programmable matrix subroutines enable wide varieties of matrix processing functionality to be implemented on matrix processors programmatically rather than via inefficient, time-consuming, and costly hardware-based implementations.

Returning to the discussion of the example of FIG. 17, illustrates an example embodiment of a programmable matrix processing engine 1700. In some embodiments, matrix processing engine 1700 may be implemented by a matrix processing architecture. For example, in some embodiments, matrix processing engine 1700 may be implemented by a matrix processing cluster on a matrix processing chip (e.g., processing clusters of an example deep learning chip (also referred to herein as a matrix processing chip)). In those embodiments, a particular matrix processing cluster may use its associated matrix processing engine 1700 to perform matrix-based processing and operations, such as partial matrix operations associated with a particular matrix operation distributed across multiple matrix processing resources (e.g., as described throughout this disclosure).

As noted above, memory resource blocks (MRBs) may be provided to efficiently store and retrieve tensor data. Matrix subroutine memory 1739 may also be provided as a memory component used to store matrix subroutines. A matrix subroutine, for example, may be a programmable subroutine for a matrix processor that is designed to perform a particular matrix operation when executed by the matrix processor. For example, a matrix subroutine may include a series of instructions and/or commands, supported by a particular matrix processor, and designed to perform a desired matrix operation when executed by the matrix processor. In some embodiments, for example, a matrix processor may be designed to support a set of instructions and/or commands for performing various fundamental operations. For example, in some embodiments, a matrix processor may support instructions for processing data, performing various arithmetic operations, and/or identifying matrix operands and outputs for the various instructions and operations.

For example, certain instructions may be used for processing data, such as reading, writing, and/or copying data (e.g., matrix data) to and from different locations, slicing matrix data, extracting matrix data, rearranging matrix data, and so forth.

As another example, certain instructions may be used to perform particular arithmetic operations, including any of the following operations: matrix multiplication; convolutions; unary matrix operations; binary matrix operations, such as addition (+), subtraction (−), multiplication (*), division (/), bitwise XOR, AND, OR, logical and arithmetic left and right shift, comparison (>, <, >=, <=, ==, !=); and column-wise, row-wise, and matrix-wide operations, such as sum, max value, and min value.

Moreover, special "register operand" (REGOP) instructions may be used to identify the matrix operands and outputs for the various supported instructions and operations. The register operand instructions, for example, may be used to specify the size and location of the operands and outputs of a particular instruction or operation. For example, in some embodiments, a register operand instruction may be used to identify a location in a high bandwidth memory (HBM) module or a memory resource block (MRB) that is associated with a particular operand or output. As an example, a basic matrix multiplication operation could be programmed using REGOP instructions to identify the location of each operand and the location of the output, followed by an instruction to perform a matrix multiplication operation.

In this manner, the fundamental instructions and/or commands supported by the matrix processor can be used to program matrix subroutines for more complex matrix operations, such as distributed matrix multiplication and/or convolution operations, dimension shuffle operations, reshape operations, and so forth.

Matrix subroutine memory 1739 may be implemented in any portion of a matrix processing architecture, such as matrix processing chips, matrix processing clusters, and/or a host computing system. In some embodiments, for example, a matrix processing chip may include a matrix subroutine memory 1739 that is accessible to the respective clusters on that matrix processing chip. As another example, in some embodiments, a matrix processing cluster may include its own matrix subroutine memory 1739. As yet another example, in some embodiments, a host computing system of a matrix processing architecture may include a matrix subroutine memory 1739 accessible to its associated matrix processing resources.

Moreover, matrix subroutine memory 1739 may be any component or mechanism capable of storing data, including any type or combination of volatile and/or non-volatile memory, such as random access memory (RAM) (e.g., dynamic random access memory (DRAM), synchronous dynamic random access memory (SDRAM), static random access memory (SRAM)), flash-based memory, read only memory (ROM), logic blocks of a field programmable gate array (FPGA), erasable programmable read only memory (EPROM), electrically erasable programmable ROM (EEPROM), and/or any suitable combination of the foregoing.

As an example, in some embodiments, matrix subroutine memory 1739 could be implemented using random access memory (e.g., SRAM) on a matrix processing chip. In these embodiments, for example, matrix subroutines could be loaded on matrix subroutine memory 1739 by a host computing system. For example, a host computing system could transfer the matrix subroutines to a matrix processing chip via an interconnect interface (e.g., a PCIe interface), and the matrix processing chip could then store the matrix subroutines on its associated matrix subroutine memory 1739. In some embodiments, a software driver of the host computing system could be used to load the matrix subroutines. Moreover, in some embodiments, any existing matrix subroutines could be loaded on matrix subroutine memory 1739 during system startup, while any additional matrix subroutines could be subsequently loaded after system startup, as appropriate.

In the illustrated example, matrix processing engine 1700 performs multiple matrix operations 1701 and 1702 in parallel. For example, as noted above, in some embodiments matrix processing engine 1700 may be implemented on a particular matrix processing cluster, and the particular matrix processing cluster may include multiple MPUs 1734. In the illustrated example, matrix processing engine 1700 is implemented on a cluster with two MPUs 1734a-b. Accordingly, matrix processing engine 1700 can perform two matrix operations 1701 and 1702 in parallel using the respective MPUs 1734. The illustrated example shows the control flow of matrix processing engine 1700 for both the 1st matrix operation 1701 and the 2nd matrix operation 1702.

In the illustrated example, the control flow for the 1st matrix operation 1701 begins with the read engine 1735 of matrix processing engine 1700. Read engine 1735 may first retrieve matrix data (e.g., matrix data associated with the operands of matrix operation 1701) from a corresponding HBM module 1740a of a matrix processing chip, and read engine 1735 may then store that matrix data in certain MRBs 1738a of the particular cluster associated with read engine 1735. For example, as noted above, HBM module 1740a may be a high bandwidth memory module on a particular matrix processing chip (e.g., memory shared by the matrix processing clusters of the particular matrix processing chip), and MRBs 1738 may be local memory resource blocks on a particular matrix processing cluster. Moreover, in some embodiments, read engine 1735 may use the master control CPU (MCC) 1732 on its respective cluster for storing and retrieving data on HBMs 1740 and MRBs 1738.

Slice engine 1736a may then "slice" the matrix data stored in MRBs 1738a to extract the particular matrix operands associated with matrix operation 1701. For example, in some cases, the associated matrix operands may only include a subset of the matrix data stored in MRBs

1738a, and/or the matrix operands may not be arranged contiguously in the matrix data stored in MRBs 1738a. Accordingly, slice engine 1736a may extract particular "slices" or pieces of the matrix data stored in MRBs 1738a, and may then arrange the slices to form the respective matrix operands. For example, in the illustrated example, matrix operation 1701 is associated with a convolution operation, and accordingly, slice engine 1736a is used to extract a sliced matrix operand and filter from the matrix data stored in MRBs 1738a. The sliced matrix operand and filter are then stored in MRBs 1738b and 1738c, respectively. In some cases, the particular slicing approach used by slice engine 1736a may depend on various factors, including the type of matrix operation 1701, the number of available processing resources, the size of the operands, and so forth. Moreover, in some embodiments, the particular slicing performed by slice engine 1736a for a particular operation may be programmed and/or defined using a set of instructions supported by slice engine 1736a.

Output engine 1737 may then be used to compute a result for the particular matrix operation 1701. For example, output engine 1737 may perform the appropriate matrix operation 1701 using the matrix operands generated by slice engine 1736a (e.g., the matrix operands stored in MRBs 1738b and 1738c). For example, in some embodiments, output engine 1737 may first identify an associated matrix subroutine corresponding to the particular matrix operation 1701, and output engine 1737 may then obtain that matrix subroutine from matrix subroutine memory 1739. In some embodiments, output engine 1737 may use the master control CPU (MCC) 1732 on its respective cluster to retrieve matrix subroutines from matrix subroutine memory 1739.

Output engine 1737 may then specify or supply certain information or fields used by the matrix subroutine, if appropriate. For example, in some embodiments, certain information and/or fields of a matrix subroutine may be incomplete or unspecified, such as the size and/or location of the particular operands for the matrix subroutine. Accordingly, in some embodiments, output engine 1737 may use MCC 1732 to specify or supply any remaining information and/or fields for the particular matrix subroutine (e.g., the size and/or location of matrix operands).

Output engine 1737 may then execute the particular matrix subroutine. For example, output engine 1737 may use MCC 1732 and/or MPU 1734a to execute the programmed instructions associated with the particular matrix subroutine. MCC 1732, for example, may be used to perform certain tasks specified by the instructions, such as reading and writing data, communicating with other resources, and so forth. MPU 1734a, for example, may be used to perform particular arithmetic operations specified by the instructions. Moreover, in some cases, a particular matrix subroutine may be repeatedly executed or looped until the particular operation has been performed or completed for all requisite data (e.g., all data of a particular matrix operand).

Output engine 1737 may then store the output or result of the matrix subroutine in certain MRB(s) 1738d of the cluster used to execute the matrix subroutine. In some cases, output engine 1737 may then provide the output stored in MRBs 1738d to another component of the matrix processing architecture. For example, in some cases, a matrix operation 1701 may be a partial matrix operation associated with a larger matrix operation distributed across multiple processing resources, and thus the output of matrix operation 1701 may be a partial result associated with the larger distributed operation. Moreover, the output of partial matrix operation 1701 may be needed by other processing resource(s)

involved in the distributed matrix operation. Accordingly, output engine 1737 may provide the output of partial matrix operation 1701 to the appropriate resource, for example, for further processing and/or storage. In some cases, the appropriate resource may vary based on the circumstances, including the type of matrix operation being performed, the implementation of the associated matrix subroutine(s), the number and availability of processing resources, and so forth. For example, in some cases, the particular processing and/or destination of the output of a matrix operation may be programmed or defined by the associated matrix subroutine. Moreover, in some embodiments, output engine 1737 may use the master control CPU (MCC) 1732 on its respective cluster in order to provide the output of partial matrix operation 1701 to the appropriate destination.

In some cases, for example, output engine 1737 may provide the output of partial matrix operation 1701 (e.g., the output stored in MRBs 1738*d*) to a particular destination used to store the partial results of a distributed matrix operation. For example, for a distributed matrix operation, the respective partial results determined by each processing resource may be consolidated on a particular memory component, such as a particular HBM 1740*b* of a matrix processing chip. For example, in some cases, the respective partial results determined by each cluster of a matrix processing chip may be consolidated on a particular HBM 1740*b* of the matrix processing chip. Moreover, the partial results may be stored on an HBM 1740*b* using a particular arrangement that collectively forms the complete result of the matrix operation.

As another example, in some cases output engine 1737 may feed the output of partial matrix operation 1701 (e.g., the output stored in MRBs 1738*d*) back to MPU 1734*a*, for example, to enable MPU 1734*a* to use that output as an operand in a subsequent partial operation. In some cases, for example, the output of a partial operation in one stage of a distributed matrix operation may be used as an input or operand for a partial operation in another stage of the distributed matrix operation.

As another example, in some cases output engine 1737 may provide the output of partial matrix operation 1701 (e.g., the output stored in MRBs 1738*d*) to another matrix processing resource, such as another matrix processing cluster on the same matrix processing chip, or another matrix processing chip altogether. For example, in some cases, a distributed matrix operation may be distributed across multiple clusters of a matrix processing chip, and/or across multiple matrix processing chips. Moreover, in some cases, the output of a partial operation performed by a particular matrix processing resource may be used as an operand in another partial operation performed by a different processing resource.

In the illustrated example, the 2nd matrix operation 1702 may be executed in parallel with the 1st matrix operation 1701. Moreover, the control flow for the 2nd matrix operation 1702 may be similar to the control flow described above for the 1st matrix operation 1701. The 2nd matrix operation 1702, however, may be a different matrix operation (e.g., performed using a different matrix subroutine), with different matrix operands and results, using different memory locations of HBMs 1740 and/or MRBs 1738, and executed using a different MPU 1734*b* and associated slicing engine 1736*b*.

Figure 36:
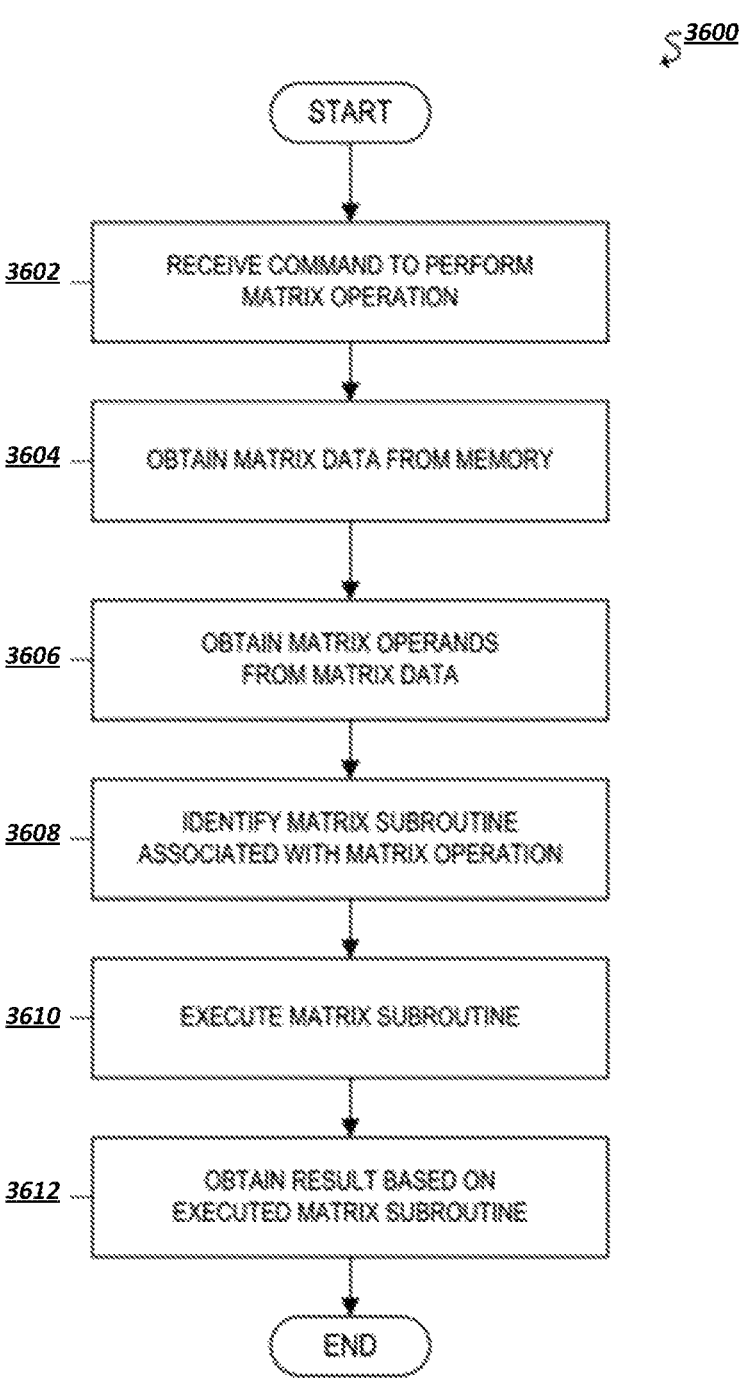
FIG. 36 illustrates a flowchart for an example embodiment of programmable matrix processing.

FIG. 36 illustrates a flowchart 3600 for an example embodiment of programmable matrix processing. Flowchart 3600 may be implemented, in some embodiments, by components described throughout this disclosure.

The flowchart may begin at block 3602 by receiving a command to perform a matrix operation. The matrix operation may comprise an operation on one or more matrix operands. For example, the matrix operation could include any matrix-based arithmetic operation, including element-wise matrix operations, matrix multiplication, convolutions, and/or any combination of such operations.

Moreover, in some embodiments, matrix operations may be used to implement computer vision artificial intelligence and machine learning capabilities in an artificial neural network. For example, in some embodiments, the matrix operation of block 3602 may be associated with operations in an artificial neural network, such as forward propagation, backward propagation, and/or weight update operations.

The flowchart may then proceed to block 3604 to obtain matrix data from memory. The matrix data, for example, may be associated with one or more matrix operands of the matrix operation. In some embodiments, the matrix data may be obtained from multi-dimensional memory. Multi-dimensional memory, for example, may be a memory component designed to efficiently store and retrieve matrix data in multiple dimensions (e.g., two-dimensions). In some embodiments, the matrix data may be obtained by executing one or more instructions to obtain the matrix data from one or more memory locations of the multi-dimensional memory.

The flowchart may then proceed to block 3606 to obtain matrix operands from the matrix data. In some embodiments, for example, the matrix operands may be obtained by slicing the matrix data to extract the matrix operands from the matrix data. Moreover, in some embodiments, the matrix operands may be obtained by executing one or more instructions to slice or extract the matrix operands from the matrix data.

The flowchart may then proceed to block 3608 to identify a matrix subroutine associated with the matrix operation. A matrix subroutine, for example, may be a programmable subroutine for a matrix processor that is designed to perform a particular matrix operation when executed by the matrix processor. For example, a matrix subroutine may include a series of instructions and/or commands, supported by a particular matrix processor, and designed to perform a desired matrix operation when executed by the matrix processor. In some embodiments, for example, a matrix processor may be designed to support a set of instructions and/or commands for performing various fundamental matrix operations. For example, a matrix processor may include instructions and/or commands for identifying memory locations of matrix operands, obtaining matrix operands from memory, and/or performing particular arithmetic operations or computations on the matrix operands, among other examples. In this manner, the fundamental instructions and/or commands supported by the matrix processor can be used to program matrix subroutines for more complex matrix operations.

In some embodiments, a matrix subroutine memory may be used to store matrix subroutines, and the matrix subroutines may be retrieved from the matrix subroutine memory as needed. For example, in order to perform a desired matrix operation, a corresponding matrix subroutine may first be obtained from the matrix subroutine memory. In some cases, however, a particular matrix subroutine may not yet be stored on the matrix subroutine memory. Accordingly, the particular matrix subroutine may need to be loaded on the matrix subroutine memory. Thus, in some cases, a particular matrix subroutine may first be obtained from a host computing system, and may then be stored on the matrix subroutine memory.

The flowchart may then proceed to block 3610 to execute the matrix subroutine. In some embodiments, for example, the matrix subroutine may be executed on a matrix processor using the one or more matrix operands. The flowchart may then proceed to block 3612 to obtain a result of the matrix operation based on the matrix subroutine executed by the matrix processor. For example, in some cases, the particular matrix subroutine may return a result determined by the series of instructions and/or commands executed by the matrix processor.

At this point, the flowchart may be complete. In some embodiments, however, the flowchart may restart and/or certain blocks may be repeated. For example, in some embodiments, the flowchart may restart at block 3602 to continue receiving and processing commands to perform matrix operations.

Figure 37:
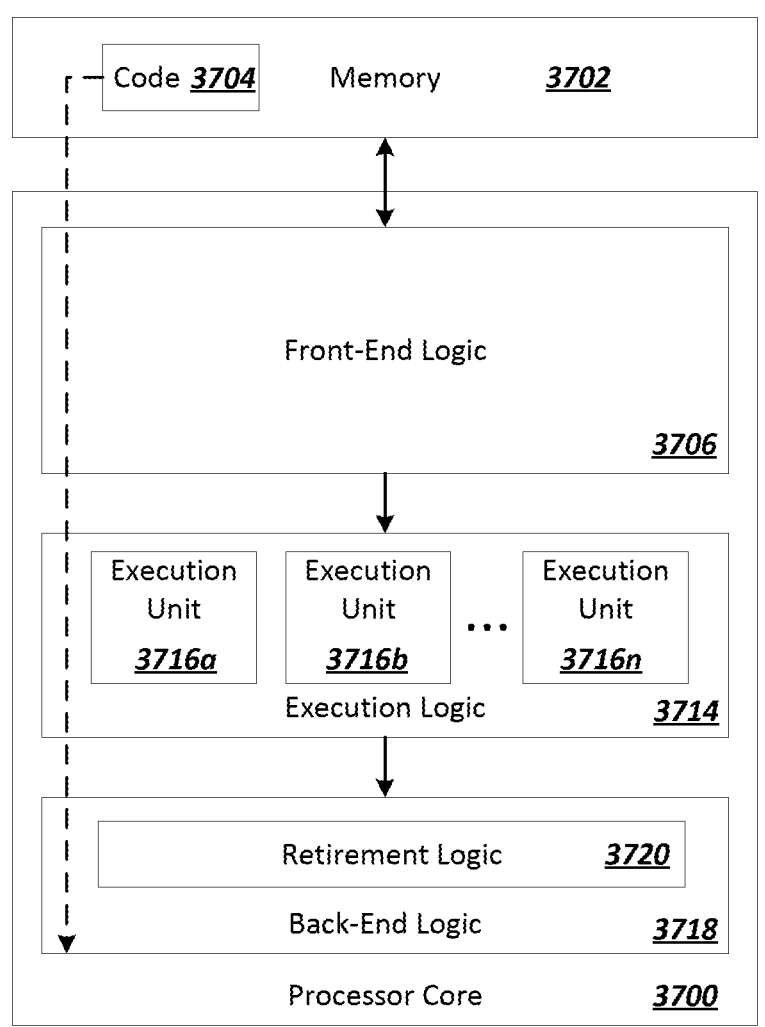
FIG. 37 is a block diagram of an exemplary processor in accordance with one embodiment.
Figure 38:
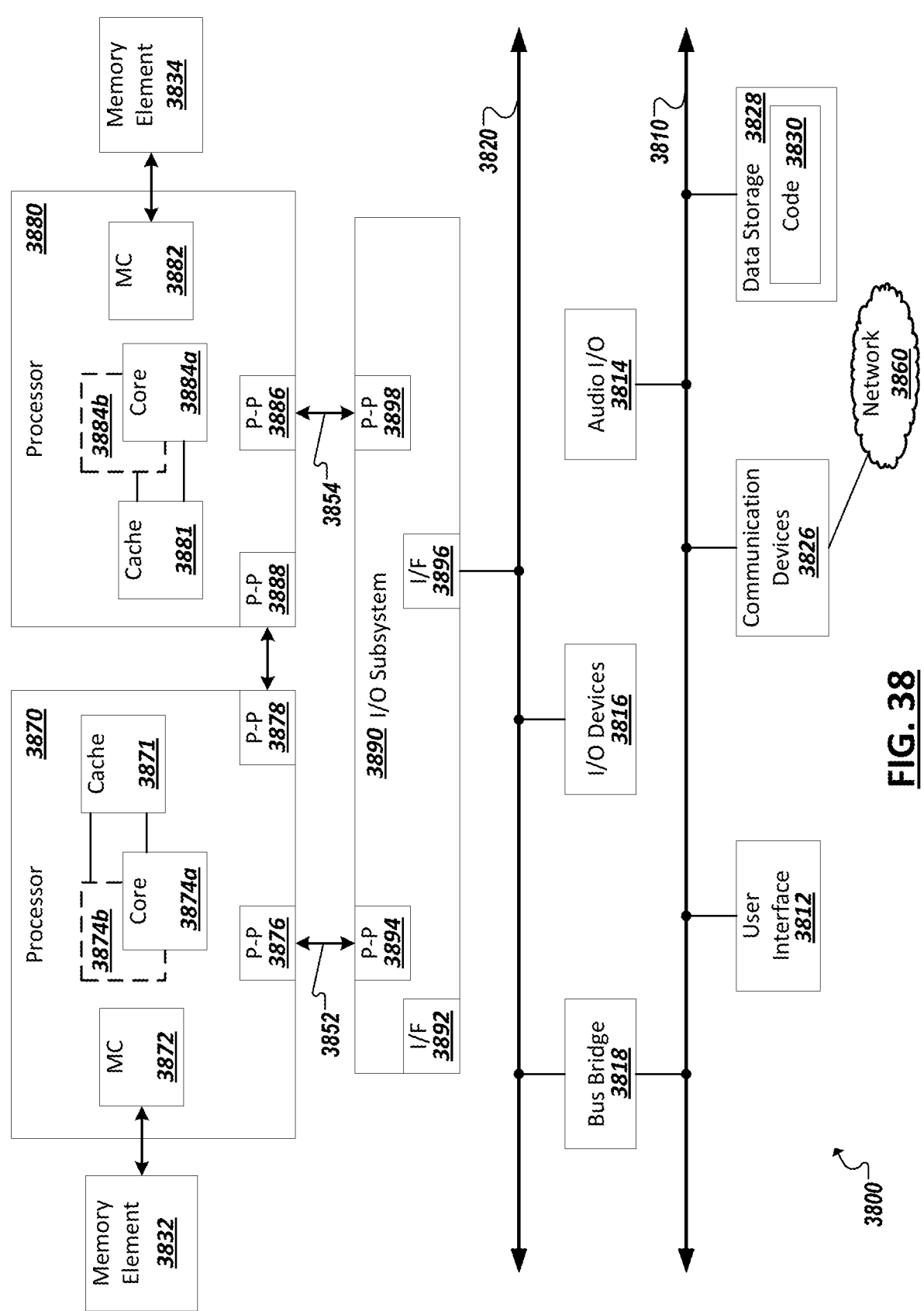
FIG. 38 is a block diagram of an exemplary computing system in accordance with one embodiment.

FIGS. 37-38 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 37-38.

FIG. 37 is an example illustration of a processor according to an embodiment. The processor 3700 may implement a host processor to interface with an example deep learning (or other matrix processing) device (such as discussed in the examples above). Processor 3700 is an example of a type of hardware device that can be used in connection with the implementations above. Processor 3700 may be any type of processor, such as a microprocessor, an embedded processor, a digital signal processor (DSP), a network processor, a multi-core processor, a single core processor, or other device to execute code. Although only one processor 3700 is illustrated in FIG. 37, a processing element may alternatively include more than one of processor 3700 illustrated in FIG. 37. Processor 3700 may be a single-threaded core or, for at least one embodiment, the processor 3700 may be multi-threaded in that it may include more than one hardware thread context (or "logical processor") per core.

FIG. 37 also illustrates a memory 3702 coupled to processor 3700 in accordance with an embodiment. Memory 3702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 3700 can execute any type of instructions associated with algorithms, processes, or operations detailed herein. Generally, processor 3700 can transform an element or an article (e.g., data) from one state or thing to another state or thing.

Code 3704, which may be one or more instructions to be executed by processor 3700, may be stored in memory 3702, or may be stored in software, hardware, firmware, or any suitable combination thereof, or in any other internal or external component, device, element, or object where appropriate and based on particular needs. In one example, processor 3700 can follow a program sequence of instructions indicated by code 3704. Each instruction enters a front-end logic 3706 and is processed by one or more decoders. The decoder may generate, as its output, a micro operation such as a fixed width micro operation in a predefined format, or may generate other instructions, micro-instructions, or control signals that reflect the original code instruction. Front-end logic 3706 also includes register renaming logic 3710 and scheduling logic 3712, which generally allocate resources and queue the operation corresponding to the instruction for execution.

Processor 3700 can also include execution logic 3714 having a set of execution units 3716*a*, 3716*b*, 3716*n*, etc. Some embodiments may include a number of execution units dedicated to specific functions or sets of functions. Other embodiments may include only one execution unit or one execution unit that can perform a particular function. Execution logic 3714 performs the operations specified by code instructions.

After completion of execution of the operations specified by the code instructions, back-end logic 3718 can retire the instructions of code 3704. In one embodiment, processor 3700 allows out of order execution but requires in order retirement of instructions. Retirement logic 3720 may take a variety of known forms (e.g., re-order buffers or the like). In this manner, processor 3700 is transformed during execution of code 3704, at least in terms of the output generated by the decoder, hardware registers and tables utilized by register renaming logic, and any registers (not shown) modified by execution logic 3714.

Although not shown in FIG. 37, a processing element may include other elements on a chip with processor 3700. For example, a processing element may include memory control logic along with processor 3700. The processing element may include I/O control logic and/or may include I/O control logic integrated with memory control logic. The processing element may also include one or more caches. In some embodiments, non-volatile memory (such as flash memory or fuses) may also be included on the chip with processor 3700.

FIG. 38 illustrates a computing system 3800 that is arranged in a point-to-point (PtP) configuration according to an embodiment. In particular, FIG. 38 shows a system where processors, memory, and input/output devices are interconnected by a number of point-to-point interfaces. Generally, one or more of the computing systems described herein may be configured in the same or similar manner as computing system 3800.

Processors 3870 and 3880 may also each include integrated memory controller logic (MC) 3872 and 3882 to communicate with memory elements 3832 and 3834. In alternative embodiments, memory controller logic 3872 and 3882 may be discrete logic separate from processors 3870 and 3880. Memory elements 3832 and/or 3834 may store various data to be used by processors 3870 and 3880 in achieving operations and functionality outlined herein.

Processors 3870 and 3880 may be any type of processor, such as those discussed in connection with other figures. Processors 3870 and 3880 may exchange data via a point-to-point (PtP) interface using point-to-point interface circuits 3878 and 3888, respectively. Processors 3870 and 3880 may each exchange data with a chipset 3890 via individual point-to-point interfaces 3852 and 3854 using point-to-point interface circuits 3876, 3886, 3894, and 3898. Chipset 3890 may also exchange data with a high-performance graphics circuit via a high-performance graphics interface, using an interface circuit 3892, which could be a PtP interface circuit. In alternative embodiments, any or all of the PtP links illustrated in FIG. 38 could be implemented as a multi-drop bus rather than a PtP link.

Chipset 3890 may be in communication with a bus 3820 via an interface circuit 3896. Bus 3820 may have one or more devices that communicate over it, such as a bus bridge 3818 and I/O devices 3816. Via a bus 3810, bus bridge 3818 may be in communication with other devices such as a user interface 3812 (such as a keyboard, mouse, touchscreen, or other input devices), communication devices 3826 (such as modems, network interface devices, or other types of communication devices that may communicate through a computer network 3860), audio I/O devices 3814, and/or a data storage device 3828. Data storage device 3828 may store code 3830, which may be executed by processors 3870 and/or 3880. In alternative embodiments, any portions of the bus architectures could be implemented with one or more PtP links.

The computer system depicted in FIG. 38 is a schematic illustration of an embodiment of a computing system that may be utilized to implement various embodiments discussed herein. It will be appreciated that various components of the system depicted in FIG. 38 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is an apparatus including: a network of matrix processing units (MPUs), where each MPU is connected to at least one other MPU in the network, and each MPU is to perform matrix multiplication operations; a memory to store tensor data; and a master control central processing unit (MCC). The MCC may receive an instruction from a host device, where the instruction includes one or more tensor operands based on the tensor data, invoke a set of operations on one or more of the MPUs based on the instruction, where the set of operations includes operations on the tensor operands, and output a result of the set of operations, where the result includes a tensor value.

Example 2 may include the subject matter of example 1, where the MCC is further to provide the result for storage in memory, where the result is stored as a tensor value in memory.

Example 3 may include the subject matter of any one of examples 1-2, where the MCC provides the result for the host device, and the host device includes a host processor connected to the apparatus.

Example 4 may include the subject matter of any one of examples 1-3, where the network of MPUs includes a plurality of MPUs, and the MCC is to select a subset of the plurality of MPUs to perform the set of operations.

Example 5 may include the subject matter of example 4, where the subset of MPUs includes two or more of the MPUs.

Example 6 may include the subject matter of any one of examples 1-5, where the instruction includes a stream of instructions and the MCC is to coordinate data flow and a sequence of operations to be performed by the network of MPUs based on the stream of operations.

Example 7 may include the subject matter of example 6, where the sequence of operations includes a sequence of tensor arithmetic operations.

Example 8 may include the subject matter of example 7, where the sequence of tensor operations includes matrix-matrix operations.

Example 9 may include the subject matter of any one of examples 1-8, where the memory includes a memory resource block to be shared by two or more MPUs in the network of MPUs.

Example 10 may include the subject matter of example 9, where invoking the set of operations includes pointing one or more of the MPUs to the memory resource block to access the tensor data.

Example 11 may include the subject matter of example 10, where the set of operations include at least one of a row/column broadcast, block shifting, matrix copy, matrix transpose, and matrix expansion.

Example 12 may include the subject matter of any one of examples 9-11, where the memory includes a super memory block (SMB) to group a plurality of memory resource blocks, and two or more MPUs in the network of MPUs have read/write access to the plurality of memory resource blocks in the SMB.

Example 13 may include the subject matter of any one of examples 1-12, further including a convolutional slicing engine to: interface with the memory; read a set of rows from the memory; flatten two-dimension data in the set of rows to generate a flat version of the two-dimensional data; and provide the two-dimensional data to one or more MPUs in the network of MPUs for use in a convolution operation performed using the one or more MPUs.

Example 14 may include the subject matter of any one of examples 1-13, further including an on-chip router to route data multi-directionally between components of the apparatus.

Example 15 may include the subject matter of any one of examples 1-14, where the memory includes one or more barrel shifters to shift a matrix described in memory to target a read or write to a particular row or column of the matrix.

Example 16 may include the subject matter of any one of examples 1-15, where the set of operations includes a max pooling operation.

Example 17 may include the subject matter of any one of examples 1-16, where the set of operations includes performing a Winograd transformation on the operands and performing a matrix multiplication on the operands transformed by the Winograd transformation.

Example 18 may include the subject matter of any one of examples 1-17, where the tensor operand includes a matrix and invoking the set of operations includes partitioning the matrix and distributing the partitioned matrix to a plurality of MPUs in the network of MPUs to perform one or more of the set of operations on the partitioned matrix.

Example 19 may include the subject matter of any one of examples 1-18, where the tensor operands include a particular input matrix and the set of operations includes a matrix dimension shuffle operation to reorder a plurality of dimensions of the particular input matrix.

Example 20 may include the subject matter of any one of examples 1-19, where at least a particular MPU in the network of MPUs includes local memory to store a set of matrix subroutines, and the particular MPU is to: translate an operation received from the MCC into a subset of the matrix subroutines; and perform the operation through execution of the subset of the matrix subroutines.

Example 21 may include the subject matter of any one of examples 1-20, where the set of operations are used to implement one of a set of deep learning models, and the set of deep learning models includes a multilayer perceptron model, a restricted Boltzmann machine model, a deep belief network models, an auto-encoder model, and a convolutional neural network.

Example 22 is a method including: storing tensor data in memory, where the memory is accessible to a network of matrix processing units (MPUs); receiving an instruction from a host device, where the instruction includes one or more tensor operands based on the tensor data; and causing a set of operations to be performed by one or more of the MPUs based on the instruction, where the set of operations include operations on the tensor operands; and generating a result from performance of the set of operations, where the result includes a tensor value.

Example 23 may include the subject matter of example 22, further including providing the result for storage in memory, where the result is stored as a tensor value in memory.

Example 24 may include the subject matter of any one of examples 22-23, further including providing the result for the host device, and the host device includes a host processor connected to a device hosting the network of MPUs.

Example 25 may include the subject matter of any one of examples 22-24, where the network of MPUs includes a plurality of MPUs, and the method further includes selecting a subset of the plurality of MPUs to perform the set of operations.

Example 26 may include the subject matter of example 25, where the subset of MPUs includes two or more of the MPUs.

Example 27 may include the subject matter of any one of examples 22-26, where the instruction includes a stream of instructions and the method further includes coordinating data flow and a sequence of operations to be performed by the network of MPUs based on the stream of operations.

Example 28 may include the subject matter of example 27, where the sequence of operations includes a sequence of tensor arithmetic operations.

Example 29 may include the subject matter of example 28, where the sequence of tensor operations includes matrix-matrix operations.

Example 30 may include the subject matter of any one of examples 22-29, where the memory includes a memory resource block to be shared by two or more MPUs in the network of MPUs.

Example 31 may include the subject matter of example 30, where invoking the set of operations includes pointing one or more of the MPUs to the memory resource block to access the tensor data.

Example 32 may include the subject matter of example 31, where the set of operations include at least one of a row/column broadcast, block shifting, matrix copy, matrix transpose, and matrix expansion.

Example 33 may include the subject matter of any one of examples 30-32, where the memory includes a super memory block (SMB) to group a plurality of memory resource blocks, and two or more MPUs in the network of MPUs have read/write access to the plurality of memory resource blocks in the SMB.

Example 34 may include the subject matter of any one of examples 22-33, further including: interfacing with the memory; reading a set of rows from the memory; flattening two-dimension data in the set of rows to generate a flat version of the two-dimensional data; and providing the two-dimensional data to one or more MPUs in the network of MPUs for use in a convolution operation performed using the one or more MPUs.

Example 35 may include the subject matter of any one of examples 22-34, further including routing data multi-directionally between components of the apparatus.

Example 36 may include the subject matter of any one of examples 22-35, where the memory includes one or more barrel shifters to shift a matrix described in memory to target a read or write to a particular row or column of the matrix.

Example 37 may include the subject matter of any one of examples 22-36, where the set of operations includes a max pooling operation.

Example 38 may include the subject matter of any one of examples 22-37, where the set of operations includes performing a Winograd transformation on the operands and performing a matrix multiplication on the operands transformed by the Winograd transformation.

Example 39 may include the subject matter of any one of examples 22-38, where the tensor operand includes a matrix and invoking the set of operations includes partitioning the matrix and distributing the partitioned matrix to a plurality of MPUs in the network of MPUs to perform one or more of the set of operations on the partitioned matrix.

Example 40 may include the subject matter of any one of examples 22-39, where the tensor operands include a particular input matrix and the set of operations includes a matrix dimension shuffle operation to reorder a plurality of dimensions of the particular input matrix.

Example 41 may include the subject matter of any one of examples 22-40, where at least a particular MPU in the network of MPUs includes local memory to store a set of matrix subroutines, and the method further includes: translating an operation into a subset of the matrix subroutines; and performing the operation through execution of the subset of the matrix subroutines.

Example 42 may include the subject matter of any one of examples 22-41, where the set of operations are used to implement one of a set of deep learning models, and the set of deep learning models includes a multilayer perceptron model, a restricted Boltzmann machine model, a deep belief network models, an auto-encoder model, and a convolutional neural network.

Example 43 is a system including means to perform the method of any one of examples 22-42.

Example 44 is a system including: a deep learning processor including a port to connect to a host processor, a plurality of interconnected matrix processing units (MPUs), where each MPU includes circuitry to perform tensor arithmetic operations, a memory to store tensor data, and a master control central processing unit (MCC). The MCC may: receive an instruction from the host processor, where the instruction includes one or more tensor operands based on the tensor data; cause one or more of the MPUs to perform a set of operations based on the instruction, where the set of operations include operations on the tensor operands; and return a result of the set of operations to the host processor, where the result includes a tensor value connected to the host.

Example 45 may include the subject matter of example 44, further including the host processor.

Example 46 may include the subject matter of example 45, where the system includes a system on chip.

Example 47 may include the subject matter of example 45, where the system includes a server blade.

Example 48 may include the subject matter of any one of examples 44-47, where the memory includes a memory resource block to be shared by two or more of the plurality of MPUs.

Example 49 may include the subject matter of example 48, where the set of operations is to be performed by the two or more MPUs to perform a distributed matrix multiplication, and data used in the distributed matrix multiplication is not communicated between the two or more MPUs.

Example 50 may include the subject matter of any one of examples 44-49, where the tensor arithmetic operations enable a matric operational mode and convolutional operational mode.

Example 51 may include the subject matter of any one of examples 44-50, where the memory includes one or more barrel shifters to shift a matrix described in memory to target a read or write to a particular row or column of the matrix.

Example 52 may include the subject matter of any one of examples 44-51, where the set of operations includes a max pooling operation.

Example 53 may include the subject matter of any one of examples 44-52, where the set of operations includes performing a Winograd transformation on the operands and performing a matrix multiplication on the operands transformed by the Winograd transformation.

Example 54 may include the subject matter of any one of examples 44-53, where the tensor operand includes a matrix and invoking the set of operations includes partitioning the matrix and distributing the partitioned matrix to a plurality of MPUs in the network of MPUs to perform one or more of the set of operations on the partitioned matrix.

Example 55 may include the subject matter of any one of examples 44-54, where the tensor operands include a particular input matrix and the set of operations includes a matrix dimension shuffle operation to reorder a plurality of dimensions of the particular input matrix.

Example 56 may include the subject matter of any one of examples 44-55, where at least a particular MPU in the network of MPUs includes local memory to store a set of matrix subroutines, and the particular MPU is to: translate an operation received from the MCC into a subset of the matrix subroutines; and perform the operation through execution of the subset of the matrix subroutines.

Example 57 may include the subject matter of any one of examples 44-56, where the set of operations are used to implement one of a set of deep learning models, and the set of deep learning models includes a multilayer perceptron model, a restricted Boltzmann machine model, a deep belief network models, an auto-encoder model, and a convolutional neural network.

Any one of the examples above may additionally be used to implement the example apparatus and system and perform example methods as set forth below. An example apparatus may be provided that includes: a memory including a plurality of memory modules, where each memory module includes a plurality of storage locations; and a memory controller to write data of a matrix to the memory; where the memory controller is configured to write a particular row or a particular column of the matrix to the memory by: shifting a plurality of matrix elements of the particular row or the particular column; and writing the plurality of matrix elements to the plurality of memory modules.

In one example embodiment of an apparatus, the memory controller further includes a barrel shifter to shift the plurality of matrix elements. In one example embodiment of an apparatus, a number of shifts performed by the memory controller is based on a row number of the particular row or a column number of the particular column. In one example embodiment of an apparatus, the memory controller is further configured to write the plurality of matrix elements to the plurality of memory modules based on a shifted order of the plurality of matrix elements. In one example embodiment of an apparatus, the memory controller is further configured to write each of the plurality of matrix elements to a particular memory module of the plurality of memory modules. In one example embodiment of an apparatus, the memory controller is further configured to write the particular row of the matrix using a same storage location within each of the plurality of memory modules. In one example embodiment of an apparatus, the memory controller is further configured to write the particular column of the matrix using a different storage location within each of the plurality of memory modules. In one example embodiment of an apparatus, each memory module is configured to access a particular storage location during a particular clock cycle. In one example embodiment of an apparatus, each memory module further includes: a read port to read from a first storage location during a particular clock cycle; and a write port to write to a second storage location during the particular clock cycle. In one example embodiment of an apparatus, the memory controller is further configured to read the particular row or the particular column of the matrix from the memory by: reading the plurality of matrix elements of the particular row or the particular column from the plurality of memory modules; and shifting the plurality of matrix elements into a correct order. In one example embodiment of an apparatus, the memory controller is further configured to perform a transpose operation on the matrix. In one example embodiment of an apparatus, each of the plurality of storage locations are configured to store a particular number of matrix elements. In one example embodiment of an apparatus, each of the plurality of storage locations are further configured to store an error correction code.

An example method may include: writing a particular row or a particular column of a matrix to a memory, where writing the particular row or the particular column to the memory includes: shifting a plurality of matrix elements of the particular row or the particular column; and writing the plurality of matrix elements to a plurality of memory modules of the memory.

In one example embodiment of a method, the plurality of matrix elements is shifted using a barrel shifter. In one example embodiment of a method, shifting the plurality of matrix elements includes performing a particular number of shifts based on a row number of the particular row or a column number of the particular column. In one example embodiment of a method, the method further includes writing the plurality of matrix elements to the plurality of memory modules based on a shifted order of the plurality of matrix elements. In one example embodiment of a method, the method further includes writing the particular row of the matrix using a same storage location within each of the plurality of memory modules. In one example embodiment of a method, the method further includes writing the particular column of the matrix using a different storage location within each of the plurality of memory modules. In one example embodiment of a method, the method further includes reading the particular row or the particular column of the matrix from the memory, where reading the particular row or the particular column from the memory includes: reading the plurality of matrix elements of the particular row or the particular column from the plurality of memory modules; and shifting the plurality of matrix elements into a correct order. In one example embodiment of a method, the method further includes performing a transpose operation on the matrix.

An example system may include: a plurality of processing elements to perform a matrix operation, including: a host processor; and one or more matrix processors; a memory to store matrix data, including: a plurality of memory modules, where each memory module includes a plurality of storage locations; and a memory controller to write a particular row or a particular column of a matrix to the memory, where the memory controller is configured to: shift a plurality of matrix elements of the particular row or the particular column; and write the plurality of matrix elements to the plurality of memory modules. In one example embodiment of a system, the memory controller further includes a barrel shifter to shift the plurality of matrix elements.

An example machine accessible storage medium may have instructions stored thereon, where the instructions, when executed on a machine, cause the machine to: write a particular row or a particular column of a matrix to a memory, where the instructions that cause the machine to write the particular row or the particular column to the memory cause the machine to: shift a plurality of matrix elements of the particular row or the particular column; and write the plurality of matrix elements to a plurality of memory modules of the memory. In one example embodiment of a storage medium, the instructions further cause the machine to perform a particular number of shifts based on a row number of the particular row or a column number of the particular column.

Another example apparatus may include: a multi-dimensional memory; a plurality of processing elements to perform a matrix operation, where the matrix operation includes a max pooling operation on one or more matrix operands, and where the plurality of processing elements includes one or more matrix processors; where the plurality of processing elements is configured to: obtain matrix data from the multi-dimensional memory, where the matrix data is associated with the one or more matrix operands; obtain the one or more matrix operands from the matrix data; perform the max pooling operation using the one or more matrix operands; and obtain a result of the max pooling operation.

In one example embodiment of an apparatus, the max pooling operation includes an operation to reduce a size of a matrix operand. In one example embodiment of an apparatus, the max pooling operation includes a forward pooling operation. In one example embodiment of an apparatus, the max pooling operation includes a backward pooling operation. In one example embodiment of an apparatus, the backward pooling operation includes an operation to create a reconstructed matrix by partially reconstructing an original matrix using a max value matrix. In one example embodiment of an apparatus, the plurality of processing elements is further configured to: obtain a max value entry from the max value matrix; create a partial matrix based on the max value entry, where the partial matrix includes a portion of the reconstructed matrix; determine that one or more elements of the partial matrix will not be modified; and write the one or more elements of the partial matrix to memory. In one example embodiment of an apparatus, the max value entry includes a maximum value and an index. In one example embodiment of an apparatus, the apparatus further includes a FIFO memory to store one or more elements of the reconstructed matrix. In one example embodiment of an apparatus, the FIFO memory includes one or more status bits to track whether one or more entries in the FIFO memory have been modified. In one example embodiment of an apparatus, the max value matrix is an output of a forward pooling operation. In one example embodiment of an apparatus, the max value matrix includes one or more value-index pairs, where the one or more value-index pairs each include a maximum value and an index. In one example embodiment of an apparatus, the max pooling operation is associated with a forward propagation operation in a neural network. In one example embodiment of an apparatus, the max pooling operation is associated with a backward propagation operation in a neural network.

Another example method may include: performing a matrix operation, where the matrix operation includes a max pooling operation on one or more matrix operands, where performing the matrix operation includes: obtaining matrix data from a multi-dimensional memory, where the matrix data is associated with the one or more matrix operands; obtaining the one or more matrix operands from the matrix data; performing the max pooling operation using the one or more matrix operands; and obtaining a result of the max pooling operation.

In one example embodiment of a method, the max pooling operation includes a forward pooling operation to reduce a size of a matrix operand. In one example embodiment of a method, the max pooling operation includes a backward pooling operation; and the backward pooling operation includes an operation to create a reconstructed matrix by partially reconstructing an original matrix using a max value matrix. In one example embodiment of a method, the method further includes: obtaining a max value entry from the max value matrix; creating a partial matrix based on the max value entry, where the partial matrix includes a portion of the reconstructed matrix; determining that one or more elements of the partial matrix will not be modified; and writing the one or more elements of the partial matrix to memory. In one example embodiment of a method, the max value entry includes a maximum value and an index. In one example embodiment of a method, the method further includes storing one or more elements of the reconstructed matrix in a FIFO memory. In one example embodiment of a method, the FIFO memory includes one or more status bits to track whether one or more entries in the FIFO memory have been modified. In one example embodiment of a method, the max value matrix is an output of a forward pooling operation.

Another example system may include: a plurality of memory elements, where the plurality of memory elements includes a multi-dimensional memory; and a plurality of processing elements to perform a matrix operation, where the matrix operation includes a max pooling operation on one or more matrix operands, where the plurality of processing elements includes: a host processor; one or more matrix processing chips; and a plurality of matrix processors associated with the one or more matrix processing chips; where the plurality of processing elements is configured to: obtain matrix data from the multi-dimensional memory, where the matrix data is associated with the one or more matrix operands; obtain the one or more matrix operands from the matrix data; perform the max pooling operation using the one or more matrix operands; and obtain a result of the max pooling operation. In one example embodiment of a system, the system further includes a communication interface to communicate with one or more remote matrix processing chips over a communication network.

Another example machine accessible storage medium may have instructions stored thereon, where the instructions, when executed on a machine, cause the machine to: perform a matrix operation, where the matrix operation includes a max pooling operation on one or more matrix operands, and where the instructions that cause the machine to perform the matrix operation further cause the machine to: obtain matrix data from a multi-dimensional memory, where the matrix data is associated with the one or more matrix operands; obtain the one or more matrix operands from the matrix data; perform the max pooling operation using the one or more matrix operands; and obtain a result of the max pooling operation. In one example embodiment of a storage medium: the max pooling operation includes a backward pooling operation; and the backward pooling operation includes an operation to create a reconstructed matrix by partially reconstructing an original matrix using a max value matrix.

Another example apparatus may include: a multi-dimensional memory; and a plurality of processing elements to perform a matrix operation, where the plurality of processing elements includes one or more matrix processors, and where the matrix operation includes a matrix multiplication operation on a plurality of matrix operands; where the plurality of processing elements is configured to: obtain matrix data from the multi-dimensional memory, where the matrix data is associated with the plurality of matrix operands; obtain the plurality of matrix operands from the matrix data, where the plurality of matrix operands includes a first matrix operand and a second matrix operand; perform a first transform on the first matrix operand to obtain a transformed matrix operand, where performing matrix multiplication using the transformed matrix operand is faster than performing matrix multiplication using the first matrix operand; perform matrix multiplication on the transformed matrix operand to obtain a partial result; and perform a second transform on the partial result to obtain a result of the matrix multiplication operation.

In one example embodiment of an apparatus, the first transform is a Winograd input transform. In one example embodiment of an apparatus, the second transform is a Winograd output transform. In one example embodiment of an apparatus, the apparatus further includes a transform subroutine memory, where the transform subroutine memory includes one or more transform subroutines associated with one or more transform operations. In one example embodiment of an apparatus, the plurality of processing elements is further configured to: obtain a first transform subroutine from the transform subroutine memory, where the first transform subroutine is associated with the first transform; and perform the first transform by executing the first transform subroutine. In one example embodiment of an apparatus, the plurality of processing elements is further configured to: obtain a second transform subroutine from the transform subroutine memory, where the second transform subroutine is associated with the second transform; and perform the second transform by executing the second transform subroutine. In one example embodiment of an apparatus, the matrix data is associated with an image and a filter for a convolution operation. In one example embodiment of an apparatus, the matrix data is associated with a plurality of filters for a plurality of convolution operations on the image. In one example embodiment of an apparatus, the matrix data associated with the plurality of filters is interleaved in the multi-dimensional memory. In one example embodiment of an apparatus, the plurality of processing elements is further configured to perform a plurality of matrix multiplication operations using the matrix data associated with the image and the matrix data associated with the plurality of filters, where the plurality of matrix multiplication operations multiply the matrix data associated with the image with the matrix data associated with each filter. In one example embodiment of an apparatus, the plurality of processing elements is further configured to slice the matrix data to extract the plurality of matrix operands. In one example embodiment of an apparatus, the matrix operation is associated with a forward propagation operation in a neural network. In one example embodiment of an apparatus, the matrix operation is associated with a backward propagation operation in a neural network.

Another example method may include: performing a matrix operation, where the matrix operation includes a matrix multiplication operation on a plurality of matrix operands, and where performing the matrix operation includes: obtaining matrix data from a multi-dimensional memory, where the matrix data is associated with the plurality of matrix operands; obtaining the plurality of matrix operands from the matrix data, where the plurality of matrix operands includes a first matrix operand and a second matrix operand; performing a first transform on the first matrix operand to obtain a transformed matrix operand, where performing matrix multiplication using the transformed matrix operand is faster than performing matrix multiplication using the first matrix operand; performing matrix multiplication on the transformed matrix operand to obtain a partial result; and performing a second transform on the partial result to obtain a result of the matrix multiplication operation.

In one example embodiment of a method: the first transform is a Winograd input transform; and the second transform is a Winograd output transform. In one example embodiment of a method, the method further includes storing one or more transform subroutines in a transform subroutine memory, where the one or more transform subroutines are associated with one or more transform operations. In one example embodiment of a method, the method further includes: obtaining a first transform subroutine from the transform subroutine memory, where the first transform subroutine is associated with the first transform; performing the first transform by executing the first transform subroutine; obtaining a second transform subroutine from the transform subroutine memory, where the second transform subroutine is associated with the second transform; and performing the second transform by executing the second transform subroutine. In one example embodiment of a method, the matrix data is associated with an image and a plurality of filters for a plurality of convolution operations. In one example embodiment of a method, the matrix data associated with the plurality of filters is interleaved in the multi-dimensional memory. In one example embodiment of a method, the method further includes performing a plurality of matrix multiplication operations using the matrix data associated with the image and the matrix data associated with the plurality of filters, where the plurality of matrix multiplication operations multiply the matrix data associated with the image with the matrix data associated with each filter. In one example embodiment of a method, the method further includes slicing the matrix data to extract the plurality of matrix operands.

Another example system may include: a plurality of memory elements, where the plurality of memory elements includes a multi-dimensional memory; a plurality of processing elements to perform a matrix operation, where the matrix operation includes a matrix multiplication operation on a plurality of matrix operands; where the plurality of processing elements includes: a host processor; one or more matrix processing chips; and a plurality of matrix processors associated with the one or more matrix processing chips; where the plurality of processing elements is configured to: obtain matrix data from the multi-dimensional memory, where the matrix data is associated with the plurality of matrix operands; obtain the plurality of matrix operands from the matrix data, where the plurality of matrix operands includes a first matrix operand and a second matrix operand; perform a first transform on the first matrix operand to obtain a transformed matrix operand, where performing matrix multiplication using the transformed matrix operand is faster than performing matrix multiplication using the first matrix operand; perform matrix multiplication on the transformed matrix operand to obtain a partial result; and perform a second transform on the partial result to obtain a result of the matrix multiplication operation. In one example embodiment of a system, the system further includes a communication interface to communicate with one or more remote matrix processing chips over a communication network.

Another example machine accessible storage medium may have instructions stored thereon, where the instructions, when executed on a machine, cause the machine to: perform a matrix operation, where the matrix operation includes a matrix multiplication operation on a plurality of matrix operands, and where the instructions that cause the machine to perform the matrix operation cause the machine to: obtain matrix data from a multi-dimensional memory, where the matrix data is associated with the plurality of matrix operands; obtain the plurality of matrix operands from the matrix data, where the plurality of matrix operands includes a first matrix operand and a second matrix operand; perform a first transform on the first matrix operand to obtain a transformed matrix operand, where performing matrix multiplication using the transformed matrix operand is faster than performing matrix multiplication using the first matrix operand; perform matrix multiplication on the transformed matrix operand to obtain a partial result; and perform a second transform on the partial result to obtain a result of the matrix multiplication operation. In one example embodiment of a storage medium, the instructions further cause the machine to: perform the first transform using a Winograd input transform; and perform the second transform using a Winograd output transform.

Another example apparatus may include: a plurality of memory elements to store matrix data; and a plurality of processing elements to perform a matrix operation associated with a plurality of input matrices, where the plurality of processing elements is configured to: partition the plurality of input matrices into a plurality of input partitions, where the plurality of input matrices is partitioned based on a number of available processing elements; distribute the plurality of input partitions among the plurality of processing elements, where each input partition is distributed to a particular processing element of the plurality of processing elements; perform a plurality of partial matrix operations using the plurality of processing elements; transmit partial matrix data between the plurality of processing elements while performing the plurality of partial matrix operations; and determine a result of the matrix operation based on the plurality of partial matrix operations.

In one example embodiment of an apparatus: the plurality of processing elements is configured in a hierarchical arrangement including a plurality of processing levels; and the plurality of processing elements is further configured to distribute the matrix operation across the plurality of processing levels. In one example embodiment of an apparatus, the plurality of processing elements is further configured to partition the plurality of input matrices based on a number of rows of the plurality of input matrices. In one example embodiment of an apparatus: the plurality of processing elements is configured in a cyclic arrangement such that each processing element is communicatively coupled to a plurality of neighbor processing elements; and the plurality of neighbor processing elements of each processing element includes a first neighbor processing element and a second neighbor processing element. In one example embodiment of an apparatus, the plurality of processing elements is further configured to: perform the plurality of partial matrix operations in a plurality of stages; and transmit a portion of the partial matrix data from each processing element to one or more of the neighbor processing elements while performing a particular stage of the partial matrix operations. In one example embodiment of an apparatus, the plurality of processing elements is further configured to transmit the portion of the partial matrix data from each processing element to the first neighbor processing element and the second neighbor processing element. In one example embodiment of an apparatus, the partial matrix data includes a partial input matrix, where the partial input matrix is to be used by a first processing element in a particular stage of the partial matrix operations, and where the partial input matrix is to be used by a second processing element in a subsequent stage of the partial matrix operations. In one example embodiment of an apparatus, the partial matrix data includes a partial result matrix determined by a first processing element in a particular stage of the partial matrix operations, and the partial result matrix is to be used by a second processing element in a subsequent stage of the partial matrix operations.

Another example method may include: performing a matrix operation associated with a plurality of input matrices, where performing the matrix operation includes: partitioning the plurality of input matrices into a plurality of input partitions, where the plurality of input matrices is partitioned based on a number of available processing elements; distributing the plurality of input partitions among a plurality of processing elements, where each input partition is distributed to a particular processing element of the plurality of processing elements; performing a plurality of partial matrix operations using the plurality of processing elements; transmitting partial matrix data between the plurality of processing elements while performing the plurality of partial matrix operations; and determining a result of the matrix operation based on the plurality of partial matrix operations.

In one example embodiment of a method, the matrix operation includes one or more matrix multiplication operations. In one example embodiment of a method: the plurality of processing elements is configured in a hierarchical arrangement including a plurality of processing levels; and the matrix operation is distributed across the plurality of processing levels. In one example embodiment of a method, the plurality of processing elements includes: a plurality of matrix processing chips; and a plurality of matrix processing clusters associated with each matrix processing chip. In one example embodiment of a method, the plurality of input matrices is further partitioned based on a number of rows of the plurality of input matrices. In one example embodiment of a method: the plurality of processing elements is configured in a cyclic arrangement such that each processing element is communicatively coupled to a plurality of neighbor processing elements; and the plurality of neighbor processing elements of each processing element includes a first neighbor processing element and a second neighbor processing element. In one example embodiment of a method, the plurality of partial matrix operations is performed in a plurality of stages, and each processing element transmits a portion of the partial matrix data to one or more of the neighbor processing elements while performing a particular stage of the partial matrix operations. In one example embodiment of a method, the portion of the partial matrix data is transmitted from each processing element to the first neighbor processing element and the second neighbor processing element. In one example embodiment of a method, the partial matrix data includes a partial input matrix, where the partial input matrix is used by a first processing element in a particular stage of the partial matrix operations, and where the partial input matrix is used by a second processing element in a subsequent stage of the partial matrix operations. In one example embodiment of a method, the matrix operation is associated with a forward propagation operation in a neural network. In one example embodiment of a method, the matrix operation is associated with a weight update operation in a neural network. In one example embodiment of a method, the partial matrix data includes a partial result matrix determined by a first processing element in a particular stage of the partial matrix operations, and the partial result matrix is used by a second processing element in a subsequent stage of the partial matrix operations. In one example embodiment of a method, the matrix operation is associated with a backward propagation operation in a neural network.

Another example system may include: a plurality of memory elements to store matrix data; a plurality of processing elements to perform a matrix operation associated with a plurality of input matrices, where the plurality of processing elements includes: a host processor; one or more matrix processing chips; a plurality of matrix processors associated with the one or more matrix processing chips;

where the plurality of processing elements is configured to: partition the plurality of input matrices into a plurality of input partitions, where the plurality of input matrices is partitioned based on a number of available processing elements; distribute the plurality of input partitions among the plurality of processing elements, where each input partition is distributed to a particular processing element of the plurality of processing elements; perform a plurality of partial matrix operations using the plurality of processing elements; transmit partial matrix data between the plurality of processing elements while performing the plurality of partial matrix operations; and determine a result of the matrix operation based on the plurality of partial matrix operations. In one example embodiment of a system, the system further includes a communication interface to communicate with one or more remote matrix processing chips over a communication network.

Another example machine accessible storage medium may have instructions stored thereon, where the instructions, when executed on a machine, cause the machine to: perform a matrix operation associated with a plurality of input matrices, where the instructions that cause the machine to perform the matrix operation further cause the machine to: partition the plurality of input matrices into a plurality of input partitions, where the plurality of input matrices is partitioned based on a number of available processing elements; distribute the plurality of input partitions among a plurality of processing elements, where each input partition is distributed to a particular processing element of the plurality of processing elements; perform a plurality of partial matrix operations using the plurality of processing elements; transmit partial matrix data between the plurality of processing elements while performing the plurality of partial matrix operations; and determine a result of the matrix operation based on the plurality of partial matrix operations. In one example embodiment of the storage medium, the instructions further cause the machine to: perform the plurality of partial matrix operations in a plurality of stages; and transmit a portion of the partial matrix data from each processing element to one or more neighbor processing elements while performing a particular stage of the partial matrix operations.

An another example apparatus may include: a plurality of memory elements to store matrix data; and a plurality of processing elements to perform a matrix operation using a plurality of input matrices, where the matrix operation is associated with one or more convolution operations; where the plurality of processing elements is configured to: partition the plurality of input matrices into a plurality of input partitions, where the plurality of input matrices is partitioned based on a number of available processing elements; distribute the plurality of input partitions among the plurality of processing elements, where each input partition is distributed to a particular processing element of the plurality of processing elements; perform a plurality of partial matrix operations using the plurality of processing elements; transmit partial matrix data between the plurality of processing elements while performing the plurality of partial matrix operations; and determine a result of the matrix operation based on the plurality of partial matrix operations.

In one example embodiment of an apparatus: the plurality of processing elements is configured in a hierarchical arrangement including a plurality of processing levels; and the plurality of processing elements is further configured to distribute the matrix operation across the plurality of processing levels. In one example embodiment of an apparatus, the plurality of input matrices includes matrix data associated with one or more images and one or more filters, where the one or more images are associated with one or more channels. In one example embodiment of an apparatus, the plurality of processing elements is further configured to partition the plurality of input matrices based on one or more of: a number of channels associated with the one or more images; a number of filters; and a number of images. In one example embodiment of an apparatus, the plurality of processing elements is further configured to distribute the plurality of partial matrix operations among the plurality of processing elements based on a height and a width of the result of the matrix operation. In one example embodiment of an apparatus: the plurality of processing elements is configured in a cyclic arrangement such that each processing element is communicatively coupled to a plurality of neighbor processing elements; and the plurality of processing elements is further configured to: perform the plurality of partial matrix operations in a plurality of stages; and transmit a portion of the partial matrix data from each processing element to one or more of the neighbor processing elements while performing a particular stage of the partial matrix operations. In one example embodiment of an apparatus, the partial matrix data includes a partial input matrix, where the partial input matrix is to be used by a first processing element in a particular stage of the partial matrix operations, and where the partial input matrix is to be used by a second processing element in a subsequent stage of the partial matrix operations. In one example embodiment of an apparatus, the partial matrix data includes a partial result matrix determined by a first processing element in a particular stage of the partial matrix operations, and where the partial result matrix is to be used by a second processing element in a subsequent stage of the partial matrix operations.

Another example method may include: performing a matrix operation using a plurality of input matrices, where the matrix operation is associated with one or more convolution operations, and where performing the matrix operation includes: partitioning the plurality of input matrices into a plurality of input partitions, where the plurality of input matrices is partitioned based on a number of available processing elements; distributing the plurality of input partitions among a plurality of processing elements, where each input partition is distributed to a particular processing element of the plurality of processing elements; performing a plurality of partial matrix operations using the plurality of processing elements; transmitting partial matrix data between the plurality of processing elements while performing the plurality of partial matrix operations; and determining a result of the matrix operation based on the plurality of partial matrix operations.

In one example embodiment of a method: the plurality of processing elements is configured in a hierarchical arrangement including a plurality of processing levels; and the matrix operation is distributed across the plurality of processing levels. In one example embodiment of a method, the plurality of processing elements includes: a plurality of matrix processing chips; a plurality of logical processing nodes associated with each matrix processing chip; and a memory element and a plurality of matrix processing clusters associated with each logical processing node. In one example embodiment of a method, the plurality of input matrices includes matrix data associated with one or more images and one or more filters, where the one or more images are associated with one or more channels. In one example embodiment of a method, the plurality of input matrices is further partitioned based on one or more of: a number of channels associated with the one or more images;

a number of filters; and a number of images. In one example embodiment of a method, the method further includes distributing the plurality of partial matrix operations to the plurality of processing elements based on a height and a width of the result of the matrix operation. In one example embodiment of a method, the plurality of processing elements is configured in a cyclic arrangement such that each processing element is communicatively coupled to a plurality of neighbor processing elements. In one example embodiment of a method, the plurality of partial matrix operations is performed in a plurality of stages, and where each processing element transmits a portion of the partial matrix data to one or more of the neighbor processing elements while performing a particular stage of the partial matrix operations. In one example embodiment of a method, the partial matrix data includes a partial input matrix, where the partial input matrix is used by a first processing element in a particular stage of the partial matrix operations, and where the partial input matrix is used by a second processing element in a subsequent stage of the partial matrix operations. In one example embodiment of a method, the matrix operation is associated with a weight update operation in a neural network. In one example embodiment of a method, the partial matrix data includes a partial result matrix determined by a first processing element in a particular stage of the partial matrix operations, and where the partial result matrix is used by a second processing element in a subsequent stage of the partial matrix operations. In one example embodiment of a method, the matrix operation is associated with a forward propagation operation in a neural network. In one example embodiment of a method, the matrix operation is associated with a backward propagation operation in a neural network.

Another example system may include: a plurality of memory elements to store matrix data; a plurality of processing elements to perform a matrix operation using a plurality of input matrices, where the matrix operation is associated with one or more convolution operations, and where the plurality of processing elements includes: a host processor; one or more matrix processing chips; a plurality of matrix processors associated with the one or more matrix processing chips; where the plurality of processing elements is configured to: partition the plurality of input matrices into a plurality of input partitions, where the plurality of input matrices is partitioned based on a number of available processing elements; distribute the plurality of input partitions among the plurality of processing elements, where each input partition is distributed to a particular processing element of the plurality of processing elements; perform a plurality of partial matrix operations using the plurality of processing elements; transmit partial matrix data between the plurality of processing elements while performing the plurality of partial matrix operations; and determine a result of the matrix operation based on the plurality of partial matrix operations. In one example embodiment of a system, the system further includes a communication interface to communicate with one or more remote matrix processing chips over a communication network.

Another example machine accessible storage medium may have instructions stored thereon, where the instructions, when executed on a machine, cause the machine to: perform a matrix operation using a plurality of input matrices, where the matrix operation is associated with one or more convolution operations, and where the instructions that cause the machine to perform the matrix operation further cause the machine to: partition the plurality of input matrices into a plurality of input partitions, where the plurality of input matrices is partitioned based on a number of available processing elements; distribute the plurality of input partitions among a plurality of processing elements, where each input partition is distributed to a particular processing element of the plurality of processing elements; perform a plurality of partial matrix operations using the plurality of processing elements; transmit partial matrix data between the plurality of processing elements while performing the plurality of partial matrix operations; and determine a result of the matrix operation based on the plurality of partial matrix operations. In one example embodiment of a storage medium, the instructions further cause the machine to: perform the plurality of partial matrix operations in a plurality of stages; and transmit a portion of the partial matrix data from each processing element to one or more neighbor processing elements while performing a particular stage of the partial matrix operations.

Another example apparatus may include: a memory element including two-dimensional memory; and a processor to perform a matrix operation to reorder a plurality of dimensions of an input matrix stored in two-dimensional memory, where the processor is configured to: access data associated with the input matrix using one or more strided memory operations, where the one or more strided memory operations are configured to access the two-dimensional memory at a plurality of locations that are separated by a particular interval; and store the data accessed using the one or more strided memory operations in a result matrix, where the data accessed using each strided memory operation is stored in the result matrix in non-transpose form or transpose form.

In one example embodiment of an apparatus, the matrix operation includes a dimension shuffle operation to reorder the plurality of dimensions of the input matrix. In one example embodiment of an apparatus, the one or more strided memory operations are configured to access the two-dimensional memory at a plurality of rows that are separated by the particular interval, where the particular interval includes a particular number of rows. In one example embodiment of an apparatus, the one or more strided memory operations are configured to access the two-dimensional memory at a plurality of columns that are separated by the particular interval, where the particular interval includes a particular number of columns. In one example embodiment of an apparatus: the one or more strided memory operations are each configured to begin accessing the two-dimensional memory at a particular offset; and the processor is further configured to store the data in the result matrix based on an order in which the data is accessed using the one or more strided memory operations. In one example embodiment of an apparatus, the one or more strided memory operations include one or more convolutional read operations, the one or more convolutional read operations including at least one of: a non-transpose convolutional read, where data accessed using the non-transpose convolutional read is stored in the result matrix in non-transpose form; or a transpose convolutional read, where data accessed using the transpose convolutional read is stored in the result matrix in transpose form. In one example embodiment of an apparatus, the one or more convolutional read operations include at least one non-transpose convolutional read and at least one transpose convolutional read. In one example embodiment of an apparatus: the non-transpose form includes a same form in which the data is accessed in the two-dimensional memory; and the transpose form includes a form in which the data accessed in the two-dimensional memory is transposed. In one example embodiment of an apparatus, the matrix operation is associated with a convolution operation in a neural network.

Another example method may include: performing a matrix operation to reorder a plurality of dimensions of an input matrix stored in two-dimensional memory, where performing the matrix operation includes: accessing data associated with the input matrix using one or more strided memory operations, where the one or more strided memory operations are configured to access the two-dimensional memory at a plurality of locations that are separated by a particular interval; and storing the data accessed using the one or more strided memory operations in a result matrix, where the data accessed using each strided memory operation is stored in the result matrix in non-transpose form or transpose form.

In one example embodiment of a method, the matrix operation includes a dimension shuffle operation to reorder the plurality of dimensions of the input matrix. In one example embodiment of a method, the one or more strided memory operations are configured to access the two-dimensional memory at a plurality of rows that are separated by the particular interval, where the particular interval includes a particular number of rows. In one example embodiment of a method, the one or more strided memory operations are configured to access the two-dimensional memory at a plurality of columns that are separated by the particular interval, where the particular interval includes a particular number of columns. In one example embodiment of a method, the one or more strided memory operations each begin accessing the two-dimensional memory at a particular offset. In one example embodiment of a method, the data is ordered in the result matrix based on an order in which the data is accessed using the one or more strided memory operations. In one example embodiment of a method, the one or more strided memory operations include one or more convolutional read operations, the one or more convolutional read operations including at least one of: a non-transpose convolutional read, where data accessed using the non-transpose convolutional read is stored in the result matrix in non-transpose form; or a transpose convolutional read, where data accessed using the transpose convolutional read is stored in the result matrix in transpose form. In one example embodiment of a method, the one or more convolutional read operations include at least one non-transpose convolutional read and at least one transpose convolutional read. In one example embodiment of a method: the non-transpose form includes a same form in which the data is accessed in the two-dimensional memory; and the transpose form includes a form in which the data accessed in the two-dimensional memory is transposed. In one example embodiment of a method, the matrix operation is associated with a convolution operation in a neural network. In one example embodiment of a method, the matrix operation is associated with a backward propagation operation in a neural network. In one example embodiment of a method, the method further includes returning the result matrix in response to the command to perform the matrix operation.

Another example system may include: a memory element including two-dimensional memory; a plurality of processing elements, including: a host processor; one or more matrix processing chips; a plurality of matrix processors associated with the one or more matrix processing chips; where a matrix processor of the plurality of matrix processors is to perform a matrix operation to reorder a plurality of dimensions of an input matrix stored in two-dimensional memory, where the matrix processor is configured to: access data associated with the input matrix using one or more strided memory operations, where the one or more strided memory operations are configured to access the two-dimensional memory at a plurality of locations that are separated by a particular interval; and store the data accessed using the one or more strided memory operations in a result matrix, where the data accessed using each strided memory operation is stored in the result matrix in non-transpose form or transpose form. In one example embodiment of a system, the one or more strided memory operations include a plurality of convolutional read operations, the plurality of convolutional read operations including: a non-transpose convolutional read, where data accessed using the non-transpose convolutional read is to be stored in the result matrix in non-transpose form; and a transpose convolutional read, where data accessed using the transpose convolutional read is to be stored in the result matrix in transpose form.

Another example machine accessible storage medium may have instructions stored thereon, where the instructions, when executed on a machine, cause the machine to: perform a matrix operation to reorder a plurality of dimensions of an input matrix stored in two-dimensional memory, where the instructions that cause the machine to perform the matrix operation further cause the machine to: access data associated with the input matrix using one or more strided memory operations, where the one or more strided memory operations are configured to access the two-dimensional memory at a plurality of locations that are separated by a particular interval; and store the data accessed using the one or more strided memory operations in a result matrix, where the data accessed using each strided memory operation is stored in the result matrix in non-transpose form or transpose form. In one example embodiment of a storage medium, the one or more strided memory operations include a plurality of convolutional read operations, the plurality of convolutional read operations including: a non-transpose convolutional read, where data accessed using the non-transpose convolutional read is stored in the result matrix in non-transpose form; and a transpose convolutional read, where data accessed using the transpose convolutional read is stored in the result matrix in transpose form.

Another example apparatus may include: a multi-dimensional memory; a plurality of processing elements to perform a matrix operation on one or more matrix operands, where the plurality of processing elements includes one or more matrix processors; where the plurality of processing elements is configured to: obtain matrix data from the multi-dimensional memory, where the matrix data is associated with the one or more matrix operands; obtain the one or more matrix operands from the matrix data; identify a matrix subroutine associated with the matrix operation; execute the matrix subroutine using the one or more matrix operands; and obtain a result of the matrix operation based on the executed matrix subroutine.

In one example embodiment of an apparatus, the apparatus further includes a matrix subroutine memory, where the matrix subroutine memory includes one or more matrix subroutines associated with one or more matrix operations. In one example embodiment of an apparatus, the plurality of processing elements is further configured to obtain the matrix subroutine from the matrix subroutine memory. In one example embodiment of an apparatus, the plurality of processing elements is further configured to: obtain the matrix subroutine from a host computing system; and store the matrix subroutine in the matrix subroutine memory. In one example embodiment of an apparatus, the matrix subroutine includes one or more instructions associated with the matrix operation. In one example embodiment of an apparatus, the one or more instructions of the matrix subroutine include one or more matrix computation instructions associated with the matrix operation. In one example embodiment of an apparatus, the one or more instructions of the matrix subroutine include an indication of one or more memory locations associated with the one or more matrix operands. In one example embodiment of an apparatus, the plurality of processing elements is further configured to slice the matrix data to extract the one or more matrix operands. In one example embodiment of an apparatus, the plurality of processing elements is further configured to execute one or more instructions to extract the one or more matrix operands from the matrix data. In one example embodiment of an apparatus, the plurality of processing elements is further configured to execute one or more instructions to obtain the matrix data from one or more memory locations of the multi-dimensional memory. In one example embodiment of an apparatus, the matrix operation includes one or more matrix multiplication operations. In one example embodiment of an apparatus, the matrix operation includes one or more convolution operations. In one example embodiment of an apparatus, the matrix operation is associated with a forward propagation operation in a neural network. In one example embodiment of an apparatus, the matrix operation is associated with a backward propagation operation in a neural network.

Another example method may include: performing a matrix operation on one or more matrix operands, where performing the matrix operation includes: obtaining matrix data from a multi-dimensional memory, where the matrix data is associated with the one or more matrix operands; obtaining the one or more matrix operands from the matrix data; identifying a matrix subroutine associated with the matrix operation; executing the matrix subroutine on a matrix processor using the one or more matrix operands; and obtaining a result of the matrix operation based on the matrix subroutine executed by the matrix processor.

In one example embodiment of a method, the method further includes obtaining the matrix subroutine from a matrix subroutine memory, where the matrix subroutine memory includes one or more matrix subroutines associated with one or more matrix operations. In one example embodiment of a method, the matrix subroutine includes one or more instructions associated with the matrix operation. In one example embodiment of a method, the one or more instructions of the matrix subroutine include one or more matrix computation instructions associated with the matrix operation. In one example embodiment of a method, the one or more instructions of the matrix subroutine include an indication of one or more memory locations associated with the one or more matrix operands. In one example embodiment of a method, obtaining the one or more matrix operands from the matrix data includes executing one or more instructions to extract the one or more matrix operands from the matrix data. In one example embodiment of a method, obtaining the matrix data from the multi-dimensional memory includes executing one or more instructions to obtain the matrix data from one or more memory locations of the multi-dimensional memory.

Another example system may include: a plurality of memory elements, where the plurality of memory elements includes a multi-dimensional memory; and a plurality of processing elements to perform a matrix operation on one or more matrix operands, where the plurality of processing elements includes: a host processor; one or more matrix processing chips; and a plurality of matrix processors associated with the one or more matrix processing chips; where the plurality of processing elements is configured to: obtain matrix data from the multi-dimensional memory, where the matrix data is associated with the one or more matrix operands; obtain the one or more matrix operands from the matrix data; identify a matrix subroutine associated with the matrix operation; execute the matrix subroutine using the one or more matrix operands; and obtain a result of the matrix operation based on the executed matrix subroutine. In one example embodiment of a system, the system further includes a communication interface to communicate with one or more remote matrix processing chips over a communication network.

Another example machine accessible storage medium may have instructions stored thereon, where the instructions, when executed on a machine, cause the machine to: perform a matrix operation on one or more matrix operands, where the instructions that cause the machine to perform the matrix operation further cause the machine to: obtain matrix data from a multi-dimensional memory, where the matrix data is associated with the one or more matrix operands; obtain the one or more matrix operands from the matrix data; identify a matrix subroutine associated with the matrix operation; execute the matrix subroutine on a matrix processor using the one or more matrix operands; and obtain a result of the matrix operation based on the matrix subroutine executed by the matrix processor. In one example embodiment of a storage medium, the instructions further cause the machine to obtain the matrix subroutine from a matrix subroutine memory, where the matrix subroutine memory includes one or more matrix subroutines associated with one or more matrix operations.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:
1. An apparatus comprising:
interface circuitry to communicate with a network of processing units, wherein each processing unit is connected to at least one other processing unit in the network, and each processing unit is to perform matrix multiplication operations;
a memory comprising high-bandwidth memory (HBM) to store tensor data; and
processor circuitry to:
obtain an instruction received from a host processor coupled to the apparatus, wherein the instruction indicates one or more tensor operands corresponding to the tensor data;
partition the tensor data into a number of partitions based on a number of processing units in the network of processing units;
cause the interface circuitry to distribute the partitioned tensor data from the HBM to memory resources blocks of corresponding processing units in the network of processing units to perform partial matrix multiplication operations on the partitioned tensor data and to output partial tensor operands of the instruction from a processing unit to neighboring processing units of the processing unit in the network of processing units;

invoke a set of operations including pre-arithmetic operations that comprise an addition operation on the tensor data prior to the partial matrix multiplication operations, post-arithmetic operations after the partial matrix multiplication operations, and a matrix-wide operation on the processing units based on the instruction, wherein the set of operations includes operations on the tensor operands, and the matrix-wide operation processes data among elements of a single matrix; and
output a result of the set of operations, wherein the result includes a tensor value to be stored in a location in a memory resource block identified by the instruction.
2. The apparatus of claim 1, wherein the processor circuitry is further to cause the memory to store the result, wherein the result is stored as a tensor value in the memory.
3. The apparatus of claim 1, wherein the processor circuitry sends the result to a host device, and the host device includes the host processor connected to the processor circuitry.
4. The apparatus of claim 1, wherein the processor circuitry is to select a subset of the network of processing units to perform the set of operations.
5. The apparatus of claim 4, wherein the subset of processing units includes two or more of the processing units.
6. The apparatus of claim 1, wherein the instruction includes a stream of instructions and the processor circuitry is to coordinate data flow and a sequence of operations to be performed by the network of processing units based on the stream of operations.
7. The apparatus of claim 6, wherein the sequence of operations includes a sequence of tensor arithmetic operations.
8. The apparatus of claim 7, wherein the sequence of tensor operations includes matrix-matrix operations.
9. The apparatus of claim 1, wherein the memory includes a memory resource block to be shared by two or more processing units in the network of processing units.
10. The apparatus of claim 9, wherein invoking the set of operations includes pointing one or more of the processing units to the memory resource block to access the tensor data.
11. The apparatus of claim 10, wherein the set of operations include at least one of a row/column broadcast, block shifting, matrix copy, matrix transpose, and matrix expansion.
12. The apparatus of claim 9, wherein the memory includes a memory block to group a plurality of memory resource blocks, and two or more processing units in the network of processing units have read/write access to the plurality of memory resource blocks in the memory block.
13. The apparatus of claim 1, further including an on-chip router to route data multi-directionally between components of the apparatus.
14. The apparatus of claim 1, wherein the memory includes one or more barrel shifters to shift a matrix described in the memory to target a read or write to a particular row or column of the matrix.
15. The apparatus of claim 1, wherein the set of operations includes a max pooling operation.
16. The apparatus of claim 1, wherein the set of operations includes performing a Winograd transformation on the operands and performing a matrix multiplication on the operands transformed by the Winograd transformation.
17. The apparatus of claim 1, wherein each the tensor operands includes a matrix.

18. The apparatus of claim 1, wherein the tensor operands include a particular input matrix and the set of operations includes a matrix dimension shuffle operation to reorder a plurality of dimensions of the particular input matrix.

19. The apparatus of claim 1, wherein at least a particular processing unit in the network of processing units includes local memory to store a set of matrix subroutines, and the particular processing unit is to:

translate an operation received from the processor circuitry into a subset of the matrix subroutines; and perform the operation through execution of the subset of the matrix subroutines.

20. The apparatus of claim 1, wherein the set of operations are used to implement one of a set of deep learning models, and the set of deep learning models includes a multilayer perceptron model, a restricted Boltzmann machine model, a deep belief network model, an auto-encoder model, and a convolutional neural network.

21. A method comprising:

storing tensor data in memory comprising high-bandwidth memory (HBM), wherein the memory is accessible to a network of processing units of an apparatus;

obtaining an instruction from a host processor coupled to the apparatus, wherein the instruction indicates one or more tensor operands corresponding to the tensor data;

partitioning the tensor data into a number of partitions based on a number of processing units in the network of processing units;

distributing the partitioned tensor data from the HBM to memory resource blocks of corresponding processing units in the network of processing units;

causing the processing units to perform partial matrix multiplication operations on the partitioned tensor data and to output partial tensor operands of the instruction from a processing unit to neighboring processing units of the processing unit in the network of processing units; and generating a result from performance of the partial matrix multiplication operations, the operations including pre-arithmetic operations that comprise an addition operation on the tensor data prior to the partial matrix multiplication operations, post-arithmetic operations after the partial matrix multiplication operations, and a matrix-wide operation, wherein the result includes a tensor value to be stored in a location in a memory resource block identified by the instruction, and the matrix-wide operation processes data among elements of a single matrix.

22. A system comprising:

a port to connect to a host processor;

a plurality of processing units, wherein each processing unit includes circuitry to perform tensor arithmetic operations;

a memory comprising high-bandwidth memory (HBM) to store tensor data; and processor circuitry to:

obtain an instruction from the host processor, the instruction indicating one or more tensor operands corresponding to the tensor data;

partition the tensor data into a number of partitions based on a number of processing units in the plurality of processing units;

distribute the partitioned tensor data from the HBM to memory resource blocks of corresponding processing units in the plurality of processing units;

cause the processing units to perform partial matrix multiplication operations on the partitioned tensor data and to output partial tensor operands of the instruction from a processing unit to neighboring processing units of the processing unit in the plurality of processing units;

cause the one or more of the processing units to perform a set of operations including pre-arithmetic operations that comprise an addition operation on the tensor data prior to the partial matrix multiplication operations, post-arithmetic operations after the partial matrix multiplication operations, and a matrix-wide operation based on the instruction, wherein the set of operations include operations on the tensor operands, and the matrix-wide operation processes data among elements of a single matrix; and return a result of the set of operations to the host processor, wherein the result includes a tensor value to be stored in a location in a memory resource block identified by the instruction.

23. The system of claim 22, further including the host processor.

24. The system of claim 23, wherein the system is implemented using a system on a chip.

25. The system of claim 23, wherein the system is implemented using a server blade.

* * * * *